United States Patent
Bradbury et al.

(10) Patent No.: US 10,491,448 B2
(45) Date of Patent: Nov. 26, 2019

(54) ACCESSING CONTENT

(75) Inventors: Richard Bradbury, London (GB);
Tony Ageh, London (GB); Gemma Garmeson, London (GB); Fraser Pearce, London (GB); Matthew Browning, London (GB); Ben Gammon, London (GB); Julia Whitney, London (GB); Julie Dodd, London (GB); Jurgen Hoehn, London (GB)

(73) Assignee: British Broadcasting Corporation, London (GB)

( * ) Notice: Subject to any disclaimer, the term of this patent is extended or adjusted under 35 U.S.C. 154(b) by 0 days.

(21) Appl. No.: 12/465,787

(22) Filed: May 14, 2009

(65) Prior Publication Data
US 2010/0100899 A1    Apr. 22, 2010

Related U.S. Application Data

(63) Continuation of application No. PCT/GB2007/004357, filed on Nov. 15, 2007.

(30) Foreign Application Priority Data

Nov. 15, 2006 (GB) .................................. 0622823.3
May 22, 2007 (GB) .................................. 0709816.3
Jul. 24, 2007 (GB) .................................. 0714434.8

(51) Int. Cl.
*H04N 21/231* (2011.01)
*H04N 21/24* (2011.01)
(Continued)

(52) U.S. Cl.
CPC ... *H04L 29/06027* (2013.01); *H04N 7/17318* (2013.01); *H04N 21/262* (2013.01);
(Continued)

(58) Field of Classification Search
CPC ............ H04N 21/231; H04N 21/2407; H04N 21/262; H04N 21/4307; H04N 21/44204
See application file for complete search history.

(56) References Cited

U.S. PATENT DOCUMENTS 5,751,282 A * 5/1998 Girard ................ H04N 5/44543
                                                     348/E5.105
2001/0056497 A1* 12/2001 Cai et al. ...................... 709/230
(Continued)

FOREIGN PATENT DOCUMENTS

EP          0976243 A2      2/2000
EP          1250805 A1     10/2002
(Continued)

OTHER PUBLICATIONS

"Great Britain Application Serial No. GB0722526.1, United Kingdom Search Report dated Mar. 7, 2008", 2 pgs.
(Continued)

*Primary Examiner* — Brian T Pendleton
*Assistant Examiner* — Jean D Saint Cyr
(74) *Attorney, Agent, or Firm* — Schwegman Lundberg & Woessner, P.A.

(57) ABSTRACT

Various embodiments include a system for providing users access to audio/visual content, the system comprising means for storing content, means for broadcasting content on a scheduled basis, means for downloading the stored content from the storage means, means for enabling a user to access the downloaded content only within a specified time period, means for streaming content off the storage means, and means for receiving the content broadcast on a scheduled basis.

29 Claims, 104 Drawing Sheets

(51) Int. Cl.
  *H04N 21/262*   (2011.01)
  *H04N 21/43*    (2011.01)
  *H04N 21/442*   (2011.01)
  *H04N 21/472*   (2011.01)
  *H04L 29/06*    (2006.01)
  *H04N 7/173*    (2011.01)
  *H04N 21/433*   (2011.01)
  *H04N 21/4545*  (2011.01)
  *H04N 21/84*    (2011.01)
  *H04N 21/858*   (2011.01)

(52) U.S. Cl.
  CPC ... *H04N 21/4334* (2013.01); *H04N 21/45457* (2013.01); *H04N 21/47214* (2013.01); *H04N 21/84* (2013.01); *H04N 21/858* (2013.01)

(56) References Cited

U.S. PATENT DOCUMENTS

| | | | |
|---|---|---|---|
| 2004/0133923 A1* | 7/2004 | Watson | G06Q 30/06 725/134 |
| 2005/0097624 A1* | 5/2005 | Salo | H04H 20/18 725/136 |
| 2005/0108748 A1 | 5/2005 | Nishikawa et al. | |
| 2005/0114672 A1 | 5/2005 | Duncan et al. | |
| 2005/0120369 A1 | 6/2005 | Matz | |
| 2005/0195978 A1* | 9/2005 | Babic | G06F 21/10 380/231 |
| 2006/0031548 A1 | 2/2006 | Funchess | |
| 2007/0079342 A1* | 4/2007 | Ellis | H04N 5/913 725/89 |
| 2007/0209065 A1* | 9/2007 | Branann | H04L 63/0815 726/5 |
| 2010/0154011 A1* | 6/2010 | Soo et al. | 725/101 |
| 2011/0107365 A1* | 5/2011 | Chen | H04N 7/17318 725/29 |

FOREIGN PATENT DOCUMENTS

| | | |
|---|---|---|
| EP | 1530115 A2 | 5/2005 |
| EP | 1803048 A1 | 7/2007 |
| GB | 2378079 A | 1/2003 |
| GB | 2415567 A | 12/2005 |
| WO | WO-01/74074 A1 | 10/2001 |

OTHER PUBLICATIONS

"International Application Serial No. PCT/GB2007/004357, International Search Report dated May 8, 2008", 7 pgs.

"International Application Serial No. PCT/GB2007/004357, Written Opinion dated May 8, 2008", 12 pgs.

* cited by examiner iPlayer Manager
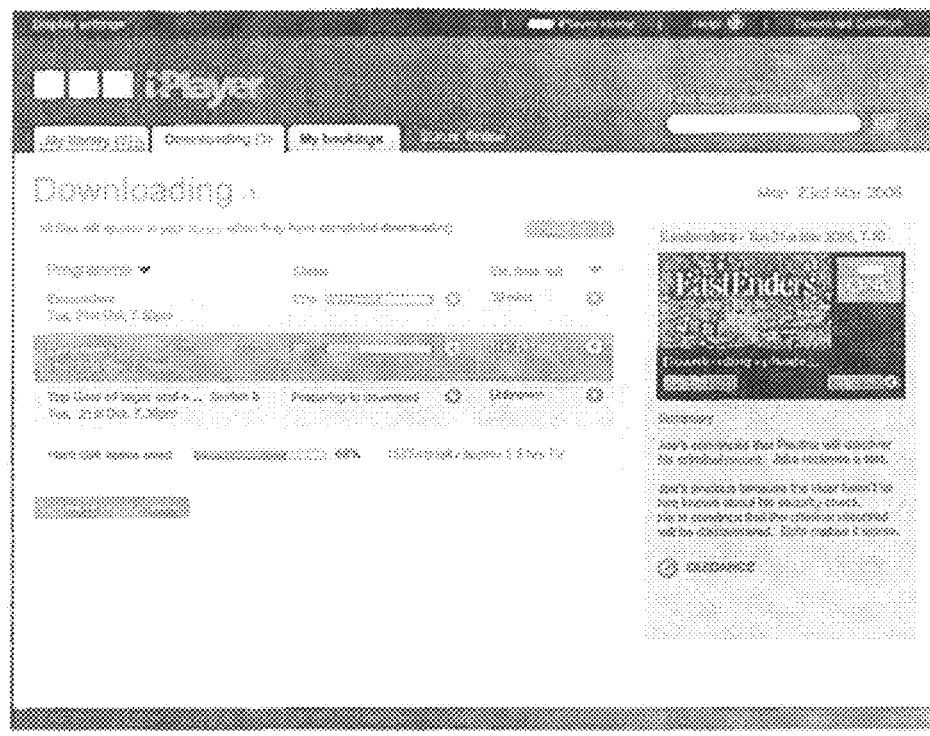
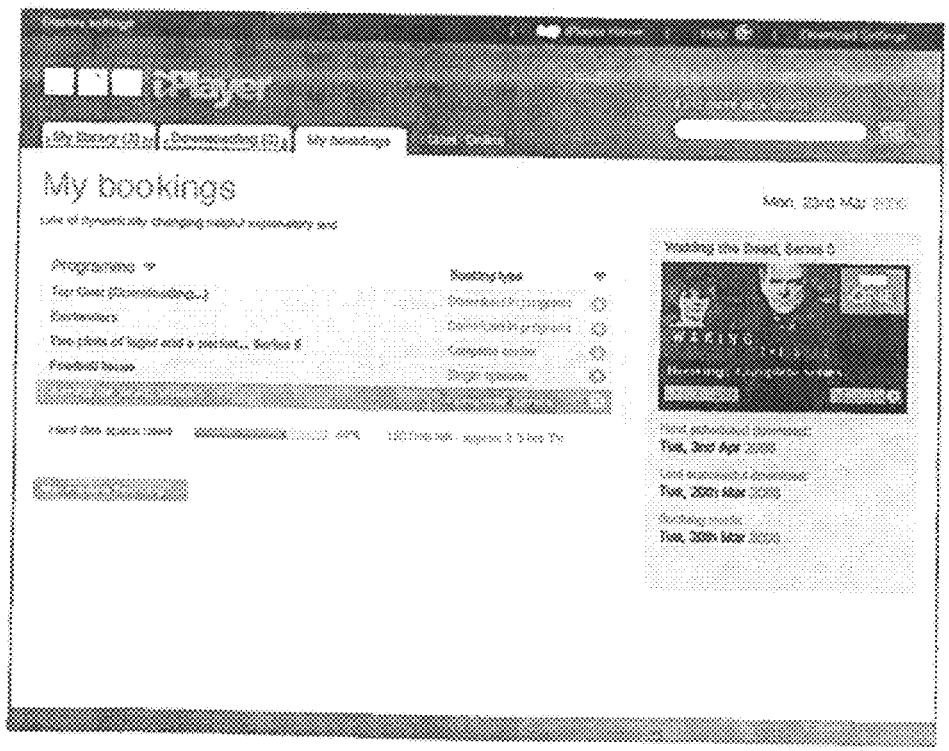
Fig. 20

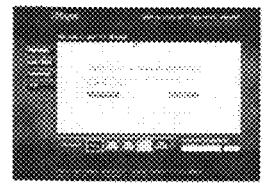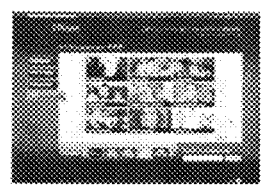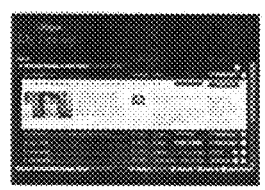
Fig. 51

An episode is broadcast on Tuesday ... 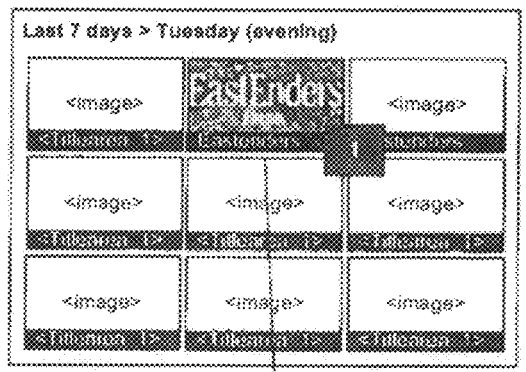 Another version of this episode (BSL) is broadcast on the following Thursday ... 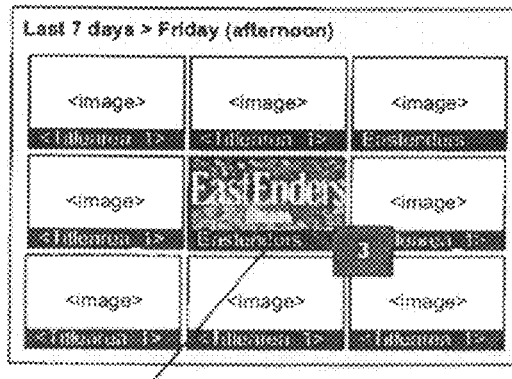
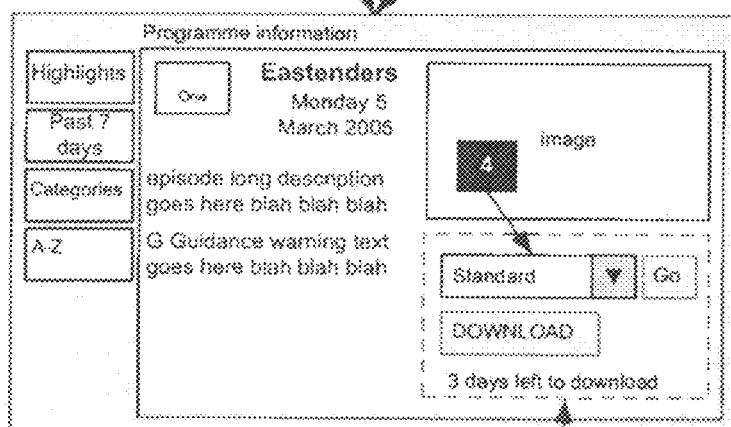
Fig. 63

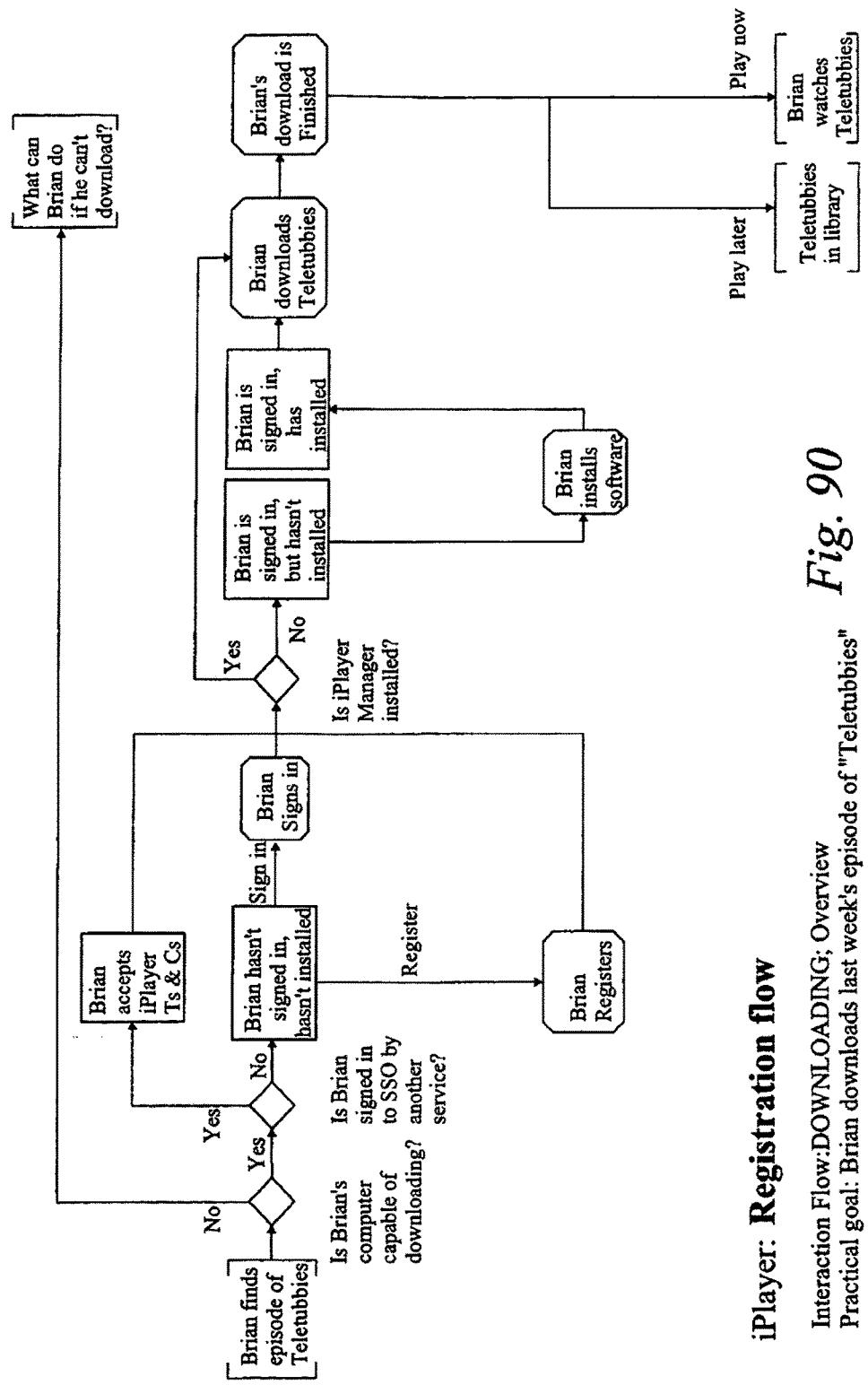

iPlayer: Registration flow
Interaction Flow:DOWNLOADING: Register
Practical goal: Brian downloads last week's episode of "Teletubbies"

ACCESSING CONTENT

RELATED APPLICATIONS

This is a continuation under 35 U.S.C. 111(a) of PCT/GB2007/004357, filed Nov. 15, 2007, and published in English as WO 2008/059250 A3 on May 22, 2008, which claimed priority to United Kingdom application no. 0709816.3, filed May 22, 2007, United Kingdom application no. 0714434.8, filed Jul. 24, 2007, and United Kingdom application no. 0622823.3, filed Nov. 15, 2006; which applications and publications are incorporated in their entirety herein by reference and made a part hereof.

The present invention relates to a system and method for providing users access to audio/visual content. This invention also relates to an electronic program guide and to a graphical user interface.

Combined Download and Streaming System

According to one aspect of the present invention there is provided a system for providing users access to audio/visual content, the system comprising means for storing content, means for broadcasting content on a scheduled basis, means for downloading the stored content from the storage means, means for streaming content off the storage means, and means for receiving the content broadcast on a scheduled basis.

Preferably, the system further comprises means for ordering content which has not yet been broadcast on a scheduled basis. The downloading means may be adapted to download ordered content following the broadcast of the content without further user intervention.

Preferably, the broadcasting means is adapted to broadcast content in the form of a simultaneous broadcast (simulcast) transmission. The simulcast transmission may be selected from two or more of the following group of broadcast transmission media: a terrestrial television and/or radio broadcast; a cable television broadcast; a satellite television broadcast; and publication on the internet.

Preferably, the downloading means is adapted to download the content in from form of a file.

Preferably, the system further comprises a media player for opening and playing content. The media player may be adapted to open and play downloaded files.

The media player may be adapted to play streamed content.

The media player may be adapted to play broadcast content.

The player may be in the form of a standalone player console. The player may be in the form of a standalone module adapted to be independently downloaded and/or installed onto a client device.

Preferably, the streaming means is adapted to stream content directly off the storage means.

Preferably, the streaming means is adapted to stream content via a peer-to-peer network.

Preferably, the system further comprises means for searching for content items stored on the storage means. The searching means may be adapted to search for content in dependence on the means by which the content may be accessed or played.

Preferably, the system further comprises a content management console for managing downloaded content. The content management console may be adapted to be independently downloaded and/or installed onto a client device. It may comprise means for indexing related content items together.

The system may further comprise a user interface which provides a set of folders under which related content items are indexed.

Preferably, the system further comprises means for restricting access to content items in dependence on whether a content item is marked with a guidance flag. The system may further comprise means for assigning guidance flags to content items automatically in dependence on metadata associated with a content item.

Preferably, the system further comprises means for transmitting further content relating to a particular content item separately from the content item once the content item has been downloaded. The system may further comprise means for linking the further content to a content item once the further content item has been received. The further content may be in the form of accessibility information. The accessibility information may comprise subtitle, sign language and/or audio description information.

The transmitting means may be adapted to initiate the transmission of the of the further content once the further content becomes available.

Preferably, the system further comprises a user interface for enabling a user to access content which may be downloaded, streamed and broadcast. The user interface may be in the form of an Electronic Programme Guide (EPG) which is adapted to enable a user to access all available audio/visual content.

Calls to Action

The invention provides a system for providing users access to audio/visual content, the system comprising means for storing content, means for assigning an access operation to a content item, the access operation being related to the method by which a user is able to view and/or listen to the stored content, and means for altering the access operation in dependence on a change to a characteristic associated with the content item.

Preferably, the characteristic relates to whether or not the content has previously been broadcast, preferably on a scheduled basis.

Preferably, the characteristic relates to the date on which the content was broadcast. The characteristic may relate to a time period during which the content is accessible to users. The characteristic may relate to commercial rights associated with the content item.

Preferably, the access operation enables a user to access the content item in one or more of the following ways: by downloading the content, by streaming the content, and by ordering the content.

Preferably, the system further comprises means for enabling a user to stream content.

Preferably, the system further comprises means for enabling a user to download content.

Preferably, the system further comprises means for enabling a user to order content.

Preferably, the system further comprises means for enabling a user to access live broadcast and/or simulcast content.

Preferably, the system further comprises means for disabling access to content items. The disabling means may be adapted to disable access to content items after a predetermined time interval.

Preferably, the system further comprises a user interface for displaying content items. The user interface may comprise an Electronic Programme Guide (EPG).

Preferably, the system further comprises means for displaying a user selectable icon associated with each content item, wherein the icon corresponds to a particular access operation. The icon may change in dependence on changes to a characteristic of the content item. The display means may further comprise means for displaying text associated with each content item. The text displayed may be selected from the following group of terms: "download now"; "book now"; "order now"; "watch now"; and "listen now".

Preferably, the system further comprises means for altering a link on a webpage in dependence on changes to the characteristic, wherein the link provides access to the content item.

The invention further provides a system for providing users access to audio/visual content, the system comprising means for storing content, means for assigning an access operation to a content item, the access operation being related to the method by which a user is able to view and/or listen to the stored content, means for altering the access operation in dependence on a change to a characteristic associated with the content item; and means for updating an internet webpage connectable to the system based on the change.

Preferably, the webpage provides a link to the content item, and wherein the updating means is adapted to update said link.

EPG Aspects

The invention provides an electronic programme guide (EPG), which comprises means for outputting a selection of available audio/visual content to a user within a display area, a plurality of user selectable indicia, each corresponding to a characteristic associated with at least one content item, and means for filtering the content items output to the display area in accordance with the selection of one or more of the indicia by the user, thereby to display only those content items which match the selected (filtering) characteristic.

Preferably, the characteristic is selected from the following group of content item characteristics: the date and/or time on which content was broadcast; the date and/or time on which the content will be broadcast; the content broadcast channel; the type of content; the title of the content.

Preferably, the output means is adapted to output default content items prior to the user selecting a particular characteristic.

Preferably, the default content items are editorially selected and/or are content items that a broadcaster wishes to promote.

Preferably, the EPG further comprises means for displaying content items to the user in graphical format.

Preferably, the indicia are in the form of user selectable icons, preferably buttons or tabs.

Preferably, the output means is adapted to output a menu of parameters and/or options associated with each characteristic upon the selection of each of the respective indicia by the user. The menu may be superimposed over the content items displayed in the display area.

The output means may be adapted to refine the selection of content items displayed in the display area in dependence on the particular parameters and/or options selected by the user. The output means may be adapted to display a calendar window upon selection of an indicia related to a date on which the content was broadcast. The calendar window may comprise a range of user selectable dates provided in a graphical format. The calendar window may comprise a range of dates in the past. The calendar window may output a sequential range of dates in the past, and preferably the current date and the previous six dates. The current date and yesterday's date may be shown using larger graphical icons on the calendar window than the other dates shown on the calendar.

Preferably, the output means is adapted to display a selection of possible categories, channels and/or titles upon selection of each of a respective category, channel and/or title icon.

Preferably, the EPG further comprises means for enabling a user to select at least a further characteristic associated with at least one content item, and wherein the filtering means is adapted to output only those content items having both of the selected characteristics. The further characteristic may be selectable once the output means has output content items which have already been filtered on the basis of a user's selection of an initial characteristic. Certain further characteristics may be selected by default.

Preferably, the output means comprises means for enabling the user to filter the output of content depending on a time slot during which the content was broadcast, and preferably depending on whether the content was broadcast in the morning, afternoon or evening.

Preferably, the output means further comprises means for displaying a graphical indication representative of the or each characteristic which has been used to filter the output of content items.

Preferably, the output means is adapted to output content items in the form of a matrix of graphical representations of the content items, and preferably each content item is represented by an image associated with a respective content item.

Preferably, the EPG further comprises means for displaying information relating to each content item. The display means may be adapted to display information relating to a particular content item when a particular content item is highlighted by a user, and preferably upon roll-over by a cursor and/or pointer device. The information may relate to the status of the content item, and preferably the amount of time remaining to download and/or play the particular content item.

Preferably, the output means is further adapted to open a content item window in response to the selection of a particular content item by a user. The content item window may provide details relating to the content item, and preferably, information selected from one or more of the items listed in the following group: parental guidance information; accessibility information (the availability of subtitles or sign language); a program summary; and version and/or repeat broadcast information.

Preferably, the EPG further comprises means for enabling a user to download a content item.

Preferably, the output means is adapted to output a single graphic representation of a content item corresponding to multiple versions and/or repeat broadcasts of a content item.

"Idents"

The system as aforesaid, in any aspect, may further comprise means for selecting automatically a further content item to be transmitted to the user, and means for transmitting said further content item to the user.

The invention provides a system for providing users access to audio/visual content, the system comprising means for storing content, means for enabling a user to download the stored content (optionally in the form of a downloadable file) from the storage means, means for selecting automatically a further content item to be transmitted to the user, and means for transmitting said further content item to the user.

Preferably, the transmitting means is adapted to automatically transmit the selected content item to a user. Preferably, the transmitting means is adapted to transmit the selected content item to the user upon user login or registration.

Preferably, the system further comprises means for updating the further content items on a periodic basis. The transmitting means may be adapted to transmit an updated content item to the user upon user login or registration.

Preferably, the transmitting means is adapted to transmit a plurality of selected content items to the user.

Preferably, the content item is selected in dependence on the content item which is downloaded by a user.

Preferably, the system selected content item comprises a short broadcast channel audio/visual identification theme ("a channel ident").

Preferably, the system selected content item comprises an audio/visual advertisement.

Preferably, the system further comprises means for selecting the system selected content in dependence on the content downloaded by the user.

Preferably, the system further comprises means for linking user downloaded content with system selected content items following the download of content by the user. The linking means may be adapted to link user downloaded content with a system selected content item in dependence on the nature and/or type of the downloaded user content.

Preferably, the system further comprises means for playing back a system selected content item prior to playing back user downloaded content.

Preferably, the system further comprises means for interrupting playback of a user downloaded content with a system selected content item.

Preferably, the system further comprises means for adding the system selected content item to user downloaded content following the download of content by the user.

The invention provides a system for providing users access to audio/visual content, the system comprising means for storing content, means for broadcasting content on a scheduled basis, means for downloading the stored content from the storage means, and means for restricting access to content items in dependence on whether a content item is marked with a guidance flag.

Preferably, the system further comprises means for assigning guidance flags to content items automatically in dependence on metadata associated with a content item.

Preferably, the system further comprises means for streaming content off the storage means, and means for receiving the content broadcast on a scheduled basis.

The invention provides a system for providing users access to audio/visual content, the system comprising means for storing content, means for broadcasting content on a scheduled basis, means for downloading the stored content from the storage means, and means for transmitting further content relating to a particular content item separately from the content item once the content item has been downloaded.

Preferably, the system further comprises means for linking the further content to a content item once the further content item has been received.

The further content may be in the form of accessibility information.

The accessibility information may comprise subtitle, sign language and/or audio description information.

Preferably, the transmitting means is adapted to initiate the transmission of the of the further content once the further content becomes available.

The invention extends to a system for providing users access to audio/visual content as aforesaid (in any aspect), further comprising an interface for enabling the transmission of audio/visual content items along with associated metadata associated with such content items.

The invention provides a system for enabling audio/visual content items to be transmitted from one content provision or distribution system to another, which comprises an interface for enabling said content items to be transmitted along with accompanying metadata which provides details of said content items.

Preferably, the metadata is in the form of a standardised profile capable of being interpreted by either system. The profile may be based on an open standard.

The invention extends to a system for providing users access to audio/visual content, the system comprising means for storing content, means for broadcasting content on a scheduled basis, means for downloading the stored content from the storage means, and means for ordering the download of a series of related content items.

The invention extends to an Electronic Program Guide (EPG) which comprises means for listing content available on multiple channels, and means for displaying program information relating to a content item upon selection of a particular content item, the display means being adapted to display the program information such that it only obscures certain content items.

Preferably, the program information only obscures content items which are not similar in some respect to the selected content item. The content items which do not form part of the same channel may be obscured. The content items which are not broadcast at the same or a similar time may be obscured.

Preferably, the display means is adapted to graphically interlink the selected content item with the program information.

The invention extends to a system as aforesaid (in any aspect), further comprising an EPG as aforesaid.

The invention also provides a computer program and a computer program product comprising software code adapted, when executed on a data processing apparatus, to perform any of the methods described herein, including any or all of their component steps.

The invention also provides a computer program and a computer program product comprising software code which, when executed on a data processing apparatus, comprises any of the apparatus features described herein.

The invention also provides a computer program and a computer program product having an operating system which supports a computer program for carrying out any of the methods described herein and/or for embodying any of the apparatus features described herein.

The invention also provides a computer readable medium having stored thereon the computer program as aforesaid.

The invention also provides a signal carrying the computer program as aforesaid, and a method of transmitting such a signal.

According to one aspect of the invention, there is provided a system for providing users access to audio/visual content, the system comprising means for storing content, means for broadcasting content on a scheduled basis, means for enabling a user to download stored content, optionally in the form of a downloadable file, means for enabling a user to view the content by opening and playing the downloaded file, the means for viewing the content being adapted to enable a user to view content directly off the storage means, optionally on a streamed basis, and being adapted to enable a user to view content broadcast on a scheduled basis.

According to another aspect of the invention, there is provided a system for providing users access to audio/visual content, the system comprising means for storing content, means for broadcasting content on a scheduled basis, means for enabling a user to download the stored content, means for enabling a user to view and/or listen to the content directly off the storage means (preferably in the form of streaming content), and means for enabling a user to receive the content broadcast on a scheduled basis.

According to a further aspect of the invention, there is provided an electronic programme guide (EPG), which comprises means for downloading content from a remote storage means, means for streaming content directly off the storage means, and means for receiving live broadcast content.

Preferably, the EPG further comprises a graphical user interface that enables a user to download content, to stream content and/or receive live broadcast content. Preferably some or all of these activities can be carried out on the same receiving unit and/or display, and/or via the same interface, preferably via the same screen on the interface Preferably there is provided (optionally independently) a server for storing content for streaming, for storing downloadable files and/or for transmitting live broadcast content. Preferably, the server includes means for inhibiting one, some or all of these activities in dependence on the time/date with respect to the live broadcast content. Preferably, the server includes means for receiving the live broadcast content, and for storing said content as streamable content and/or a downloadable file.

Preferably there is provided means for receiving and optionally storing schedule information (such as the time) of the content.

Preferably, the means for opening and playing the downloaded file is adapted to open and/or play the downloaded file only after the scheduled broadcast time of the content, preferably only within a fixed time period after the scheduled broadcast time.

Preferably, the system further comprises means for booking or ordering content which has not yet been broadcast on a scheduled basis, for future downloading and/or viewing.

Preferably, the system further comprises a single media player adapted to view and/or access broadcast content, streamed content and downloaded content. In this way a user is able to download content that has previously been broadcast, view content which is broadcast on a scheduled basis, view content on an on-demand basis and book content for future viewing and/or downloading all via a single media player and content access system.

Preferably, the media player comprises a player console adapted to enable a user to view downloaded, broadcast or streamed content.

Preferably, the system further comprises a searching console adapted to enable a user to search for particular content items, optionally stored on the storage means.

Preferably, the system further comprises a content management console adapted to enable a user to manage downloaded content.

Preferably, each of the player, searching and management consoles are in the form of separate client modules adapted to be independently downloaded and/or installed onto a client device in dependence on user requirements. Thus, if a user only requires the player console to view streamed or broadcast content, only that console is installed by the user.

Preferably, the system further comprises an internet website, in which case the content is accessible over the internet.

Preferably, the content management console comprises means for storing related content items within separate folders. More preferably, the content management console comprises means for storing each item forming part of a series of content items in a series sub-folder.

Preferably, the system further comprises means for searching for content stored on the storage means. Any of the searching features described herein may be provided independently.

Preferably, the searching means is adapted to display content items matching a searching criterion together with a set of user selectable icons each icon corresponding to a particular viewing or access option associated with a content item fitting the search criteria.

Preferably, the searching means is adapted to display related content items to the content items matching the search criteria. More preferably, the searching means is adapted to display an editorialised set of search results relating to the content items matching the search criteria.

Preferably, the searching means is adapted to enable a user to search for content in dependence on the means by which the content may be accessed or viewed. In this way a user may search only for content that can be downloaded, or only for content that can be viewed (via streaming) immediately.

Preferably, the searching means is adapted to enable a user to search for content in dependence on whether an accessibility feature is provided together with the content item, for example, subtitles or sign language.

According to another aspect of the invention, there is provided a system for providing users access to audio/visual content, the system comprising means for storing content, and means for enabling a user to access the content in a predetermined fashion in dependence on particular characteristics of the content.

Preferably, the characteristic relates to whether or not the content has been previously broadcast. More preferably, the characteristic relates to commercial rights associated with the content. Yet more preferably, the characteristic relates to the type of content.

Preferably, the access means is adapted to enable the user to download the content if it has previously been broadcast.

Preferably, the access means is adapted to modify the way in which the content can be accessed in dependence on whether or not the content has previously been broadcast. More preferably, the access means is adapted to modify the way in which the content can be accessed in dependence on when the content is broadcast.

Preferably, the access means is adapted to enable the user to view the content, optionally in a streamed fashion, at the time of a scheduled broadcast if it has not yet been broadcast. More preferably, the access means is adapted to enable a user to order or book content that has not yet been broadcast. More preferably, the access means is adapted to disable access to the content after a predetermined time interval.

Thus, various "calls to action" (CTA) are provided which are associated with each respective content item, and the access means is adapted to alter the CTAs over time, for example, a content item may at first have a "watch now" CTA, which is later replaced by a "download now" CTA and/or a "watch now" CTA.

According to another aspect of the invention, there is provided a method of providing users access to audio/visual content, the method comprising providing a content item, associating a user viewing accessibility operation with the content item, and altering the user viewing accessibility operation in dependence on a change in a characteristic of content item.

Preferably, the characteristic relates to whether or not the content has previously been broadcast, optionally on a scheduled basis.

Preferably, the system further comprises means for storing content in a plurality of different formats, and wherein the viewing means is adapted to view content in a plurality of different formats. Preferably, the content may be provided in formats suitable for viewing on different devices, for example, having different viewing resolutions, such as a mobile device, a home television or a high definition television. Furthermore, the content may be provided together with accessibility features, for example, sign language or subtitles.

According to another aspect of the invention, there is provided an electronic program guide which comprises means for listing content available on multiple channels, and means for displaying program information relating to a content item upon selection of a particular content item, the display means being adapted to display the program information such that it only obscures certain content items.

Preferably, the program information only obscures content items which are not similar in some respect to the selected content item. More preferably, the content items which do not form part of the same channel are obscured. More preferably, the content items which are not broadcast at the same or a similar time are obscured.

Preferably, the display means is adapted to graphically interlink the selected content item with the program information.

Preferably, the display means is adapted to display the program information upon roll-over by graphical selector. Thus, as a user rolls over or hovers over a particular content item with a cursor, the program information relating to that content item is displayed.

Preferably, the program information includes a set of user selectable icons each corresponding to a particular viewing or access option associated with the content.

Preferably, the set of icons changes in dependence on the viewing or access characteristics of the content.

Further Interface Aspects

According to another aspect of the invention, there is provided a system for providing users access to audio/visual content, the system comprising means for outputting content items to users, means for enabling a user to select at least one characteristic associated with at least one content item, and means for filtering the output of the content items on the basis of the user selection, thereby to output only those content items having the selected characteristic.

By providing means for enabling a user to apply a particular filtering characteristic to the output content the system may enable a user to locate and access content more easily.

Preferably, the output means is adapted to output default content items to a user prior to the user selecting a particular characteristic. Preferably, the default content items are editorially selected and/or are content items that a broadcaster wishes to promote. More preferably, the default content items may be a selection of popular content items.

Preferably, the system further comprises means for enabling a user to download content items.

More preferably, the system comprises means for enabling a user to download content items in the form of a downloadable file.

Preferably, the system further comprises means for broadcasting audio/visual content on a scheduled basis.

Preferably, the content items available for download have previously been broadcast on a scheduled basis. More preferably, the content items have previously been broadcast to a plurality of users on a scheduled basis. In this way, a "catch-up" TV or radio system is provided. More preferably, the content is only available for download and/or viewing within a specified time window following broadcast, for example 7 or 30 days following broadcast. Preferably also, the number of days left in a specified window are signalled to the user.

Preferably, the system further comprises means for enabling a user to stream content.

Preferably, the system further comprises means for storing the content for broadcast, download and/or streaming.

Preferably, the characteristic relates to at least one of the following: date; time; channel; category; highlights; and title or name. Preferably, in the case in which the system is used for catch-up, the characteristic relating to the content is any one of the following: the date on which the content was broadcast; the time at which the content was broadcast; and the channel on which the content was broadcast. Alternatively, in the case in which the system is used for streaming content, the characteristic relating to the content is any one of the following: the date on which the content is to be broadcast; the time at which the content is to be broadcast; and the channel on which the content is to be broadcast.

Preferably, the output means comprises means for displaying content items to the user. More preferably, the output means comprises a graphical user interface.

Preferably, the output means comprises a selection of user selectable icons, each icon corresponding to a particular characteristic. More preferably, the icons are in the form of user selectable buttons or tabs. Preferably, the output means comprises at least the following icons: date; category; channel; and title or name. More preferably, the display means comprises at least the following icons: "Highlights"; "Last 7 days"; "Categories"; "Channels"; and "A-Z".

Preferably also, items can be filtered according to a plurality of characteristics (e.g. highlights in the last seven days).

Preferably, the output means is adapted to graphically indicate (via a display means or an interface) that an icon has been selected.

Preferably, the output means is adapted to output a menu of parameters and/or options associated with each characteristic upon selection of a respective icon by the user. Preferably, the menu is output over a current output or display of content items.

Preferably, each of the parameters and/or options is selectable by the user. More preferably, the output means is adapted to output or display content items associated with particular parameters and/or options.

Preferably, the output means is adapted to output or display a calendar window upon selection of the date icon. Preferably, the calendar window comprises a range of user selectable dates. Preferably, the dates are provided in a graphical format on the display. More preferably, the output means is adapted to output or display content items associated with a particular date in response to the user selection of a particular date on the calendar window.

Preferably, upon selection of the date icon, the output means is adapted to output or display a calendar window which outputs the current date and a range dates in the past. More preferably, the output means is adapted to output a sequential range of dates in the past. Yet more preferably, the output means is adapted to output the current date and the previous six dates.

Preferably, the calendar window outputs both day and date information.

Preferably, the current date and yesterday's date are shown using a larger graphical icon on the calendar window than the other dates shown in the calendar.

Preferably, the output means is adapted to display a selection of possible categories upon selection of a category icon.

Preferably, the categories relate to a particular content type. In one example, the categories may be one or more of the following: children's; entertainment; comedy; drama; factual; music; news and weather; learning; religion and ethics; movies; and sport.

Preferably, the output means is adapted to output or display a menu including the following categories upon selection of the category icon by the user: children's; entertainment; comedy; drama; factual; music; news and weather; learning; religion and ethics; movies; and sport.

Preferably, the output means is adapted to output or display a menu including a selection of available channels upon selection of a channel icon. More preferably, the output means is adapted to display content relating to a particular channel in response to the selection by the user of a particular channel shown on the menu.

Preferably, the output means is adapted to output or display, upon selection by the user of a title or name icon, a menu including a selection of icons displaying particular letters and/or numbers.

Preferably, the output means is adapted to output or display content having a title or name beginning with a particular letter or number in response to the selection by the user of an icon displaying that particular letter or number.

Preferably, the system further comprises means for enabling a user to select at least a further characteristic associated with at least one content item, and the filtering means is adapted to output or display only those content items having both of the selected characteristics. In this way, the user is able to refine the content items displayed.

More preferably, the system further comprises means for enabling a user to select multiple characteristics associated with at least one content item, and the filtering means is adapted to output or display only those content items having all of the selected characteristics. In this way, the user is able to further refine the content items output or displayed by the system.

Preferably, the further or subsequent characteristics may be selected once the output means has output or displayed content items which have already been filtered on the basis of a user's selection of an initial characteristic.

Preferably, the further characteristic may be any one of the characteristics as herein described. More preferably, the further characteristic is some other characteristic of a content item.

Preferably, when the user has initially selected the "date" (or "Last 7 days") characteristic, the further characteristics may relate to time, channel and/or category.

Preferably, the output means comprises means for enabling the user to filter the output or display of content depending on the time at which the content was broadcast. More preferably, the output means comprises means for enabling the user to filter the output or display of content depending on whether the content was broadcast in the morning, afternoon or evening.

Preferably, when the user initially selects the "title", "category", or "channel" characteristics, the further characteristic may be date and/or time, and either title, category, or channel, as appropriate. Thus, a user may filter the content items that are output or displayed by the system on the basis of, say, channel, date and time. This can enable a user to more easily locate a content item that the user is aware was broadcast, say, on a particular channel, on a particular day, and at a particular time.

Preferably, certain further characteristics are selected by default, for example, by default when filtering content by date, content which was broadcast during the evening is displayed. In another example, when filtering content by category, content that has been broadcast on all channels is displayed.

Preferably, the output means is further adapted to enable a user to sort the output or displayed content items.

Preferably, the output means further comprises means for displaying a graphical indication of the characteristics which have been selected by the user to filter the display of content.

Preferably, the output means is adapted to output or display content items in the form of a matrix or grid of graphical representations of the content items. More preferably, each content item is represented by an image associated with a respective content item, for example, an image of a main character may be used to represent a particular television program.

Preferably, each content item is displayed together with certain program information.

Preferably, the output means is adapted to display further information relating to a particular content item when a particular content item is highlighted by a user. More preferably, the further information is displayed upon roll-over by a cursor or pointer device.

Preferably, the further information relates to the status of the content item. More preferably, the further information relates to the amount of time remaining to download and/or access the particular content item.

Preferably, the output means is further adapted to open a content item window in response to the selection of a particular content item by a user. Preferably, the content item window provides further details relating to the content item. Preferably, the content item window provides parental guidance information, accessibility information (the availability of subtitles or sign language), and/or version information.

Preferably, the content item window comprises means for enabling a user to download the content item. More preferably, the content item window comprise means for enabling a user to access (or stream) the content item.

Preferably, the system further comprises means for downloading content items. More preferably, the downloading means is a separate client application which is installable on a user's local computer in response to a request to download a content item.

Preferably, the download means comprises means for enabling a user to manage the download of content items. More preferably, the download means comprises means for displaying downloaded content items.

Preferably, the output means is adapted to output the status of downloaded content items. More preferably, the output means is adapted to output the amount of time remaining to access or view downloaded content items.

Preferably, the download means comprise means for sorting the downloaded content items, for example, based on the status of the downloaded content items.

Preferably, the output means comprises a graphical user interface.

Preferably, the system further comprises an internet website and wherein the graphical user interface is provided on the website.

Preferably, the system further comprises a media player for playing streamed or downloaded content items.

According to another aspect of the invention, there is provided a method for providing users access to audio/visual content, the method comprising displaying content items to users, enabling a user to select at least one characteristic associated with at least one content item, and filtering the display of the content items on the basis of the user selection, thereby to display only those content items having the selected characteristic.

According to another aspect of the invention, there is provided a graphical user interface to an audio/visual content access system, the interface comprising means for outputting content items to users, means for enabling a user to select at least one characteristic associated with at least one content item, and means for filtering the output of the content items on the basis of the user selection, thereby to output or display only those content items having the selected characteristic.

According to further aspect of the invention, there is provided an electronic program guide, comprising means for outputting content items to users, means for enabling a user to select at least one characteristic associated with at least one content item, and means for filtering the output of the content items on the basis of the user selection, thereby to output or display only those content items having the selected characteristic.

Versions and Repeats

Preferably, the output means is adapted to selectively output either a single graphic representation of a content item corresponding to multiple versions and/or repeat broadcasts of a content item or a separate graphical representation for each respective version or repeat broadcast of the content item.

Preferably, the output means is adapted to output either single or multiple graphical representations of a content item in response to the selection of a particular filtering characteristic. In one example, if the user has selected the date icon, the repeat broadcasts of content items will be shown on each day that the content item was broadcast. Alternatively, if the user has selected the title or name icon, only one content item, corresponding to all of the repeat broadcasts, will be shown in the output grid. Thus, repeat broadcasts and/or different versions of a content item are displayed only once when certain filtering characteristics are applied, and are accessible from multiple locations when other filters are applied.

Preferably, the output means comprises means for providing access to multiple versions of a content item from a single location. More preferably, multiple versions of a single content item are made available via the content item window.

Subtitles

Preferably, the system further comprises means downloading further content relating to a particular content item separately from the content item.

Preferably, the system further comprises means for matching the further content to the content item once both the further content and the content item have been downloaded.

Preferably, the further content is in the form of accessibility information, for example, subtitle, sign language and/or audio description information.

Preferably, the system further comprise means for requesting the further content (accessibility information) in response the user request for the download of a version of a content item which includes accessibility information. More preferably, the system is adapted to initiate automatically the download of the further content to the user once the accessibility information is to hand.

Guidance Ratings

Preferably, the system further comprises means for controlling access to certain content items in dependence on the subject matter of the content item.

Preferably, the access control means comprises means for authenticating users attempting to access and/or download restricted content. More preferably, the authentication means comprises a password-based security system.

Preferably, the authentication means is configured at the time a content item is first accessed and/or downloaded. More preferably, the authentication means is configured when a user first installs client software to manage downloads. More preferably, the authentication means is configured at the time a user registers and/or signs in to the system.

Preferably, the system further comprises means for restricting access to certain content items if such content items contain subject matter which is marked with a (parental) guidance flag. Preferably, guidance flags are assigned automatically on the basis of metadata associated with each content item.

"Idents"

Preferably, the system further comprises means for transmitting to a user at least one content item which has been selected by the system. Preferably, the transmitting means is adapted to automatically transmit the system selected content item to a user. More preferably, the transmitting means is adapted to transmit the system selected content item to the user upon sign-in, login or registration. More preferably, the system comprises means for updating the system selected content item on a periodic basis. More preferably, the updating means is adapted to update the system selected content item whenever the user signs in to the system.

Preferably, the transmitting means is adapted to transmit a selection of system selected content items to the user.

Preferably, the system selected content items comprise short broadcast channel audio/visual identification themes ("idents").

Alternatively, or in addition, the system selected content items may comprise audio/visual advertisements.

Preferably, the system further comprises means for linking user downloaded content items with transmitted content items. More preferably, the linking means is adapted to link user downloaded content items with a transmitted content item in dependence on the nature or type of the user downloaded content item. In one example, if a content item was originally broadcast on a particular channel, an ident for that channel, which has been transmitted by the system to the user, is linked to the content item.

Preferably, the system further comprises means for playing back the transmitted content item prior to playing back the content item to which it is linked. More preferably, the system comprises means for interrupting the play-back of the content item with the transmitted content item.

In this way the system is able to play an appropriate ident or advert at the time the user plays back a particular content item. The system is also able to ensure that an up to date ident or advert is made available to the user. Furthermore, download bandwidth requirements are reduced, since the same ident and/or advert is only transmitted once and may then be linked to multiple content items.

In a further aspect, there is provided means for altering a link on a webpage in dependence on changes to a characteristic, wherein the link provides access to a content item.

A system for providing users access to audio/visual content, the system comprising means for storing content, means for assigning an access operation to a content item, the access operation being related to the method by which a user is able to view and/or listen to the stored content, means for altering the access operation in dependence on a change to a characteristic associated with the content item; and means for updating an internet webpage connectable to the system based on the change.

Preferably, the webpage provides a link to the content item, and the updating means is adapted to update said link.

There is also provided herein a system for providing users access to audio/visual content, comprising first means for distributing content and second means for indicating the availability or otherwise of content to be distributed by said first means, said second means being included amongst other information.

Preferably any, some or all of the following features are provided:
- The other information is information to be displayed on a website
- The second means includes a display element that is smaller than the size of a web page
- The first and second means are remote from one another
- The first and second means are linked via the internet
- A plurality of second means is provided
- The first means also includes means for indicating the availability or otherwise of content to be distributed by the first means
- The second means is invisible if no content is available
- The second means indicates the availability or otherwise of only a selection (perhaps only a single item) of the content to be distributed by the first means
- The second means permits the distribution of the available content In one preferred embodiment, the electronic programme guide as herein described is implemented in hardware or software.

In one preferred embodiment, the graphical user interface as herein described is implemented in hardware or software.

It is envisaged that aspects of this system, method, guide, user interface and/or media player may be implemented in software running on a computer such as a personal computer or receiver/decoder (which may be connected directly to a monitor or to a television or other display means), which enables a user to download content that has been previously broadcast and to replay said content. Using this software, the user may also order content to be downloaded once it has been broadcast. Furthermore, the user may also stream (and hence view) content at the time of broadcast.

Other aspects of this system, method, guide, user interface, and/or media player may be implemented in software running on various interconnected servers, and it is to be appreciated that inventive aspects of this system, interface, guide and/or media player may therefore reside in the software running on such servers.

Furthermore, individual user's computers will also be connectable to a communications network which is in turn connected to the various servers and computers which constitute the system and accordingly there may be communications software running on each of the aforementioned computers and/or servers which controls the system.

According to another aspect of the invention, there is provided a computer programme product for implementing the electronic programme guide, user interface and/or media player as herein described.

The invention extends to methods of providing individual users access to content that will be broadcast to a plurality of users on a scheduled basis, and to computer programme products for implementing said methods.

The invention also extends to a server or a plurality of interconnected servers running software adapted to implement the system as herein described.

The invention extends to methods of providing individual users access to content that has already been broadcast to a plurality of users on a scheduled basis, and to computer programme products for implementing said methods.

The invention extends to any novel aspects or features described and/or illustrated herein.

The invention extends to systems, methods and/or apparatus substantially as herein described with reference to the accompanying description and/or drawings.

Any feature in one aspect of the invention may be applied to other aspects of the invention, in any appropriate combination. In particular, method aspects may be applied to apparatus or system aspects, and vice versa. Again, any feature may be provided independently, or dependent upon another feature.

The invention also provides a computer program and a computer program product for carrying out any of the methods described herein and/or for embodying any of the apparatus or system features described herein, and a computer readable medium having stored thereon a program for carrying out any of the methods described herein and/or for embodying any of the apparatus or system features described herein.

The invention also provides a signal embodying a computer program for carrying out any of the methods described herein and/or for embodying any of the apparatus or system features described herein, a method of transmitting such a signal, and a computer product having an operating system which supports a computer program for carrying out any of the methods described herein and/or for embodying any of the apparatus or system features described herein.

Furthermore, features implemented in hardware may generally be implemented in software, and vice versa. Any reference to software and hardware features herein should be construed accordingly.

The following published document is hereby incorporated herein by reference WO2005125200 (based on application no. PCT/GB05/002437).

Preferred features of the invention will now be described, purely by way of example, with reference to the accompanying drawings, in which:

FIG. 20 shows a number of views of a download manager;

FIGS. 50 and 51 show various help pages;

FIG. 63 shows the display rules that apply to grids for versions and repeats for the past 7 days screen;

FIGS. 90 and 91 are flowcharts showing a registration process;

A number of examples of the interactive player system (interactive player system/interactive player system system) and corresponding user interface and EPG are now described. It is envisaged that certain aspects of each of the described examples may be combined in a number of possible ways.

Background

Interactive Player System

In one example, the system or interactive player system provides an internet or network based service. In this case, the system is accessed via a web browser, with certain downloadable elements. The system is an online gateway to a vast amount of audio/visual content, which may be delivered to the user via a user interface, and which enables users to search for content.

Figure 26:
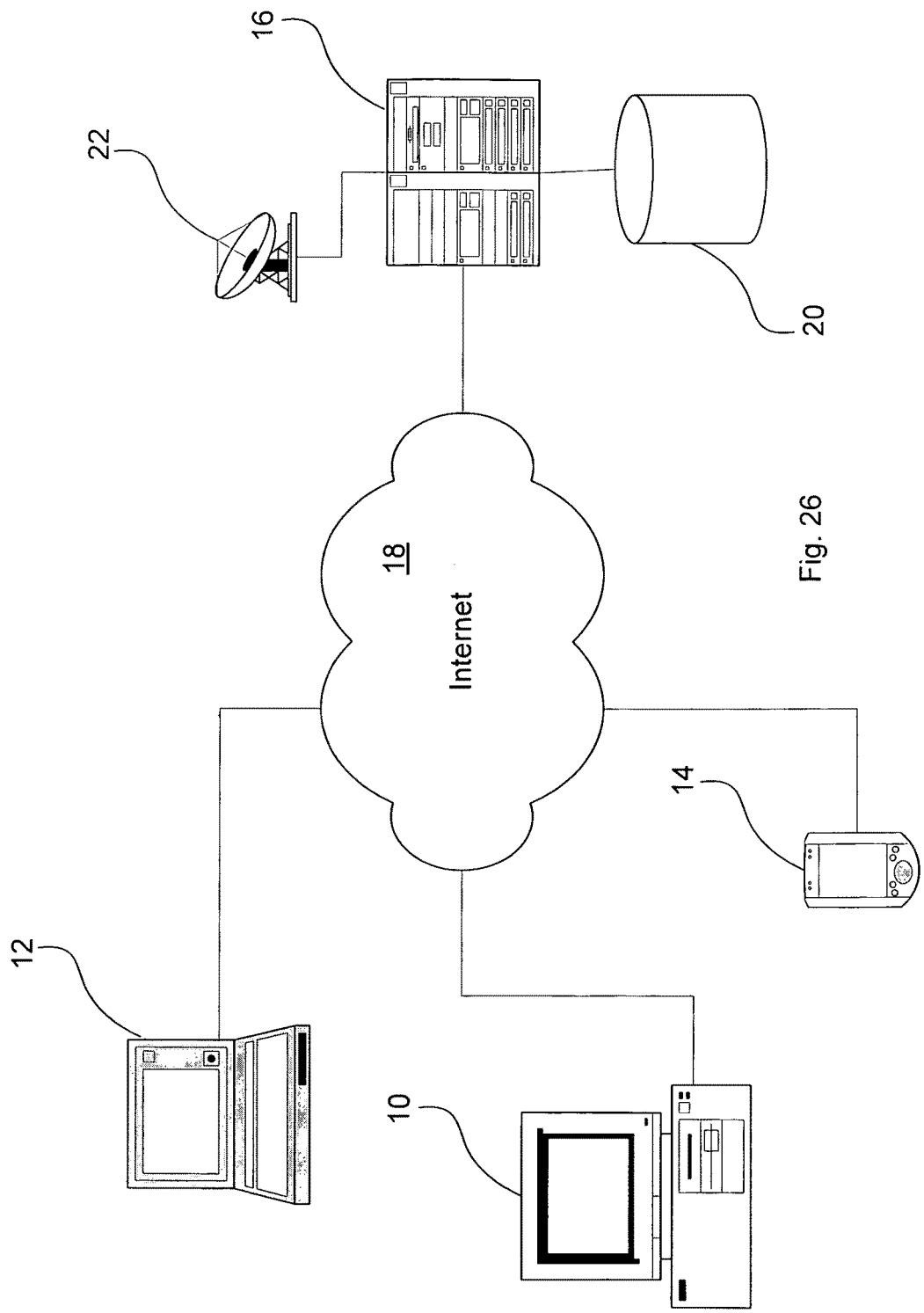
FIG. 26 is a schematic diagram of the interactive player system.

As shown in FIG. 26, in one example, the interactive player system is implemented at least in part in software running on a variety of (client) devices, for example a desktop PC 10, a laptop 12 or a personal digital assistant 14 which access the interactive player system service or website hosted on a server 14 provided by the broadcaster. The server 16 executes server-side software. As shown in FIG. 26, the devices 10, 12 and 14 and the sever 16 are connectable to the internet 18. Each of the devices 10, 12 and 14 and the server 16 include at least one processor and an associated memory, in the form of RAM and ROM. It will also be appreciated that the server 16 may comprise a number of separate servers each adapted to perform a particular function, and that these servers may be connected to one another over a network or the internet. The broadcaster's broadcasting equipment is schematically represented in FIG. 26 by the satellite 22, which is shown connected to the server 16. The server 16 is also connected to a database and/or archive 20 which enables the server to provide access to audio/visual media content of various types.

One example described herein is the QAT (Quality Assurance Test) version of the system. As described herein, an example of a Peer-to-Peer system would be a Kontiki system.

User Interface Design

Figure 1:
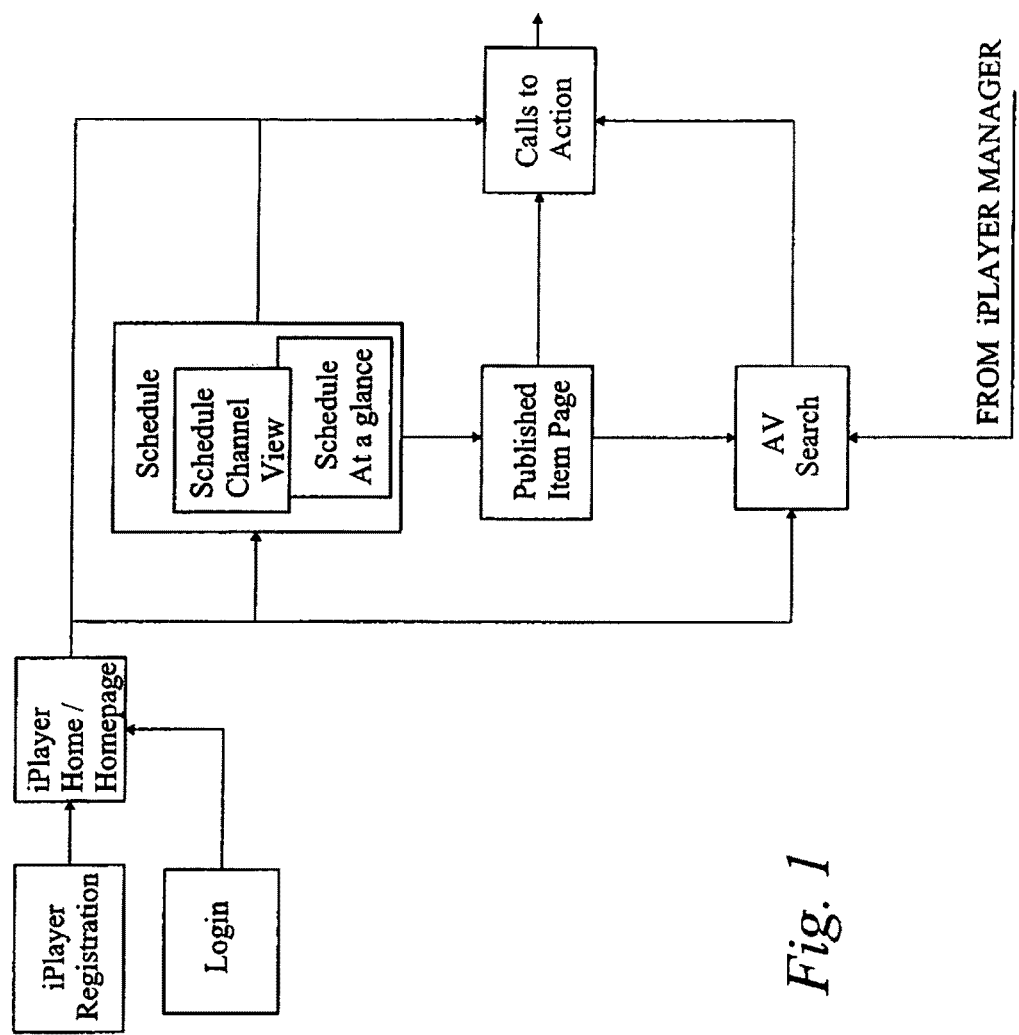
FIGS. 1 to 3 show the interactive player system user interface architecture or layout.
Figure 2:
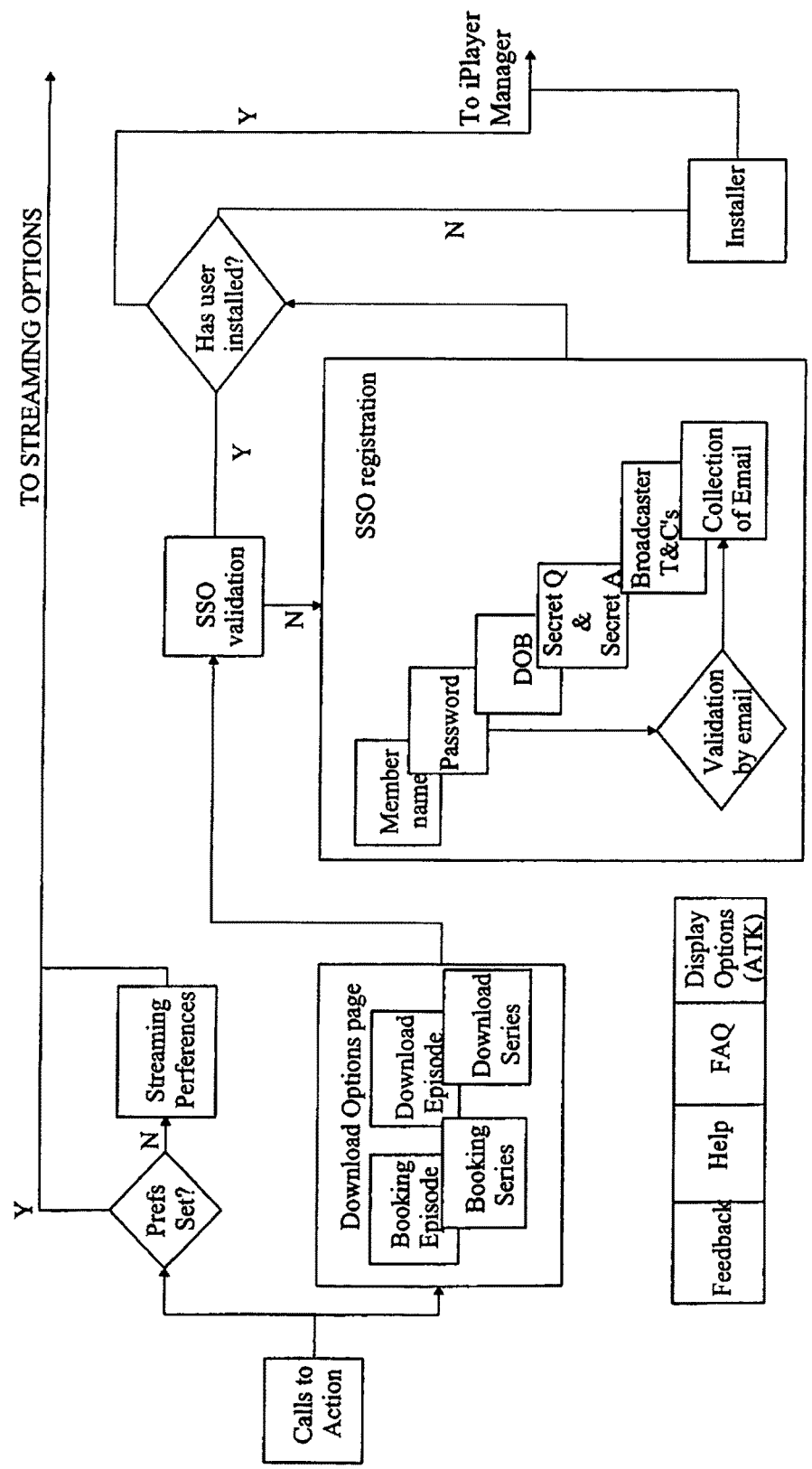
Figure 3:
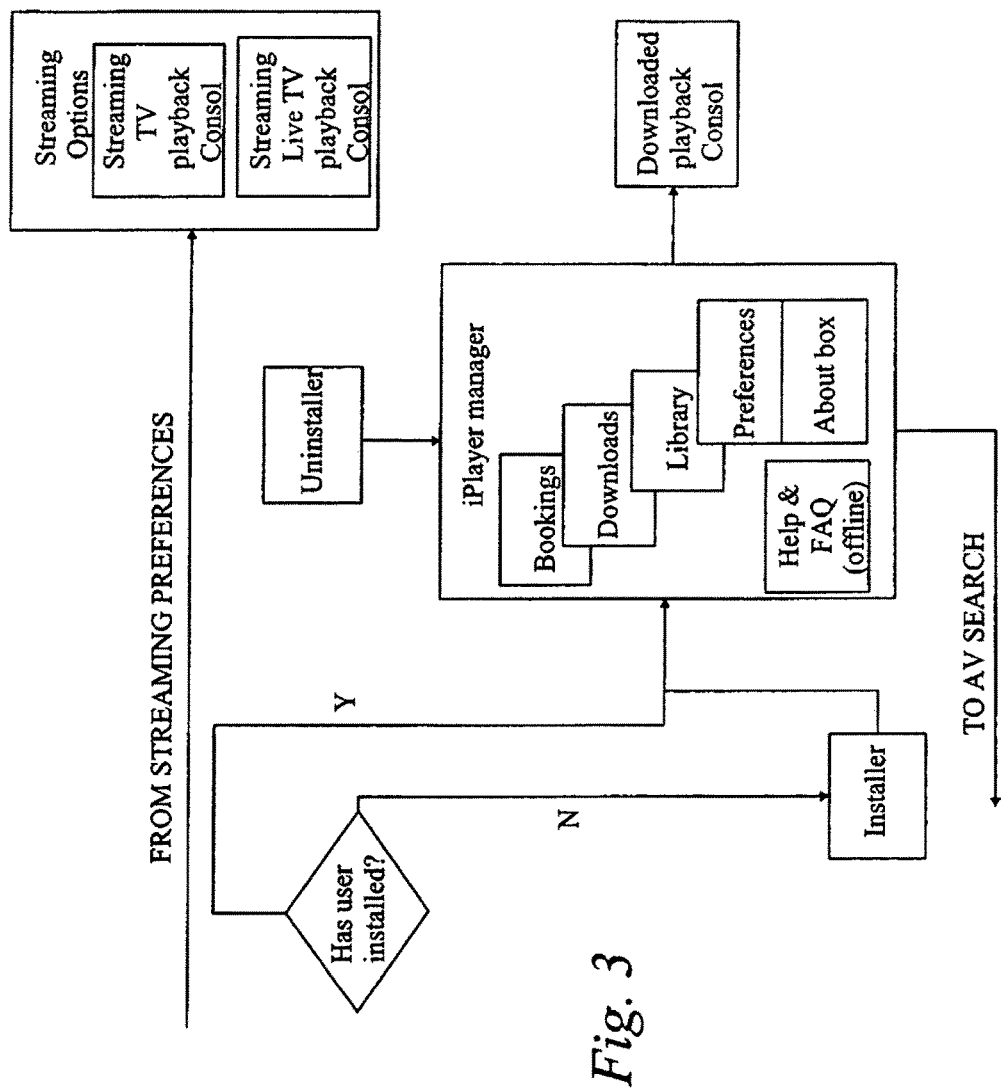
Figure 4:
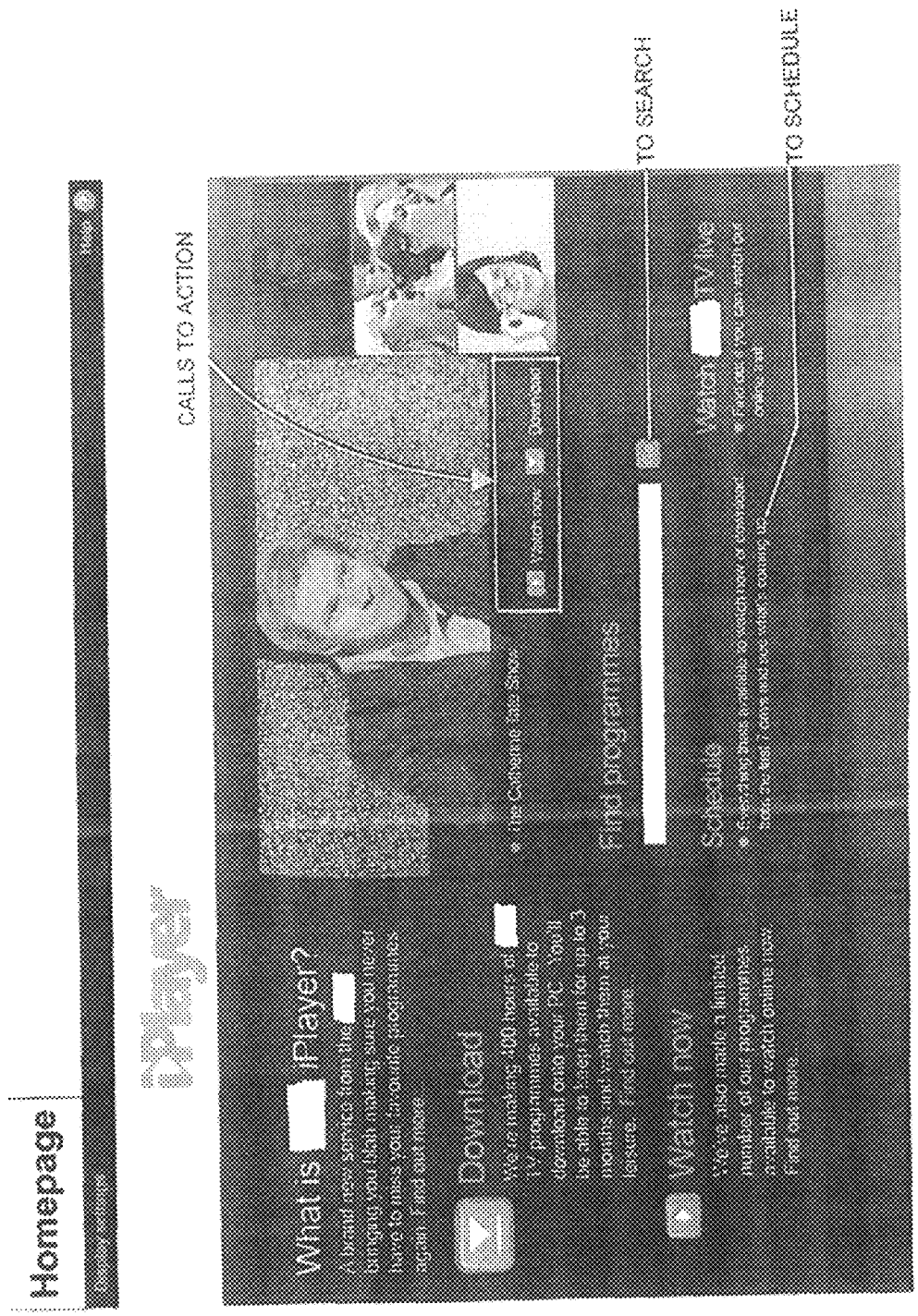
FIG. 4 shows a homepage interface.
Figure 5:
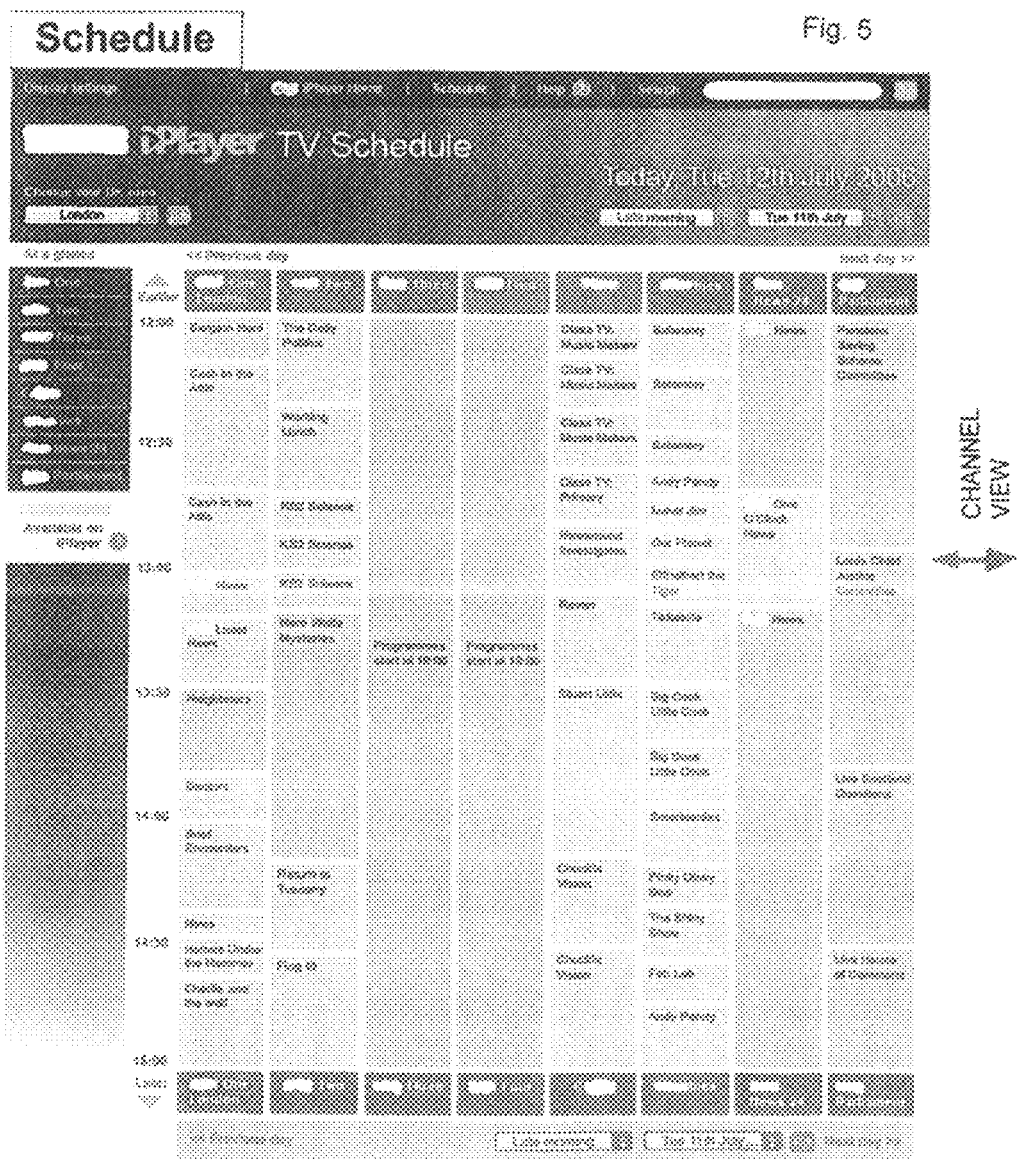
FIG. 5 shows a schedule/EPG interface.
Figure 6:
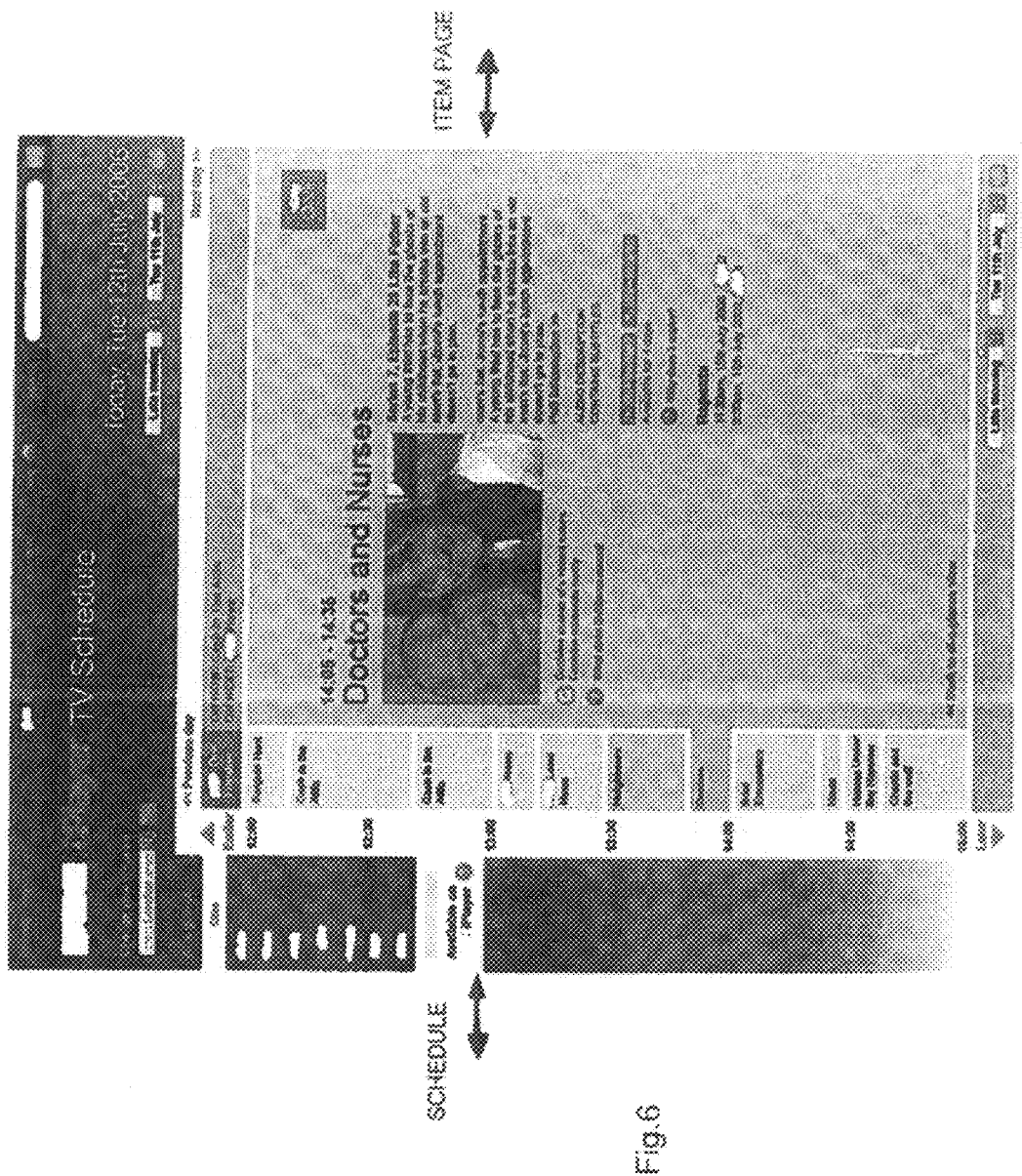
FIG. 6 shows a further view of the schedule/EPG interface of FIG. 5.
Figure 7:
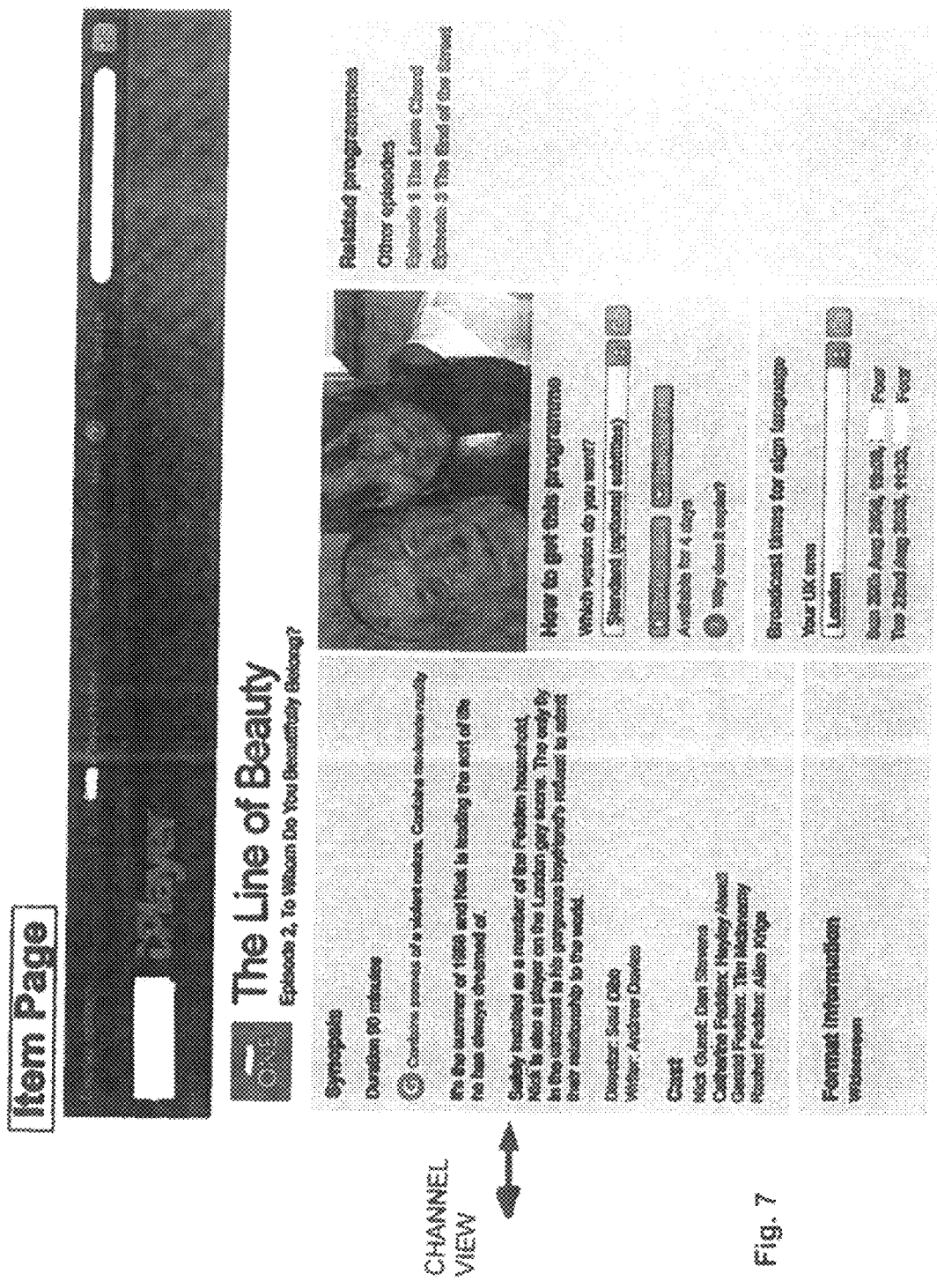
FIG. 7 shows a programme item screen.
Figure 8:
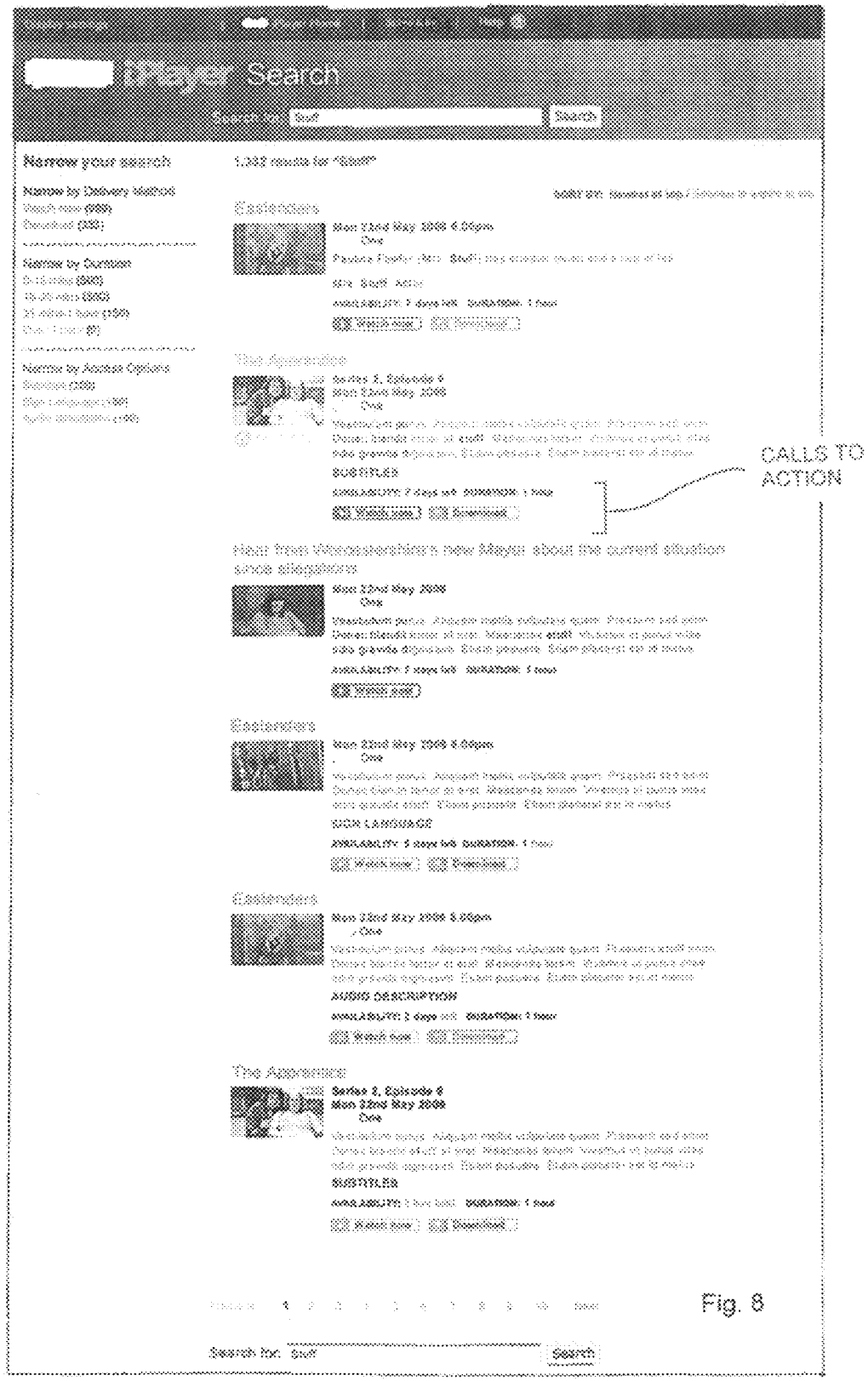
FIG. 8 shows a search results screen.
Figure 9:
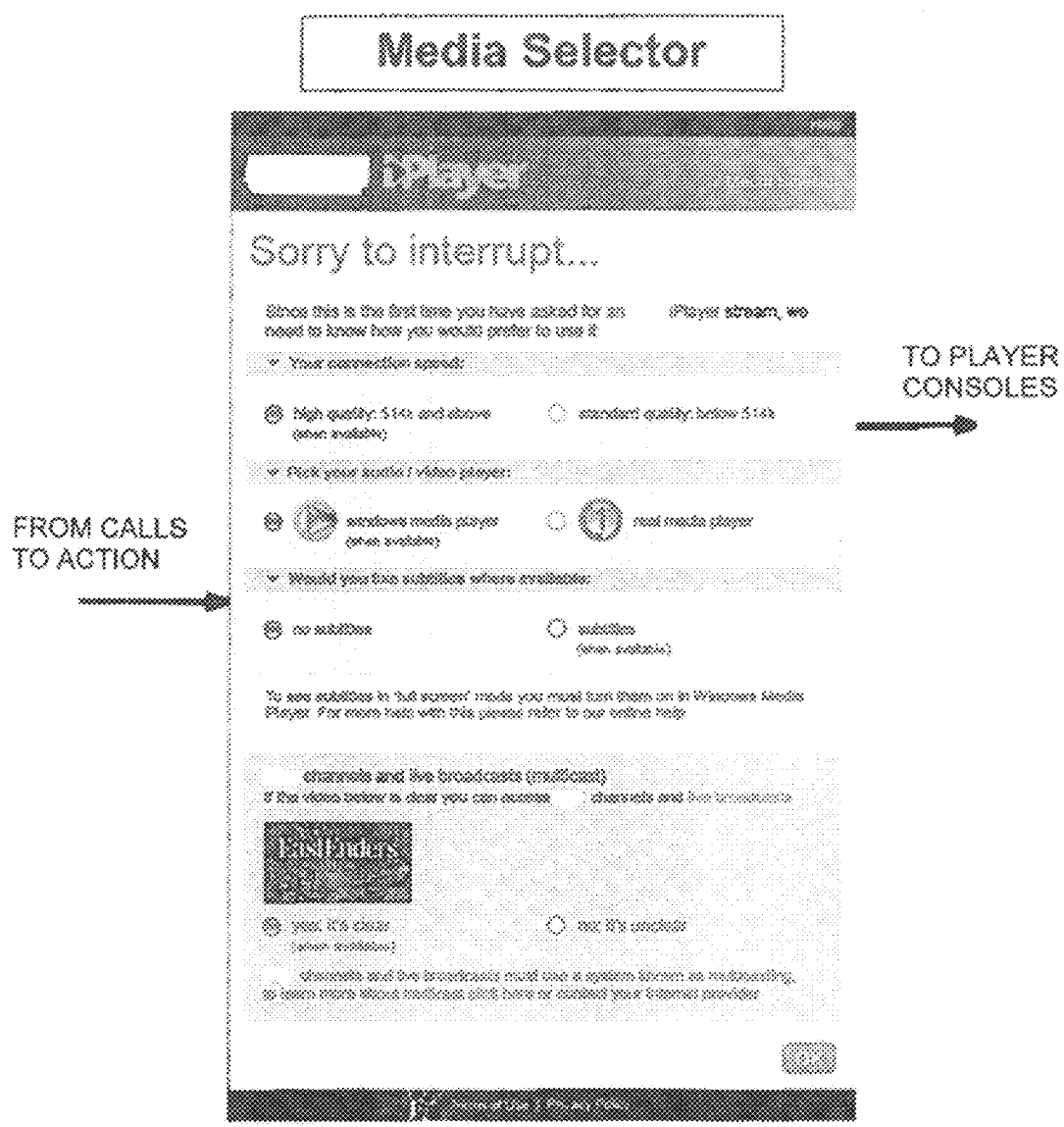
FIG. 9 shows a streaming options screen.
Figure 10:
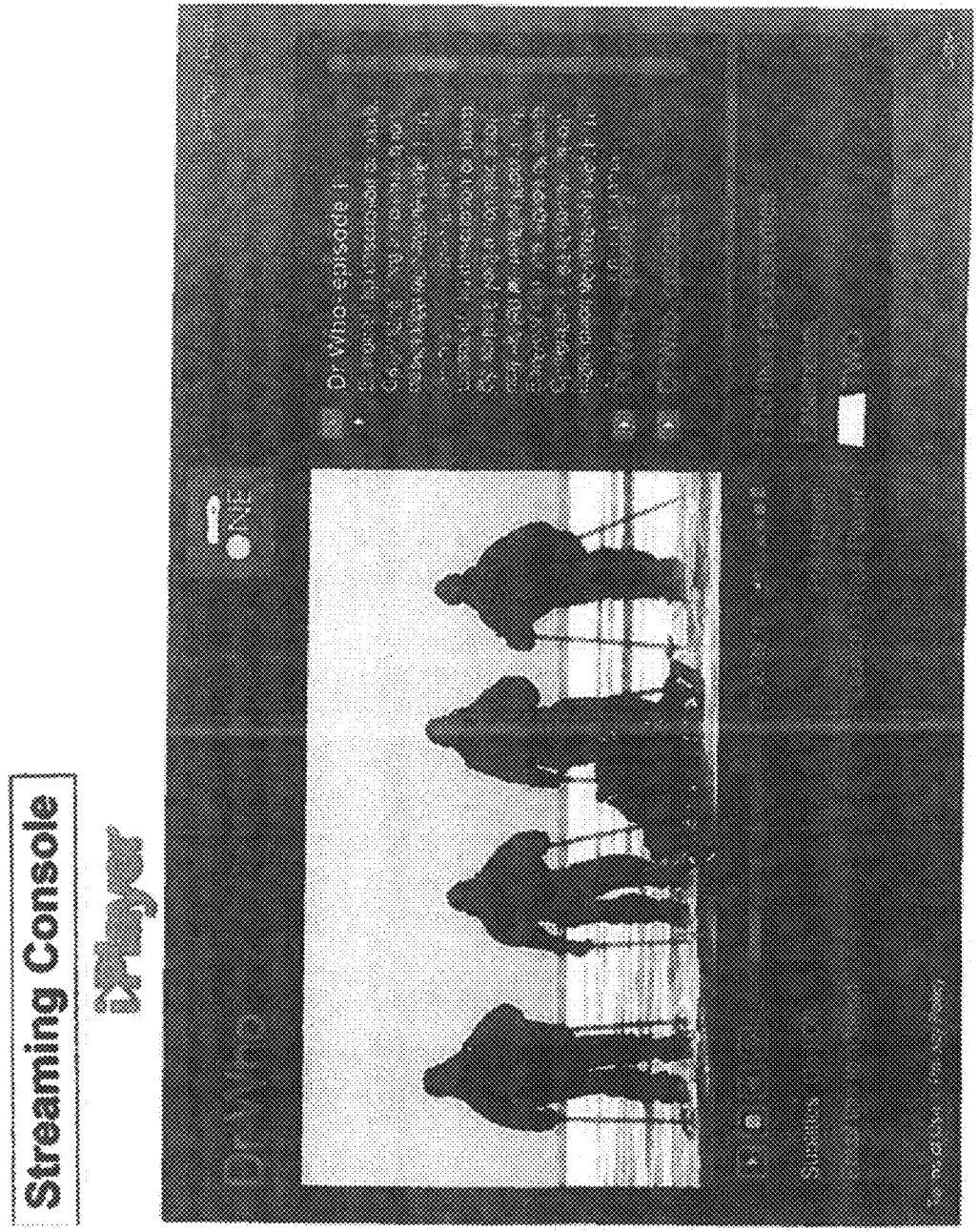
FIG. 10 shows a playback console or media player.
Figure 11:
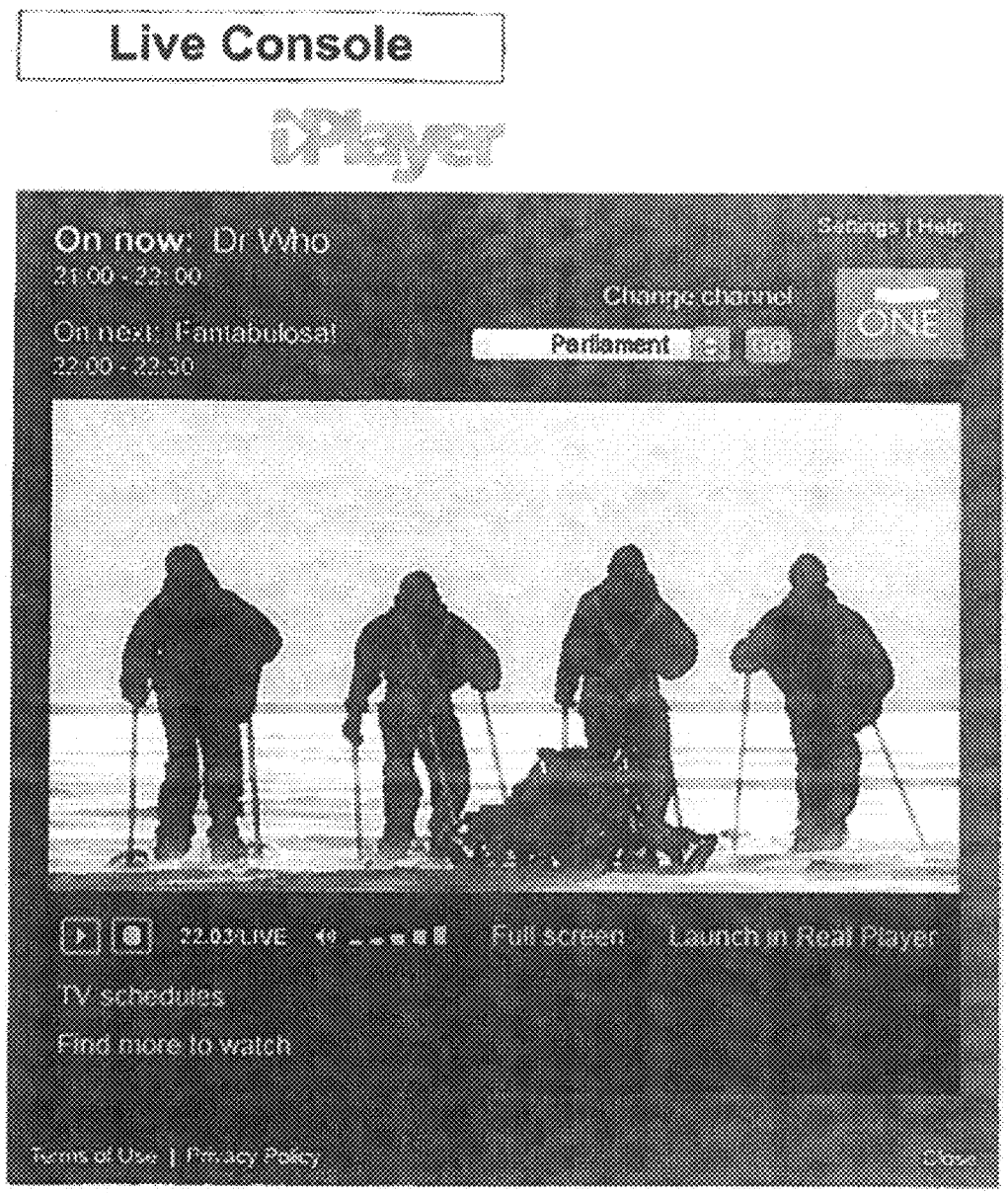
FIG. 11 shows a further playback console or media player.
Figure 12:
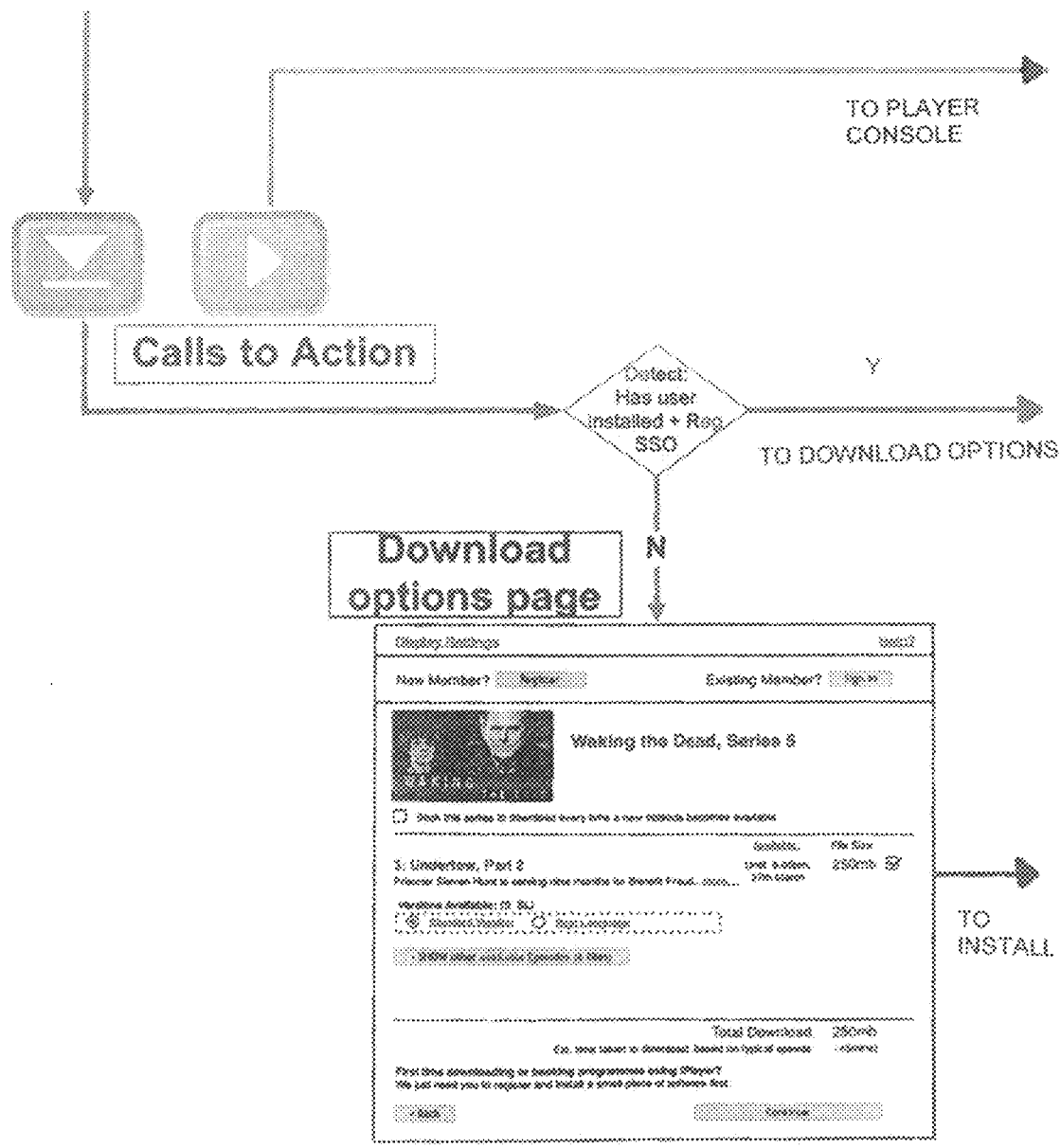
FIG. 12 shows a download options screen.
Figure 13:
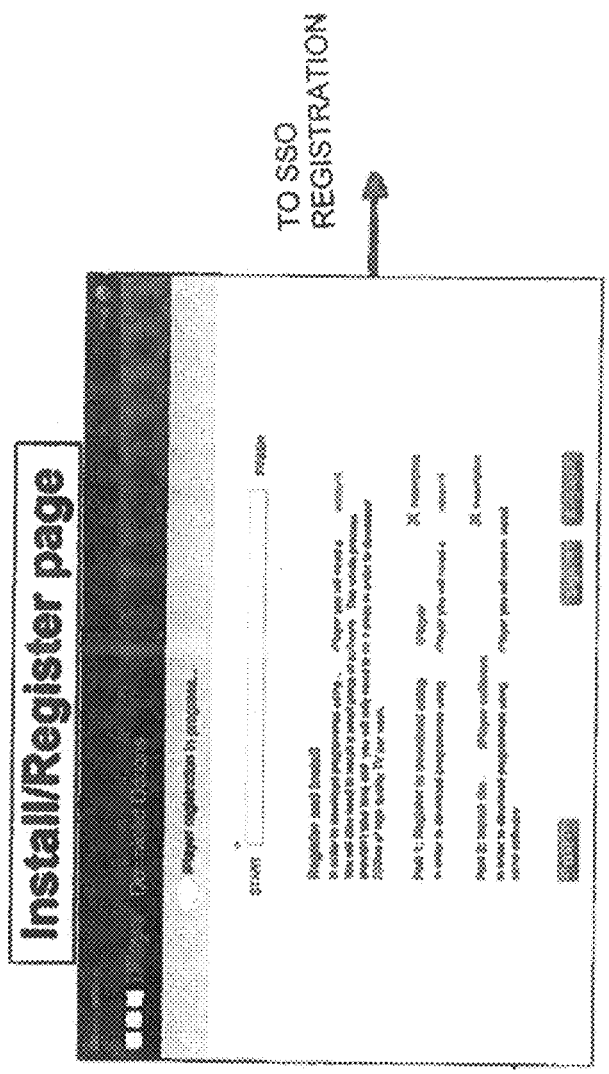
FIG. 13 shows an install or registration interface.
Figure 14:
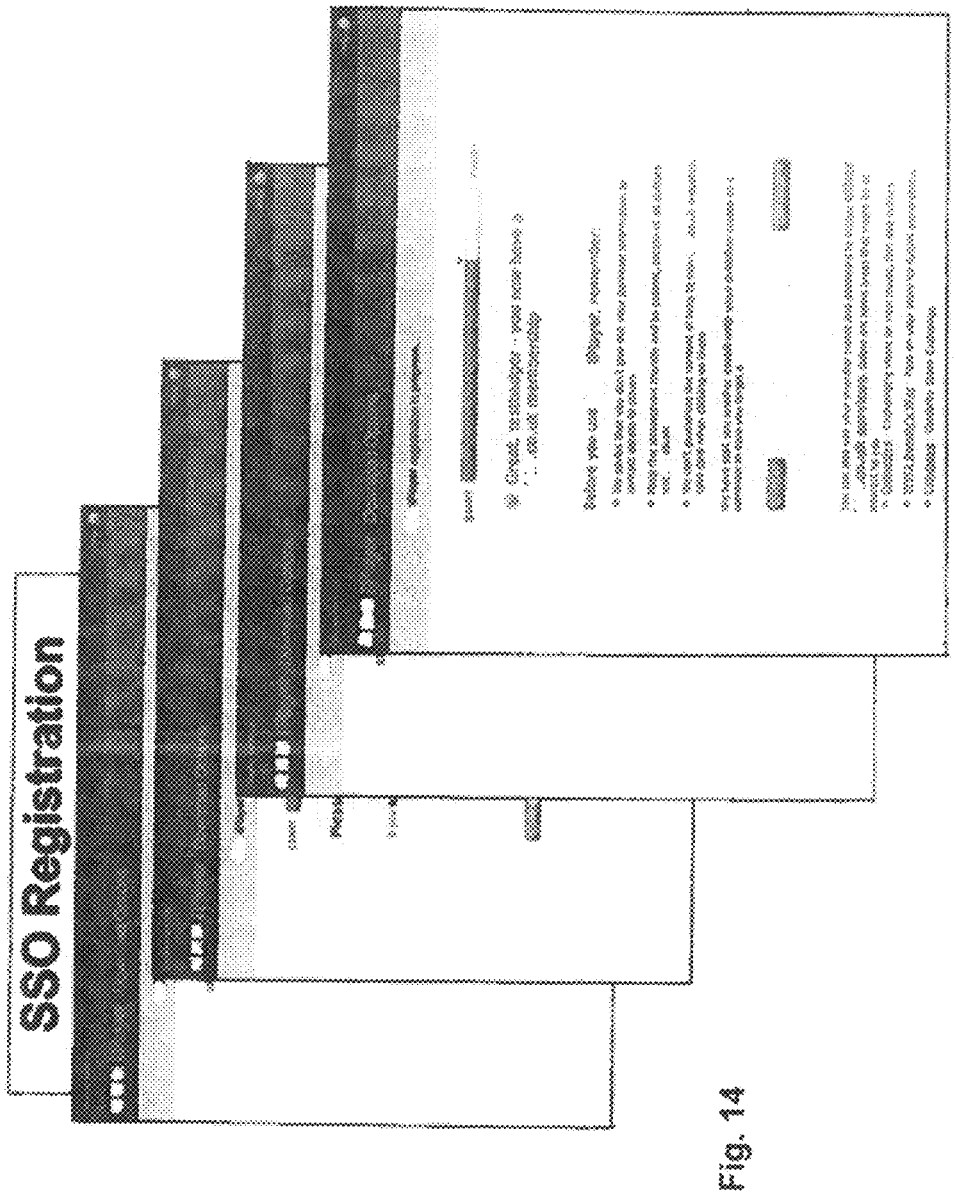
FIG. 14 shows a registration screen.
Figure 15:
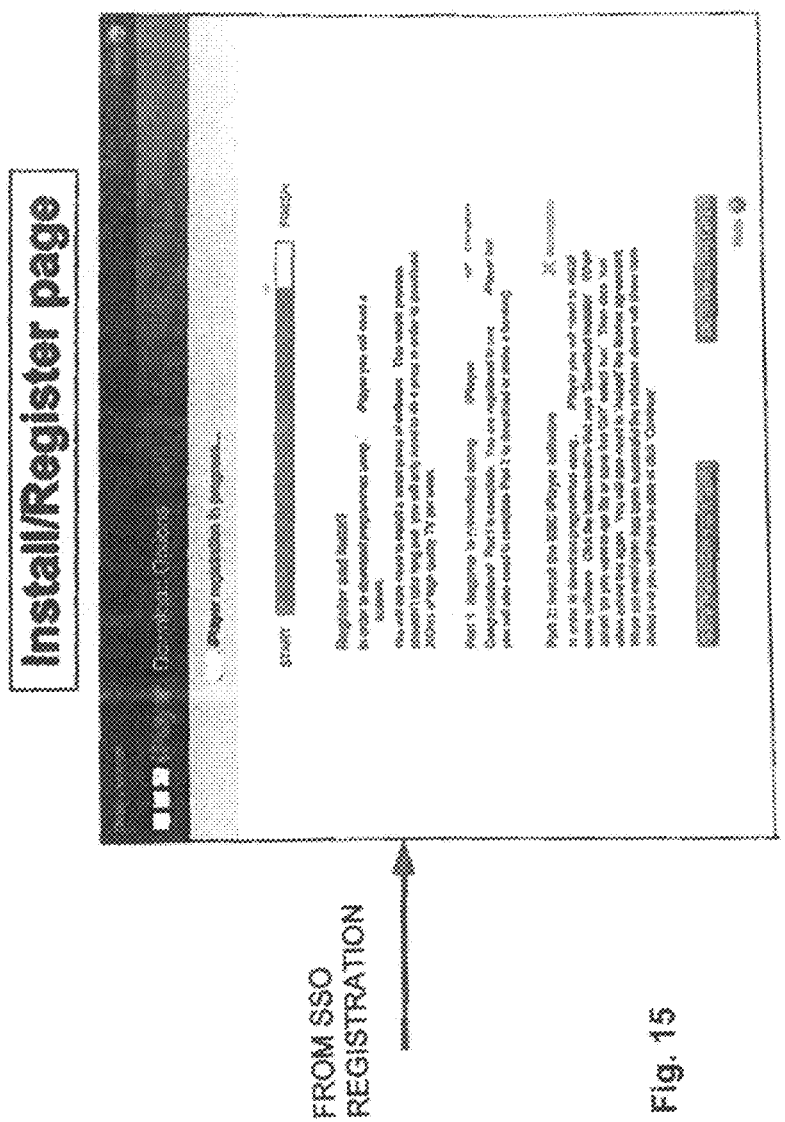
FIG. 15 shows a yet further registration screen.
Figure 16:
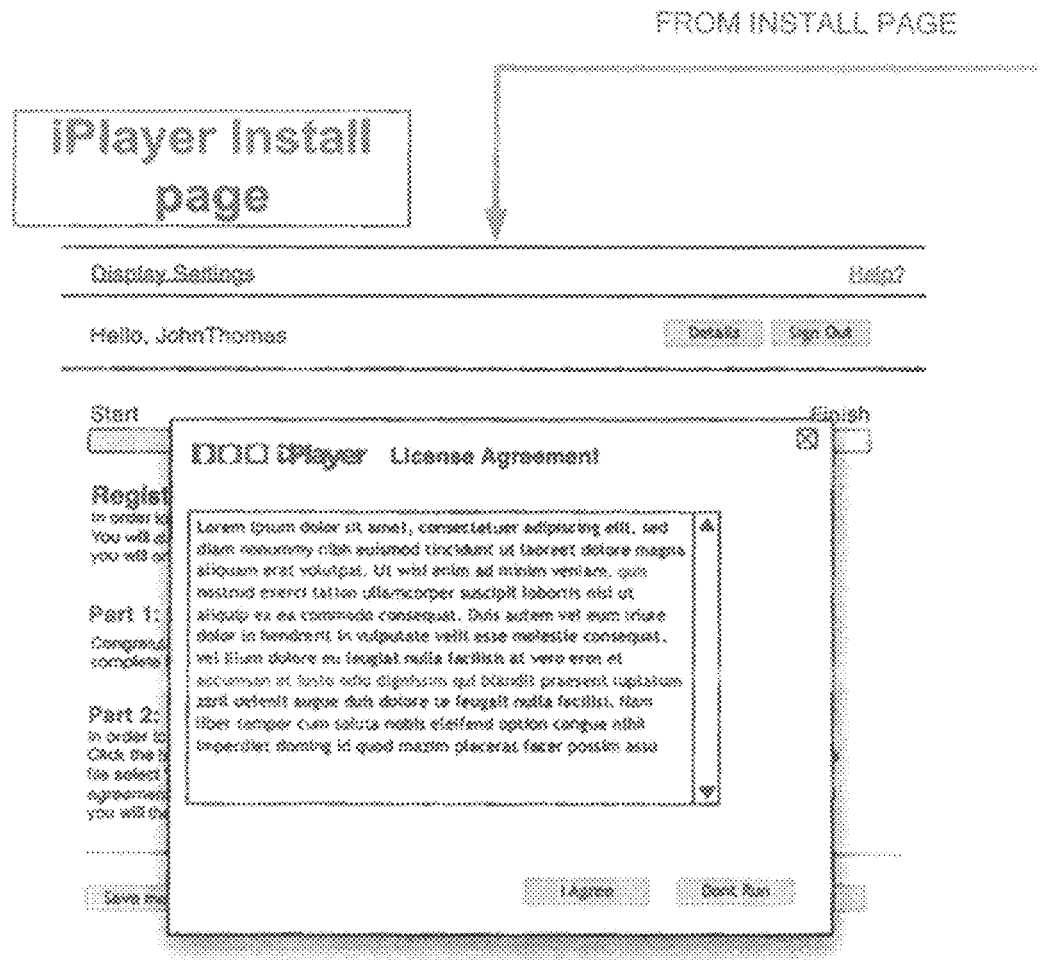
FIG. 16 shows a yet further registration screen.
Figure 17:
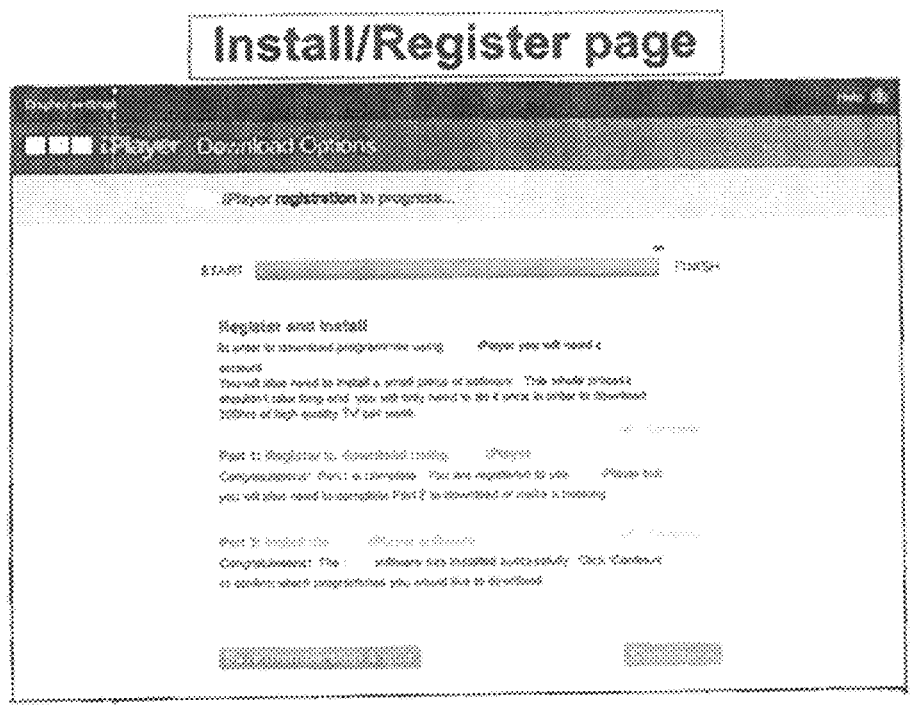
FIG. 17 shows a yet further registration screen.
Figure 18:
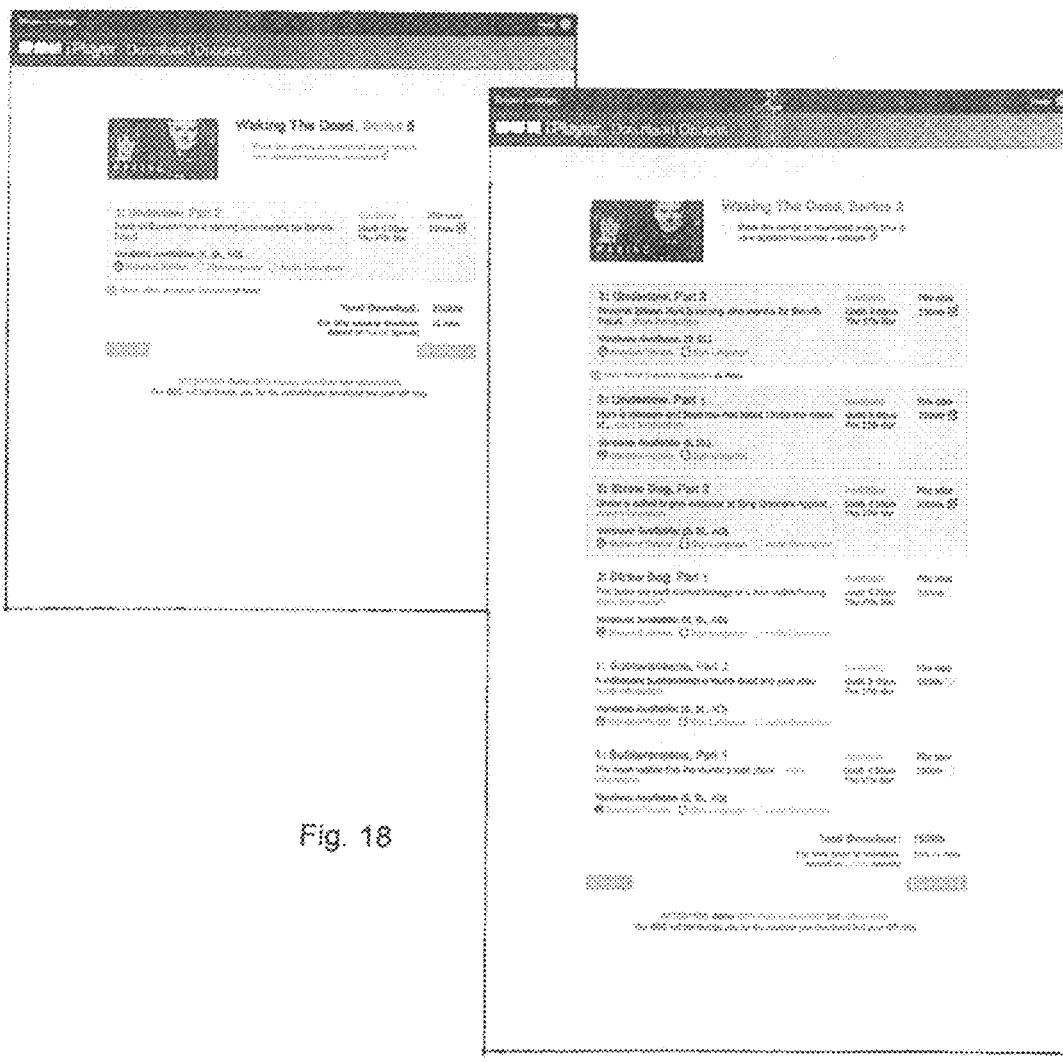
FIG. 18 shows a number of views of various download options screens.
Figure 19:
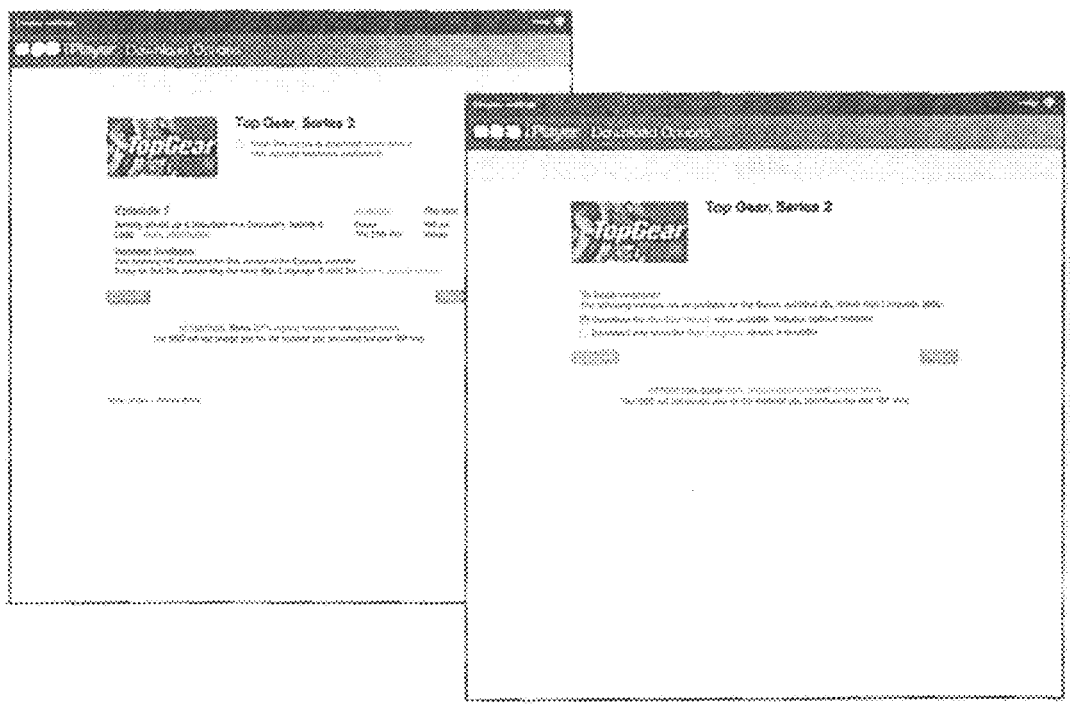
FIG. 19 shows a further view of various download options screens.
Figure 21:
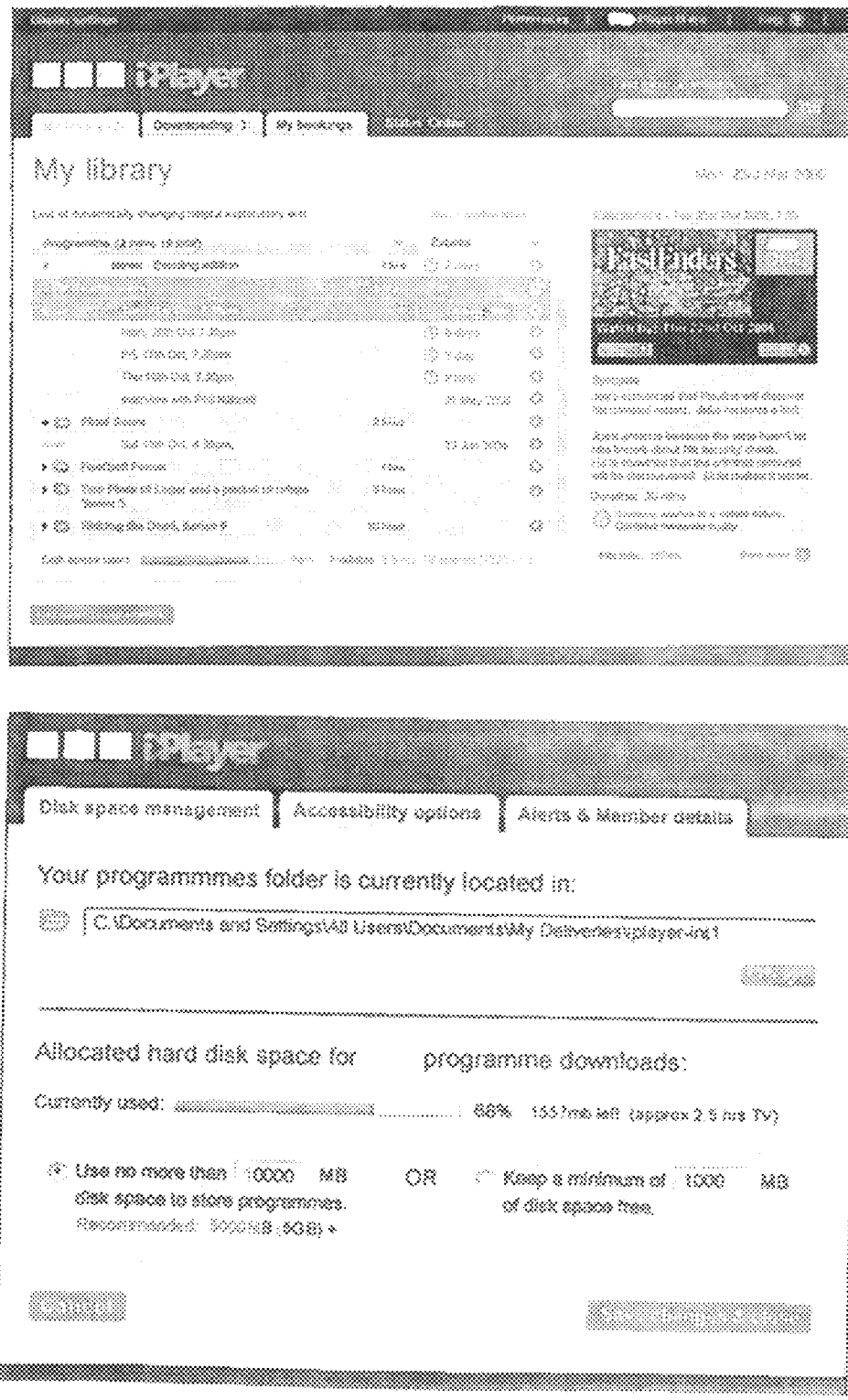
FIG. 21 shows a number of further views of a download manager.
Figure 22:
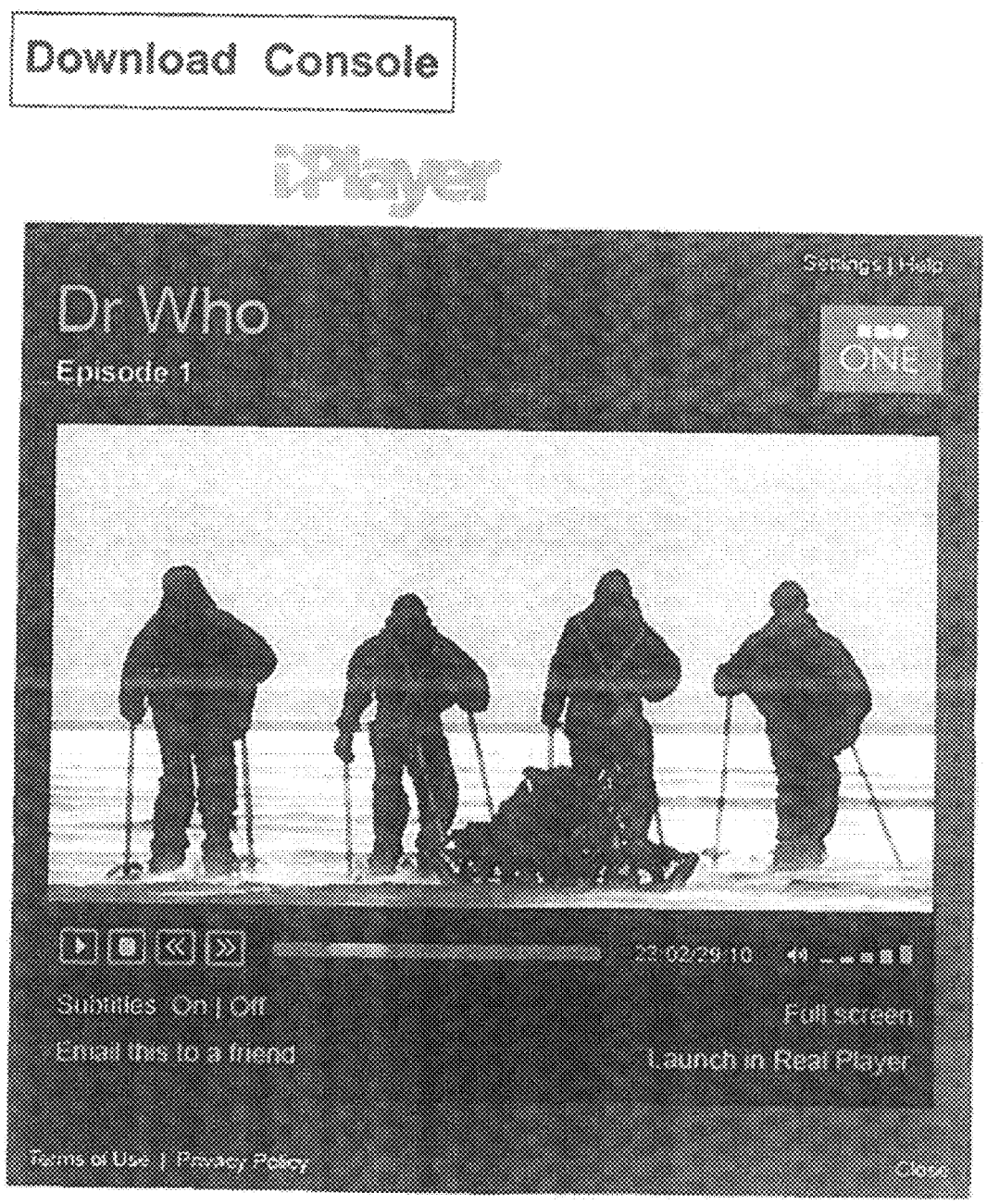
FIG. 22 shows a playback console or media player.
Figure 23:
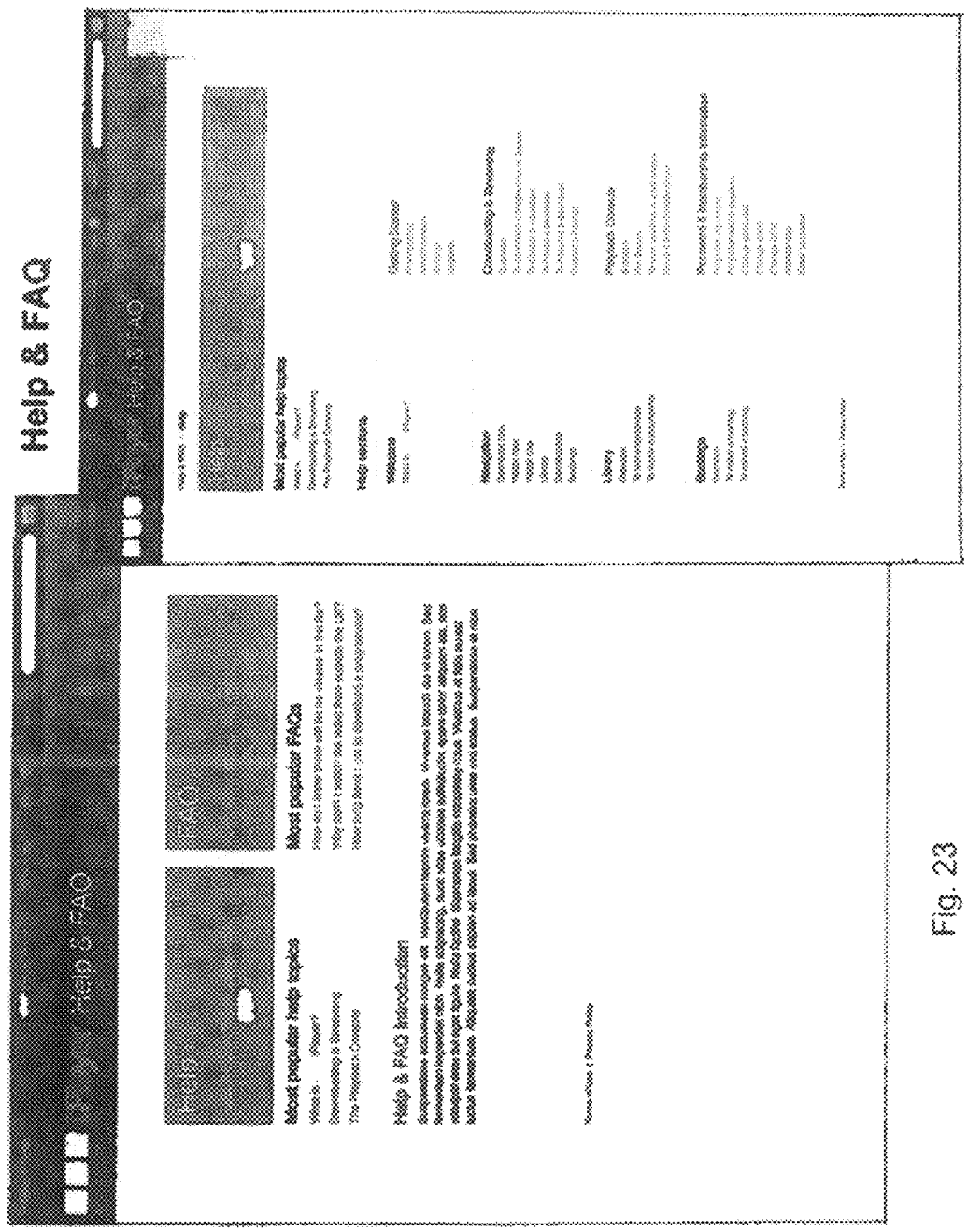
FIG. 23 shows a number of views of various help and frequently asked questions screens.
Figure 24:
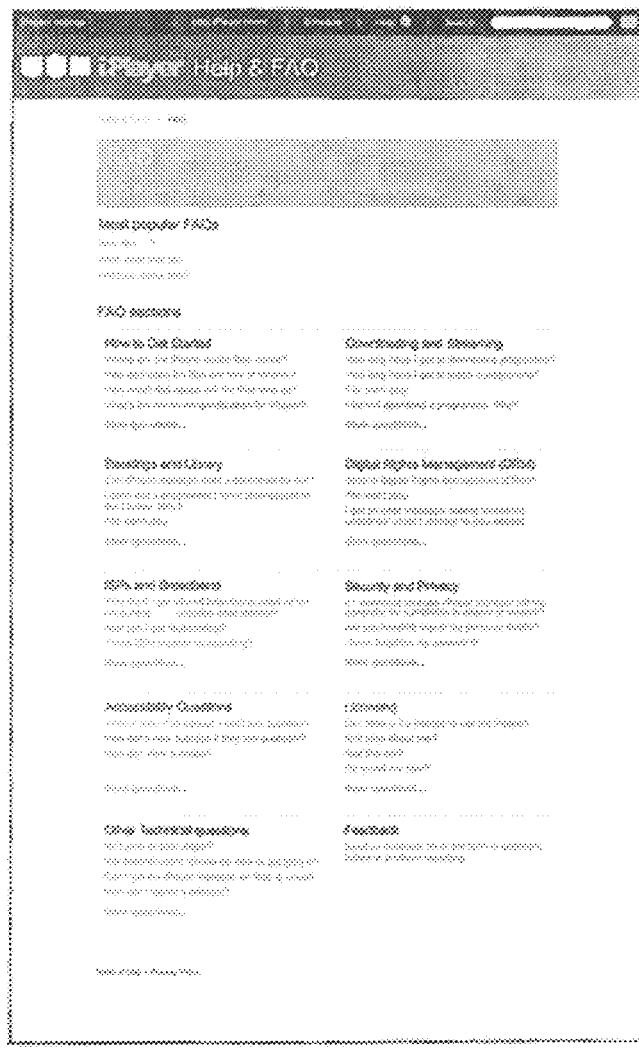
FIG. 24 shows a number of further views of various help and frequently asked questions screens.
Figure 25:
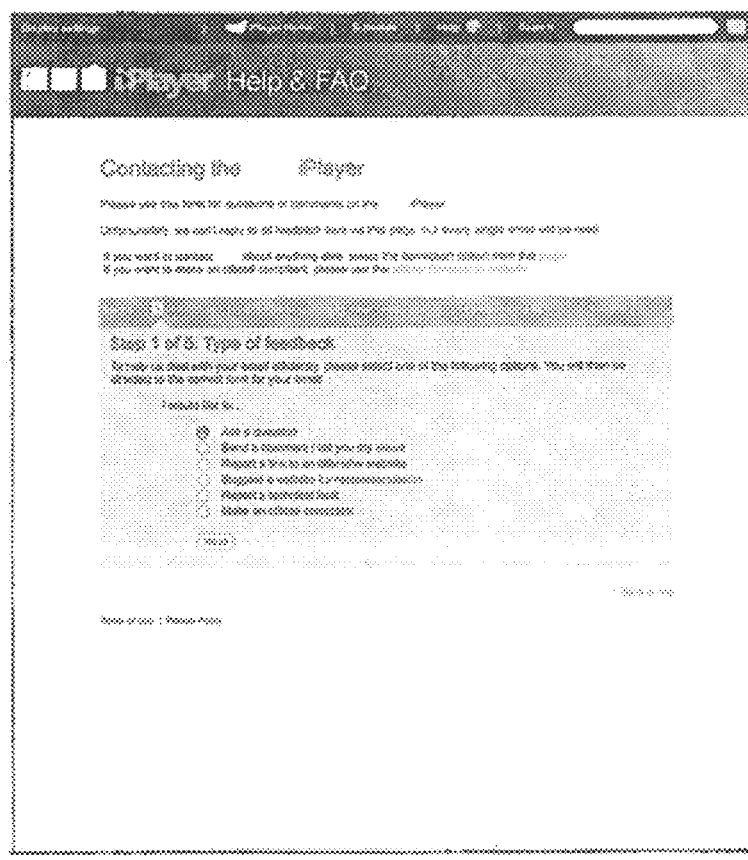
FIG. 25 shows a further view of a help and frequently asked questions screen.

One example of the interactive player system user interface architecture or site map is shown schematically in FIGS. 1 to 3, with the corresponding wireframes or interface screenshots shown in FIGS. 4 to 25. These represent the user facing pages.

The interactive player system site map or user interface architecture is described with reference to FIGS. 1 to 3.

Wireframes/User Interface

Figure 52:
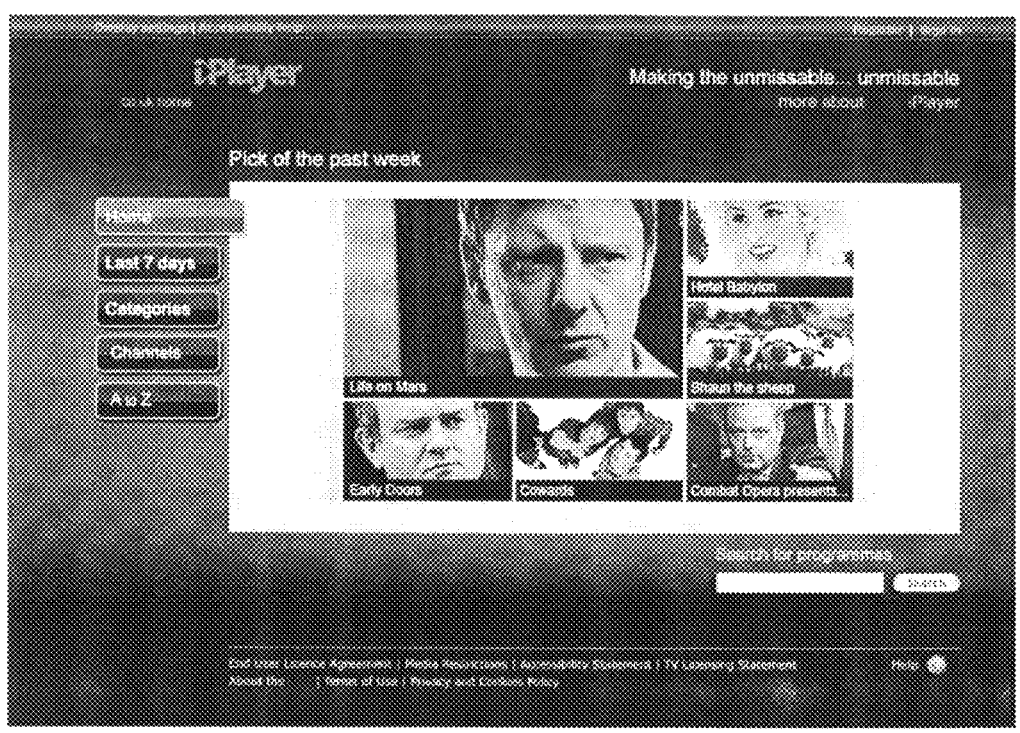
FIG. 52 shows an alternative homepage interface.

Interactive player system Home: See FIG. 4. An alternative version of the homepage is shown in FIG. 52.

Search: See FIG. 8.

Schedule/EPG: See FIGS. 5 and 6.

Programme Item Page: See FIG. 7.

Download Options Page: See FIGS. 12, 18 and 19.

Streaming Options Page: See FIG. 9.

Interactive player system Manager

Downloading Page: See FIG. 20.

My Library Page: See FIG. 21.

My Bookings Page: See FIG. 20.

Playback Consoles: See FIGS. 10, 11 and 22.

End User Functionality

Global Elements

The Global elements are elements of the service or system which appear across the interactive player system central pages i.e. pages generated by the interactive player system service or system. These will comply with a set of Standard Template Guidelines developed for the interactive player system. Examples of certain of these are shown in the table below.

TABLE 1

| | |
|---|---|
| GL 10 Sign in/Sign Out | Persistent links providing the ability to sign in to the service will exist on interactive player system central pages. If a user is not registered they will be given the option to register. Sign in offers 'Remember Me' functionality, showing the user login and offering the option to sign out. |
| GL 20 Settings and Preferences (interactive player system Web) | The user is able to access and amend local settings and user preferences from the interactive player system central pages (where this is appropriate - see the wireframes). |
| GL 30 Help | An option to access Help (how to use the interactive player system) will exist from all interactive player system central pages. Contextual help is also available. |
| GL 40 Global Navigation | Global navigation elements are included on all interactive player system central pages and will conform to the Standard Guidelines. Links will be included to: interactive player system Home A broadcaster's homepage |
| GL 50 Global Footer | A global footer showing standard footer elements will be included on every interactive player system central page and will conform to the Standard Guidelines. This will include the following elements: Terms of Use (EULA) Privacy Policy Security |
| GL 60 interactive player system Branding | Interactive player system Branding will be present on all of the interactive player system central pages. |
| GL 70 Calls To action | Calls to Action refer to the standard links used to indicate the availability of audio/visual media within interactive player system for streaming and download. Appropriate Calls To Action appear when the relevant media is available to play, book or download. Further details relating to Calls to Action is discussed below. |

Interactive Player System Home

The interactive player system Home page is the central entry point for the interactive player system Service, and provides:

Easy access to the Schedule/EPG

Easy access to interactive player system Search

Easy access to Live Radio

Easy access to Live TV (given that this is available to the user).

It also provides:

Links into the browsing pages

Links which enable users (subject to the meeting certain criteria) to register for the interactive player system download service Service information—'What is interactive player system' (this is in the form of a video demonstration)

An entry point for users to learn more about the interactive player system (via a help facility)

Promotion and Recommendation spots for content

Discovery

Search

Examples of certain search features;

In an example, interactive player system Search will consist of an audio/visual (a/v) search only.

In an example, the interactive player system search (A/V search) remains a 'closed' search, i.e. it is not linked to a broadcaster's entire website, but instead indexes a/v content which is available within interactive player system, i.e. content which a user may, for example, download, stream or order (or book).

In another example, a 'total' search is provided, i.e. a text-based and a/v search, which returns all results, for example, a search for 'John Simpson' might return biographical and/or a/v content.

The audio/visual search works consistently from wherever it is accessed and will be included in the standard interactive player system toolbar.

Further details relating to certain search features are provided in the following table.

Schedule/EPG

The interactive player system includes a schedule, in an example in the form of an Electronic Programme Guide (EPG). In an example, the interactive player system schedule will display all national and regional variations of all a selected broadcaster's scheduled programming, for 7 days ahead of and 7 days behind the current day. Interactive programming may also be provided.

Further details relating to certain EPG features are provided in in the following table.

TABLE 2

| | |
|---|---|
| SCH 10 Standalone Search | In an example, the interactive player system search is a standalone a/v search service (independent to the broadcaster's regular a/v search). In the QAT example, an 'internal' search service is not provided. In other examples, the search is integrated into a public facing search service. |
| SCH 20 Search Results Overview | Search results return all a/v assets which fall within the current availability window i.e. which have associated a/v media available for use within interactive player system. It may also include certain content which has been marked as a series stack (episodes which have already been broadcast). Every a/v asset is treated as a single search result, for example, an episode of Eastenders will be returned as a single search result. In all other respects A/V searches will operate in a similar manner to the broadcaster's regular A/V Search. |
| SCH 30 Search Availability Window | In order for a search result to be returned it is provided within its interactive player system availability window, i.e. the a/v asset is shown as being available for streaming and/or downloading. |
| SCH 50 Search Calls to Action | Returned search results include the appropriate Calls to Action buttons with the asset e.g. Watch Now, Download Now, Book Now. |
| SCH 70 Search Links | Each asset returned in the results is linked to the appropriate Item Page for that asset. |
| SCH 80 Search Results Display | Each asset displays a thumbnail image (or substituted brand image), summary information (i.e. Programme Title and Subtitle, Episode Detail), latest broadcast date and time, and a link to the Item page. (Exact list to be confirmed by UXD). Results include the appropriate Calls to Action buttons. |
| SCH 90 View Search Results | Users are able to sort Search results by view - Grid or List. The default view is the Grid view. |
| SCH 100 Results Ordering | Returned results are ordered by broadcast date, Latest First. Other options will be Earliest First and Relevance. (Exact list to be confirmed by UXD) |
| SCH 110 Access to Search | The search is accessible from all central interactive player system pages via the standard interactive player system toolbar. |
| SCH 120 Search Index - Freetext | The following freetext fields are indexed: Brand Title Episode Title Item Title Description Contributor Field |
| SCH 130 Search Index - Controlled | The following controlled fields are indexed: Broadcast Channel Accessibility Type (accessibility options) Broadcast Date/Time |
| SCH 150 Search Updates | The latest 'version' of an asset is stored. The latest update is the definitive search result for that asset. |

TABLE 3

| | |
|---|---|
| EPG 10 Broadcaster's Scheduled Programming | The EPG displays all scheduled programming of the broadcaster. This includes all local, regional and national programming. |
| EPG 30 Multi-Language Content | The EPG interface supports multi-language character sets in order to support e.g. Welsh and Gaelic programme information. |
| EPG 40 EPG Display | Scheduled programmes are displayed by network or channel, over time.<br>The EPG indicates if a broadcast channel is currently off-air.<br>Multiple channels are displayed at the same time.<br>Users are able to 'focus' in on a particular channel or scheduled item. |
| EPG 45 Update of Schedule | The EPG is updated at least every 15 minutes as a minimum on a publish to static basis. |
| EPG 50 | The EPG shows a complete schedule for all channels included within scope. |
| Blanked Content | The EPG is not affected by blanking i.e. content that is blanked or otherwise made unavailable to the user is still shown on the EPG. |
| EPG 60 interactive player system Media Availability | Scheduled items which have media available/not available within interactive player system are clearly indicated. |
| EPG 65 interactive player system Item Summary | The following information is shown on the schedule for all items:<br>Title<br>Series Number and episode Number (when available)<br>Time and Date (including duration)<br>Link to more information<br>Short synopsis<br>Availability information (Available until . . . )<br>Further information may also be available. |
| EPG 66 Programme Properties | The EPG indicates the following programme properties (assuming these are available in the feed):<br>Widescreen/Aspect Ratio<br>HDTV<br>Repeat/version information<br>Additionally, certain of the following properties regarding a programme are displayed:<br>Audio Description<br>Subtitles<br>BSL<br>Sound Format (Stereo, Surround, etc) |
| EPG 70 Regionalisation | The EPG displays all national channels and regional variations of channels, and allows the user to choose which region is displayed. Default regions do not need to be derived from postcodes. |
| EPG 80 Accessibility Toolkit | The Schedule/EPG supports the accessibility toolkit, described below. |
| EPG 85 Favourites | This option is provided to enable a user to choose which channels and/or regions he or she wishes to view within the schedule. |
| EPG 90 EPG Calendar Availability | The schedule displays (by default) information for 7 days ahead of the current day and 7 days behind the current day. The user is able to navigate backwards/forwards within the schedule. |
| EPG 95 EPG Top Picks | Where Top Pick data is made available from Media Planning, the Schedule displays certain programmes as being 'Top Picks'. |
| EPG 100 EPG Guidance | The EPG displays a guidance 'G' flag for programmes broadcast which rate guidance information, in the Channel view.<br>Appropriate Level 1 (Denton Text) and Level 2 (Guidance Descriptions) are displayed wherever the 'G' flag is displayed. |
| EPG 115 Categories | The schedule may link and display categories for programme items. |
| EPG 120 interactive player system Calls to Action | The schedule integrates Calls to Action to interactive player system a/v content (such as Watch now, Download, Book). |
| EPG 130 EPG Links | The EPG provides links to the following areas:<br>Item pages<br>Service Brand pages<br>Calls to Action<br>There is integrated navigation between the item page and the schedule. An item page supports every item displayed on the schedule. |
| EPG 140 Thumbnails | The schedule supports still images/thumbnails (thumbnails are supplied and are images taken from a stock set) for all eligible programmes.<br>Where a thumbnail is not available, a default image is shown. When a thumbnail becomes available, the information is updated to include the image. The default image is based on a hierarchy of series/brand/network thumbnails. |
| EPG 170 'What's On Now' | The schedule includes a link (by channel/network) to the current broadcast programme, and indicates the current programme being broadcast. This information is supplied by the IST.<br>Where a channel/network is off-air, this information is provided in a message. |
| EPG 180 Glossary | Any abbreviations used within the Schedule (e.g. 'R', 'S', 'AD') are explained within the interactive player system Service (in one example, within the Help screens). |

Intermediary Pages

Programme Item Page

The Programme Item page is the page from which a user can find detailed information available on an item of audio/visual content. In an example, a Programme Item Page will exist for every item of content published by the broadcaster (whether for broadcast, via the internet, for example simulcast). In an example, Item Pages will be generated only for broadcast content where the media asset is available for download or streaming within interactive player system. Item Pages do not necessariliy have a one-to-one relationship with all programmes/items presented, e.g. via the Schedule.

Item pages contain and aggregate as much information about the item/programme as possible, including links to related content and information, such as interactive content. The amount of information displayed is related to the type of content being described.

An Item Page allows the user to navigate between related items of content, e.g. linked episodes, derived programmes, and so on.

Item Pages also include information about available 'versions' of the content. Versions may be different from a technical point of view (e.g. HDTV or widescreen version), an editorial point of view (e.g. original or shortened versions of a programme, or different fomr an accessibility point of view (e.g. sign language, audio description or subtitle versions).

An Item Page also presents the user with all the relevant Calls to Action for the content's availability, e.g. Watch Now, Download, Book Download, Stream, or any other options which may exist for the content at the time the page is accessed by the user.

Programme item pages are accessible via the Schedule/EGP and via the Search. They may also be accessed from sites across the broadcaster's websites, at the site owner's discretion. Item pages are persistent and can be found using the Search facility indefinitely, whether or not the audio/visual item is actually available to the user.

Further details relating to certain program item page features are provided in the following table.

TABLE 4

| | |
|---|---|
| PIP 10 Item Pages Overview | An Item Page exists as a persistent page for every item on the linear schedule where the media asset is flagged as available to interactive player system. An Item Page does not necessarily have a one-to-one relationship with a broadcast item). Duplicate Item Pages are not produced for programmes which are repeated - a repeat will link to an existing Item Page. The associated media may or may not be available from the Item Page depending on the timeframe in which it is accessed. Item pages are automatically generated and contain basic programme information where this exists, e.g. brand, title, description, guidance and text, contributors, links, category, version, availability, thumbnail/image, etc.). |
| PIP 20 Item Brand | The Programme Item Page displays an Item Brand. This will be only one of two types of brand - service/channel brand or programme brand. (See data model for further information regarding Brands.) |
| PIP 30 Item Page Thumbnails | The Item Page displays an image associated with the programme as a thumbnail. The image is provided by (extracted from the media when possible) or selected from the stored set and chosen based on editorial rules. If no thumbnail is available a more generic programme brand image may be used. If no image is available for editorial or technical reasons then the area will be collapsed to show no image. |
| PIP 50 Item Page Basic Information | All item pages include the following basic information (where it exists): Title Subtitle Series/Sub-series part Episode Number Synopsis Contributors Guidance and the availability of: Subtitles Audio Description Sign language availability |
| PIP 60 Item Publish Events | Publish events refer to either the channel/date/time on which this item was broadcast or the date/time on which this item was published. The Programme Item Page displays (all) broadcast channels/dates/times for this item. |
| PIP 70 Item Page Relationships | Item Pages include relationship information which associates one Item Page with other Item Pages eg. parent, brand, series, season, etc. Where multiple versions of a programme exist, e.g. original and derived versions, the Item Page will reference all other versions. Where an Item is a Repeat, which is editorially identical to that referred to on an existing Item Page, a new Item Page is not generated. Instead new broadcast date/time is added to the Item Page. A new version of the Item, which is editorially different to the original, does not generate a separate Item Page. Any Item Page generated shows all of the versions of the item. |
| PIP 80 Item Series Relationships | Links to other episodes within the same series are included in the Item Page (via e.g. a link to "View other episodes"). If an episode is part of a series or stacked series, this information will be indicated on the Item Page. |
| PIP 90 Item Group Relationships | The item page provides links to related items, e.g. a parent or event grouping (such as Wimbledon), where this data is supplied from a supplier. |

TABLE 4-continued

| | |
|---|---|
| PIP 100 Link to Existing Websites | The item page includes links to an existing programme or related websites, where this exists. |
| PIP 110 Link to Item Categories | Programme Categories for an item are displayed on the Item Page, where this information has been supplied.<br>Following a Programme Category link takes a user to the relevant browse results for that category. |
| PIP 140 Item Availability | Item Pages show the availability window of an item. The availability of an item changes over time and an Item Page reflects this by updating and displaying the relevant Calls to Action.<br>Where an asset is no longer available, the Calls to Action buttons are no longer displayed.<br>This functionality is provided by the IST and displayed by the Item Page. |
| PIP 150 Item Versions | Information about item versions is included on the Item page.<br>Item versions are:<br>Editorial versions, e.g. original and derived versions of a programme, omnibus version<br>Accessibility versions, e.g. subtitles, audio description, BSL, transcripts<br>Technical or Format versions, e.g. HDTV, Widescreen, Sound Format (stereo, surround, etc.), higher/lower audio quality, higher/lower video quality |
| PIP 170 Item Repeats | Programme repeats and narrative repeat is linked to the Item Page of the original version of a programme. Repeat broadcast dates for the item are included on the Item Page. |
| PIP 210 Item Restrictions | The availability of an a/v asset/version displayed on an Item page is dependent on a number of criteria including user location, date (booking), bandwidth, registration, etc.<br>Therefore, although item availability may be displayed, access to the item may be restricted, dependent on the media rights, business rules and availability restrictions. This functionality is not performed by the Item Page but is initiated by selecting the Call to Action. |

Download Media Selection

The Download media process is directly controlled by the interactive player system Manager and Download Options.

The user will select content to be downloaded or booked via a Call to Action button and, assuming the business rules are met, the user will be directed to the Download Options page, in order to select and confirm the download/booking choices.

Download Options

The Download Options are accessed from Download related Calls to Action buttons, wherever these appear. The Download Options page/interface is accessed whenever an option related to downloading/booking content has been selected.

The purpose of the options is to allow the user to:
Confirm the file selected
Confirm that they wish to start the download process
Confirm the file version required:
  Accessibility Versions (e.g. subtitles, BSL, audio description)
  Editorial Versions (e.g. short version of programme)
  Technical Version (e.g. HDTV, Widescreen)
Confirm Calls to Action option
  Download, Book (as available)
  Confirm that the user has the correct set-up (software, location, version of client installed, etc.) in order to download the file.

The page will also allow the user to download and book related content:
Download previous/other episode(s)
Book more episodes
Download/Book a series, that is, "stack" a series.

Programmes may not be released for download (in light of commercial rights) until the end of the programme transmission, that is, until transmission (Tx) duration plus one minute in time. In one example, if a download is attempted prior to the end of the programme transmission, the download will be booked and then automatically downloaded once the end of transmission time is reached.

A programme will continue to be available according to its commercial rights data (usually for 7 days (hours/minutes) after transmission end time+1 minute). Clearly, there are many exceptions to this rule, particularly in the case of series stacking.

Further details relating to certain download option features are provided in the following table.

TABLE 5

| | | |
|---|---|---|
| DN 01 | Download Options Overview | The Download Options are accessed through download related Calls to Action. They are displayed whenever an option to download or book media to download has been selected. |
| DN 10 | Download Confirmation | The purpose of the Download Options is to confirm the information about the media selected to download to the user and for the user to confirm that this is the option they wish to select. |
| DN 11 | Download Booking Options | Booking options are indicated if the media is not available to download now, but may be booked for download in the future. |
| DN 12 | Download Version Options | If there are different versions of the media available e.g. subtitled, sign language, or HDTV, then this is indicated and the option given to choose any version for download/booking. |
| DN 20 | Download Preferences | Preferences are available to select different download options for the download, e.g. sign language, subtitles, audio description.<br>A link is also provided which enables the user to edit their download preferences. |
| DN 30 | | Information is provided to aid the user in dealing with housekeeping information. |

TABLE 5-continued

| | |
|---|---|
| Housekeeping Information | As a minimum this includes the file size of the download. |
| DN 40 Media Restrictions Validation | The Download Options may in an example enforce media restrictions and business rules including:<br>Enforcing sign on - registration checking<br>Location checking<br>Software detection - including version of client installed and media player<br>The option to download latest version of the client if this is not already installed |
| DN 50 Related Media | If the programme selected is part of a series, the Download Options indicates the availability of Series Stacking and other episodes within the series available for download/booking. |
| DN 60 interactive player system Downloading Page | Once the user has confirmed their Download Options, they will be taken to the Downloading Page within the interactive player system Manager. |

Streaming Media Selection

The user selects content to be streamed (either live or on-demand) via a Call to Action button and, assuming the business rules are met, content is immediately made available within the audio or video Streaming Playback Console.

Download Management

The media download process is controlled by the interactive player system Manager, which also enables users to manage their local Library of downloads, and to manage their Bookings of content for download in the future.

In an example, both Downloads and Bookings are requested from Download Options.

Whether a programme is available for download/booking or not, depends on a combination of business rules and commercial rights frameworks. Further details regarding rights frameworks are provided below. A brief overview is as follows:

A programme is available for download during an 'Availability Window'. It is stored on the user's PC for the 'Shelf Life Window' (if unplayed). Once a user breaks the 'seal' of the programme by playing it, the 'Playout Window' is invoked.

Two Rights Frameworks exist in the QAT version:

7/13/7

A programme is available for download for 7 days to the minute after the transmission end time plus one minute.

A user is able to store an un-played programme on a PC (or similar device) for 13 weeks to the minute after the transmission end time plus one minute (after which it will be automatically disabled).

Once a user plays a programme the 'seal' is broken. The user then has 7 days to the minute (after the start of the first play) during which they may view the programme an unlimited number of times (after which it will be automatically disabled).

Note that a file is disabled either 13 weeks after the transmission end time, or 7 days to the minute after the first play, whichever of these dates occurs first.

1/1/1

This second framework exists primarily for downloaded news or current affairs content, which works in a similar way to the framework described above, except that each of the content items exists for only 24 hours.

In this scenario a user who downloads the previous day's 6:00 pm news at 5:00 pm on the following day, would only have 1 hour in which to play the programme before it expires and is disabled.

Interactive Player System Manager

Downloading Page

The Downloading Page allows users to maintain and manage the Downloads which are currently in progress. Information is available both on and off-line, and users are informed if downloads are currently suspended due to the user going off-line.

The Downloading Page will also provide the user with information relating to download progress.

Further details relating to certain download features are provided in the following table.

TABLE 6

| | |
|---|---|
| IPM 10 Downloading Programmes - Status | The user is able to monitor the status of downloads and see which media or content items are currently downloading. Information displayed includes at least:<br>programme name<br>broadcast day and time<br>download status (% complete)<br>estimated time remaining for download (hours/mins)<br>It is possible to individually list and distinguish regional variations of the show (or other variations of shows which have identical titles). |
| IPM 20 Cancel Download | This option is available to cancel a download.<br>When selcted, this removes the media downloaded so far from the user's hard disk. |
| IPM 30 Pause Download | The user is able to pause an individual download. |
| IPM 40 Resume Download | There is an option shown which enables a user to resume a paused download. |
| IPM 50 Downloading Programmes - Sort | The user is able to sort downloading programmes by:<br>Programme title (alphabetic)<br>Status (e.g. most complete to least complete)<br>Time remaining for download (e.g. least to most) |

TABLE 6-continued

| | |
|---|---|
| IPM 80 Downloading Programmes - Information | In addition to the Downloading Programmes Status information, other information displayed on the Downloading Programmes window includes:<br>Programme Brand<br>Service/Channel Brand<br>Programme Synopsis<br>Broadcast date/time<br>Guidance information.<br>Thumbnail<br>Version Information (e.g. BSL, etc)<br>File sizes<br>Information displayed in the Programme Status area is consistent information displayed in the Downloading page and the Library page. |
| IPM 90 Downloading Programmes - Online/Offline | When offline, the information displayed is the status information relating to the download at the point it was last online.<br>Offline/online status is indicated to the user. |
| IPM 100 Links from Downloading Page | Links on the downloading page include:<br>Link to Search/Browse<br>My Library<br>My Bookings |
| IPM 101 Download More Link | The Download More link links to Search and in other versions of the system launches a browse page.<br>This link also provides the ability for a user to locate more content to be downloaded. |
| IPM 110 Automatic Content Download | Booked and subscribed packages are automatically downloaded to the user's machine as they become available. This is indicated in the downloading area. |

My Library Page

Local Library management is supported by the interactive player system Manager and allows users to organise and maintain their downloaded programmes. Note that Downloads are requested via the Download Options page. interactive player system Manager also permits the user to manage the Downloads which are in progress and to manage their Download Bookings.

The Library page displays the following information for all downloaded files:
Programme Name
File Size
Expiry Information (days remaining/date of expiry)
File status (played/unplayed/new)
Broadcast Time Users may Play and Delete download files from the Library. The user is notified when content is close to expiry, say, 24 hours before expiry.

Downloaded files are stored in the location the user has chosen in 'Settings' and information displayed by the Library is cross referenced to these files. If this setting is changed, the Library then references the files in both the old and new locations.

Further details relating to certain library features are provided in the following table.

TABLE 7

| | |
|---|---|
| IPM 150 Library Download List Information | Displays a list of downloaded programmes in the Library. Information to be displayed include, at least:<br>Programme Name<br>Number of files/size of files<br>Content status (played/unplayed)<br>New downloads<br>Expiry information (days remaining/date of expiry)<br>Broadcast time<br>Information related to the version e.g. BSL, HDTV, is also displayed. |
| IPM 210 Library Programme Information | For each programme selected, the Library page displays the following information:<br>Thumbnail<br>Service Brand<br>Episode Title/Subtitle (or date where title/subtitle do not exist)<br>Episode Number?<br>Programme broadcast date/time (original?)<br>Duration<br>Expiry Date<br>Programme Synopsis<br>Programmes which are 'New' i.e. have been downloaded in the last 24 hours and are unplayed, are also displayed. |
| IPM 230 Library Content Information | For each programme selected, the following Content information is displayed:<br>Type<br>First broadcast date<br>Technical Format<br>Accessibility Version |
| IPM 200 Library Links | The interactive player system Manager Library page contains the following links:<br>User Preferences/Settings<br>interactive player system Home<br>Service Brand (Channel) |

TABLE 7-continued

| | |
|---|---|
| IPM 240 Library Options | The user is given the following options with respect to an item of a/v content within the Library:<br>Play content<br>Delete content |
| IPM 250 Library Disk Space | The user will is able to see the total amount of used/unused disk space available for downloads.<br>Disk space allocation can be amended from the Library page via the Setting/Preferences link. |
| IPM 260 Confirmation Dialogue Boxes | Confirmation dialogue boxes are displayed when the user selects the Play or Delete options.<br>The 'Play' option reminds the user that the file will expire 7 days after first Play.<br>The user can select, via a pop-up dialogue box, to have confirmation dialogue boxes either displayed or not displayed. |
| IPM 270 Library 'Play' Option | Once the user has played content for the first time, the following information will be updated in the Library:<br>the thumbnail image (new image displayed)<br>'Watch by' changes to 'Watch Within'<br>'New' disappears<br>Expiry date is updated in download list. |
| IPM 280 Library Guidance Information | Guidance information is displayed in the Library page, together with the appropriate Denton guidance text. |
| IPM 290 Library Content Availability | Downloaded files are held or stored on the user's PC and can be found and played using a stand-alone media player if desired. |
| IPM 300 Content Expiry Warning | Users are warned when downloaded content is close to its expiry date (7 days).<br>Information is displayed in days and/or hours. |
| IPM 310 Transfer Content | The user is able to move content between computers. |
| IPM 320 Library Off-line | When the Library is off-line, the user will be presented with the same information as when it is on-line, and the user will be able to use the Play and Delete functions.<br>The user is prompted to go on-line to access the following functions:<br>links to Download More programmes<br>Search/Browse |
| IPM 160 Delete Download | The user is able to delete downloaded files from their library which will also delete them from the operating system. |
| IPM 170 Auto-Delete Download | Expired content (i.e. content which has been disabled) is deleted automatically as soon as is possible to its expiry date.<br>Automatic deletion takes place whether the user is on or off-line. |
| IPM 180 Disable Download | Content is automatically disabled exactly 13 weeks (91 days) and the appropriate number of hours and minutes from the end of the transmission time. Once disabled, the content will no longer appear in the user's library information.<br>Deletion of content may also take place after this time in certain situations. |
| IPM 190 interactive player system Manager Settings | The user is able to access interactive player system Manager Settings and User Preferences from the Library (via the Settings tab) and amend these as required.<br>e.g. a user will be able to amend the file storage location, or disk space allocation. |

My Bookings Page

Bookings management is supported by the interactive player system Manager and allows users to organise and maintain their Bookings. Bookings are made via the Download Options. The interactive player system Manager also permits the user to manage their Download Library and to manage Downloads which are in progress.

When off-line the user will be presented with the same information as when online.

Further details relating to certain booking features are provided in the following table.

TABLE 8

| | |
|---|---|
| IPM 340 Booking List Information | The Bookings List displays the following information:<br>Programme Title<br>Download Status (In Progress or Booking) |
| IPM 350 Booking Programme Information | For each selected booking the following information is displayed:<br>Thumbnail image<br>Service/Channel Brand<br>Programme Title/Sub-title<br>Booking made date<br>Booking Type e.g. complete series, single episode<br>Next scheduled download (date)<br>Last successful download |
| IPM 360 Booking Links | The following links exist on the Bookings page:<br>interactive player system Home<br>Find more stuff<br>Service/Channel Brand |
| IPM 380 Bookings Options | The user is given the following options within the Bookings Page:<br>Delete Booking |

TABLE 8-continued

| | |
|---|---|
| IPM 390 Bookings Off-line | When the user is off-line they are presented with the same information as when on-line. |
| IPM 400 Cancel Download Booking | The user is able to cancel an individual booking. |
| IPM 120 Subscribe to On-going Series | The user is able to subscribe/unsubscribe to an on-going series, i.e. to book a download for every future episode available (according to editorial settings) in this series.<br>Episodes are automatically downloaded once they become available for download. |

Download Variations

There are a number of special circumstances which affect the download process described above.

Repeats

The interactive player system treats Repeats and Narrative Repeats (repeats shown within 7 days of the original broadcast) in the same way as the original programme. This means that the media will be available to the user for 7 days after the transmission end time, whether or not the programme is a repeat.

All broadcast transmission dates/times i.e. those of the original broadcast and any broadcast repeats, will be shown on the Programme Item Page.

Accessibility Repeats

Where a programme has a separate broadcast slot because, for example, it is the sign language version, then it will be treated in the same manner as repeats, as described above.

Omnibus Editions

An omnibus edition of a programme, e.g. Eastenders on a Sunday, will optionally be made available to interactive player system for download or streaming.

Time-Shifting

It is possible that programmes can be time-shifted in different regions. Programmes can be shown:
  Before network transmission
  At the same time as network transmission (but shifted slightly)
  After the network transmission These scenarios must be taken into account when considering the availability of programmes and series for streaming/downloading.

Series Stacking

Series stacking provides the user, subject to commercial rights, with the ability to obtain all (or a number of) the episodes within a series, i.e. a selection of related content items.

The frequency of the broadcast of episodes within the series (daily, weekly or any other frequency) is not relevant to the stack.

Series Definition

The decision to classify a series as a Series Stack (or a variation on a Series Stack—as described below) is editorial in nature. A series may consist of one or more sub-series, e.g. it may include a 2-part sub-series within a 12 part series. This does not affect the series stack. A series can be linked to another related series, i.e. Dr Who Series 2 can be linked to Dr Who Series 1 or Dr Who Series 3. This will provide the ability for a user to request a series which may not yet have been scheduled.

Series Availability

In one example, in order to obtain (i.e. download) a series stack, the stack must be requested either:

via a booking, up to 7 days prior to the broadcast of the first episode
at any point during the broadcast of a series
up to 7 days after the last episode in the series is broadcast.

When a user requests a series stack, episodes which have already been broadcast can be selected for download. Episodes which have not been broadcast will be booked and downloaded after the end of programme transmission.

Series Shelf Life

In certain cases, rights agreements mean that a series stack cannot exceed a 13 week shelf life window. The 13 weeks starts at the end of the transmission of each episode i.e. when the episode becomes available for download. Thus, for example, if a user downloads a 12 part series stack, six days after the last episode is broadcast, the user will have 1 day in which to watch the first episode before it expires.

Series Playout

The playout window for an episode is also in some cases restricted by a 13 week hard stop. If a user attempts to play a previously downloaded programme/episode 12 weeks and 6 days after transmission end, he will only have only 1 day in which to play the programme.

Number of Episodes

The number of episodes which occur within the 13 weeks is not relevant to a series stack. It is possible to make all episodes available to a user. It is also possible to restrict a user's ability to make bookings and to download all the episodes in a series. When a broadcast series exceeds the 13 week duration, a user may not in some cases be able to obtain all of the episodes within the series.

Series Stacking Variations

Broken Stacks

There are some situations in which a series stack may be 'broken'. In normal circumstances, a stack which has a (planned or unplanned) break in transmission of less than 2 weeks is considered to be a single stack. A (planned or unplanned) break in transmission of the series of more than 2 weeks will cause the series stack to be 'broken' into two (or more) separate stacks.

A number of scenarios in which a stack may be broken are as follows:
  Long running series, containing many episodes, with planned breaks
  Shorter series with short unplanned breaks
  Series with longer planned breaks which are shorter than 13 weeks
  Series with longer breaks which end up being longer than 13 weeks A 'broken' stack is considered to be a single entity for all other purposes, e.g. when presented on a Programme Item Page.

Series Repeats

Repeated broadcasts of a series (whether narrative or otherwise), will adopt the equivalent rights rules of a single episode. Thus, it is an editorial decision as to whether or not a repeated series will be series stacked.

Further details relating to certain series stack features are provided in the following table.

TABLE 9

| | |
|---|---|
| SES 10 Series Stacks | A series is designated as a series stack on an editorial basis which indicates all the programmes which are episodes within a particular series.<br>For future reference, a series can be linked across series 1, series 2, and so on, through the use the series concept. |
| SES 20 Stacking Types | A series stack can be used to link any one of the following types of programming:<br>Single series stack - for episodic series which have a final episode (such as Spooks)<br>Rolling Stack - for ongoing series (such as soaps) with an indefinite number of episodes. |
| SES 30 Series Stacking Availability | Series stacking allows a user to catch-up on a number of episodes within the available rights window.<br>Within the rights windows a user is able to:<br>Download any episode within a series that has already been broadcast<br>Book the whole series before it has been broadcast and downloads will occur as the episodes are broadcast/released<br>While a series is being broadcast, download available episodes and book future episodes to download that have not yet been broadcast.<br>A user is able to download a series up to 7 days after the last episode in the series.<br>There are a number of possible variations to these rules. |
| SES 40 Series Stacking - Broken Stacks | It is possible to break a series stack into one or more separate parts (a 'broken' stack). The business/commercial rules applied to 'broken' stacks in one example, are as follows:<br>if a planned or unplanned gap within a series broadcast exists, and the gap is for less than two weeks, the series will be considered as a single series.<br>if a planned or unplanned gap within a series broadcast exists, and this gap is for more than two weeks, the series will be broken into two (or more) sub-stacks.<br>For all other purposes (other than download) a broken stack is treated as a single stack, e.g. when presented on an Item Page. |
| SES 50 Series Stacking - Multiple Episodes | It is possible to offer all of the episodes within a 13 week duration as a series. The frequency of broadcast of episodes is not relevant to the stack.<br>If the series duration is longer than 13 weeks, some episodes in the series may become unavailable to the user. |

Subscriptions

A Subscription is an on-going booking, and enables a user to download content on an on-going basis as opposed to downloading a fixed amount of content. Two types of subscription exist:

1. A subscribtion to a on-going series (a rolling stack) e.g. a soap opera
2. A subscribtion to regular bulletins, e.g. news reports or a weather forecast.

An on-going series, such as Eastenders, is not classified as a series stack as it does not have fixed number of episodes. A user could however subscribe to Eastenders and obtain a 'rolling' 13 weeks worth of episodes.

TABLE 10

| | |
|---|---|
| SUB 10 Subscription | Subscription refers to subscribing to the download of ongoing content<br>There are two types of subscription:<br>Subscribe to an ongoing series (such as a soap)<br>Subscribe to regular bulletins (such as news, weather, etc).<br>It is possible to restrict the number of episodes that can be booked and stored within a rolling series (both forwards and backwards) to avoid excessive downloading and usage of local storage (e.g. maximum booking window in advance) |

Content Expiry

Users are provided with expiry information for all content held within the Library. This consists of the number of days remaining before expiry and/or the expiry date. Content close to its expiry date is highlighted to the user.

It is possible to order content on the basis of how close to expiry the content is via the search/browse tools.

A two-stage process exists to control and delete content.

Disabling Content

Content expiry is driven by rights issues and is calculated from one minute after the end of transmission of the programme. This information is held within the Digital Rights Management (DRM) license. For unplayed content, the downloaded file will be automatically disabled exactly 13 weeks (91 days) to the minute from the end of the programme transmission time. Once content has been played out for the first time, i.e. once the DRM 'seal' has been broken, the content will be disabled exactly 7 days to the minute after the start of the first play.

Content will expire either 7 days (to the hour/minute) after first play, or 13 weeks (to the hours/minutes) after transmission end time, whichever of these dates occurs first. If content is downloaded 12 weeks and 6 days after broadcast (e.g. if part of a series) then the user will have only 1 day within which to play the content. It is therefore unlikely that the user will be made aware of the 13 weeks duration.

Expired files, i.e. those which have been disabled, will no longer appear visible to the user within 'My Library'.

Deleting Content

Disabled content will be automatically deleted from the user's PC as soon as possible after it has expired/been disabled. The exact time of deletion will be determined by the the system, as there are some playout scenarios which must be taken into consideration. For example, a user who starts to play out a programme one minute before its expiry time will be permitted to continue to play the programme until it finishes. Deletion information will be stored locally and therefore the content can be auto-deleted whether or not the user is on-line.

Content Transfer

The user has the ability to transfer files (using normal transfer mechanisms outside of interactive player system)

between locations on the same machine, and to move files to other machines. Content can also be attached to an email and sent to other users.

A user attempting to play a file which has been moved from its original download location (by any method) will be able to do so, as long as the relevant commercial rules are satisfied. These rules include:

The content is within its Shelf Life window

The user has registered for the interactive player system Service

The user is located within a particular location

As described above, the 'My Library Page', provides further information.

Playout

The playback console can support at least the following:
On-demand streaming—radio
On-demand streaming—tv
Live streaming—radio
Live streaming—tv
Downloadable content—tv
Downloadable content—radio
Playback Consoles—General It is possible to minimise the interactive player system application itself and the playback console. When the console is minimised the user is able to continue listening to an audio file or the audio track of a video file.

Further details relating to certain playback concole features are provided in the following table.

TABLE 11

| | |
|---|---|
| PBC 05 Console Variations | The following console scenarios are provided: Streaming On Demand (TV) Live (Simulcast) Streaming (TV) Download (TV) |
| PBC 10 Console Links | Links from consoles will include at least some of the following: links to interactive player system Home links to directly related content (package, package groups) html links links to service/channel brand links to accessibility options where these exist (e.g. subtitles on/off) recommendation links Where link data is not available (e.g. optional titles) the link will not be displayed. |
| PBC 12 Console Packages | A link to a package is defined as a link to an a/v content file with its associated assets (e.g. thumbnail) and metadata A link to a package group is defined as a group of packages directly linked to the content stream that is playing e.g. the same programme, news story etc. For example, a stacked series, all clips related to a particular news story, chapters of a programme, clips related to a programme episode. Package groups can contain both video and audio links. |
| PBC 20 Console Playback Accessibility | The system is adapted to apply a user's accessibility selections to all types of playback console, whether they are online or offline. The Accessibility Toolkit is also applied to all playback consoles. Where subtitles are selected they are displayed according to the user preferences, and appear below the video screen. It is also possible to switch the subtitles on or off (see FIGS. 46 and 47). |
| PBC 25 Console Window Size | Users are presented with a 'full screen' option or a 'mini screen' option. Further details are shown in the wireframes and screenshots. It is also possible to minimise the window to allow the user to carry on working on the PC. |
| PBC 30 Console Media Selector Settings | When streaming, the system can work with either Windows ™ Media Player ™ or similar player. |
| PBC 35 Console Offline/Online | If a user is offline, and selects online functionality e.g. a link to the interactive player system Home Page, a prompt is displayed notifying the user that they are offline. |
| PBC 40 Console Playback Controls | The player console provides at least certain of the following controls: stop play pause resume (where left off) rewind fast forward control volume (up/down) sound (on/off) 'Minutes left to play' (info only) Note that that the radio consoles controls may differ from the tv controls for rights reasons (eg. contain 'skip' options) - see wire frames for further information. |
| PBC 41 Console Playback Time | The number of remining minutes of a programme is displayed. |
| PBC 42 Console Playback Status | The console is able to save the playback state of a download on closure to enable the user to resume playing a programme where they left off. |
| PBC 48 Console Recommendations | Recommendations are structured as follows: 1st link - related programme from any brand 2nd link - other people who watched/listened to this also watched/listened to this 3rd link - any programme from any brand. For news clips all three links are wild cards. All recommendations generated automatically. |
| PBC 50 Console | All playback consoles include a link to settings and help. |

TABLE 11-continued

| | |
|---|---|
| Settings/Help | |
| PBC 55 Streaming Playback | The scenarios for Live Streaming and Streaming On-Demand are independent processes. |
| PBC 60 Live Streaming Availability | Where a channel is not currently broadcasting a user will be presented with a 'Not on air' message. Where live streaming is blanked (for rights reasons or similar) the user is presented with a generic 'This service is not currently available' message. |
| PBC 65 Live Streaming Preferences | Channels/Networks default to the National schedule. The option of selecting from a full list of channels is also provided. |
| PBC 70 Live Streaming Navigation | The interface enables a user to navigate between live TV and live Radio channels. A user navigating to a channel which is 'off-air' is presented with a generic message explaining this. |
| PBC 75 Live Streaming Schedule | A link to the TV schedules is included in the Live Streaming playback console. |
| PBC 80 Live Streaming Controls | Live streaming controls are limited to: Play, stop, volume, and full screen/mini screen. |
| PBC 90 Live Streaming Information | Information regarding the schedule is presented in the live streaming consoles. This includes 'What's on Now/Next' and a link to the Schedule. See wireframes for further information. |
| PBC 100 Download TV Playback Console | Plays back content which users have downloaded to their interactive player system Manager. |
| PBC 110 Download Console Links | Download Console links will include: link to interactive player system manager link to a broadcaster's page link to the interactive player system Home |
| PBC 120 Download Console Prompts/Warnings | The player is able to store the playback details so as to enable a user to resume playback where they left off. |
| PBC 130 Streaming On-Demand TV Content | The streaming on-demand playback console indicates the content 'Playing Now'. |
| PBC 150 Playback Reporting | User activity on all playback consoles eg. play, pause, follow link etc. is captured for reporting purposes via a set of embedded tags. |

Streamed audio catch-up, downloaded audio catch-up, podcasts and vodcasts are provided in certain examples.

Streamed Video Catch-Up

At any point after transmission (business rules permitting) a user can select content to be streamed on-demand. Streamed content is not stored on the user's PC but is watched on-demand through the On-Demand Video Streaming Playback Console.

Streamed content can be accessed throughout the interactive player system Service from the Streaming Call to Action, wherever this is embedded.

Downloaded Video Catch-Up

The download video catch-up service provides a user with the ability to download a DRM (rights protected) file which has been broadcast on scheduled TV within the last 7 days. A user selecting the 'Download' Call to Action button will be directed to the Download Options Page, where choices regarding file format, programme version, accessibility preferences, etc. can be made.

Downloadable content can be accessed throughout the interactive player system Service from the Download Call to Action, wherever this is embedded.

Live audio is provided in certain examples.

Live Video

A user may choose to watch any a television channel that is currently broadcasting, via interactive player system (simulcast).

Where a multicast distribution system is not supported, the user may be offered a unicast stream of the broadcast.

User Registration

In a certain embodiment prior to using the interactive player system, users are required to be registered with single sign on (SSO) for service.

A user may register for the interactive player system Service by:

Registering via a link from a central interactive player system page, e.g. from interactive player system Home. An immediate location check will be performed to see if the user is based in a certain location.

By attempting to access downloadable content. If a user attempts to access downloadable content the system will check to see whether or not they have previously registered for the service (amongst other checks) and offer the option to register if the user has not previously registered for the service.

Following registration, the user is presented with certain default User Preference and Settings information (as described in more detail below).

After having collected the registration data, a copy of the data is held locally within the client to facilitate DRM licence checking.

Further details relating to certain SSO features are provided in the following table.

TABLE 12

| | |
|---|---|
| SSO 20 Register for Service | Register in SSO for interactive player system service. Registration is only required for download functionality, personalisation, and so on. It is not required for access to streamed content. The login information will be cached as a cookie and also held centrally. The registration bar is only presented to users in certain jurisdictions. Thus, certain users will not be able to download content. |
| SSO 20 User Location | The SSO status bar will be displayed to all users, however a location check (not performed by SSO) will be carried out before registering for the interactive player system Service to avoid a user creating a membership for a service they cannot use. |
| SSO 40 Log In | The user will log in through SSO to access the interactive player system service for downloads, personalisation etc. It is not necessary to log in to access streaming functionality. |
| SSO 45 Log Out | Option to log out of the interactive player system service. |
| SSO 50 Remember Me | Ensure that login details are retained indefinitely, and that a user is automatically logged in unless the system is instructed to do otherwise, that is, 'Remember Me' functionality. |
| SSO 70 Manage User Profile | The 'User Profile' consists of: SSO registration data User Preference data Users are able to create/edit/delete both SSO and User Preference data. Both SSO and User Preference data is password or PIN protected. |
| SSO 80 Restrict Access | It is possible to restrict users registering for the interactive player system service. |
| SSO 90 Data Collection | SSO collects standard registration data for the interactive player system service. In addition to the standard data it collects personalisation and demographic data. |
| SSO 100 SSO Display | The interactive player system SSO form is based on the universal format for data collection. |

User Preferences

The User Preferences are a set of centrally managed options and personalisation data which are attached to a registered profile of a user (as setup through S SO). They are available to the user whenever and wherever they are logged in (i.e. they are associated with the user, and not with a particular machine).

User Preferences are set as defaults on collection, and it is possible for the user to login and edit these preferences.

The 'Settings' area of the interactive player system interface will allow a user to edit their user preferences and local settings information. User preference information only appear if the user is online.

Settings

Settings are PC based settings which can be defined by users who are both registered and unregistered. They are held locally and are machine (laptop, PC or any other supported device) specific.

The 'Settings' area of the interactive player system interface will allow a user to edit their local settings information.

Settings & User Preferences

TABLE 13

| | |
|---|---|
| USP 10 User Preferences - Offline | The system stores accessibility (interface) preferences for use when the user is offline. These will be stored locally. Preferences will apply to areas such as interactive player system Home, interactive player system Manager, and all associated interactive player system pages. |
| USP 20 User Preferences - Online | The system stores accessibility (interface) preferences for use when the user is online. Preferences are stored both centrally and locally via cookies. Preferences apply to areas such as interactive player system Home, interactive player system Manager, and all associated interactive player system pages. |
| USP 30 User Preferences - Data | User preferences include the following: Disk Management Option to change folder where programmes are stored Ability to set disk space for downloads Ability for user to choose how much space should be kept free Accessibility Options Font - sized/colour/contrast (of all text including subtitles) Visible highlighter Design layout options - low graphics, text only Linearisation Subtitles display (on/off) Parental Guidance |
| USP 40 User Preferences - Update | Users are able to create, edit and update their Preferences online. In order to update preferences the user must be signed in to SSO and must enter a password to access the preferences. Preferences will be reflected by the download component. An update to the online preferences will automatically update the offline preferences. Users may not directly update the locally held (offline) preferences but must do this via SSO. |

TABLE 13-continued

| | | |
|---|---|---|
| USP 50 User Preferences Storage | User preferences are stored centrally. Password protection is applied to user preferences. | |

Accessibility

The interactive player system Service has been designed to be as accessible as possible for all users. Accordingly, an accessibility tool kit has been developed for use by all interactive player system interface pages.

The interactive player system supports sign language, audio description, and transcript and subtitled files. These are made available and/or associated with the programme content of content items.

Accessibility preferences are made available to the user at the time of registering for the interactive player system Service, or at the time the user first accesses the system. User accessibility options are stored locally as well as centrally, since they may be machine specific. The accessibility options selected are applied to all views of interactive player system/interactive player system content, whether the user is online or offline.

The following abbreviations are used to describe the accessibility requirements:
D—Dyslexia B—Blind
C—Cognitive Disorder H—Hearing Impaired
M—Motor Dysfunction LL—Low level of literacy (8 years or less)
L—Low Vision Further details relating to certain accessibility features are provided in the following table.

TABLE 14

| | |
|---|---|
| ACC 30 Accessibility Tools Page | The system provides users with a set of simple adjustment tools and templates to enable them to adjust:<br>font (size, colour and contrast)<br>visible highlighter<br>design/layout options (low graphics, text only and linearisation).<br>These tools are provided via the interactive player system Home screen and on all other interactive player system pages. (See, for example, the graphic indication at the top of the screenshot shown in FIG. 88.)<br>These tools will be applied via SSO.<br>The user is able to save their preferences for use online and offline.<br>D, C, M, L, B |
| ACC 33 Web Pages | Consistent standards and mechanisms, for example for changing colours, will be applied across all pages which link to the system. |
| ACC 34 Playback Consoles | Existing playback consoles, re-skinned as an interactive player system console, also comply with the interactive player system accessibility requirements. |
| ACC 35 CSS Templates | All interactive player system pages or interface screens use CSS search templates.<br>This enables the integration of ATP. |
| ACC 55 Options Checkboxes | The download options page displays checkboxes (or similar) which can be selected. The user can then choose to download a sign language verison, or an audio description version, of a content item (where these are available). |
| ACC 56 Checkbox Updates | Selecting a checkbox on the download options page (sign language, audio description, subtitles) will not automatically update the user preferences (online and offline) to reflect the options selected. |
| ACC 60 Sign Language | Downloadable sign language content, which has been scheduled for linear broadcast, will be flagged as available through interactive player system (subject to Rights agreements).<br>Sign language versions may be regarded as separate versions of the content item. The user is shown/offered the sign language version of the content item where this exists. |
| ACC 70 Audio Description | Downloadable audio description content, which has been scheduled for linear broadcast, (i.e. where audio descriptions are embedded within the file) will be flagged as available through interactive player system (subject to Rights agreements).<br>The user is shown/offered the audio description version of the content item where this exists. |
| ACC 80 Subtitles | Subtitles (where available) apply to both downloadable content and on-demand streamed content.<br>The user is shown/offered the subtitled version of the content item where this exists. Subtitles are either embedded within the content item itself, or alternatively, the subtitles are delivered separately. |
| ACC 88 Subtitles On/Off | Wherever subtitles are available with the file the playback window displays the "Subtitles On/Off" option. |
| ACC 95 Links Display | Navigation, Access and Help related link positions remain consistent across all pages/screens |
| ACC 100 Syndication Calls to Action | Calls to Action buttons/widgets comply with the accessibility requirements in all interactive player system pages. |
| ACC 110 Children's Display | interactive player system links and calls to action buttons/widgets on children's pages are tailored to be accessible to children. |

TABLE 14-continued

| | |
|---|---|
| ACC 120 Audience Support Accessibility | Audience support pages, (help, faqs, contextual help etc.) comply with the accessibility requirements employing simple consistent designs and layout. |
| ACC 130 Accessibility Help | Accessibility help pages, providing information on accessibility issues within interactive player system, are accessible from the interactive player system Home page/screen and all other interactive player system pages/screens. |

Parental Controls

The interactive player system provides a number of measures to protect children. Three features are employed to protect children:

1. Guidance: where the content is considered to be unsuitable for children, or unsuitable for children to view withouth parental guidance, a "Guidance" or "G" flag is associated with the content item and discplayed together with the content item, along qwith the appropriate Denton text. The appropriate Denton text is displayed whereeve a 'G' flag is displayed. The 'G' flag is usually displayed on the programme item page.
2. Playback. The 'G' flag and Denton text will be displayed prior to a user playing any downloaded or streamed content which has been 'G' rated
3. PIN protection. interactive player system provides a pin facility to enable a parent to PIN protect all downloaded content that has been 'G' rated. In this way, content cannot be played without the entry of the PIN.

Further details relating to certain guidance features are provided in the following table.

It will be appreciated that the interactive player system client can also be installed on other platforms, for example Apple™ computers and, for example, on handheld or portable devices.

The client can be installed in one of two ways:

By signing up to the services via an interactive player system Internet Page

By attempting to download content directly, in which case, if the client has not yet been installed, the user will be directed to the install procedure.

Un-Install

Un-installing the client will remove all components related to interactive player system, including any content files and cookies.

International Users

The interactive player system is also able to support International users. In particular, the system provides:

Open Access: users, whatever their location, are able to access the interactive player system via the internet. However, access to the certain content and/or functionality is restricted based on user location, for example using Geo-IP.

TABLE 15

| | |
|---|---|
| GUI 10 Guidance Text | Guidance, i.e. the display of a 'G' flag, is applied consistently within the interactive player system pages/screen (schedule EPG, interactive player system programme page, etc.). The G flag is included in the supplier feed. All TV Programmes where the content rates guidance (which includes sex, violence, swearing, disturbing scenes or repetitive flashing images) will be clearly marked with a 'G' guidance flag and the appropriate Denton text, wherever a reference to the programmes appears, for example, in the schedule, and programme information pages. |
| GUI 18 Guidance Distribution | Guidance is applied to: All downloaded content i.e. G flag and text will be displayed before download All on-demand streamed content i.e. G flag and text will be displayed before streaming |
| GUI 20 Guidance Format | Guidance takes the form of a 'G' flag and the appropriate Denton text is displayed everywhere the programme is referenced. The Guidance flag and Denton Text is displayed on the Programme Information pages. |

Client Install/Uninstall

Install

In an example, the interactive player system client can be installed on the following PC platform:

A PC running Windows™ XP™ (Service Pack 2)

IE™ 6.0 and above

Windows™ Media Player™ 10 and above, within DRM version 10

Flexibility: interactive player system supports different access rights on individual pieces of content, depending on a set of commercial rules.

In one example, the system only enables users in a certain location, for example the United Kingdom, to download content. Further features relating to this example, are provided in the following table.

TABLE 16

| | |
|---|---|
| INT 10 Unrestricted View | International users viewing UK pages have the same view as UK users i.e. international users will be able to see 'Calls to Action' and any other data that a UK viewer can see. Location checks will not be carried out when a user views the page. |
| INT 15 Location Checking | Geographical location checking will be applied when the user selects an interactive player system link, eg. a Call to Action button. It will not take place when the page is rendered, that is, location checking will be performed downstream of any Call to Action. |
| INT 20 Dead End | On selecting a 'Call to Action' or other interactive player system link or icon, a user journey will not proceed as normal as the result of failing a geographic location check. |

TABLE 16-continued

| | |
|---|---|
| User Journeys | For example, an international user who selects 'Download' will not be able to download content. |
| INT 30 Re-direct User | Users who cannot access content due to failing a check have an appropriate error message displayed.<br>In normal circumstances, the user should be re-directed to the Programme Information page for the selected content as, for example, it may be available to them for streaming but not for downloading. |
| INT 50 International Pages | interactive player system links to content, for example 'Calls to Action' may be applied to any appropriate web pages. |

Media Packaging

"Media packaging" refers to the set of files that are managed as a group for the peer-to-peer system and other publishing content. The common components of a media package would be a video file for the programme, a trailer a promotional channel identification theme to be played at the start or finish of the content, subtitles, related images, and so on.

'Package group', e.g. groups of related clips in the Media Wrapper, functionality is provided in certain examples.

"Idents" (brand-specific short video clips) and "trails" (short promotional clips for programmes) functionality is provided in certain examples.

Subtitles for live streaming (i.e. multicast) functionality is provided in certain examples.

A Media Package is the set of files which are assembled to be delivered as a single editorial whole. In the QAT version, a download Media Package comprises:

One Windows Media file
One subtitle file EBU_STL or SAMI (which will be combined with the media file)
One metadata file
Several thumbnails Further features relating to media packaging are provided in the following table.

Personalisation

Personalisation of media promotions and editorial is provided.

Publishing

The system enables content to be published for download and streaming together, separately or individually.

All the elements of a media package are managed and published as a single group of items for the purposes of publishing.

Revoking

Media can be revoked so that it is no longer available to download and/or stream. Furthermore, it is possible to remove all elements of the media package associated with this media.

Internal Syndication Toolkit

The system provides an Internal Syndication Toolkit (IST) which is a centralised solution to allow internal systems around the broadcaster to incorporate Calls to Action (CTAs) into their services so that they can promote the interactive player system content easily, effectively and efficiently.

The IST includes a set of publishing processes alongside guidelines and business logic for implementing CTAs across sites and services in the following key areas: item pages, search results, schedule and around user interfaces such as web pages.

TABLE 17

| | |
|---|---|
| MPA 10 Media Package Creation | There is a basic set of media and metadata which are associated with a 'main feature' media file. These include:<br>subtitles<br>images/thumbnails<br>metadata<br>The 'main feature' and associated elements are referred to as a Media Package. The Media Package is created so that it can be sent to P&D and other suppliers. |
| CPA 10 Content Package Creation | The Media Package is a core grouping of media files and metadata. To create the online consoles, more metadata and files may be required: this additional aggregation is called a Content Package. The content package is created using P&D components. |
| CPA 20 Content Package Indexing | The additional information in a Content Package does not need to be indexed for searching. |

Parental Control Pin

As far as media packages are concerned, in one example, only the Guidance flag and Guidance Text are specified to be available.

Profiles

The system enables the managing of profiles to provide personalised editorial based on user characteristics such as demographic and research user profiles.

The IST provides the means to
Find relevant interactive player system content within the system
Define automated Programme Feeds to drive CTAs and dynamic lists for interactive player system Home
Automate the promotion of interactive player system content in user interface screens such as web pages
Interfaces Further features relating to the IST are provided in the following table.

TABLE 18

| | |
|---|---|
| SYN 130 User Management | The IST provides an authenticated login to help users setup up and manage dynamic Programme Feeds |
| SYN 40 Finding Content Within interactive player system | Users require a view of what content packages are available within the system to work with when setting up and maintaining Calls to Action |
| SYN 170 Programme Expiry | The IST provides users with a way to configure how a Call to Action should display once the programme has expired |
| SYN 100 Preview Calls to Action | The IST provides users with a means to preview the behaviour of Calls to Action he/she has configured so that he/she can integrate them easily across user interfaces such as web pages |
| SYN 180 Embargo Call to Action | The IST provides users with means to embargo a programme by overriding and restricting access to a specific Call to Action in a short timeframe |
| SYN 70 International Viewing Rights | The IST relays information about a media asset around international viewing rights so that a decision can be taken as to whether or not to integrate them into web pages or the like |
| SYN 80 DRM Rights | The IST relays information about the DRM status of a content package so that a decision as to whether to promote it can be taken |
| SYN 110 Integration with Internal Systems | The IST enables internal CMSs to integrate CTAs into their publishing process in conjunction with accepted design guidelines |

Programme Feeds

TABLE 19

| | |
|---|---|
| SYN 140 Programme Feeds | The IST provides means for users and internal systems alike to construct dynamic Programme Feeds that can be used to drive Calls to Action providing dynamic lists to incorporate into interactive player system Home and syndicate to other systems as needed. This provides a way for the selection of programmes from the schedule without explicitly referring to a persistent ID.<br>Some examples of the type of rules that might be considered are:<br>be able to link to the most recent episode of a series<br>be able to link a specific episode within a series<br>generate a dynamic programme list based on search terms<br>generate a dynamic list of this week's episodes for a programme<br>generate a dynamic list of last night's programmes<br>create dynamic lists of most popular programmes<br>create a dynamic list of most recently available programmes<br>create a dynamic list of all programmes just about to expire<br>create a dynamic list of all programmes available in a series during stacking<br>The ability to integrate with other systems e.g. CMS will be provided. |

Calls to Action

Further information about Calls to Action is described herein.

Calls to Action are Standards and Guidelines, represented by icons, buttons and the language around these buttons, which reflect actions within interactive player system. In addition, associated contextual information and treatments/recommendations for integration of the Calls to Action e.g. puff boxes/promos exist. (Note that the button names below are provided purely by way of example). Examples of Calls to Action are provided below:

Watch or Listen Live—request a simulcast (multicast or unicast) stream of a programme which is currently being broadcast Watch or Listen Now (Again)—request a streamed programme/clip/item which is no longer being broadcast and is now available on-demand Download Now—a request to download a DRM'd programme/clip/item, which has already been broadcast or published, for playback at a later time Podcast/Vodcast—request to download a non-DRM'd item such as a podcast or vodcast, for playback at a later time. Note that interactive player system Manager will not manage the download of these items.

Book Now—(represented by the Download button) a request to book a DRM'd programme/clip, which has not yet been broadcast or published, for download after broadcast.

Note that (as a result of rights restrictions) it is only possible for the buttons to appear in certain logical combinations, e.g. Watch Live & Download Now could not appear together.

TABLE 20

| | |
|---|---|
| SYN 210 Scope of Involvement for CPB | The IST incorporates CTAs in the following areas:<br>Schedule, Item Pages, Search Results<br>In addition it provides Programme Feeds for interactive player system Home |
| SYN 220 CTA Lifecycle | CTAs reflect the lifecycle of media availability for a programme as it moves through the interactive player system from arriving on the schedule, to being broadcast, to expiring. |

TABLE 20-continued

| | |
|---|---|
| SYN 230 Icon Sizes | It handles this for the two main types of CTAs:<br>Panel Lists - Unfocussed (groups of programmes/clips)<br>Patches - Focussed (single programmes)<br>The CTAs are available in three different sizes in order to ease the migration A/V links around web pages into interactive player system service. |
| SYN 240 Editorial Labelling | The IST gives editorial users and internal systems a means to associate editorial text labels with CTAs icons when they appear in link sets to avoid repetitive labelling. |
| SYN 250 Asset Linking | The IST provides a means for users and internal systems to link to a common location where he/she can reference anti-aliased icon graphics that match the required aspect ratio and background colours for sites. |
| SYN 260 Viewing Options | CTAs display the appropriate options for programmes that are either only available for download or streaming rather than both. |
| SYN 190 Centralised CTA Business Logic | The IST owns the business logic around how CTAs are integrated to promote the interactive player system service. This ensures that CTAs look and behave the same way across entry points to the service |
| SYN 200 Switching Logic | The IST uses the content metadata about a programme to par-bake time dependent switching logic that can be used to display the lifecycle of a CTA in a load efficient manner that takes into consideration the high traffic areas that they will reside on. |
| SYN 20 Exposing Properties for Calls to Action | The IST exposes the properties of a content package such as: expiry date, guidance information, schedule info and availability for streaming and/or download for Calls to Action to automatically configure themselves according to pre-defined configurations. |
| SYN 30 Call to Action Automation | Once configured, the Calls to Action are updated autonomously, reducing the need for manual intervention or maintenance |
| SYN 90 Reporting | The IST automatically handles any reporting info on usage of calls to action |
| SYN 120 Accessibility | All CTAs are forward compatible with the interactive player system Accessibility Toolkit |
| SYN 150 Handling Fallbacks | The IST allows the user to specify what fallback behaviour a Call to Action should exhibit when a programme is unavailable i.e. a regular series gets a break in transmission or broadcast gets cancelled/delayed |

External Syndication Toolkit

Such functionality is provided in certain examples.

Content Metadata

Content Structure (Brands, Series, Episodes, Versions)

The basic structure of content is to support the following key features:

Brands will be supported

Brand is short for Programme Brand: typical examples include: Dr Who, Casualty, Midweek, Woman's Hour, Waking the Dead, Balamory, Country File, PM etc.

Series groups will be supported

Series refers to ordered, finite, audience-facing* series within (usually) Brands, such as the 5th series of Waking the Dead, or the 3rd of Little Britain.

Sub-series occur much more rarely: they are used for cases where each "story" within a series comes in more than one part. For example: Brand: Waking the Dead; Series: 5th series; Sub-series (story): Towers of Silence (which has two episodes, Parts 1 and 2).

Seasons will be supported

Season, a looser editorial package than Brand. A Season would often be made up of selected episodes from various existing Brands, as well as a few "one-offs".

Episodes within a series (and the episode order) should be able to be determined It is possible for media to not be within a series. Both unbranded single Episodes and unbranded Series (containing Episodes) are possible.

Media is collated by an "Asset Concept" which refers to and groups all the versions of a particular episode or individual media.

Media Packaging

Media Package Components

Components of an example of the media package are as follows:

Media asset (e.g. .wmv file)

Subtitle file

Licence file (probably downloaded at playback time)

Still images (thumbnails and larger pictures) related to the programme brand and/or episode "interactive objects" (e.g. Flash movies, games)

"Metadata" (content descriptions, categories, parental guidance notes)

Components of another example of a media package are as follows:

Media asset (e.g. .wmv file)

Subtitle file (embedded into .wmv file)

Metadata (supplied as part of the Peer-to-Peer core functionality)

Thumbnail images (supplied as part of the Peer-to-Peer metadata)

Thumbnails and metadata will be downloaded as part of the Peer-to-Peer DMS content item for display in the user interface.

Media Package Structure

The media is released as a single file. The subtitle file, where available, will be embedded into the .WMV file downloaded by the interactive player system.

Details Relating to CRID (Content Reference Identifier)

The TV-Anytime standard (for example see ETSI TS 102 822) specifies that a CRID is URI compliant (see RFC 2396). The format of a CRID is CRID://<authority>/<data> where:

<authority> is <dns name><name_extension>

<dns name> is a registered internet domain name

<name_extension> is an optional string (beginning with a ';' character) to enable multiple authorities to use the same dns name <data> is uri escaped—reserved chars are encoded as % hex triplets Preferably, the <data> format is required to be alphanumeric—i.e. only contains chars: a . . . z, A . . . Z, 0 . . . 9.

Further Aspects Relating to Downloaded Content

Screen Size

The "display options" of a PC/Laptop are considered to ensure optimal configuration of the system. Although it is possible to auto-detect this from the screen resolution assuming the displays are square pixel, an end-user is enabled to set the laptop resolution to 1024×768 when he/she has a widescreen display. The interactive player system allows the user to override aspect ratios in a configuration dialog.

Rights & DRM

The supported DRM framework is Windows Media 10 rules with the following key attributes required to be set (detailed field level values are available in the DRM Specification document).

Additionally it is necessary to ensure that rights windows are relevant to both streaming and download.

Rights Framework Details

The following points should be considered:
Where the rights are available for a programme, they apply to both streaming and downloading of content.
The 'Framework' refers to the following set of windows:
  Availability Window—window in which the content is available to be downloaded/streamed (currently 7 days)
  'Shelf Life' Window—window in which the content is available to consume/stored on a user's PC before the 'seal' is broken (currently 13 weeks)
  'Play Period' Window—window in which the content is available to play an unlimited number of times, after the 'seal' has been broken (currently 7 days)
  13 weeks is considered to be 91 days (to the minute). 7 days is considered to be 7×24 hours (168 hours) to the minute. The 'start' time is one minute after the end of the transmission/publication event i.e. transmission+Duration+1 Minute.
Publication Event—the broadcast date (for on-schedule) or publish date (for off-schedule) content is being referred to as a "Publication" or "Publication event". This covers all methods by which media might be released and is always a fixed date.

TABLE 21

| Restriction Type | Description | interactive player system default |
| --- | --- | --- |
| BeginDate | This right specifies a date after which the license is valid. Before this date, the Windows Media file cannot be played. By default, this right is not set and a license is valid immediately | Not set. It is assumed that programmes will not be published pre-transmission. Publishing content before it's 'BeginDate' creates a problem because multiple DRM licenses can be issued. |
| ExpirationDate | This right specifies a date after which the license is no longer valid and the Windows Media file can no longer be played. For example, you can set a license to expire on Dec. 31, 2005. By default, this right is not set and the license never expires. | 200 days from transmission. This figure is a backstop and other restrictions will apply before this one. |
| ExpirationAfterFirstUse | This right specifies the length of time (in hours) a license is valid after the first time the license is used. For example, you can set a license to expire 24 hours after a consumer begins to play the Windows Media file. By default, this right is not set and the license never expires. | Default 7 days (168 hours) |
| ExpirationOnStore | This right specifies the length of time (in hours) a license is valid after the first time the license is stored on the consumer's computer. For example, you can set a license to expire 72 hours after it is stored. By default, this right is not set and the license never expires. | 13 weeks (2184 hours) |

The specific DRM requirements follow:

TABLE 22

| | |
|---|---|
| DRM 10 Availability to Download | 7 days/168 hours/minutes/seconds from transmission + Duration + 1 Minute |
| DRM 20 User Storage Limit | 13 weeks/91 days/hours/minutes/seconds from transmission + Duration + 1 Minute |
| DRM 30 Playback Window | 7 days/168 hours/minutes/seconds from 'Start of Play' as defined by Windows Media Player. |
| DRM 10 DRM Content | All downloaded content is DRM'd. DRM'd content must fit the Rights Framework Window. Content which is not DRM'd will not be downloadable through interactive player system Manager. |
| DRM 20 Rights Framework - Local Playout | The Local Playout window* is: Content is available for the user to download for 7 days after transmission Content is available for the user to view for 7 days after the first play Content may be watched an unlimited number of times within the 7 days after first play * These rules apply to single programmes/episodes. Series Stacking expands upon these rules - see related requirement DRM 40 |
| DRM 30 Content Expiry | Downloaded content will expire (be disabled): 7 days/hours/minutes after first viewing, or 13 weeks/hours/minutes after transmission + Duration + 1 minute after download Content will be automatically deleted as soon as possible after expiry. |
| DRM 35 Content Expiry Exceptions | It is possible to vary the Rights Framework such that exceptional content expiry rules can be accommodated, e.g. News downloads may expire after 24 hours. |
| DRM 55 Omnibus Programmes | Omnibus editions of programmes e.g. the Sunday broadcast of Eastenders, will not be considered as downloadable items in their own right. |
| DRM 60 Narrative Repeats | The availability window for narrative repeats is the same as for the original programme, meaning that each repeat has its own new rights window (e.g. 7 days to download) |
| DRM 61 Non Narrative Repeats | The availability window for non-narrative repeats is the same as for the original programme, meaning that each repeat has it's own new rights window (e.g. 7 days to download) |
| DRM 70 Derived Content | Derived programmes will be DRM'd and stored as a separate asset from the original programme; i.e. both versions will be made available to the user as downloads. Programme item pages will link derived programmes and their originating programmes. For example, 'Start the Week' has an original version and is repeated with a shortened derived programme later in the week. Both assets would be DRM'd and stored separately. |
| DRM 80 Preview Episodes | Preview episodes, i.e. an episode forming part of a series which is released on its own in advance of that series, are considered to be separate programmes for the purposes of series stacking. |

Content Availability

Content availability is defined as the period during which a media asset or content item is available on the interactive player system service for download and/or streaming.

For streamed content, the window of availability and play are the same, however this is not the case for downloaded content.

Licence Issue

The period during which a user will (given other restrictions e.g. being in the UK) be given a license to play a piece of content. This is not relevant for streaming.

Downloaded Content Playout

Some interactive player system content will have restricted rights for usage. These rights may include how many times and over what period content can be played.

The set of rights for any piece of content is essentially a contractual matter; as such the rights could vary for each piece of content. It is expected that rights will generally be applied according to a 'rights frameworks'.

For the QAT version of interactive player system, it is assumed that content will be assigned to the standard rights framework. Case-by-case variations from a framework may be possible but will require a greater level of manual operation.

Accessibility Versions

Different versions of media will be available which include Accessibility Service embedded features (such as BSL). These are available as separate versions of the same editorial programme.

Metadata

Metadata Submission

All media is accompanied by the core interactive player system metadata and is submitted to the interactive player system Feed Input Generator in an appropriate format or inserted into the interactive player database system. Media will not be incorporated into the interactive player system unless it meets minimum metadata standards.

Metadata Definitions

The Metadata details are encapsulated in the following main specifications:

Interactive Player System Data Model

The data model defines in detail the information to be stored about media within interactive player system and the relationships between media that will be supported.

Interactive Player System Content Object Model

The Content Object Model maps the data in the data model to the User Experience and ensures that all key functionality is supported by the production systems. It also maps metadata to the download model supported by peer-to-peer type systems.

Interactive Player System Genres

The genres specification is a single set of genres for use across interactive player system (including Item pages, the on demand schedule. News, Radio, etc). This set of genres/categories and programme types has been compared and mapped across the other relevant standards and specifications used within the broadcaster and externally (including TVAnytime, the Archive, iTunes, etc.)

Interactive Player System TVAnytime Interface/Mapping Specification

This aspect provides the profile of TVAnytime that the interactive player systems will use to deliver metadata information from the schedule to the broadcaster production systems.

Requirements Catalogue

TABLE 23

| | |
|---|---|
| Network Infrastructure | In one example the system re-uses at least part of existing network infrastructure. |
| Secure Network Connection | A secure network connection (i.e. not vulnerable to hacking or external interception) must be provided between suppliers and the system. |
| Reith Hosts | The system must support connectivity from Reith based hosts. |
| Data Transfer | The network connection between suppliers and the system is able to transfer data at a minimum of 100 Mbps. |
| Reliable Network Connectivity | The system provides reliable network connectivity between DRM, SSO and Global ID services as defined by the SLA. |
| Low Latency Connectivity | The system provides network connectivity resulting in low latency between DRM, SSO and Global ID services as defined by the SLA. |
| Connection Blocking | The system allows for blocking of connections to interactive player system based on ISP peering policy so content is not delivered to specific non-peering partners. |
| Grid Servers & Firewalls | Grid servers are directly connected to the Internet without firewalls. |
| Concurrent Access | The system allows multiple content providers to access its external interfaces concurrently (e.g. upload services exposed to the Reith Network through an external interface can be accessed by more than one content provider). |
| Restricted Access | The system restricts access to its external interfaces to the broadcasters Radio & Music and the supplier only. Access is restricted through the infrastructure setup between content providers and external interfaces (e.g. firewall accepts only certain IP addresses). |
| Unique Global ID | The system allows a content provider to use a globally unique ID in order to manage (e.g. modify or delete) an entity (e.g. asset or metadata) in the system. |
| Reference Entities via ID | All entities in the system are externally referenced by their globally unique ID. |
| Status Information via ID | The system allows a content provider to retrieve status information about a media asset or content item in the system by specifying its globally unique ID. |
| Immutable Global ID | The globally unique ID for an entity in the system is immutable. |
| Upload Metadata | The system allows a content provider to upload arbitrary 'pass through' metadata to the system for distribution to the client application. The metadata contains information about an asset. |
| Modify Metadata | The system allows a content provider to replace the metadata associated with a particular asset with updated metadata (e.g. in the event metadata associated with an asset is incorrect or needs to be updated). |
| Delete metadata | The system is able to delete the metadata associated with a particular asset from the system. |
| Upload an Asset | The system allows a content provider to upload an asset to the system so it can be processed (e.g. DRM protected or not) before it is made available for distribution to an end user for viewing or downloading. |
| Asset Integrity Reporting | It is possible to query against the integrity of an asset during processing (e.g. 30 minute program reduces to 40 seconds after being DRM protected). |
| Revocation Reporting | The system informs the content provider in the event a request is received to revoke a license or delete an asset while the asset is still being processed. |
| Monitoring and Reporting Interfaces | Monitoring and reporting interfaces are visible on the Reith network by the system. |
| Microsoft Windows Media Player 9 - Non-DRM | Any non-DRM asset must play on Microsoft Windows Media Player 9. |
| Microsoft Windows Media Player 10 - Non-DRM | Any non-DRM asset must play on Microsoft Windows Media Player 10. |
| Microsoft Windows Media Player 10 - DRM | Any DRM protected asset must play on Microsoft Windows Media Player 10. |
| System Architecture - Scalability | The system architecture and build is scalable and robust in order to accommodate the development of future requirements. |
| Scalable Connection | The system provides a scalable connection between DRM, SSO and Media Selector services. |
| Scalability - Volumes | The system architecture is scalable to handle a predicted increase in traffic and data volumes. |
| Delivery Service Efficiency | It is possible to adjust the delivery service efficiency requirements. |
| Caching | The system architecture effectively manages caching between local storage and SAN/NAS access. |

TABLE 23-continued

| | |
|---|---|
| Queuing | The system has the capability to process data without unnecessary queuing. In terms of implementation, asset processing component architecture is non-blocking. |
| Environments | Three environments are provided: "Integration 1" for "dirty" development; "Integration 2" environment for system integration testing and UAT; and a Production Environment. |
| Programmatic Interfaces | All interfaces made available to a content provider are programmatic. |
| Series Stacking Subscription | The system supports series stacking for subscription based content with longer rights windows. |
| Removal of Content | The system has the capability to remove content from all internal systems when requested by a content provider. |
| Event Logs | The system has the capability to store event logs and statistical information in files in existing log filtering system. |
| Global ID Service | The system is capable of updating the Broadcaster Global ID service with the ID used by the peer-to-peer distribution system. |
| Modify an asset | The system allows a content provider to replace an existing asset with an updated or correct version of the asset. |
| Delete an asset | The system allows a content provider to delete an asset from the system which is no longer to be made available for distribution to end users (e.g. due to editorial reasons or content owner rights). |
| Prioritise asset deletion request | A request received by the system to revoke a licence or delete an asset is given higher priority over all other requests. |
| Upload a package | The system provides an interface to allow a content provider to upload a package to the distribution platform. |
| Deletion of Files | The system automatically deletes input files (e.g. files uploaded by a content provider) from an upload location once they have been successfully processed for end user distribution. |
| Asset Prioritisation | The system ensures that each asset uploaded by a content provider is equally prioritised. |
| Asset Time Measure | The system measures the time taken from the point an uploaded media asset is committed to the system by a content provider to the point of availability for distribution to end users. |
| Time Taken | It is possible to query the system to retrieve the time taken from the point an uploaded media asset is committed to the system by a content provider to the point of availability for distribution to end users. |
| System Storage | The system provides 5TB of storage for active assets held in the content distribution service. The storage is expandable to 50 TBs. |
| Hours of Content | The system is able to process at least 660 hours of TV content encoded at 800 Kbps and 500 hours of Radio content encoded at 150 Kbps. |
| Uploaded Assets per Hour | The system is able to process at least 8 GB of uploaded assets per hour. |
| Transactional Services | All upload services are transactional. Transactional in this context means that the system will return a transaction id synchronously when requests are received for asynchronous tasks. This transaction id can be used to poll for the transaction status for long-running transactions. |
| Microsoft Windows Media DRM 10 | The system uses Microsoft Windows Media Digital Rights Management 10 for digital rights management of compatible assets. |
| Single Set of Rights | The system allows a content provider to associate a single set of rights to an asset that requires DRM protection by the system. The system enforces the rights which are associated with the asset. |
| Asset Modification | With the exception of licence revocation and item deletion requests, any requests to replace/modify any item within the system must be rejected once the item has been committed to distribution. |
| Rights Modification | The system allows a content provider to modify the rights associated with a DRM protected asset. |
| Authenticate Licence Request | The system authenticates a request for a licence made by an end user to download or view a DRM protected asset against the Broadcaster New Media SSO (Single Sign On) authentication service. |
| Authentication Failure | The system does not issue a licence to an end user who wishes to download or view a DRM protected asset if there is a failure in authenticating the end user against the Broadcaster New Media SSO (Single Sign On) authentication service. |
| Location & Licence Issue | The system only issues licences to end users who are located in a specific geographic location, such as the UK, by checking the IP address of the end users. |
| Generate a Licence | The system generates a licence for a DRM protected asset based on the rights associated with the asset. |
| Licence Pre-delivery | The system has the capability to deliver a licence for a DRM protected asset before the download of the DRM protected asset is complete i.e. licence pre-delivery. |
| Just-in-time Licence Delivery | The system is able to deliver a licence for a DRM protected asset when an online end user plays an asset (e.g. just-in-time licence delivery). |
| Licences & Removed Assets | The system does not issue a new licence for any assets which have been removed from the system. |
| Fallback to Just-in-time | The system fallsback to just-in-time licence delivery in the event licence pre-delivery fails. |
| Licence Delivery Time | The system delivers a licence to an end user within 10 seconds of a licence request. |
| Statistical Data Capture - Client | The system has the capability to capture statistical data from the peer-to-peer delivery client. Statistical information captured from the peer-to-peer delivery client islogged into human readable file files (i.e. text files). |

TABLE 23-continued

| | |
|---|---|
| Satistical Data Capture - Server | The system has the capability to capture statistical data from peer-to-peer delivery servers. Statistical information captured from the peer-to-peer delivery servers is logged into human readable file files (i.e. text files). |
| Statistical Data Capture - Licences | The system has the capability to capture statistical data from DRM licence delivery servers. Statistical information captured from the DRM licence delivery servers is logged into human readable file files (i.e. text files). |
| Statistical Data Capture - DRM | The system has the capability to capture statistical data from DRM packaging servers. Statistical information captured from the DRM packaging servers is logged into human readable file files (i.e. text files). |
| Satistical Data Capture - Application | The system has the capability to capture statistical data from upload application servers (i.e. FTP file store). Statistical information captured from the upload application servers is logged into human readable file files (i.e. text files). |
| Reporting - Download Time | The system has the capability to report the average download time for an end user. |
| Reporting - Asset Status | The system has the capability to report the status of an asset to a content provider when requested. |
| Reporting - System Failures | Failures in the system are addressed according to the agreed processes outlined in the Managed Service Operations Manual. |
| Revoke Licences | The system allows a content provider to make a request to revoke all licences for a particular DRM protected asset from end users who are online. |
| Non-reversible Revocation | Licence revocation is a non-reversible action. |
| Distribution Mechanism - DRM Assets | The system is able to distribute a DRM protected asset to an end user using peer-to-peer delivery technology. |
| Distribution Mechanism - Non-DRM Assets | The system is able to distribute a non-DRM protected asset to an end user using peer-to-peer delivery technology. |
| Download Asset for Internal Use | The system allows users within the Reith network to download a DRM protected asset when it has been made available via client download for internal use (e.g. last minute sanity checks, editorial purposes etc). |
| Independent Download | The system allows an end user to download a DRM protected asset independently from the viewing restrictions specified in the associated rights. |
| Network Capacity | The network capacity available to the interactive player system service from the Broadcasters Internet connectivity must be constrained to protect the bandwidth required by BAU services and the 100% TFC mandated headroom for these services. |
| Graceful Degradation | It is possible for BAU services to make use of the network capacity allocated to the interactive player system service to protect the user experience from the web site in the event of a surge in traffic. |
| Asset Distribution | The system is able to distribute an asset which has been uploaded by a content provider to an end user for viewing or downloading. |
| Non-Media Asset Distribution | The system is able to distribute a non-media asset which has been uploaded to be made available to a client facing application. |
| Single and Series Assets | The system ahs the capability to differentiate between MOIDs for a single asset and MOIDs for a assets which belong to a series. |
| DRM Errors | The system returns error information in the event of any errors during licence acquisition. |
| Audit Trail - Asset Transactions | The system keeps an audit trail for actions related to an asset within the system that are initiated by an external party. |
| Audit Trail - Metadata Transactions | The system keeps an audit trail for actions related to metadata within the system that are initiated by an external party. |
| Asset Status | The system has the capability to track the status of an asset within the distribution workflow and within the boundaries of the infrastructure and interfaces which are provided to the content provider. |
| Volumetrics Measurement | Volumetics exposed by the system are measured in real time. |
| Download Time Measurement | The system measures the average download time for an end user. |
| Efficiency Measurement | The system measures the efficiency of the peer-to-peer delivery service. |
| URL Monitoring | The system has the capability to expose URLs driven monitoring tools which will allow the Broadcaster to monitor all interactive player system activity. |
| SSO Error Reporting | The system reports an error if there is a failure with SSO. |
| SSO & ID Error Reporting | The system reports an error if there is a failure with SSO or Global ID services. |
| Statistical Data Repository | A repository stores all statistical data captured from internal data sources. Statistical data is captured in the form of files. |
| Statistical Data Mapping | The system maps all statistical data for an entity against its globally unique ID. |
| Playcount Statistics | The system has the capability to store the number of times a DRM protected asset has been played by an end user (i.e. playcount). |
| Statistical Data Storage - Online | The system stores raw statistical data 'online' for a period as per the SLA. Raw statistical data are stored as event logs in the form of human readable flat files (i.e. text files). |
| Statistical Data Storage - Offline | The system stores raw statistical data 'offline' for a period as per the SLA. Raw statistical data are stored as event logs in the form of human readable flat files (i.e. text files). |

TABLE 23-continued

| | |
|---|---|
| Exception Reporting | The system ahs the capability to report all exceptions to a content provider. |

Media Requirements Catalogue
Media Acquisition

TABLE 24

| | |
|---|---|
| Automated Ingest | The ingest of programme media to the ODPS is automated wherever possible, so that programmes marked as available for On-Demand in the On Demand Schedule are automatically captured from playout systems. Measures are in place for appropriate quality assurance. |
| Off-Air | The system is able to ingest programmes and subtitles directly off-air as well as from pre-delivered files. |
| Automatic Matching | Ingested programmes, subtitles and thumbnails are matched automatically to the relevant metadata and the rights information defined in the on-demand schedule. |
| Automated Push Delivery | The push delivery of metadata, subtitles, media and thumbnails to downstream On-Demand distribution systems is fully automated |
| Segmented Broadcast Stream | The ODPS is able to segment the broadcast stream into individual programme content and synchronise this to match individual programme media to schedule and EPG data. Media recorded off air is flagged as such to enable more focussed quality control. |
| Programme Capture | Programmes are captured with accurate start and end times; coping with possible slippage and also avoiding interstitials and continuity announcements where possible. |
| Channels - London | Media from channels played out by the supplier from London is encoded using an SDI feed directly from the playout desk. Where a "clean feed" is available the media is encoded from that. |
| Channels - Regional | Media from channels broadcast from regional centres is encoded off air or from a suitable feed. |
| Multiple Transcoded Programmes | It is possible to encode and manage more than one transcoded version of a programme within the service. For example, this will support the provision of a version for broadband and for VOD. |
| Single Ingest Process | Media delivered close to transmission can bypass the ODPS and be delivered directly to broadcast playout systems but it must be possible to reintegrate this media with the central repository. Wherever possible, a single ingest process is used. |
| Availability of Programmes | Every programme listed in the published metadata as being available within the On-Demand schedule and recorded from linear playout or off-air is made available to the On-Demand service after transmission within the time specified in the SLA. |
| Thumbnail Images | Thumbnail images are generated and/or stored for all media. It is possible to submit default thumbnails for media and specify which images are used if they are extracted form video media. Thumbnails are of an appropriately high quality so they can be scaled to a variety of output formats. |
| Late Changes/Updates | The Service Provider supports the ability to override automated processes for late changes/updates. |
| Promotional Material | Promotional material (or versions thereof) and generic idents is ingested into the ODPS for television and radio. |
| Archive Workflow | Media is stored within the system at the full ingested quality (without transcode from original media) for at least the time specified in the SLA and this version of the media must be possible to transfer to the Archive through an agreed workflow. |
| Status Tracking | The ODPS provides tracking and reporting on the status of media and metadata within the ODPS workflow and within the boundaries of the Service Provider infrastructure and the interfaces that they provide to the broadcaster and third parties. |
| Capture | Capture from pre-delivered media provides a clean feed and capture to frame accuracy. When recording off air programme boundaries are accurately captured but not to Frame accuracy. Nations and regions content will be captured off air. |
| HD | The ODPS supports the ability to ingest HD versions of media. |
| Tape Media | The ODPS ingests media from tape formats as within the existing TV playout frameworks. In simple terms, it is not necessary for the Broadcaster to make specific versions of tape media in addition to the broadcast version for ingest into the ODPS. |
| Sequencing | For On-Demand platforms it is possible to generate a sequence file (such as a Windows Media asx file) which will indicate how to playout items of media in sequence. |
| Sequencing - Other Platforms | Sequencing of media is only used for broadband delivery in one example but consideration is given to VOD and other platforms for playout of idents, promotions and other sequences of media. |
| Uploading Interface | An interface for uploading scheduling and programme metadata as well as media planning is provided. |

TABLE 24-continued

| | |
|---|---|
| Media Retention | The ODPS retains all versions of media for at least a month after broadcast which will be the default retention policy. |
| Media Mark Up | It is also possible to mark up material as being retained to remove the need to re-ingest material where it is known to be repeated soon or regularly. |
| Delivery Monitoring | Monitoring of delivery at the point of consumption to notify the Broadcaster of service problems and quality control issues. |

Media Management

TABLE 25

| | |
|---|---|
| Streamed Media | Streamed media 56, 250 kbps, and possibly 350 kbps; low Quality and high quality streams |
| Programmes and Clips | TV Programmes and clips; 800 kbps; downloadable files |
| Trailers and Promos | TV trailers and promos; 800 kbps; served as on demand clips |
| Radio and Audio | Radio and Audio; 128 kbps; downloadable files and streams |
| Streaming Quality | Streaming qualities are per the relevant Broadcaster standards. |
| Encoding and Transcoding | Encoding quality and methods are able to be adjustable to provide optimum quality for the defined encoding rates and encoding rates can be changed over time to keep up with general market trends. The total number of transcodes and specific versions of media to be made and managed are to be defined for the ODPS as (in one example): 1. Transcode to downloadable format for all TV media 2. Transcode to Streamed media in both low and high quality windows and Real format for some limited video media 3. Future options to transcode to other formats including VOD |
| Media Store | The system will maintain a media store of encoded TV programme media content available via Broadcaster On-Demand distribution platforms potentially at a variety of quality levels. This is an internal repository that the system manages. |
| Storage Volumes | The media store is scalable to adequately store large volumes of media. This would currently be estimated at between 300 and 600 hours per week of network television, and approximately 100 hours per week of Nations and Regions TV Media may be delivered considerably before broadcast/release so this needs to be accounted for. |
| Separation of Media | Secure separation of Broadcaster media from non Broadcaster media to ensure no inappropriate access to Broadcaster media and data and no risk of playout of non Broadcaster media through Broadcaster distribution channels. |
| Programme Versions | Manage versions of programmes, linking these to GPIs and programme information. This includes editorial, platform and technical (format) versions of programmes. |
| Rights Management | Rights management information linked to content and enforcement of availability based on rights windows. |
| Removal of Programmes | Removal of programmes from the store when they are no longer available to be viewed on any of the on-demand distribution platforms, as derived from rights information and the Service SLA bearing in mind any options for long term storage. |
| Media Delivery | Media in the media store is delivered to On-Demand distribution platforms in a timely manner according to the requirements described in respective operational specifications. |
| Asset Interface | There is an interface through which the Broadcaster can interrogate the status of assets within the ODPS workflow. This interface allows for requests to view assets based on an agreed workflow. |
| Stored Media Extraction | The interface enables media stored in the store to be extracted by the Broadcaster through an agreed process as well as made available to be archived before it is deleted out of the store. |
| Manual Override | It is possible to override any automated processes so that media can be replaced or updated manually if required. The Broadcaster and the Service Provider will maintain an agreed list of authorised requesters who can make such changes and agree a work flow for this business process. |
| Radio Media | The Service Provider is required to collate the Radio schedule and of this approximately 300 Radio Programmes a week are available via on demand platforms. The Service Provider does not store Radio media in the media store. |
| Nations & Regions | For Nations and Regions the media required includes all Early evening main news programmes and politics show opt outs. |
| Programme Segments | Provides the ability to identify segments of programmes and publish these independently as new media items. |
| Flexible Model | A flexible model for retaining media within the repository for extended periods is provided. |
| Non-A/V Media Storage | Storage of non Audio Visual media such as Flash or other interactive media types is provided. |
| Internationalisation | Managing versions of media for Internationalisation. |
| Version Identification | Ability to identify all the versions of the same programme or media. |
| Metadata Repository | A metadata repository for On-Demand media is managed and updated |

TABLE 25-continued

| | |
|---|---|
| | by the Service Provider to provide a core and consistent data set describing all on and off schedule media. |
| Unique Identifier | Unique Identifier is allocated to all media assets for all on and off schedule media. The identifier is assigned through an agreed workflow. |
| Unique ID and Previous Metadata | The unique ID is also used to identify where media metadata has been provided previously. |
| Media Availability Tagging | The Schedule and On-Demand Schedule provided by the Broadcaster is used to tag media content as available for specific on-demand platforms. This is updated automatically, and/or manually and deals with changes and updates to the schedule. |
| Combined Schedule Information | The Service Provider combines schedule information with programme related metadata, distribution and publishing metadata and rights metadata as described herein. |
| Export Interface | An interface is provided to export metadata to the Broadcaster in a structured format such as an XML feed. |
| Automated Import/Export | It is possible to import and export metadata using automated processes. It will be the Service Providers responsibility to ensure the integrity of the format of import and export process. |
| Metatdata Updates | It is possible to update and remove metadata from the repository as well as the schedule and on-demand schedule (including updates from TV, Nations and Regions, Radio, etc). |
| Metadata & Asset Link | The metadata provides a suitable identifier and link to the media whether or not this media is stored by the Service Provider. |
| Identifiers | Identifiers are based on TV Anytime structures and are able to refer to groups of media, schedule events, etc. |
| Media Groups | The ability is provided to represent groups of media such as packages, and playlists (with a sequence) of media. |
| Metadata Quality | Strict quality control of metadata consistency with the ability to reference common vocabularies and taxonomies is provided by the Broadcaster. |
| Metadata Update Interface | A clear and specified form of interface to allow the Broadcaster to provide metadata updates to the Service Provider. This is not for the Broadcaster to directly perform updates but to provide an administration process whereby the Broadcaster can provide updates efficiently to the Service Provider. |
| Rights Metadata Publication | The Broadcasrer requires the Service Provider to use an agreed format (which uses or is compatible with XRML) for the publication of rights metadata. This supports a variable rights model. |
| Blanking Flag | A blanking flag is associated with all media to determine it from certain services. The Broadcaster provides this information and formulates any common rules that can be applied. |
| Metatdata and DOGs | Metadata is managed to represent the DOG branding within media. This indicates which DOG (if any) from a specified list has been used. |
| Rights Management Changes | On occasions the Broadcaster may identify that media is available via an On-demand platform for which there is a rights issue. If this situation arises it is critical that the media is removed as quickly as possible. ODPS rights management is scoped to deal with these situations. This includes a fast track for changes and triage for notification to partners. |
| Delivery Formats | Delivery formats and platform specific information is included within the ODPS, such as whether there are downloadable and streaming versions of media. |
| Administrative Interface | A reporting and viewing interface must allow for administrative access to report on metadata within the system. |
| 'Don't Miss' Recommendations | 'Don't Miss' recommendations are marked against media. This represents marketing recommendations not to miss which will be provided by the Broadcaster to be marked against media and exported via the appropriate data feed. |
| Subtitle/Transcript Links | Where available a link is stored which links to the subtitle file or transcript file associated with a programme. This information is exported with the relevant data feed. |
| Series Links | Series Links for programmes within a series and series links across one series to another. This is supported from a more generic ability to generally be able to group media items using TV anytime groups, for example. |
| Re-Broadcast Material | The ability is provided to identify media which is a re-broadcast of an existing version of material and avoid making further versions of identical material. |
| On-Demand Statistics | The Broadcaster provides the Service Provider with on-demand media statistics which will enable media to be ranked. The top 100 on-demand media items are provided by the Broadcaster at regular intervals which must be loaded into relevant systems. |
| 'Most Popular' Media | Most Popular media is integrated with content metadata and stored by the Service Provider and can be exported. |
| Metadata and Segmentation | The metadata vocabulary supports the segmentation of media to identify media within a programme. |
| Genre Mapping | IOt is ensured that consistent mapping of genres across existing Broadcaster standards to develop a unified approach to genre description. |
| Series Stacking Subscriptions | Series stacking for longer rights windows based on subscriptions. |
| Pre-seeding | Pre-seeding of distribution networks. |

TABLE 25-continued

| | |
|---|---|
| Metadata and Graphics | Metadata to describe the type of onscreen graphics used within a programme. This extends beyond the DOG but to provide some generic information regarding whether some graphics would be unsuitable (i.e. unclear) on small screen platforms. |
| Flexible Metadata Structures | Flexibility of metadata structures to represent all or part of a programme and place this in the schedule. |
| Automated Business Rules | The Service Provider supports automated business rules to ease the manual overhead of rights management. For example, exclude programmes from the EPG which do not have the appropriate rights clearance and generic DRM templates for specific programme groups and programmes. |

Media Publishing

TABLE 26

| | |
|---|---|
| Output Formats | The ability is provided to transcode media to a variety of output formats for different platforms as specified. These formats are specified as: Windows Media for Download Windows Media Streaming (one quality) |
| Programme Versions | Some limited transcoding of different versions of material (e.g. HD and SD versions of the same programme). |
| Secure Delivery | Secure file based delivery to distribution platforms with quality assurance regarding delivery of media. |
| Structured Metadata | Delivery of metadata to describe media via a specified structured format. |
| Rights Information Delivery | Delivery of rights information via an agreed format (which uses or is compatible with XRML) and linked to content. |
| Blanking Feed | Delivery of a blanking feed in a structured format (such as XML) to indicate if content should be blanked based on information provided by the Broadcaster. |
| Change/Update Process | Process for propagating updates and changes to metadata and rights within a specified time. |
| Multiple Locations | Capability to syndicate the same content to more than one location and manage/track this delivery process. |
| Unique Reference Mapping | Mapping of unique references to the required format for distribution platforms. |
| Media Package Distribution | Distribution of packages of media and metadata (i.e. media, subtitles, synopsis, top and tails). |

Accessibility Services

TABLE 27

| | |
|---|---|
| Subtitle Files | Subtitle files are provided by Access Services providers. |
| Early Delivery - Subtitles | For media delivered more than 48 hours from transmission where the subtitle file is available these will be delivered as subtitle files prior to transmission. |
| Live - Subtitles | For live content, the subtitle files can be recorded off-air or delivered as a file after transmission. |
| Late Delivery - Subtitles | For late delivery of the media (less than 48 hours before transmission), subtitles are delivered as a file when available. |
| Separate Subtitle Delivery | The subtitle file and the media content are distributed separately and recombined by the broadband player. |
| Subtitling Metadata | It is important for the metadata to reflect whether or not media is due to be subtitled and additionally whether or not the subtitling is available. |
| Audio Description (AD) | Audio description content is distributed as an alternative audio track for the same video. |
| British Sign Language (BSL) | Signed content is delivered and distributed as an entirely distinct version of the media and is included as within the total scheduled hours per week. |
| Flags | Within metadata, subtitles and audio description are provided to indicate whether the content contains these options and secondly whether they are available. |
| Flag - BSL | Signed content is indicted with a signed flag. |
| Media Versions | In one example of the player, signed media and Audio Description will be managed as separate media versions (as scheduled for the signed zone for example). |
| Audio Description Media | Audio description media may be made available as an alternative audio track for the same video and is treated as another asset. |
| Accessibility Media & Metadata | Any specific accessibility media and accessibility metadata to be utilised within user experience (such as alt tags for thumbnails) will be specified by the Broadcaster. |
| Radio Transcripts | Radio transcripts are not required for version 1 but allowance should be made for linking transcripts to schedule metadata. It is expected that Radio will manage the creation and delivery of these files. |

TABLE 27-continued

| | |
|---|---|
| Nations & Regions Files | For N&R the subtitle files can be delivered as a file transfer from the relevant location where they are produced and also need to be captured off air for live programming. |
| Subtitling Distribution Methods | Beyond version 1 of the player, for VOD and other platforms the ODPS should allow for possible different distribution methods for Subtitling. |

Guidance

TABLE 28

| | |
|---|---|
| Guidance Flagging | Media guidance will be indicated by flagging media as having guidance. |
| Guidance Warnings | The Service Provider must correctly tag all content with the appropriate warning as supplied by the Broadcaster. |
| Warning Text Management | The text of the warning is also stored and managed. |
| Guidance Iconography | Any iconography or graphics related to the indication of guidance is stored and managed. |

Presentation

TABLE 29

| | |
|---|---|
| Channel Brands & DOGs | The ODPS supports the ability to add channel branding and DOGs into the encoded video. This allows the Insertion of a generic DOG for Broadcaster On-Demand Branding. |
| DOG Metadata | Metadata indicates from a specified list which DOG programme content contains. |
| Versions and Graphics | The Service Provider considers the option to allow for different content versions and overlay graphics. |
| Packages, Topping & Tailing | A solution which allows for Media playlists is generated for packages of linear content and for topping and tailing of individual media elements is provided. This also relates previews and trailers with relevant media. |
| Trailers & Interstitials | On air continuity should be removed and for on-demand platforms be managed through the appropriate use of trailers and interstitials. |
| Live Blanking | Where necessary the blanking flag will be used to blank out broadcast content from live streams. Replacement content may also be specified in the form of a link to alternative content for a specified platform or context. Blanking data will be provided by the broadcaster in a structured format feed. |
| Personalisation | Some elements of metadata are required to drive user preferences. However at this time, it is not required for the Service Provider to provide personalisation features. |

Further details relating to programme stacking/series downloading are now provided.

Types of Stack

Definition of a Stack

A 'stack' is when a programme that is available on-demand is made available beyond its normal seven-day post-transmission window.

Typically, it will be available from transmission until seven days after the transmission of the final programme in the series (if the series is 13 episodes/weeks long or under).

As each week passes the episode assets begin to 'stack up.' For example, in the first week of a series the first episode is made available, in week 2 both the first and second episodes are available. By week 6 all six episodes are available. It is then possible for the viewer to watch all six episodes in one sitting.

If a series broadcasts multiple episodes each week, then the 13-week rule switches to episodes, and no more than 13 episodes can be stacked. No stack may exceed 26 weeks due to the commercial holdback window.

An example of a series of weekly episodes broadcast over 13 weeks is Doctor Who.

An example of a series of weekly episodes broadcast over 6 weeks is The Mighty Boosh.

An example of a series of multiple-episodes-week broadcast over 4 weeks is The Weakest Link.

There are also different types of stack, differing due to transmission patterns and availability windows. These are detailed below.

Single Stacks

Definition

A single stack is the normal, default version of a stack. Single stacks are based on the assumption that the series has a finite number of episodes, and that the series run will have a definite end date.

Episodes are made available for the duration of the series (plus seven days) or for up to 13 weeks from transmission.

The maximum availability window for a stacked programme is 13 weeks. This breaks down as the normal seven-day post-transmission window, plus 12 further weeks.

Seven days after the transmission of the final episode of the series all stacked episodes expire, and the stack ends.

Figure 103A:
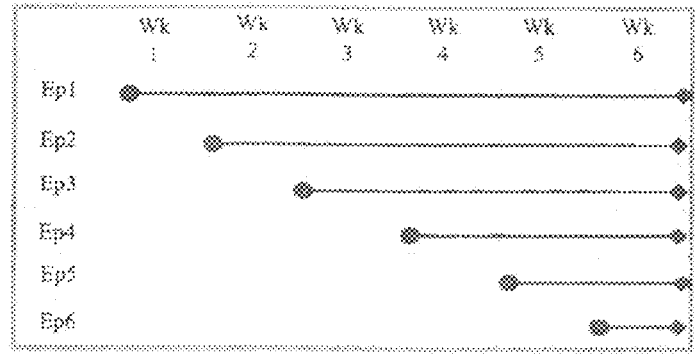
FIGS. 103a, 103b, 103c, 103d, 103e, 103f and 103g show various examples of stacks.

FIG. 103a shows a six-episode stack (such as a comedy series)

Stacks up to 13 weeks

Single stacks typically last between six and 13 weeks, and are made up of six to 13 episodes. Some single stacks may have a fewer or greater number of episodes (e.g. a four-week four-part documentary may be stacked, as could 24 with its 24 episodes).

There is no limit on the number of episodes that can be stacked within this 13-week window. If a programme has two episodes screened per week, there may be 26 episodes stacked at the 13-week drop-off point.

Stacks over 13 weeks

There is no limit on the series duration of a single stack (and some series last several months). However, if the stack goes beyond the normal 13-week rights window then earlier episodes then become unavailable.

Figure 103C:
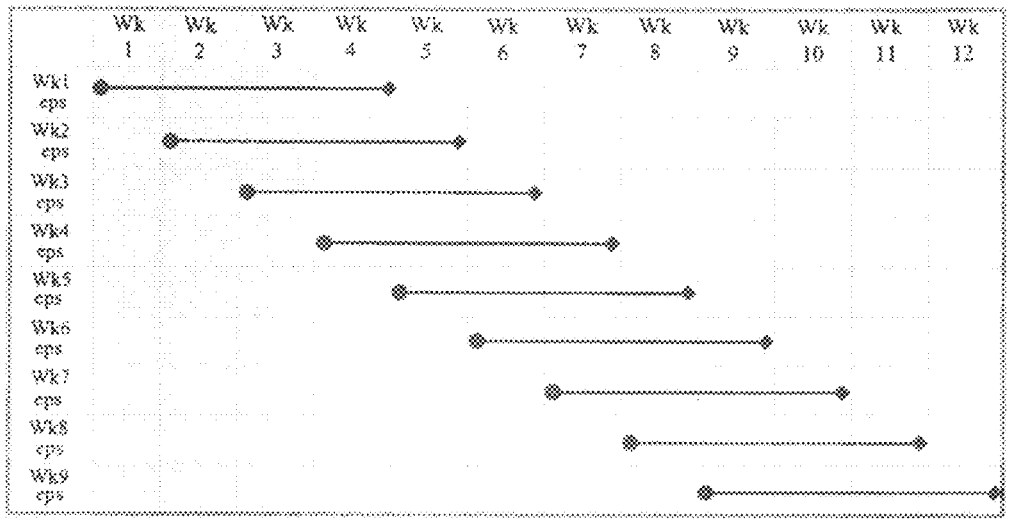
Figure 103D:
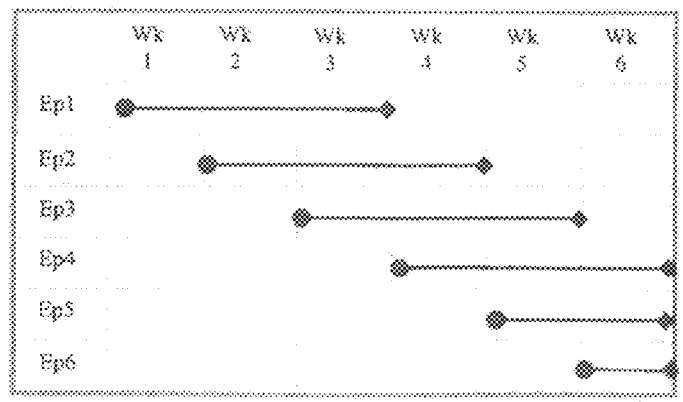
Figure 103B:
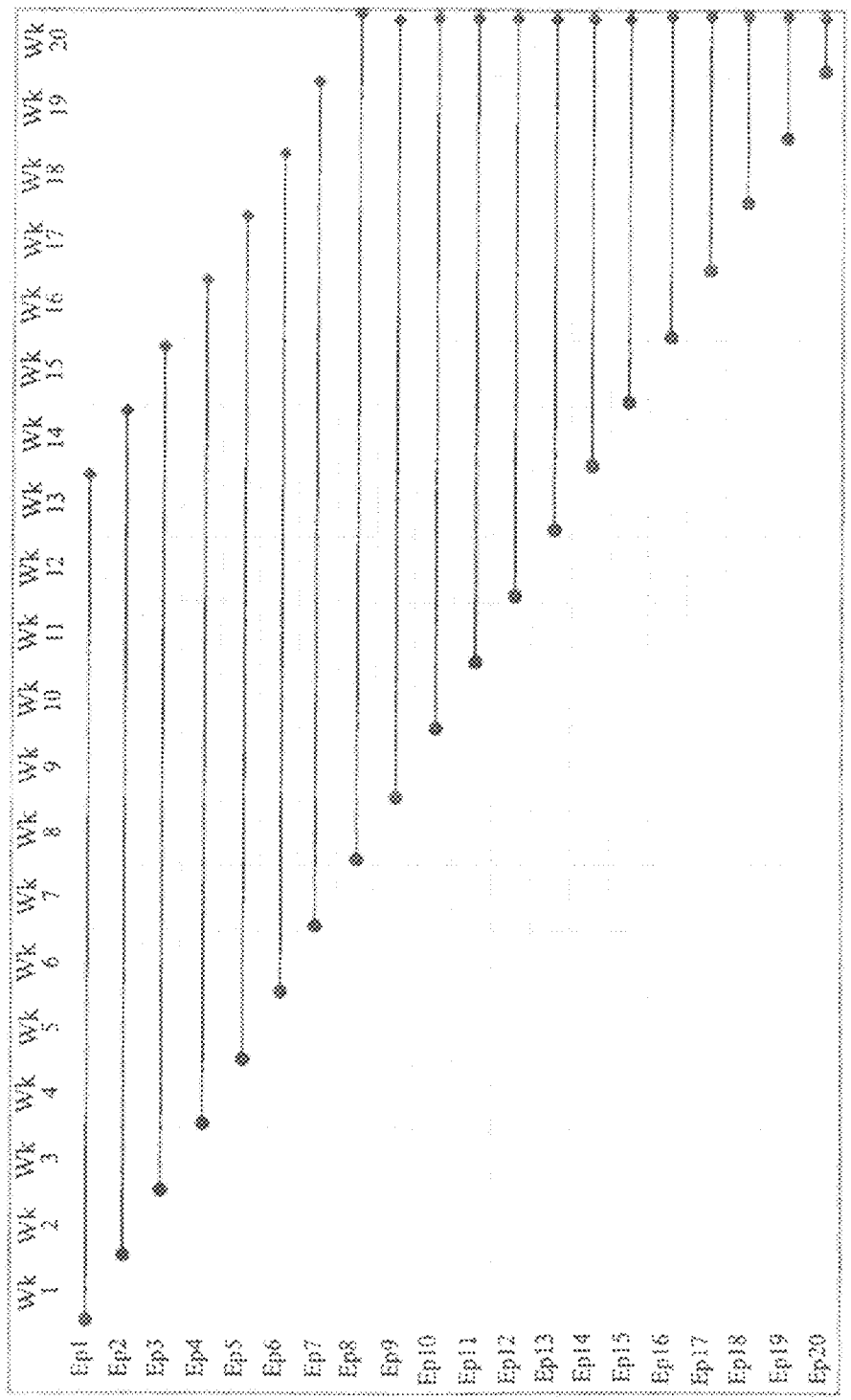

For example, if a 20-part series of Spooks was stacked, on week 14 that week's episode would be available (episode 14), but the first episode would no longer be available as it had gone beyond the 13-week window. FIG. 103b shows a 20 part single stack.

As each week progresses the newly-transmitted episode becomes available, and the episode that reaches the end of its 13-week window drops off.

When the series has less than 13 weeks left to run (i.e. final transmission plus seven days), early episodes stop dropping off, and remain available until the stack end date (final transmission+7).

The remaining episodes have shortened windows of availability, reflecting the decreasing number of weeks left until the stack's end date. For example, episode 18 will be available for three weeks; the week of its transmission (week 18), the week after episode 19 is transmitted (week 19), and the week after episode 20 is shown ('final transmission+7').

Rolling Stacks

A rolling stack is the term for a stack which is defined by a pre-selected amount of episodes being made available at any one time. This differs from a single stack in that episode availability is not defined by series length or the 13-week window.

Rolling stacks apply to series that do not have a definite end date and are ongoing (e.g. soaps, news). As the series has no end date there cannot be a predetermined end to the stack, and so episode availability is a decision that must be taken editorially.

In the same way that episodes drop off from a single stacked series after the 13$^{th}$ week, episodes in a rolling stack drop off based on a predetermined window. FIG. 103c shows a rolling stack.

For example, Top Gear may have a month's worth of episodes available on a rolling-stack basis. This would mean that as each new episode becomes available (November 1$^{st}$'s episode), the corresponding episode from the previous month (October 1$^{st}$'s episode) expires. In this way there would be an ongoing 'roll' of episodes. (For a news or weather programme the rolling stack's duration could be fixed at a week's worth of episodes).

The availability window for each episode is fixed and constant, the 'roll' generated by the amount of overlap (e.g. four weeks of episodes will be available from week four onwards).

Rolling stacks require lead time equal to their 'roll window' to build up the numbers of back-episodes that are available to form the 'roll'.

Exceptional Stacks

An exceptional stack occurs when a stack has particular rights and windowing requirements. These will predominantly apply to co-productions and acquisitions that are of high commercial value (and so have greater rights restrictions).

A recent example of an exceptional stack is Extras. Extras could only have three episodes stacked at any point. This meant that Extras effectively became a rolling stack, even though it had a fixed end-date to the series. FIG. 103d shows an example of an exceptional stack.

As FIG. 103d shows, episodes could not be made available for more than three weeks, and episode 4 onwards had the fixed end date of 'final transmission+7'. The special availability window that Extras required made it an exceptional stack.

Permanent Stacks

In further examples of interactive player system there is content that will be made available on a permanent basis, both with DRM (archive content) and without DRM (podcasts). With permanent stacks the assets will be available on interactive player system whether stacked or not, and so the 'stacking' element of this will be whether these assets will be linked together to form a permanent stack.

Broken Stacks

A broken stack occurs when a single-stacked series contains a break between episodes at some point during the series. These may be planned (such as Top Gear taking a week's break for the golf), or unplanned (an episode is suspended due to a state funeral). Different DRM will be applied to broken stacks at the point they break depending on whether they are planned are unplanned breaks.

However, the broken stack type is determined by the length of the break rather than whether it was planned or unplanned. Here they are defined as a 'single break' or a 'double break'.

Single Break

A single break is a stack which contains a break of two weeks or less. Any series stack that resumes stacking of episodes within two weeks will remain a single stack.

Figure 103E:
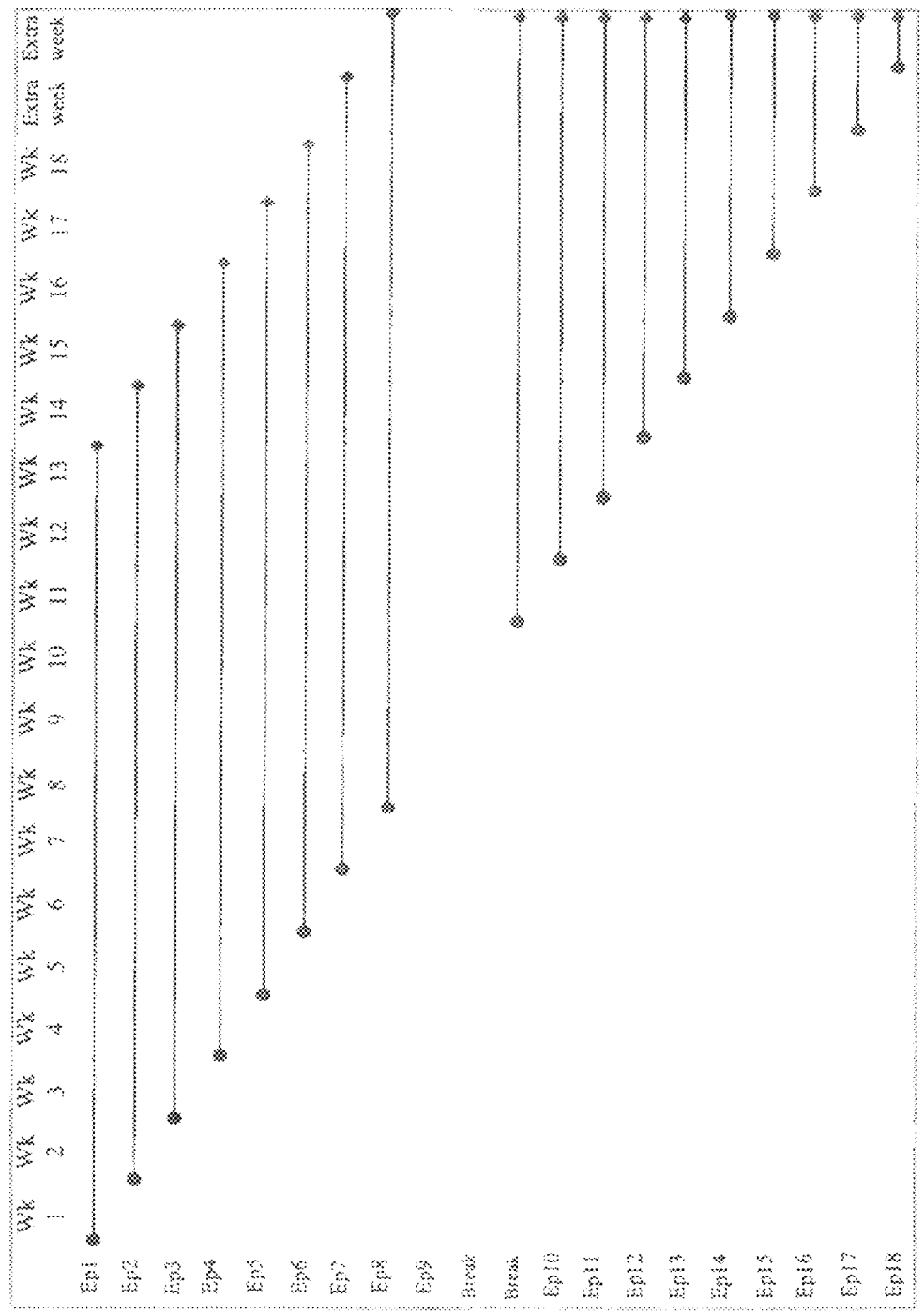

As FIG. 103e shows, episodes 10 and 11 are delayed by two weeks. This puts the end date of the stack back by two weeks. So after the break episodes 10 onwards are stacked as normal but with adjusted DRM licences.

For planned breaks earlier episodes in the stack should have their DRM licences re-issued to bring them up to the revised end date.

For unplanned broken stacks episodes which are already stacked should not have their DRM changed.

Double Break

A double break is a stack which contains a break of three weeks or more. Any series stack that resumes stacking after three weeks is to be treated as two separate stacks (the first episode after the break becoming the first episode of a new stack).

For stacked series which broadcast multiple episodes each week, a broken stack becomes a 'double break' if there is a gap of over 14 days (e.g. If Waking the Dead has a break of 15 days during its run it becomes a double break).

Figure 103F:
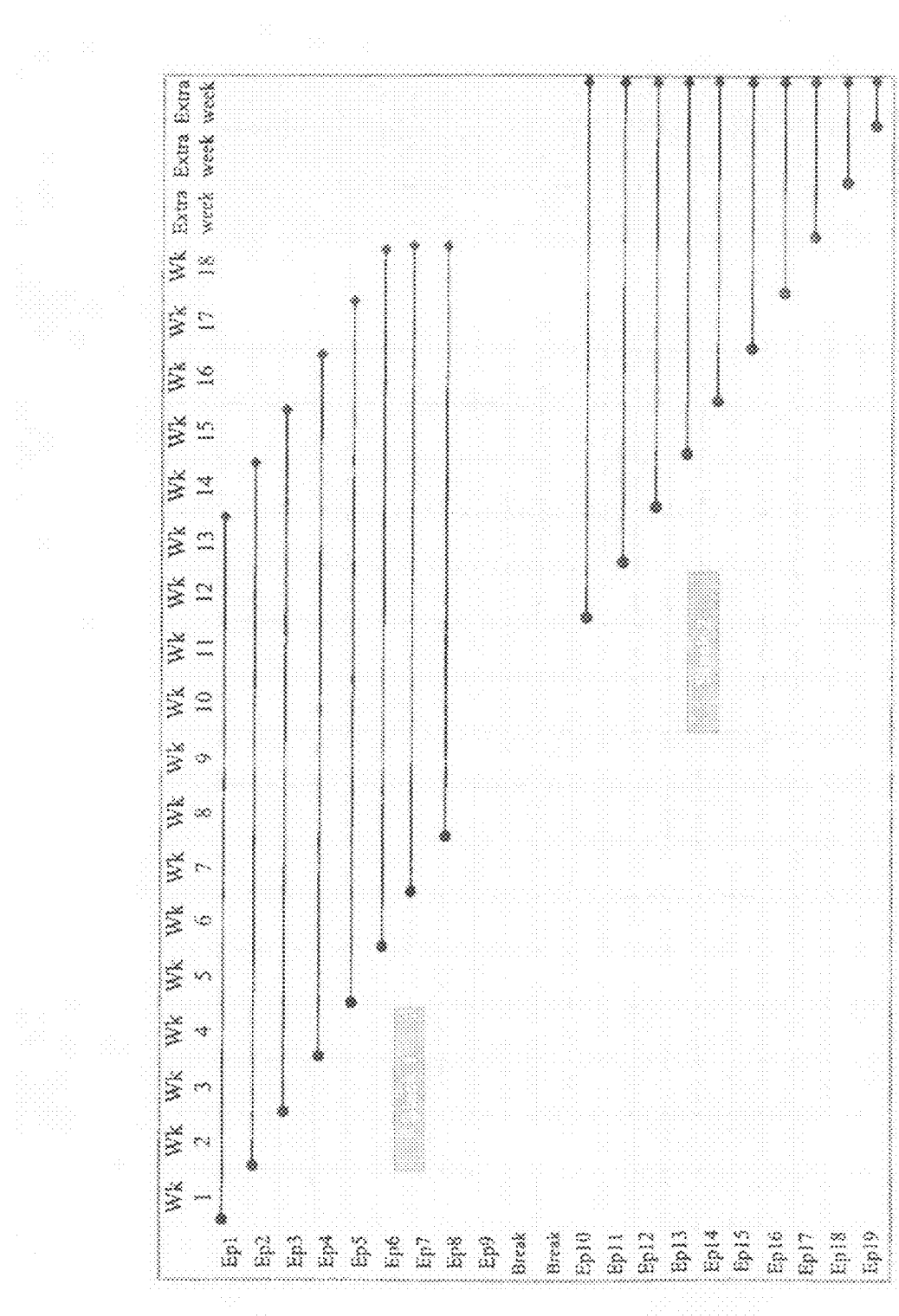

As FIG. 103f shows, episodes 10 and 11 are delayed by three weeks. This breaks the stack and forces a new stack to begin. The end date of the series is put back by three weeks.

If the break is unplanned the episodes on the original stack (stack 1) do not have their end dates adjusted due to the 'double break'. They expire at the original series end-date.

If the break is planned (e.g. Top Gear), then the DRM will be adjusted.

As a new stack begins with episode 10 only episode 10 will be available on this stack, and from this episode onwards the stack builds towards its end date as normal.

Broken Rolling Stack

If a series which is stacked on a rolling basis has a break (whether planned or unplanned), it resumes its normal status as soon as the break is over.

Figure 103G:
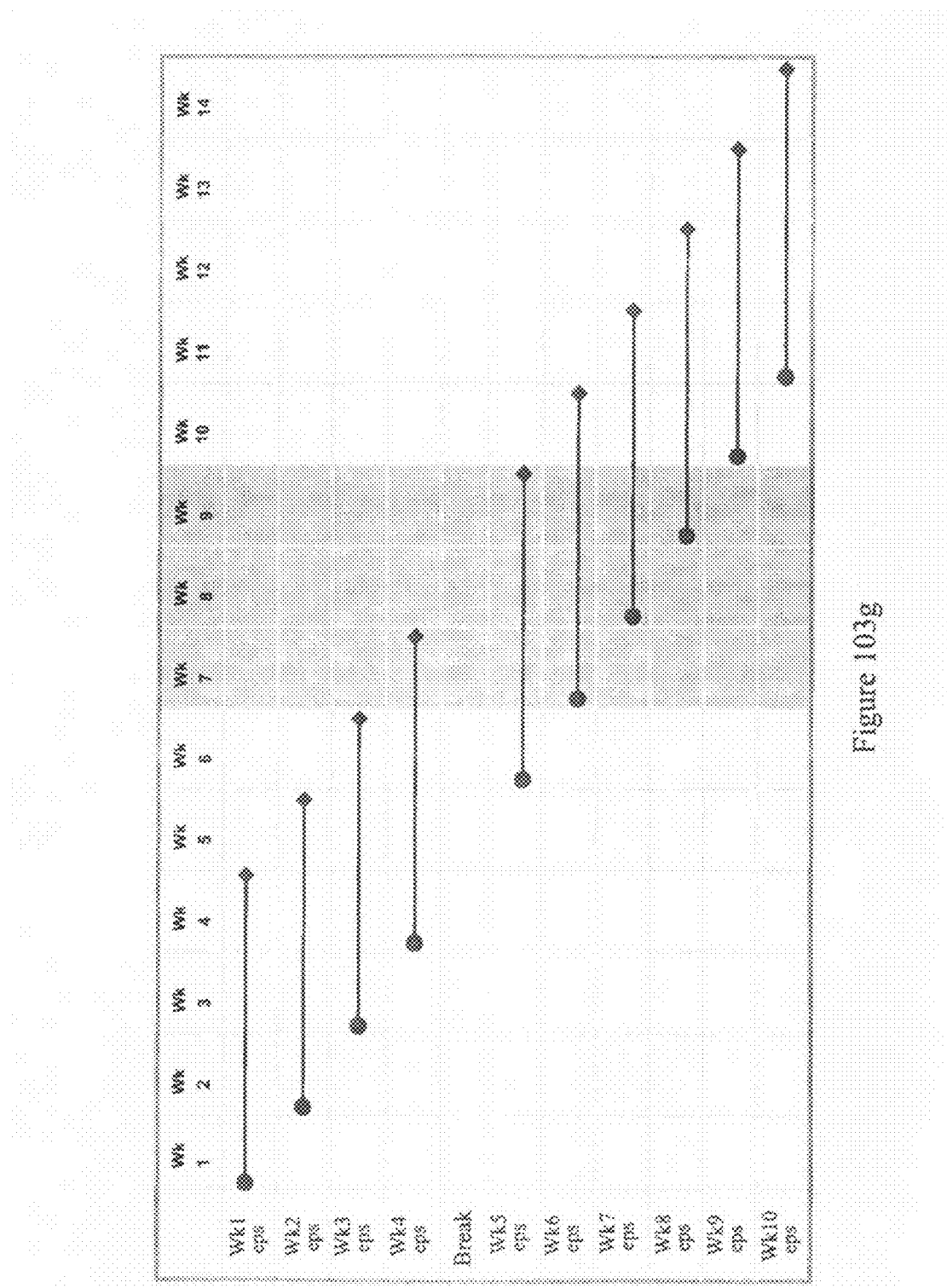

As FIG. 103g shows, week 5's episodes have been delayed a week before the stack resumes. From then on episodes begin stacking again as normal.

For the two weeks following only three week's worth of episodes will be available (weeks 7 and 8). From week 9 onwards the roll will be as normal.

Broken Exceptional Stack

Broken exceptional stacks will be dealt with on a case-by-case basis.

Availability of Stacks—DRM and Windowing

Single stacked series and its variants series should be available from the transmission of the first episode until seven days after the transmission of the final episode. For rolling, exceptional, and some broken stacks the availability period may be determined on a case-by-case basis.

The standard availability window for an episode asset when stacked is up to thirteen weeks from transmission. The thirteen weeks is made up of the normal seven-day post-broadcast window, plus an additional twelve weeks (i.e. the normal amount of time a user can store a programme un-played on their computer).

Within the broadcaster the length of time that a stack is available for should be written in hour rather than day form. The maximum availability window is therefore 2184/2184/168 hours (or 13 weeks/13 weeks/7 days).

Any series with a definite end date must end seven days after the transmission of its final episode. At this point all episodes assets expire on the interactive player system. Series which do not have a definite end date (i.e. rolling stacks) must have a regular availability window and a specific end point at which each episode asset expires.

Single and exceptional stacks (and any broken versions of them) will not have uniform availability windows (as the diagrams in above indicate). For series that last up to thirteen weeks each week will have a progressively shorter period of availability. For series over thirteen weeks, once there are less than thirteen weeks remaining, the DRM window will then get progressively shorter.

It is essential that the end date is known for any series which has a fixed number of episodes (i.e. a single or exceptional stack and any broken variations to them). Stack windowing is based on working backwards from the end date of 'final transmission+7'.

Messages to Users About Stacks

Considering the complexity of the various forms of stacking that will be available to the user, there need to be clear messages about each stack.

These messages should be presented wherever stacks are available either as contextual help ('What's a stack?' link to pop-up box), or as a static line of explanatory text on any download options or holding page that contains only stacked episodes. There is also additional explanatory text available for broken stacks, and any changes or extensions to stacks.

Stack Volumes

The Broadcaster can currently stack an average of thirty series a week, under its agreements with Equity, PACT and other rights holders. This is based on an annualised average-stack-per-week rate.

The numbers of series that are stacked can rise and fall depending on the schedule (new series starts) and season launches.

Based on an average of thirty stacks a week, the total number of series available from the interactive player system as stacks could be as high as four hundred (thirty new thirteen-episode-plus titles a week for thirteen weeks). This number could rise at season launches.

The interactive player system will initially use the series stack function on a tactical basis. A limited number of series will be stacked so that it can be presented as a 'prestige' or value-added service, as well as to gauge the value of stacked series to users.

Differences Between Stacks, Series and Bookings on the Interactive Player System Series A series is the default grouping of programme episodes.

Within the interactive player system two separate functions will be attached to series—the ability to pre-book episodes for download (once they become available), and the ability to download episodes which are stacked.

Stacks

Stacking is based upon asset availability, rather than the viewer booking the series as it becomes available.

Bookings

'Booking' is the ability to pre-book an episode to download—i.e. download each new episode as it becomes available each week. The programme asset itself is not available for longer than the normal 7 days and has the normal 7/13/7 (or 168/2184/168) window.

With stacked series the assets remain available on the servers for download for the duration of the stack. A series that the user chooses to book and not view until the whole series has been download may be effectively 'stacked' on their PC, but this is a 'booked series' rather than a stacked one.

So if Extras was selected for a series booking it would download every Thursday night. If the user left the downloaded episodes unopened for six weeks then they could all be watched one after the other.

| Week | TX | Episode | Availability Window | Episodes unplayed on PC | Time left to view (hours) | Keep unplayed window | Viewing window |
|---|---|---|---|---|---|---|---|
| Week1 | 14$^{th}$ Sept | 1 | 168 | 1 | Ep1-2184 | 2184 | 168 |
| Week2 | 21$^{st}$ Sept | 2 | 168 | 1, 2 | Ep1-2016, ep2-2184 | 2184 | 168 |
| Week3 | 28$^{th}$ Sept | 3 | 168 | 1, 2, 3 | Ep1-1848, ep2-2016, ep3-2184 | 2184 | 168 |
| Week4 | 05$^{th}$ Oct | 4 | 168 | 1, 2, 3, 4 | Ep1-1680, ep2-1848, ep3-2016 ep4-2184 | 2184 | 168 |
| Week5 | 12$^{th}$ Oct | 5 | 168 | 1, 2, 3, 4, 5 | Ep1-1512, ep2-1680, ep3-1848, ep4-2016, ep5-2184 | 2184 | 168 |
| Week6 | 19$^{th}$ Oct | 6 | 168 | 1, 2, 3, 4, 5, 6 | Ep-1-1344, ep2-1512, ep3-1680, ep4-1848, ep5-2016, ep6-2184 | 2184 | 168 |

By episode 6 all episodes would be stored on the user's PC and would still be within the thirteen-week (or 2184-hour) 'keep un-played' window. All episodes can now be watched in the same way a stack would be.

Changes to Stacks

Changes to Stack Length

When the number of episodes that makes up a stack is changed (e.g. a run of Cash in the Attic may have episodes added or dropped), the availability windows of stacked episodes will be changed from the point at which this change has been notified. Episodes that are already stacked will not have their DRM rights changed.

This does not include changes to stack length due to any breaks in the stack.

Changes to Series Order

Stacks on the interactive player system reflect the broadcast order of a series' episodes. If a series is shown out of order on TV, or if the wrong episode is shown accidentally, then the interactive player system should not attempt to re-order the series on the series stack as it will cause difficulties in re-aligning the DRM and availability windows.

This has an impact primarily on shows with a developing narrative or series arc (dramas, comedies, factual, entertainment, documentary), and so there should be special care with these genres. It is not as great a concern with non-sequential series (e.g. some format entertainment and lifestyle titles).

Changes to Channel and Day

If a series that is stacked is unexpectedly moved to another channel during its run (e.g. a peak-time series which is getting poor ratings on Channel1 is moved to a late-night slot on Channel 2), the stack continues as is.

If the run continues on a different channel with limited change to its availability window (e.g. broadcast on the same night but an hour earlier or later), then no new DRM will be applied.

If the run continues on a different channel on a different night (e.g. Davina moves from Channel 1 Wednesdays to Channel 2 Sundays) then this causes a significant impact to stack availability. Even so, no new DRM should be applied to episodes already stacked. Changes to DRM are made to current and future episodes from the point of the change onwards.

In exceptional cases a channel change can be treated as a 'double break' broken stack to improve the availability of the series.

Retrospective and Partial Stacks

It is unlikely that a series will be stacked during the course of its run. This would require a 'retrospective stacking' of previously un-stacked episodes. As all episodes but the previous one would have expired on the interactive player system this requires special treatment (recovery from archive, republishing, DRM), and is to be avoided.

If a series needs to be stacked from midway through its run onwards this could be considered a 'partial stack' (e.g. just the last five episodes of Doctor Who). Though this may be of value to certain series (e.g. stack University Challenge from the semi-finals onwards) it is a confusing proposition to offer to the audience and so should be avoided.

Late Changes, Rescheduling and Revoking Stacks

Late Changes

Late changes to stacks, such as late programme delivery, could affect the stack as a whole. As such, stacks containing late changes should be stacked as per normal, with the DRM changed solely on the episode affected.

If a programme is delivered late and so is not published on interactive player system until later than expected (i.e. several hours into the 'transmission +' window), then the DRM applied should reflect this but retain the planned episode expiry time and date (as part of a stack). New DRM should be applied to current and future episodes from the point of the change onwards.

Rescheduling

When an episode of a single stacked series is rescheduled, it is assumed the series will still be shown in order after this rescheduled episode. As such the DRM on existing episodes should not be changed and any new episodes (including the rescheduled episode) should have their availability windows adapted to accommodate the rescheduling.

Revocations

If an episode is revoked from a single stack it may have a damaging impact on the integrity of the stack as a whole (e.g. a drama with the third episode missing makes the whole series redundant). However, for some genres there will be minimal impact if an episode is revoked (e.g. an episode of Bargain Hunt). As such, any stack which has an episode revoked within it needs to be reviewed case-by-case.

(It is unlikely that a rolling stack will be pulled based on a late change, reschedule or revocation due to the lead time required to build up the rolling stack).

Other Amendments to Stacks

There are other amendments to stacks that could be needed mid-series. These include changes to transmission times, transmission dates, frequency of episodes (e.g. series moving from weekly broadcast to twice-weekly), and duration of episodes (e.g. Top Gear moving from half-hour to hour-long).

When these types of changes occur, the DRM applied to current and future episode should be altered to reflect these changes. There should not be any changes applied to episodes which are already stacked.

Further details relating to certain examples of the interactive player system and interface are now provided.

What is the Interactive Player System?

interactive player system is a system enabling users to access media, such as television programmes, radio shows and the like, on demand through a user interface such as a website. The system is optimised for use with an internet connection capable of broadband like speeds.

Users can discover the available programmes from the interactive player system through high-level web pages, such as the interactive player system Home web page, as well as from genre or subject specific pages across the rest of the Broadcaster's web site, (e.g. from, broadcaster.co.uk/tv, /radio, /news, /sport, /channeltwo, /radiochannel1, /genericsoapshow, etc.)

The system allows users to search the entirety of the Broadcaster's output for programmes, locate them within a schedule, and find out more information about them. Users can choose whether to watch or listen to programmes instantly as streams, or to download DRM protected audio-visual files to view at higher quality or offline.

Users can also transfer downloaded files to other devices or viewing screens. Users can also book an episode or a whole series for download in advance, so each episode is delivered to them when it becomes available. In order to download files, users are required to download and install some elements and also register with the Broadcasters web page, e.g. broadcaster.co.uk.

In the embodiment described herein the interactive player system is a PC internet service; however, in other embodiments the interactive player system can extend to other platforms and devices.

In one example, the ability to catch up on virtually every Broadcaster television and radio programme from the previous week is provided.

The interactive player system provides a simple, easy to use, interface which enables users to navigate entire database of content available. The interactive player system is adapted to provide an experience similar to that of watching the television, but provides the user with the interactivity provided by internet applications. The system consists of a player and a manager; the player is used by the user to view the desired media content, and the manager is used in the selection of the media content. Both the player and manager are fully integrated to provide simple access to the media.

Key User Benefits:

Watch or listen at a time suitable to the user.

Never miss content that the user wants to watch/listen

Ability to discover new media content that would otherwise have been passed over by the user Available Content In addition to whole television and radio programmes, the Broadcaster produces many other types of content including sport clips, news clips, the weather in video, trailers, highlights packages etc. These are also discoverable through the interactive player system, and can be played back through the interactive player system playback window.

Brand Positioning

Brand Essence

The interactive player system allows content to be viewed at any time so that the user can watch/listen in at any time and need never miss a desired programme. The brand essence is 'never miss out'.

Peer-to-Peer Delivery Manager

The interactive player system Manager is built using a Peer-to-peer Delivery Manager (PDM). PDM manages the booking, download and management of media files. Downloads are delivered using peer-to-peer. PDM is installed on user's computers during the installation of the interactive player system Manager. PDM runs as a Windows, or the like, service and is referenced through as a JavaScript interface. The user-interface is built using an embedded version of Internet Explorer in a Peer-to-Peer wrapper; using HTML, JavaScript, XML, CSS and AJAX. Elements of the Peer-to-Peer user interface can be installed on the users computer to enable it to operate when not connected to the Internet.

Accessibility

Key aspects of the interactive player system service are accessibility and usability, with the objective of providing these to the highest achievable standards.

interactive player system is designed with deliberate consideration to the following issues:

Screen reader users.

Keyboard and Switch control.

Interface customisation for users with either poor vision or cognitive disorders such as Dyslexia.

The inclusion of TV access services; Subtitles, Audio Description and British Sign Language.

An Example Scenario:

The following example will provide details of the interactive player system when in use. After following a link from one of the user's favourite sites, www.broadcaster-.co.uk/genericsoapshow, the user found out about the interactive player system. The user watched a couple of episodes of Genericsoapshow through the interactive player system by streaming the programme onto his/her laptop. The user liked the way he/she could watch what he/she liked, when he/she liked; so he/she decided to register for the download service and install the interactive player system Manager to his/her laptop at home and 'collect' his/her favourite programmes. Since then the user has been able to watch his/her favourite programmes when it suits him/her, which makes a big difference to his/her busy schedule as he/she only has a limited amount of time in the evenings to watch TV.

For example, the user has just got home from work and it is already pretty late. He/she was out last night and remembers one of his/her workmates mentioning during a coffee break at work that he/she had watched a great programme on Channel 2 last night.

The user turns on his/her home laptop, and clicks through to the interactive player system homepage/interface screen. The programme he/she is looking for does not seem to be one that is listed or mentioned so he/she decides to do a search to see if he/she can find the programme that way. He/she thinks he/she finds the programme his/her work colleague was talking about and this is confirmed when he/she clicks through to the programme item page which gave him/her detailed information about the programme. He/she decides to download the programme to his/her laptop. After making a quick bit of dinner and pouring a glass of wine, the user goes to the interactive player system Manager, clicks on the link to the downloaded programme; and the interactive player system Console appears on the screen. The user selects full screen mode and then settles back for a bit of light entertainment.

The following subsections outline the functional requirements for the four components noted above:

Interactive Player System Homepage/Interface Screen

Interactive Player System Homepage: Introduction e.g. www.broadcaster.co.uk/interactive player system This is the launch pad for the interactive player system. It is the URL which will be promoted on TV, Radio and in all marketing communications about the interactive player system from all media. It should feel like an interactive, live, up-to-date, useful space, providing a simple and instant route to the most popular or most wanted content which is instantly accessible and visible and enticing.

Interactive Player System Homepage: Requirements

The purpose of the home page is:

To explain what interactive player system is about

To generate and build awareness of the interactive player system brand

To promote A/V content in line with a clear promotional policy

To get audiences to the available A/V content that they came looking for

Examples of content for the homepage include but are not limited to:

1. Offering regularly updated ideas for what to watch/listen to, make recommendations and offer promotions.

Features should include

Top 10 downloads today (or possibly more live stats than that, by hour or even minute)

Most popular this week

Recently added to the interactive player system (new releases)

"Don't miss" promotions

In-time 'recommended for you' suggestions

Last chance to see . . .

2. Including a search box, browse functions and link to the schedule so that users can quickly get to the main product features of the interactive player system.

3. Including some information explaining to new users what the interactive player system is, and links to the registrations, help and FAQs.

Search

Search: Introduction

The search function on broadcaster.co.uk will allow users to find all video and audio programmes and clips that are available whether streamed or downloaded.

Search: Display

When a programme is highlighted in Search (as well as in Bookings, Downloads and Library,) the following information is displayed:

Programme Name (Length)
Thumbnail image
Thumbnail—87×49 pixels, max file size 5 k
Medium (to be used in interactive player system Manager)—150×84 pixels
Large—250×141 pixels, max file size 16 k
X Large—720×576 pixels, max file size not stipulated
TV or Radio Station Logo
Broadcast Date/Time
Synopsis
Guidance (a G symbol will be displayed if the programme contains sex, violence, strong language or strobe lighting)
Guidance Description if There are Guidance Warnings
Duration
Subtitles Available Y or N There will be an indictor of when the programme contains British Sign Language.

The appropriate Calls to Action must be displayed next to each item.

When a user clicks on the programme name/clip title or thumbnail image in the search results, they will be taken to a Programme Information Page. (Information about the Programme Item Page is provided in the section 'Supporting Information)

Search: User-Controlled Features

Search results can be displayed in a range of formats e.g. in a list or grid view. (This could be user selectable.)

The display of thumbnail images and/or synopsis can user determined in order to have more results displayed on the screen.

Search results can be sorted by:
Programme Name or Clip Title (i.e. A-Z)
TV Channel/Radio Station or non-traditional broadcast title (News, Sport or Broadcaster)
Broadcast Date/Time (if clip then went created)
Duration/Length
Availability where appropriate (i.e. Some A/V assets do not expire e.g. News clips)

Search results must be able to be filtered using the following facets (see the description of metadata herein):
TV or Radio or other (i.e. Film, Clip, still, Text)
Category
Programme Type
Duration
Item Type
Delivery Method
Access Options After a search has been performed the above facets and the first level of options are displayed.

When a facet is selected the search results are filtered according to the selected facet option. If they exist, lower level facet options will also be displayed. Lower level facet options can be selected to refine the results further. Examples of faceted searches are those used by Froogle, Amazon and shopping.com.

Interactive Player System Manager
Interactive Player System Manager: Introduction Interactive player system Manager is used for booking, downloading and managing downloaded TV and Radio programmes.

The current designs for interactive player system and the previous designs for other embodiments have functions displayed in different tabs (Bookings, Library and Downloading).

In some embodiments the functions are combined in a single area; care must be taken on the different amount of information displayed in each functional state. The present embodiment describes three tabs; however, other ways to present the three functions on fewer/one page are available.

If the user clicks on a call to action on broadcaster.co.uk or a third party website that requires the interactive player system Manager (Download, Book Download or Book Series Download) and it is not installed, a series of screens will be displayed that will enable the user to install it.

There are 4 main functions of the interactive player system Manager:
Search for programmes and clips
Downloading programmes
Managing the booking of downloads
Managing the Library or downloaded programmes A supplementary function is Launching Live TV or Radio playback.

By highlighting a programme in the interactive player system Manager, a programme information pane is displayed showing more information on the selected programme, without leaving the page.

Interactive Player System Manager General Requirements

Interactive player system Manager is an internal name for describing the product—not necessarily the product name.

Live TV and Radio

There is a method of launching the live TV or radio playback Window.

'Now' and 'Next'

The user is able to select the appropriate TV or Radio channel before launching and potentially could see what is on 'Now and Next' across all channels.

Search

A simple search facility is provided. Functionally this is the same as the Search on the broadcaster website, although the results will be returned directly in to interactive player system Manager and so the design should reflect this.

Interactive Player System Manager: Downloading

For 'Downloading' at least the following information is displayed in one example:
Programme Name
TV Channel/Radio Station
Media Type: TV or Radio (could be icon)
Broadcast Date/Time
Duration (hours, mins)
Size
Estimated time remaining for the download to complete
Download Progress Bar When a user selects an item in the download area the programme information pane is displayed with the appropriate metadata.

If the selected programme is downloading, a 'Pause Download' and 'Cancel Download' button is displayed in the programme information pane. Clicking this 'Pause Download' pauses the download and display 'Resume Download'. Clicking 'Cancel Download' cancels the download.

If 'Pause Download' is displayed, clicking it resumes the download process.

Interactive Player System Manager: Bookings

For 'Booking' at least the following information is displayed in one example:

Programme Name

TV Channel/Radio Station

Media Type: TV or Radio (could be icon)

Broadcast Date/Time if a single episode is booked or 'Series Booking' if all future episodes have been booked to be downloaded.

Duration (hours, mins)

When a user selects an item in the bookings area the programme information pane is displayed with the appropriate metadata.

If the selected programme is a single episode booking, a 'Cancel Download Booking' button is displayed in the programme information pane. Clicking this cancels the booking.

If the selected programme has been booked as Series Download, 'Cancel Series Download' is displayed in the programme information pane. Clicking this cancels the series booking.

Interactive Player System Manager: Library

In the Library at least the following information is displayed in one example:

Programme Name

TV Channel/Radio Station

Media Type: TV or Radio (could be icon)

Broadcast Date/Time

Duration (hours, mins)

Size

Status—Played or Unplayed

When the programme is due to expire

Guidance icon (A "G" symbol will be displayed if the programme contains sex, violence, strong language or strobe lighting)

Guidance Description

When a user selects an item in the library pane the programme information pane is displayed with the appropriate metadata.

If the selected programme is a single episode booking, a 'Cancel Download Booking' button is displayed. Clicking this cancels the booking.

A 'Play Download' and 'Delete Download' button is displayed in the programme information pane. Clicking a 'Play Download' launches the playback window and clicking 'Delete Download' deletes the downloaded file from the computer.

If the selected programme has been booked as Series Download, 'Cancel Series Download' is displayed in the programme information pane. Clicking this cancels the series booking.

Playback Console

Console: Introduction

This is used for the audio and video playback of streamed (live and on-demand) and downloaded media. The Playback Console is launched either from broadcaster.co.uk or from the interactive player system Manager.

The Playback Window adjusts to the type of content (audio or video) and method (live streaming, on-demand streaming and download).

Playback of DRM protected downloads are always launched through interactive player system Manager and the user may or may not be connected to the Internet. The playback of live or on-demand streams can be launched through a link on broadcaster.co.uk, a link on a third party website or the interactive player system Manager Search Results.

When the window is opened for the first time when streaming media, some checks are carried out to detect the connection speed the user has and the user is asked to choose their preference for either Windows Media Player or another media player for media playback.

Console: Controls & Logos

At least the following is displayed in the playback console in one example:

The interactive player system logo

The Programme or Clip title

The logo for one of the following: A TV Channel, Radio Station, or News or Sport (see toolkit for full set of assets to be used)

On the Playback Console, there must be at least the following controls for the video in one example:

Play

Stop

Pause

Fast Forward

Rewind

Drag-able progress bar

Volume up/down

Mute

Subtitles on/off

Full Screen (for video only)

The current time-code as well as the overall duration must be displayed for the video.

Console: Links

At least the following links must also be displayed in one example:

Launch in Windows Media Player (depending on the currently selected preference)

Email a friend

A link to the interactive player system Home to find more to watch

Two links to html pages from broadcaster.co.uk (examples: a link to a programme site, genre site, channel or station site, News Story page, etc.)

Settings

Help

Terms of Use

Privacy Policy

Up to 13 links to editorially related a/v content (e.g. other episodes of the same dramatic series.) Most instances of the console will have fewer editorially related links, or none at all. For each link at least the following is required:

A link name, of up to 36 characters

A description, of between 60-250 characters, which only appears when the associated link has been selected.

Duration of a/v associated with link

A watch or listen icon, as per the toolkit provided

The capacity to display a sub-set of a/v links. These are needed in order to link to, for example, a set of clips associated with an episode of a series, or chapters/subdivisions within a News story. (See diagram)

In a small minority of cases there will be the need to display a small applet or the like. In those cases there will not be a need to display any links to editorially related a/v content, 3 'recommended' links to additional clips or programmes, "Like that? Try this."

Site Map

FIGS. 1 to 3 show a high level view of the operation of the interactive player system.

Wireframes

FIGS. 4 to 25 show an example of the user interface/screenshots of the interactive player system.

Content Object Model (See Appendix A below)

Programme Information Page

Display

This page will display detailed information on the programme.

Programme Brand Name

Episode Name

Guidance icon (a G symbol will be displayed if the programme contains sex, violence, strong language or strobe lighting) and Guidance description Duration Synopsis Additional episode information such as Director, Writer, Cast Format information TV Channel, Radio Station or other broadcast channel (e.g. News, Sport etc) logo A link to a Programme web site, which may include some promotional emphasis Episode image 16×9 aspect ratio (Height 141 pixels× Width 250 pixels)

List of versions available (i.e. there may be a British Sign Language version of the episode available, in addition to a Standard version which would come with subtitles. There might also be a version created with a slightly shorter duration).

Broadcast Dates/Times/Channels for each version (For example, the standard version may be repeated multiple times within the same week)

Availability where appropriate (i.e. Not for News clips) For each different version (i.e. British Sign Language vs. Standard) a different availability window will apply, depending on the date the version was last broadcast.

Calls to action per version, when that version is available

Where the programme is part of a series, a list of other episodes are displayed.

A list of categories associated with the Programme/Item, that the user may use to browse further A list of related programmes How Users Will Access the Interactive Player System Content The following 'calls to action' (CTA) to stream or download audio or video content are embedded throughout broadcaster.co.uk and in interactive player system Manager as text, icons or both. The language used for the CTAs are placeholder terms; the agency should feel free to use the most appropriate language. The meaning of the CTAs is described below:

Download

User can download the programme to their computer for viewing at their later convenience, up to 13 weeks later. If the user is on a Windows platform and the interactive player system Manager is installed, clicking 'Download' will launch the interactive player system Manager and add the programme to the Downloading area and start the download.

Note: All television programmes may be available for download. In an example, radio programmes are also be available for download.

Watch Now

User can immediately watch a streamed TV programme or clip without the need to download it.

In one example it will be of slightly lower quality than a download, is only available for 7 days (unless series stacked) and is not stored in their library. On clicking a 'Listen Now' button the Playback Window will be launched.

Listen Now

User can immediately listen to an on-demand streamed radio programme or clip without the need to download it. In one example, it is only available for 7 days and is not stored in their library. On clicking a 'Listen Now' button the Playback Window will be launched.

Note: In one example, all radio programmes will be available as an on-demand stream.

Book It

User can reserve a programme to download with DRM in the future as soon as it becomes available (immediately after broadcast). Once available it will automatically download to their library and be available for viewing/listening for up to 13 weeks.

If the user is on a Windows platform and the interactive player system Manager is detected, clicking 'Book Download' will launch the interactive player system Manager and add the programme to the download area and start downloading the programme when it becomes available.

Book Series Download

User can reserve a whole series to download in the future as soon as it becomes available. Once available it will automatically download to their library and be available for viewing/listening for up to 13 weeks.

If the user is on a Windows platform and the interactive player system Manager is detected, clicking 'Book Series Download' will launch the interactive player system Manager and add the booking to the Downloading area and start the downloading the most recent episode if it has not already been downloaded.

Podcast

Same as 'Book Series Download', but without DRM, so it is available until the user decides to delete it. Clicking 'Podcast' button will add the item to the user's preferred Podcast client (e.g. iTunes) if one is installed. The download and playback of file will not be handled through interactive player system Manager.

Watch Live

User can immediately watch a live streamed TV Channel. On clicking a 'Watch Live button the Playback Window will be launched.

Listen Live

User can immediately listen to a live streamed radio Station. On clicking a 'Listen Live' button the Playback Window will be launched.

Note: All radio stations are available.

Content that will be Available Within Interactive Player System

Video

The aspiration is for the entire output hours of TV programmes per week (circa 1,000 hours); however, rights constrain the amount of content that can be made available.

All TV programmes will be available as DRM protected downloads in Windows Media format (Full screen circa 1 Mbps).

The majority of downloaded and on-demand streamed programmes will have subtitles.

Approx 10-20% hours of TV programmes per week will be available as unicast streamed video (quarter screen) 256 kbps in either Windows Media or an alternative media player. The reason all programmes will not be able streamed is that the available capacity will not be able to meet the potential demand.

A growing archive of News and Sports News clips will be available unicast streamed video (quarter screen) 256 kbps in either Windows Media or an alternative media player.

Programmes will be available after broadcast and be available for download or stream for 7 days; except certain first run series (Series Stacked) where up to 13 episodes will be available until 7 days after the final episode.

Downloadable DRM protected programmes will expire 7 days from the first play or 13 weeks whichever is first; except programmes which are part of a series stack which will expire 13 weeks after the final episode (or 13 episodes max) has been transmitted or 7 days after the final episode (or 13 episodes) on first play.

Please note unicast streaming will be available to all users, whereas most users will have severely limited access to multicast streaming is only be supported by a small proportion of ISPs (circa 3%).

Digital Rights Management

A/V files which are available for download are DRM protected. The user will experience this protection in the following way:

1.) Just after the broadcast transmission of a TV programme, a file of that programme is made available to users on broadcaster.co.uk. The file remains available for discovery for 7 days. The user may download the file from broadcaster.co.uk any time during this 7 day "discovery" window. At the end of this window the file becomes unavailable for the user to discover or download from broadcaster.co.uk.

2.) A file may remain on the user's hard drive (un-played) for up to 13 weeks from the day that it was downloaded.

3.) When the user opens the file to begin playback, a 7 day clock starts ticking down. In other words, as soon as the user "breaks the seal" on the file, they have 7 days within which to watch it. During this 7 day "watchable" window the user may open and play the file as many times as they'd like.

4.) At the end of either the 7 day "watchable" window, or the full 13 weeks (whichever comes first) the file is deleted from the user's hard drive.

The above explanation uses 7, 13, and 7 respectively as the values for DRM framework's three windows. We expect these windows will vary in length depending on the specific content due to the terms of different agreements with different rights holders.

A summary of an example is now provided.

Interactive Player System

Interactive player system is a simple, convenient internet based service available to all licence-fee payers via a broadband connection. Accessed via a web browser, with some downloadable elements, the interactive player system is an online gateway to the vast amount of broadcaster audio visual content, delivered to the users via the very best in navigation and search.

Purpose

In the following sections an overview of the QAT interactive player system (an example) is described.

Interactive Player System Home Page

The interactive player system Home page is the central entry point for the interactive player system Service, providing easy access to the Schedule/EPG, interactive player system Search, Live Radio and Live TV (where available).

Further provision will accommodate links to the browsing pages, links enabling eligible users to register, service information ('What is interactive player system?'), an entry point to Learn More about interactive player system via a Help facility and promo/recommendation spots for content Discovery Discovery of content will exist in three forms; Search (which will differ from the current broadcaster.co.uk search facility), the schedule/EPG (not including 'Red Button' interactive programming) and a Browse facility.

Intermediary Pages

Programme Item Page

A Programme Item page (PIP) will display, contain and aggregate detailed information available on an item of a/v content, including all available versions and relevant Calls to Action at the time of access, and exist for every item of content published by the Broadcaster.

PIPs will display a service/channel or programme brand for the Item and associated images/thumbnails if available. Item access can be limited under specific circumstances, however all and any Item information will still be displayed.

PIPs can be accessed/discovered via the Schedule/EPG and Search and from sites across the broadcaster.co.uk at the site owner's discretion, whether or not the a/v item is actually available to the user. PIPs will allow navigation between related items of content.

Download Media Selection

The Download media process is directly controlled by the interactive player system Manager and Download Options. Content available for download will be presented as a Call to Action. Assuming business rules are met, a user will be directed to the Download Options.

Download Options

Download Options may be accessed whenever any download/booking option/CTA is selected and inform and present to a user in full of any and all relevant confirmations, amendments, information, selections, settings/preferences, variations, versions, processes initiated and/or associated programme assets available.

Download requests initiated prior to an asset's availability will prompt a booking request.

Streaming Media Selection

The Streaming Media process is directly controlled by Media Selector and this process is not visible to the user. If business rules are met, content is immediately made available within the audio or video Streaming Playback Console on selection of content via a Call To Action.

Streaming Options Page

Streaming Options allows the selection of the Preferred Player and Stream Quality on first use and are stored as default preferences for all subsequent streaming activity as settings. These are the only settings available from the Streaming Option, updated via the 'Settings' tab on all interactive player system central pages.

Download Management

The Download Media process is controlled by the interactive player system Manager, permitting management of local Libraries of downloaded content and future download Bookings, which can be cancelled from within the interactive player system Manager download client. Programme availability will depend on business rules and the rights framework.

Interactive Player System Manager

The interactive player system Manager consists of three elements: The Downloading Page, My Library Page and My Bookings.

The Downloading Page will contain and display online and offline download status information and download management tools. The display of information can be configured by a user. Links to other features and facilities will exist on this page.

My Library Page will allow the organisation/maintenance/playback/deletion, but NOT request, of downloaded programmes, downloads in progress and management of Download Bookings. It will display any and all mandatory information relevant to downloaded files. Playback of content outside of the interactive player system and content transfer will not be supported by interactive player system.

Bookings management is supported by the interactive player system Manager and allows users to organise, maintain, cancel and/or delete, but NOT order, their Bookings. When off-line the user will be presented with the same information as when online.

Download Variations

There are currently three special circumstances which affect the download process described herein; Repeats and Narrative Repeats shown within 7 days of the original broadcast, Accessibility Repeats—programmes with separate broadcast slots for accessibility and Omnibus Editions. Omnibus Editions will not be made available for download or streaming via interactive player system but will have an associated Item Page where a user can access the media assets which make up an omnibus programme.

Variations will also exist for time-shifted programmes.

Series Stacking

Series stacking, which may contain one or more sub-series and/or links to related series, provides the ability to obtain some or all of the episodes within a series, the frequency of which is not relevant to the stack, and is an editorial decision.

Series stacks must be requested via bookings 7 days prior to transmission of the first episode, during broadcast or up to 7 days after the last episode. Requests will download or book programmes accordingly.

A Series Stack cannot exceed the 13 week Shelf Life window determined by rights agreements.

The playout window for an episode is restricted by the 13 week Hard Stop.

The frequency of occurrence is not relevant to the Series Stack, and the system will be required to restrict download and booking availability. Episode availability may be restricted if a series exceeds 13 weeks in duration.

Series Stacking Variations

There are three variations on Series Stacking. Broken Stacks will be series where a break in transmission consists of more than 2 weeks, breaking a stack into two separate entities.

Series Repeats will not be series stacked, with the exception of Time-Shifted Series and cross-channel Series repeats existing in both regional and network schedules.

Subscriptions

In an example, a user will only be able to subscribe to an on-going series (a "Rolling Stack"). It will be possible to restrict the volume of episodes available for booking and storage with a Rolling Stack.

Subscriptions to regular bulletins are also possible in one example.

Content Expiry

Users will be provided with expiry information for all content held within the Library and highlight content close to expiry, calculated from one minute after the end of transmission of a programme. Expired content will be automatically deleted from a users PC as soon as possible.

It will be possible to order content by 'Closest to Expiry' within Search/Browse.

Deletion and control of content will be possible by Disabling/Deleting Content automatically exactly 13 weeks to the minute from the end of a programmes transmission time for unplayed content and/or exactly 7 days to the minute after First Play whether or not a user is online.

Exceptions will include playback prior to expiry where playback continues beyond the expiry deadline.

Content Transfer

Independent content transfer is supported by interactive player system in some examples, and transferred content will still be playable depending on business/DRM rules qualification.

Playout

QAT playback consoles will support 5 scenarios: Streaming on Demand (TV & Radio), Live (Simulcast) Streaming (TV & Radio), and Download (TV). All consoles will provide links to Settings and Help.

Playback consoles will offer the following functionality; minimise (continued listening), full-screen, mini-screen (Radio).

Streaming consoles will offer Windows Media Player.

Usage and user activity on all consoles will be captured for reporting purposes

Playout will consist of seven scenarios: Audio Catch-up (Streamed and Downloaded), Video Catch-up (Streamed and Downloaded), Live (Audio and Video) and Pod/Vodcasts.

Downloaded content is accessed from embedded Calls to Action and selected from the Download Options Page.

Live Video is designed for users with ISPs supporting and enabling multicast distribution. Where this is not supported, Unicast streams will be offered.

User Preferences

The User Preferences are a set of centrally managed options and personalisation data which are attached to the registered profile of a user (as setup through SSO) and set as default on collection.

Accessibility preferences will be stored locally and online, and will only display/be editable if a registered user is online.

Settings

The 'Settings' area on an interactive player system page will allow a user to edit their local settings information, defined by both registered and unregistered users, the data held locally and machine specific.

The download component will contain some preferences independent of the interactive player system's main preferences (subtitles on/off for QAT).

Accessibility

The interactive player system Services will support BSL, Audio Description, Transcript and Subtitled files, where available, and the interface will comply with the Broadcaster's Accessibility Standards and Guidelines.

User accessibility options will be stored locally (machine specific) and will apply to all views of interactive player system/interactive player system content whether the user is on or offline.

Selecting a checkbox on the download options page will not automatically update the User Preferences (online and offline).

Internal Syndication Toolkit

The Internal Syndication Toolkit (IST) is a centralised solution to allow users and internal systems around the Broadcaster to incorporate Calls to Action (CTAs) into services so that they can promote the interactive player system content easily, effectively and efficiently.

For QAT, the IST finds relevant interactive player system content within the system and defines automated Programme Feeds to drive CTAs/dynamic lists for interactive player system Home.

Interfaces/Programme Feeds

Such functionality is provided in certain examples.

Calls to Action

Further information about Calls to Action is described herein. CTA for QAT will be: Watch or Listen Live, Watch or Listen Now (Again), Download Now, Book Now.

External Syndication Toolkit

Such functionality is provided in certain examples.

Content

Content Structure (Brands, Series, Episodes, Versions)

The basic structure of content is to support the following key features:

Brand, series groups and seasons will be supported

Episodes within a series (and the episode order) should be able to be determined It is possible for media to not be within a series.

Media will be collated by an "Asset Concept" which refers to and groups all the versions of a particular episode or individual media.

Service/Channel Brands

Brands supported within the interactive player system QAT are illustrated in the core requirements document.

Media Packaging

Media Packaging will consist of the media package Components, Structure, Media Management and Transfer to Distribution and Subtitling.

Media Package Components

Components of the QAT media package will be structured and released as a single file, grouped as a Media Asset, Subtitle file, Metadata and Thumbnail images.

Media Package Structure

The media will be released as a single file. The subtitle file, where available, will be embedded into the .WMV file downloaded by the interactive player system.

Media Management and Transfer to Distribution

A request from to a supplier to a supplier at a point when all assets are deemed ready to be available will trigger a publish/packaging event.

After the "availability notice" has been passed only a revoke-and-republish process can change the information making up the 'package'.

Subtitling Issues

QAT will use SAMI to encode subtitles on the assumption that the bugs discovered in Windows Media Player will be fixed in the future.

The supplier will provide subtitle files, whenever available, in EBU STL format and also embed the subtitles within the media file as hidden/closed captions.

Content Identifiers

Interactive Player System Persistent ID (pid)

The Persistent id is a token that can be passed amongst interactive player system components to identify a programme, or programme group.

Figure 100:

Further aspects relating to the interactive player system, interface and player are now described with reference to the following example, which is described with reference to FIGS. 27 to 100. Certain aspects relating to the examples as described above do however also apply to this example.

Interactive Player System: Home Page/Left Hand Navigation

As shown in FIG. 52, the default or home page of the interactive player system user interface provides the following navigation icons or tabs:

Highlights (or Home): Default Entry Screen.

6 images in a "grid" view (editorially selected). No channel filter. Alternatively, 9 images in a "grid" view (editorially selected). If there is only 1 page the use of channel sort will not be required.

Last 7 Days: 'Pop Up' Calendar View.

The user can sort by morning/afternoon/evening and filter by channel. Default positions are 'evening' and 'All channels' as they offer primetime content.

The time of day sort option will always default back to evening if the user changes either day or channel filter (or both).

The channel filter will stick when a user swaps between days within a navigation session.

If the user changes menu navigator option, and then goes back to last 7 days, it returns to the default state.

Figure 53:
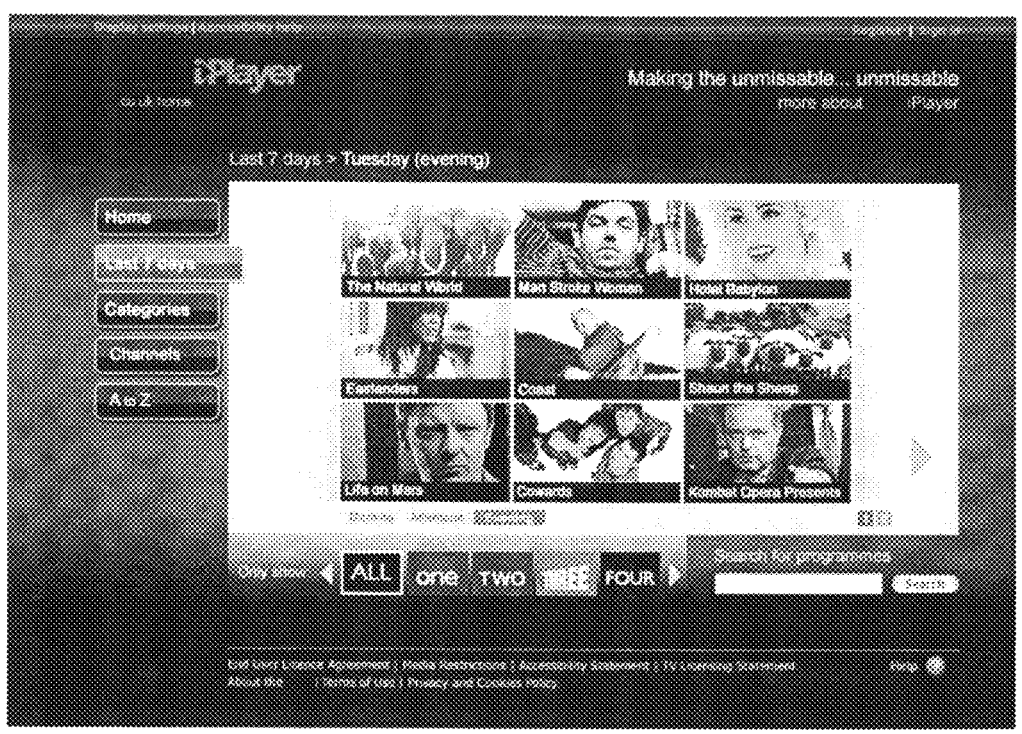
FIG. 53 shows an alternative EPG interface.
Figure 59:
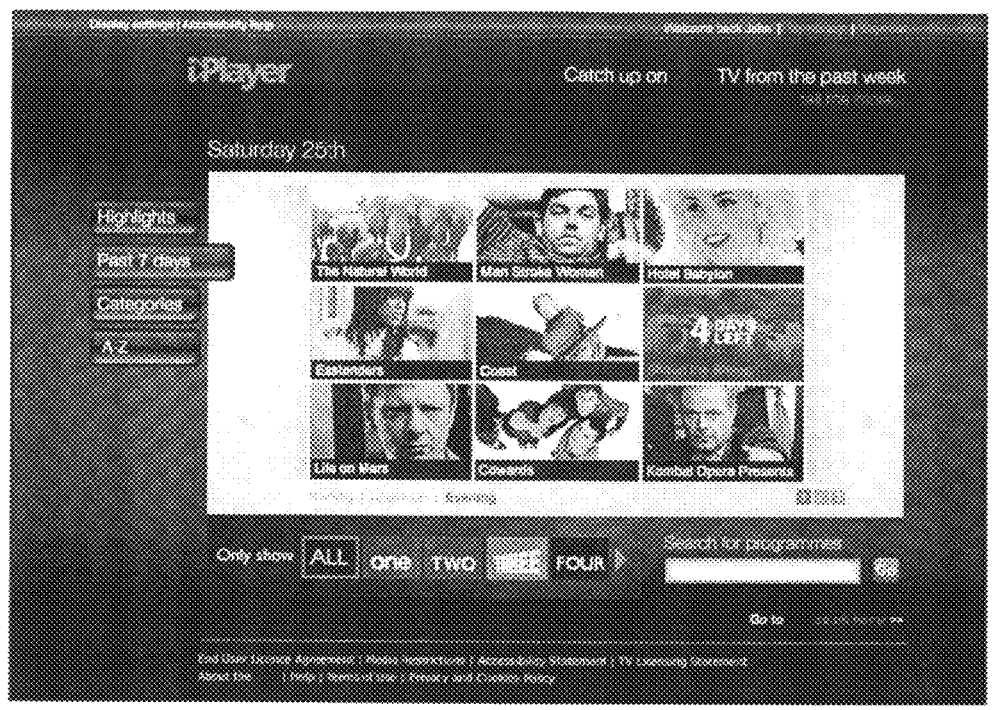
FIG. 59 shows a further EPG screen.

FIGS. 53 and 59 show alternative last 7 days screens.

Categories: 'Pop Up' with 9 Top Level Items.

The user can sort by most recent/A-Z, and filter by channel. Default positions may be 'most recent' and 'All channels'.

The channel filter will stick when a user swaps between categories within a navigation session.

Sort by most recent/A-Z will stick when a user swaps between categories or channel filters within a navigation session.

If the user changes menu navigator option and then goes back to categories, it returns to the default state.

Figure 54:
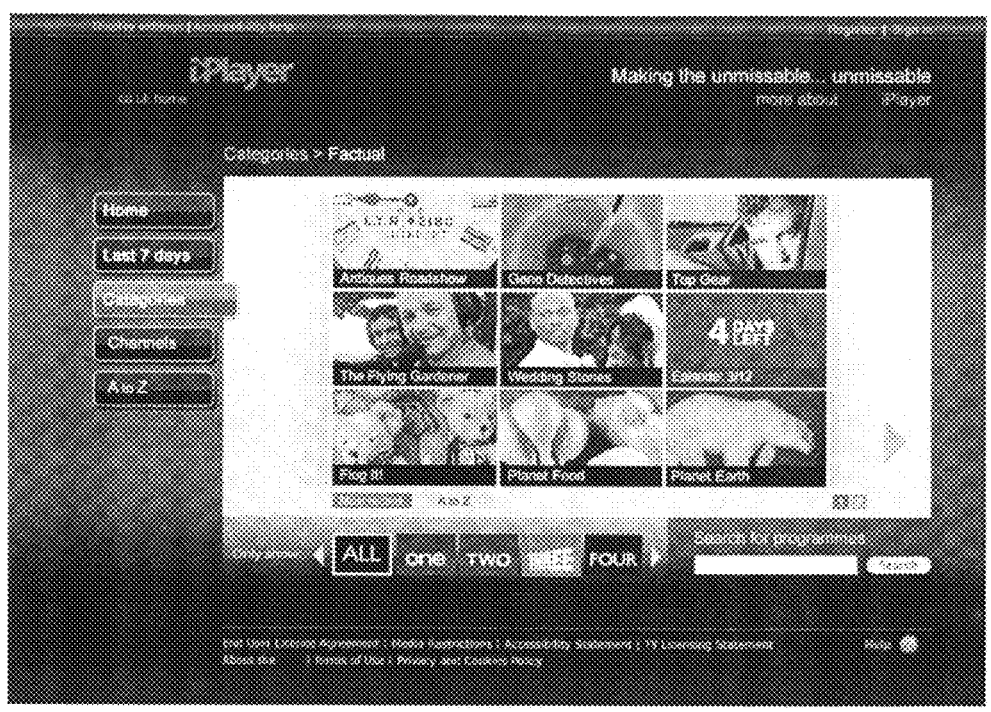
FIG. 54 shows a categories screen.

FIG. 54 shows a categories screen.

A to Z: 'Pop Up' with Choices from AB, CD, EFG etc.

The user may filter by channel only, default position is 'All channels'

The channel filter will stick when a user swaps between letters within a navigation session.

If the user changes menu navigator option and then goes back to A to Z, it returns to default state.

If a channel is not available the channel brand fades back i.e. Channel Three is only available from 19:00 in the evening.

Figure 56:
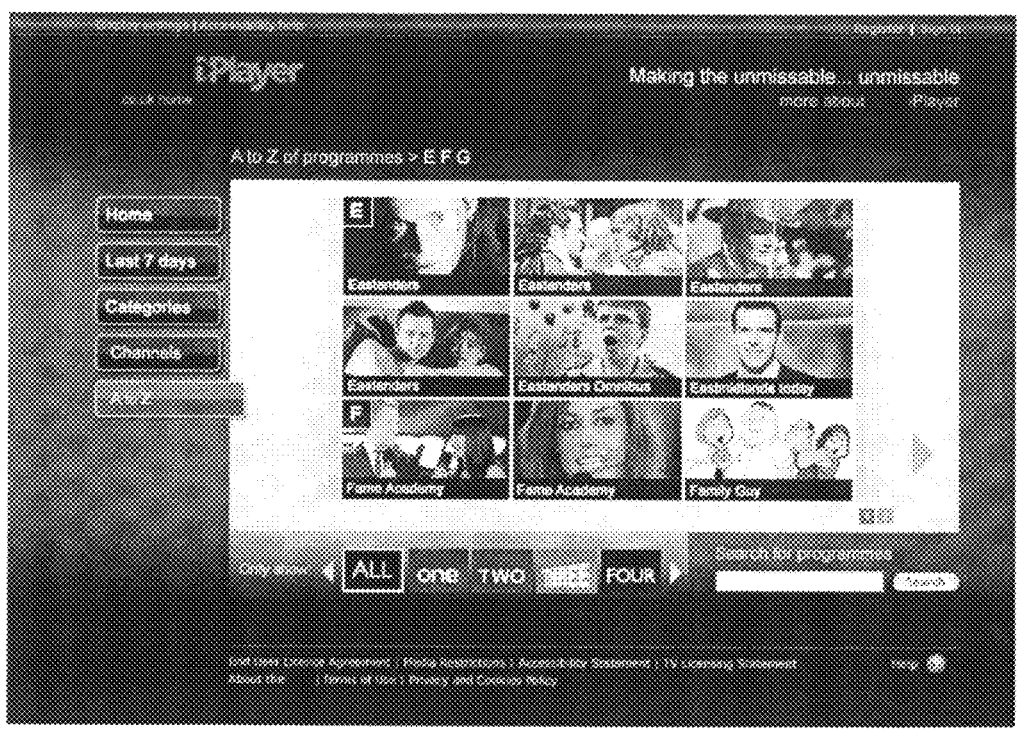
FIG. 56 shows an A-Z screen.

FIG. 56 shows an A-Z screen.

Search:

Search results may be displayed in the 9 'grid' view. Sort functionality may change in search results—by most recent only, and filter by channels. Alternatively or additionally, sort functionality may change by A-Z and/or by expiring.

Figure 57:
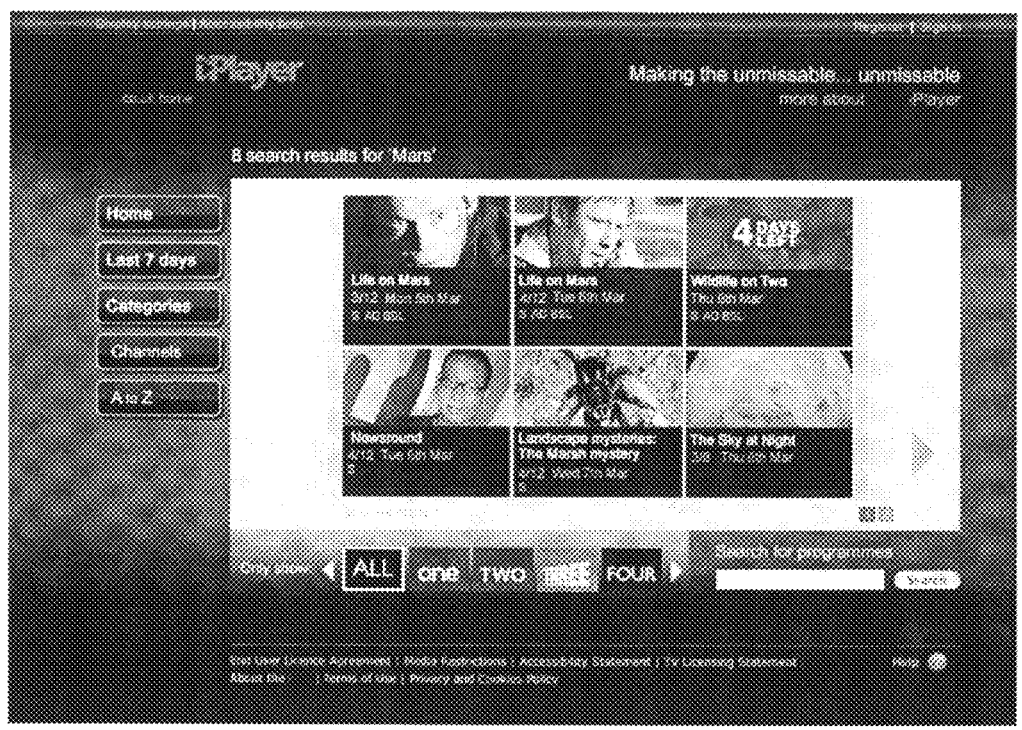
FIG. 57 shows a search results screen.

FIG. 57 shows a search results screen.

Sort Functionality:

The default setting may be by time (from first image top left in the "grid") Morning, Afternoon, and Evening are the basic sort functions in "7 day" view. Users can sort by channel but only one at a time or "show all". If channel is not available, channel brand drops back i.e. Channel 3 is only available from 19:00 in the evening. If selecting a channel and then changing the time of day the user will still be looking at the selected brand ordered by Morning, Afternoon, Evening. The proprietor brands will contain the regional variations (i.e. Channel 1 regions will not be displayed separately).

Items on the interactive player system homepage or interface screen may include:

Left hand navigation

Highlights

Last 7 days

Categories

A to Z

What is interactive player system (Two modes of display: prominent initially, and less prominent once registered)
Search
Accessibility options
Help (deep link)
Footer (on all pages)
Page title (crumb trail) (may reflect what user has selected i.e. 7 days etc.)
Sort functionality
Page left/right
Log in (waiting for confirmation)
Page 1 of . . .
Link to library
Links to other websites
Browse
Legal notices.

Images and Programme Description:

Image size may be: 150×84 (medium). If an image is not available the default interactive player system image may be displayed (the default image should preferably be medium sized).

Figure 27:
FIG. 27 shows a categories screen.
Figure 28:
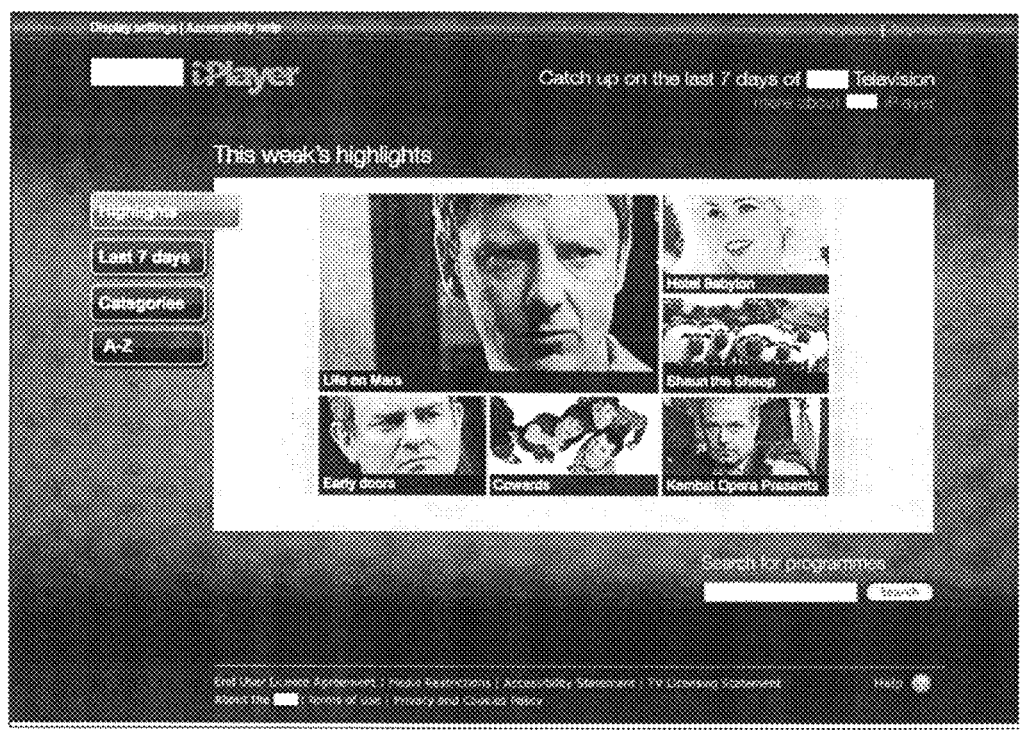
FIG. 28 shows a highlights screen.

In FIG. 27, title_area_1 27.1 indicates the OFF STATE and displays the title at the top level of any programme's hierarchy. Title_area_1 runs on a single line. Should the title be longer than the space allows then the remaining words will be cut off Title_area_2 27.2 indicates the ROLLOVER STATE and displays the title at the lowest level of the programmes hierarchy. The data displayed in title_area_2 can wrap on to two lines. If this title exceeds the two lines the remaining words of the title may be cut off FIG. 28 shows the highlights section or screen which may be editorially selected or manually updated.

Figure 29:
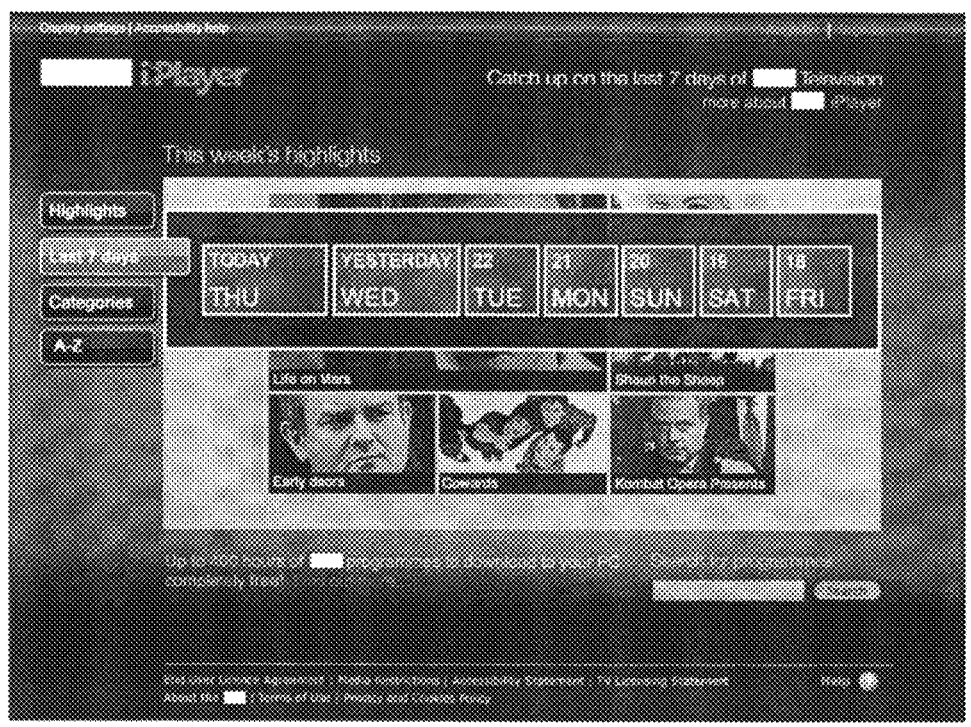
FIG. 29 shows a past 7 days screen.

FIG. 29 shows the Past 7 days section or screen. When a user clicks Past 7 days a calendar pops up and a highlight follows the cursor. Once selected the grid will be updated with day selected and calendar will disappear.

Figure 30:
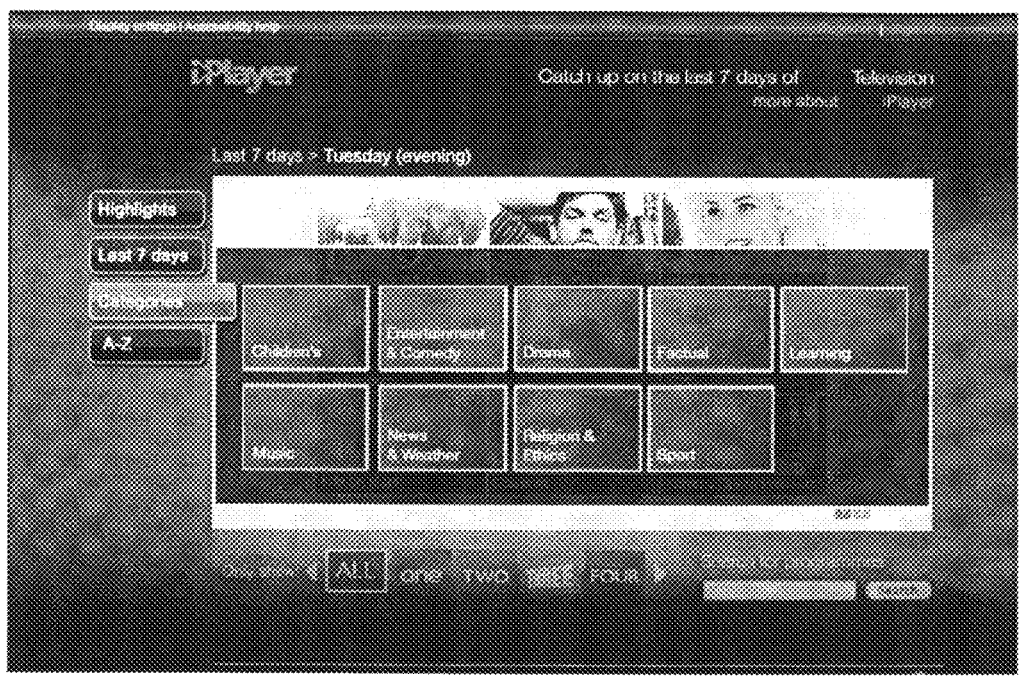
FIG. 30 shows a categories screen.

FIG. 30 shows the categories section or screen. When the user clicks on categories an overview of top level categories is available. Once selected the grid will be updated with content and the most recent will appear top left.

Figure 31:
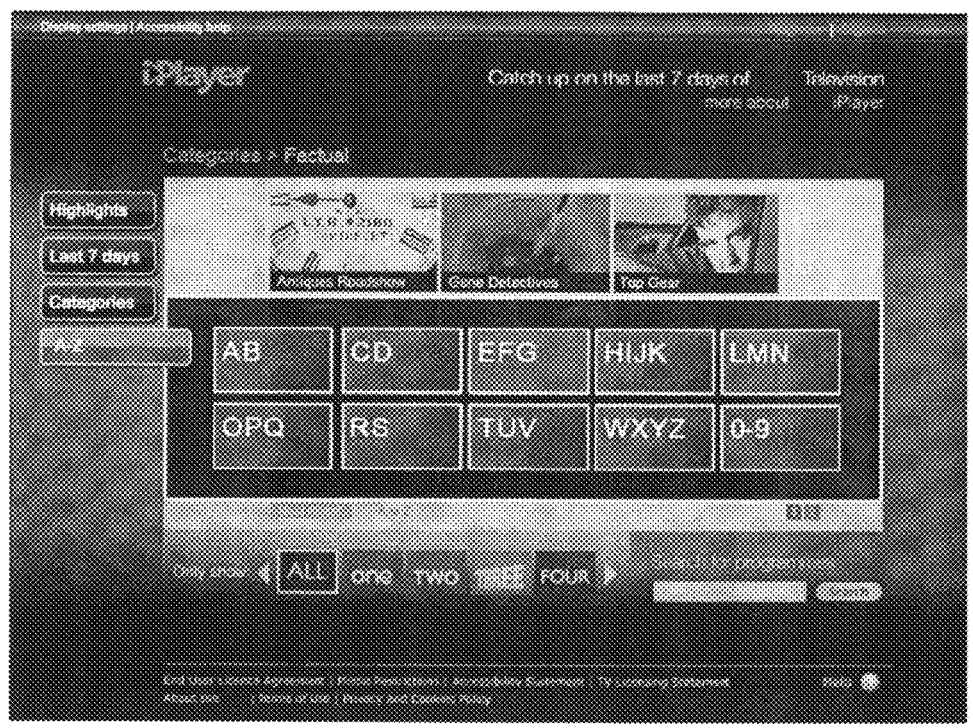
FIG. 31 shows an A to Z screen.

FIG. 31 shows the A to Z section or screen. When you click A to Z, the user will press the relevant letter grouping and content will be sorted accordingly.

Figure 32:
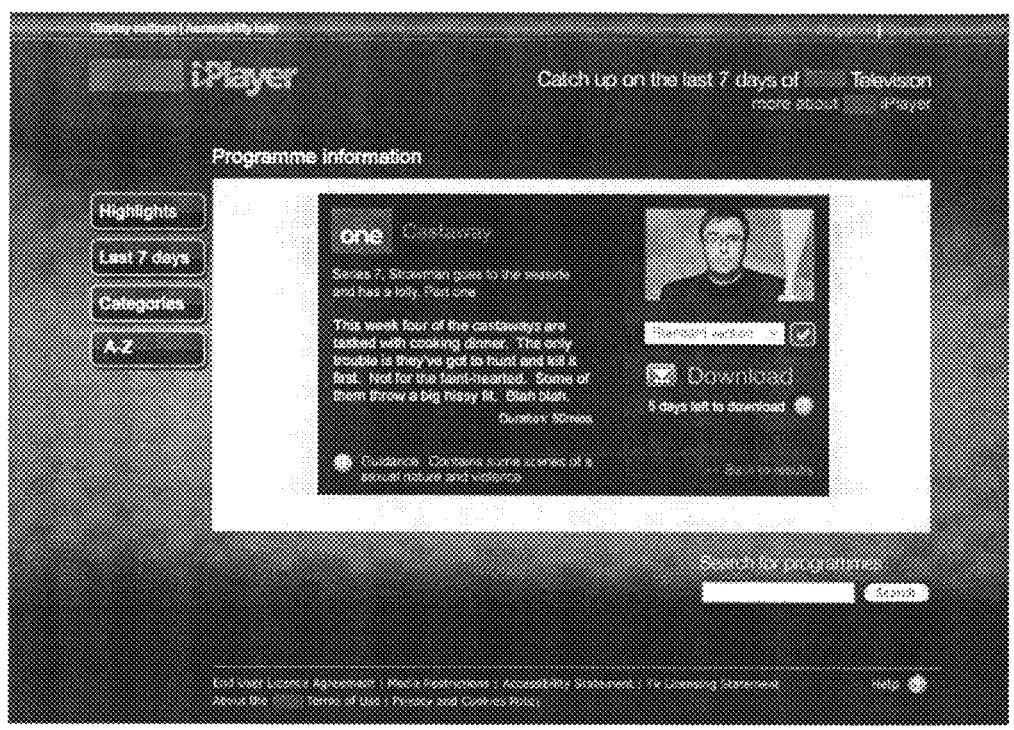
FIG. 32 shows a programme information section or screen.
Figure 60:
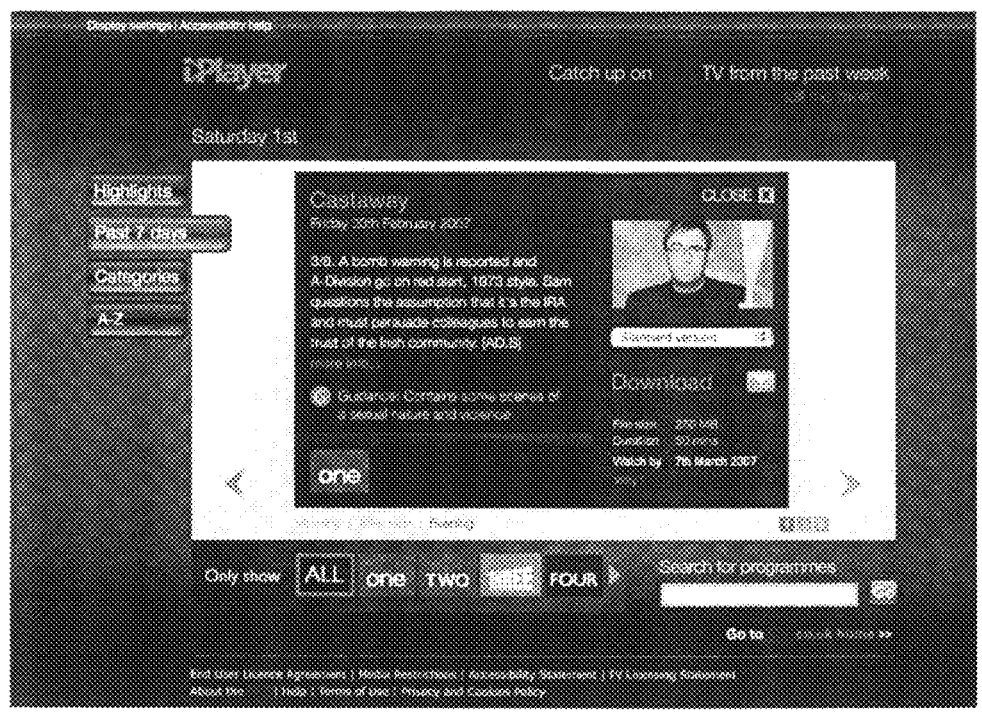
FIG. 60 shows a further EPG screen.

The mini item page is shown in FIGS. 32 and 60. A programme description may be given in which case the channel/programme view description is a short version (200 characters) and does not include a detailed description of the programme (cast etc.) or transmission history. A link may be available to an extended version.

A Call To Action (CTA) may be a call to download, a call to view etc., accordingly: a user arrives at mini item page and has an option to download. Download feedback messages may include: downloading starting (checking your status), and downloading (check progress in your library). Checking may be in accordance with the system checker (described below).

The CTA may alternatively have the following states:
1. User arrives at channel view page and has an option to download.
2. Once downloaded the CTA will change to an "in progress" message.
3. If the user is not registered the system detects this and will offer the user the opportunity to go to the register page.
4. Download completed.

Around four percent of interactive player system content may require variations of individual programmes (British Sign Language etc.). When programme versions are available a drop down with the options available is displayed the page. If no versions are available the drop down will not be displayed. A button next to the drop down may be included to meet accessibility needs.

Items on the programme information page may include:
Short programme description (200 characters).
Guidance with denton text.
proprietor logo—master brand.
CTA.
Help text (link icon).
Drop down programme versions (BSL).
Link back to interactive player system home to continue browsing (confirm).
BACK.

Figure 58:
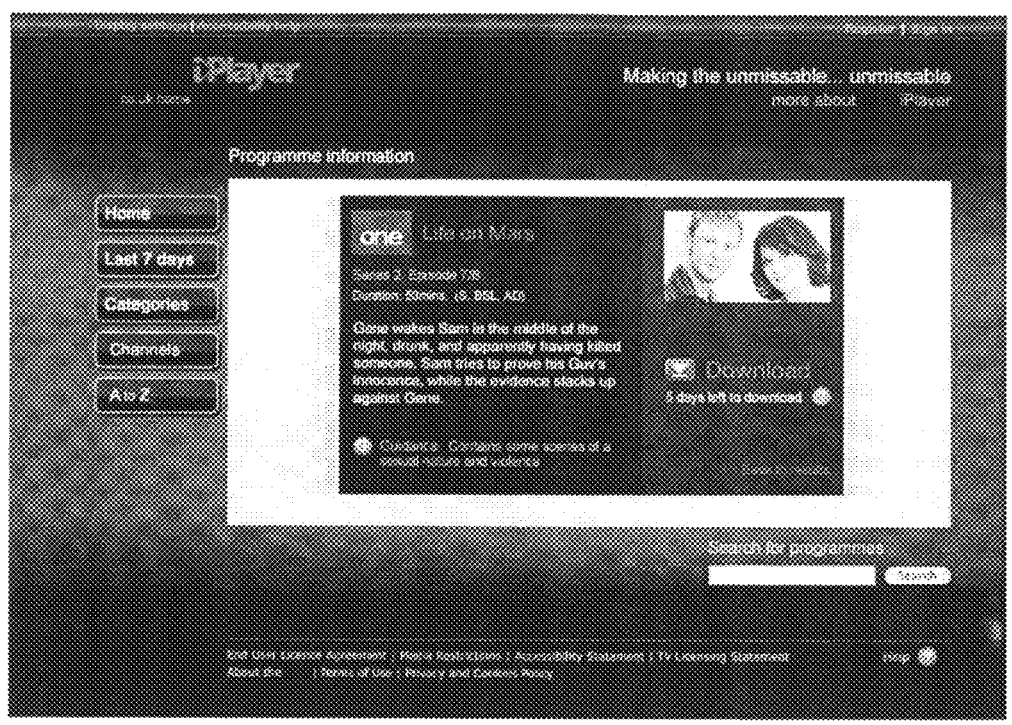
FIG. 58 shows a programme information screen.

FIG. 58 shows a program information screen or mini item page.

Search Results

Figure 33:
FIG. 33 shows a search results screen.

As shown in FIG. 33, search results are presented in the grid view but there are a few additions to the grid:

Programme description is over ⅔ lines.
On roll over and/or days left to download are displayed. Additionally or alternatively, time of transfer or expiry date may be shown.

When the cursor is over an image and it is to expire the days left may be displayed on top of image.

If the user performs a search, the search term should stay in the search box until they perform another search. However, if they swap to another menu navigator option, then the search box should empty.

Channel filter: the user may filter results by channel. The channel is the master brand and may include a number of different channel names.

Sort function: alternatively or additionally, the user may sort the content according to: most recent, about to expire, A-Z.

The grid: if the grid is not complete with 6 or 9 images, grey boxes will indicate containers so that users will not think the page has failed to load completely. If searching for GenericSoapShow and episode images are not available then series image is repeated in the grid.

Figure 55:
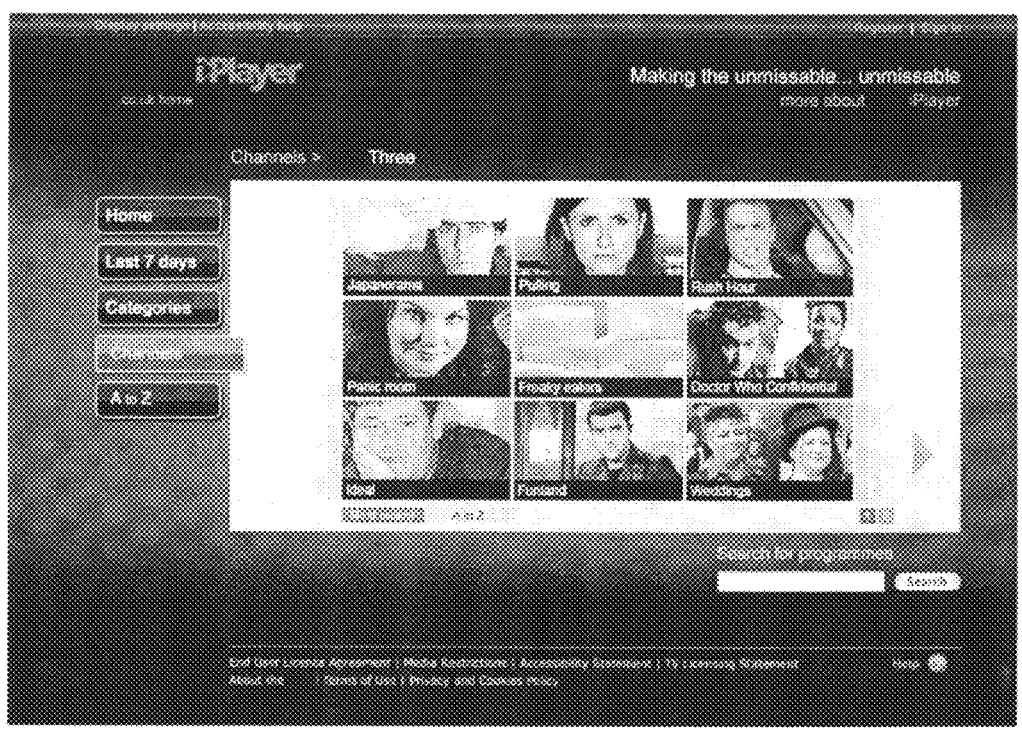
FIG. 55 shows a channels screen.

FIG. 55 shows a channels screen.

System Checker

Figure 34A:
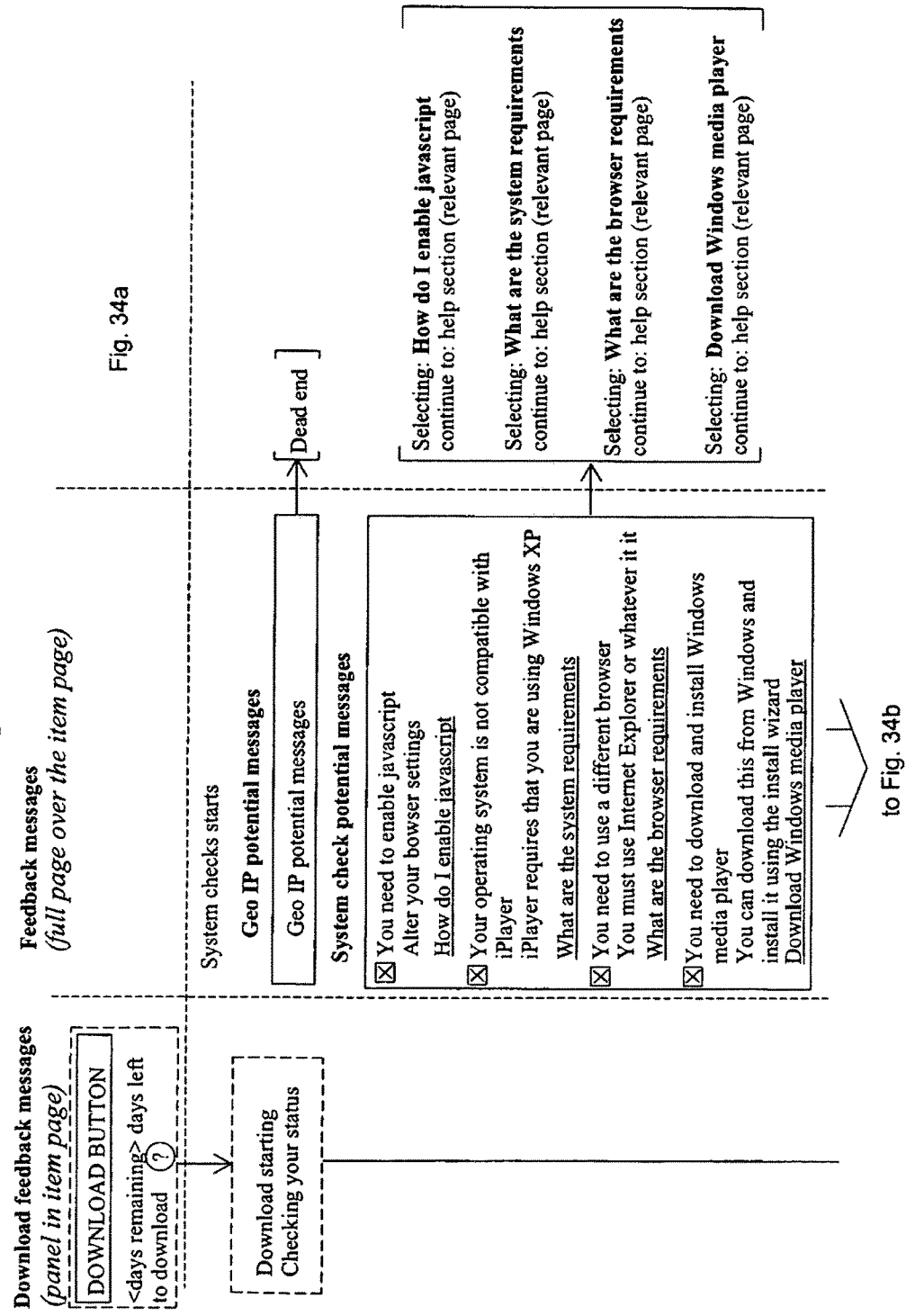
FIG. 34 is a schematic flow chart of a system checker.
Figure 34B:
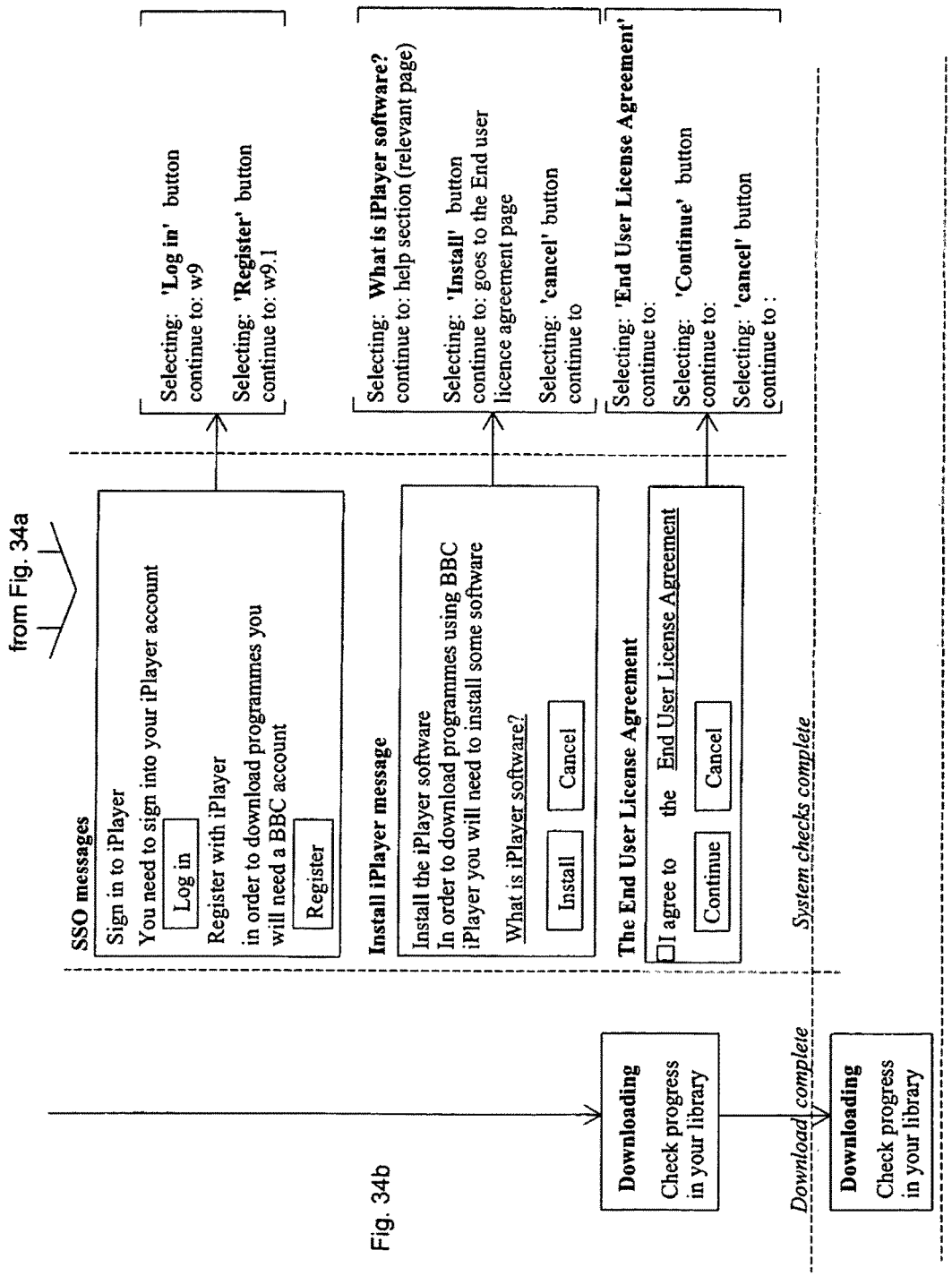

For the system checker and as shown in FIG. 34 several feedback messages are required.

These may include: downloading starting (Checking your status), and downloading (Check progress in your library). If the system does not detect any problems this is the only message the user needs to see. Potential system check messages include:

You need to enable Javascript—Alter your browser settings.
Your operating system is not compatible with interactive player system—interactive player system requires that you are using Windows XP.
You need to use a different browser—You must use Internet Explorer (or whichever browser is required).
You need to download and install Windows media player—Your can download this from Windows and install it using the install wizard.

Other messages may include: SSO Messages, install interactive player system message, and/or the End User Licence Agreement.

Figure 35:
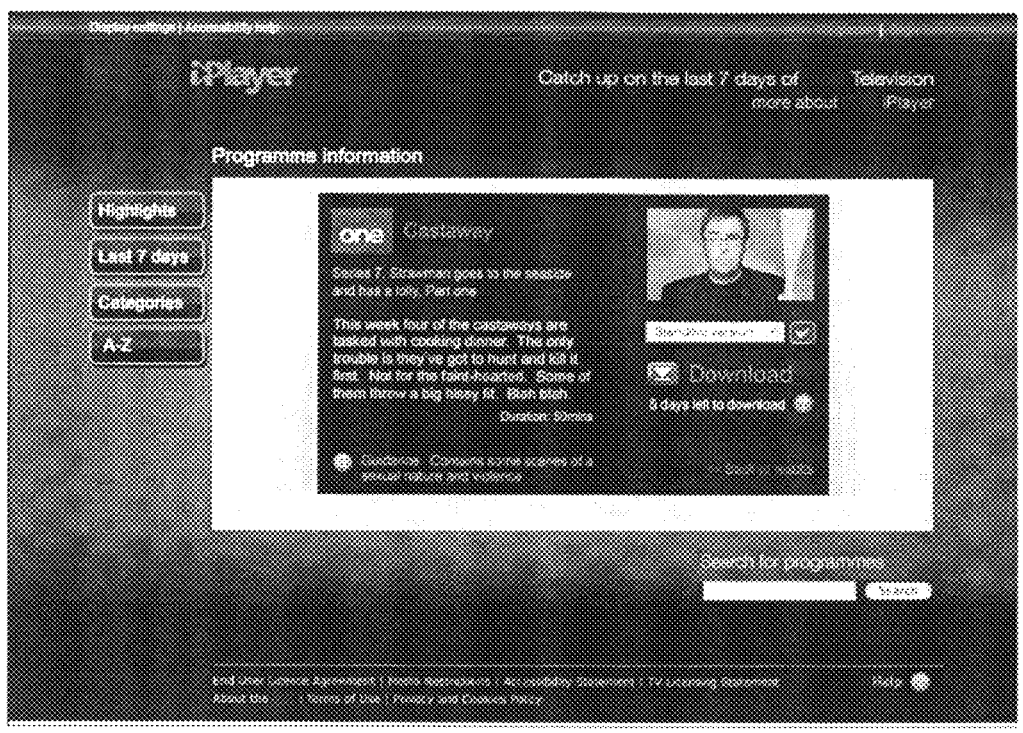
FIG. 35 shows a mini item page.

FIG. 35 shows the mini item page including versions dropdown and featuring: versions, tick box, CTA, 5 days to download, help icon (deep link), and the back key.

Figure 36:
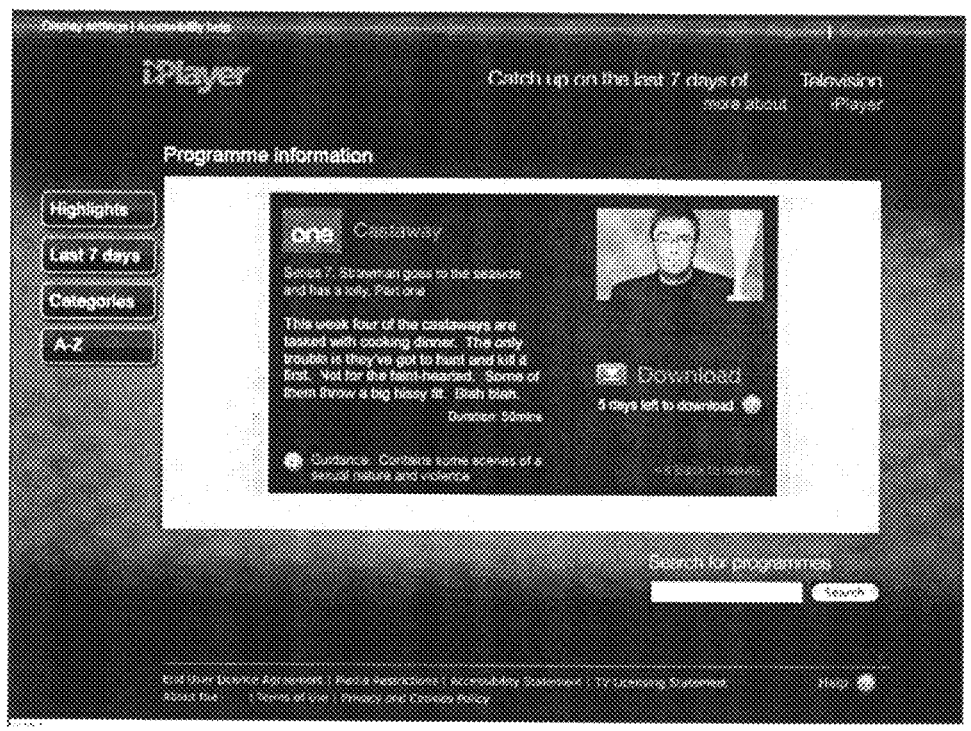
FIG. 36 shows another view of a mini item page.

FIG. 36 shows the mini item page including versions dropdown and featuring: CTA, 5 days to download, help icon (deep link), and the back key.

Figure 37:
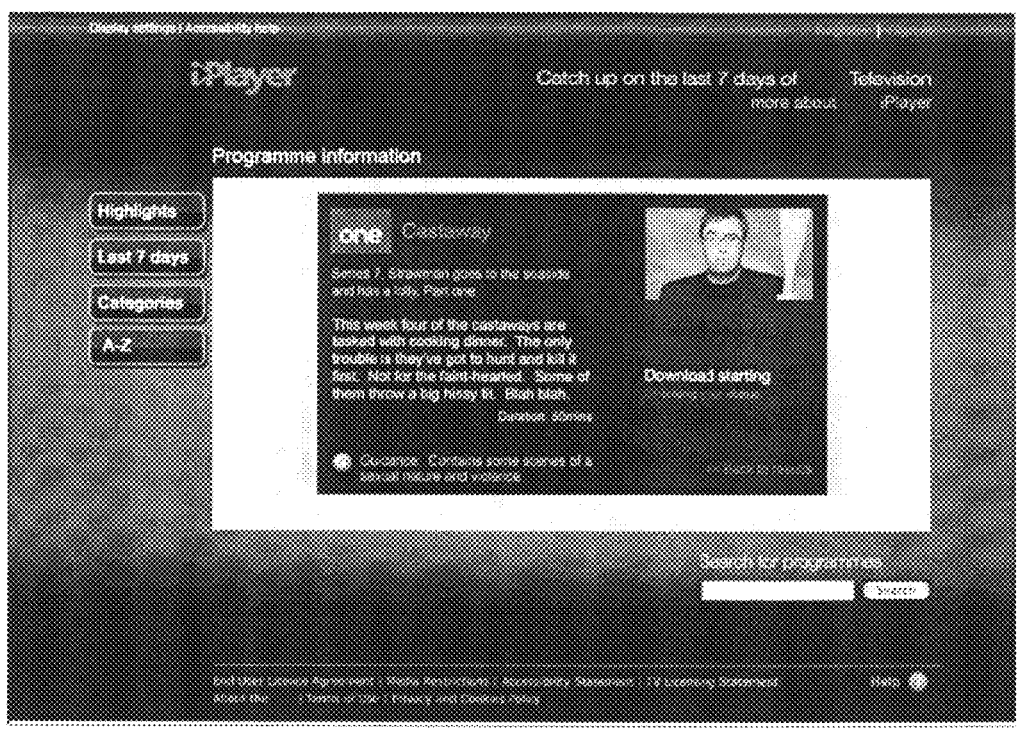
FIG. 37 shows a further view of a mini item page.

FIG. 37 shows the mini item page including system checker feedback featuring: downloading starting (checking your status), and the back key.

Figure 38:
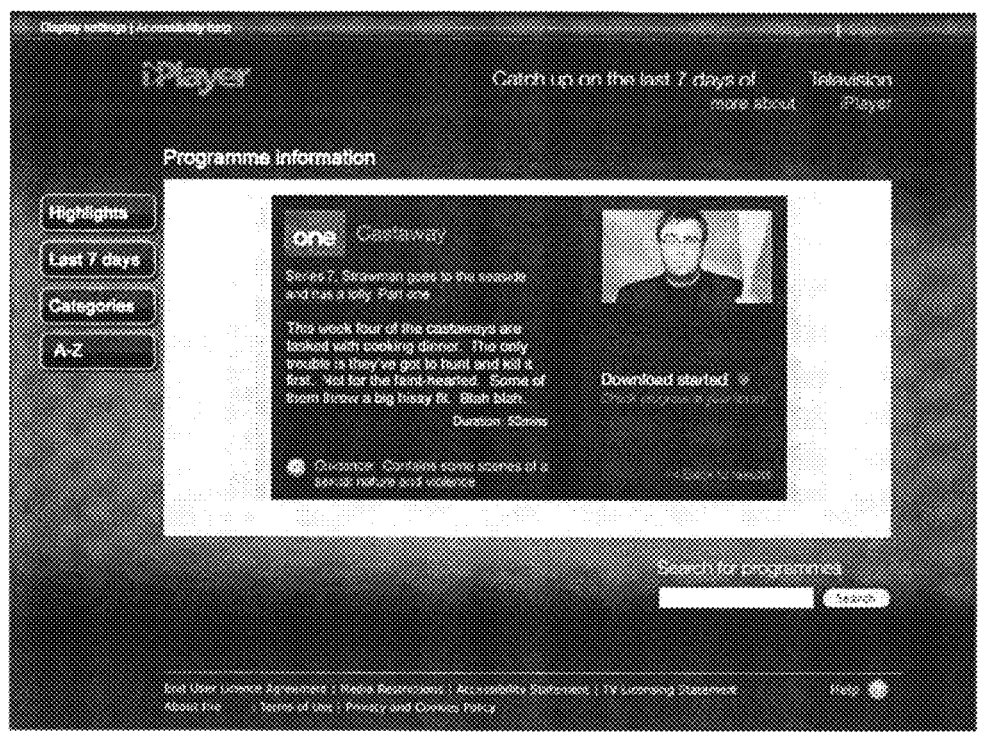
FIG. 38 shows a further view of a mini item page.

FIG. 38 shows the mini item page including system checker feedback featuring: downloading starting (check progress in your library), and the back key.

Figure 39:
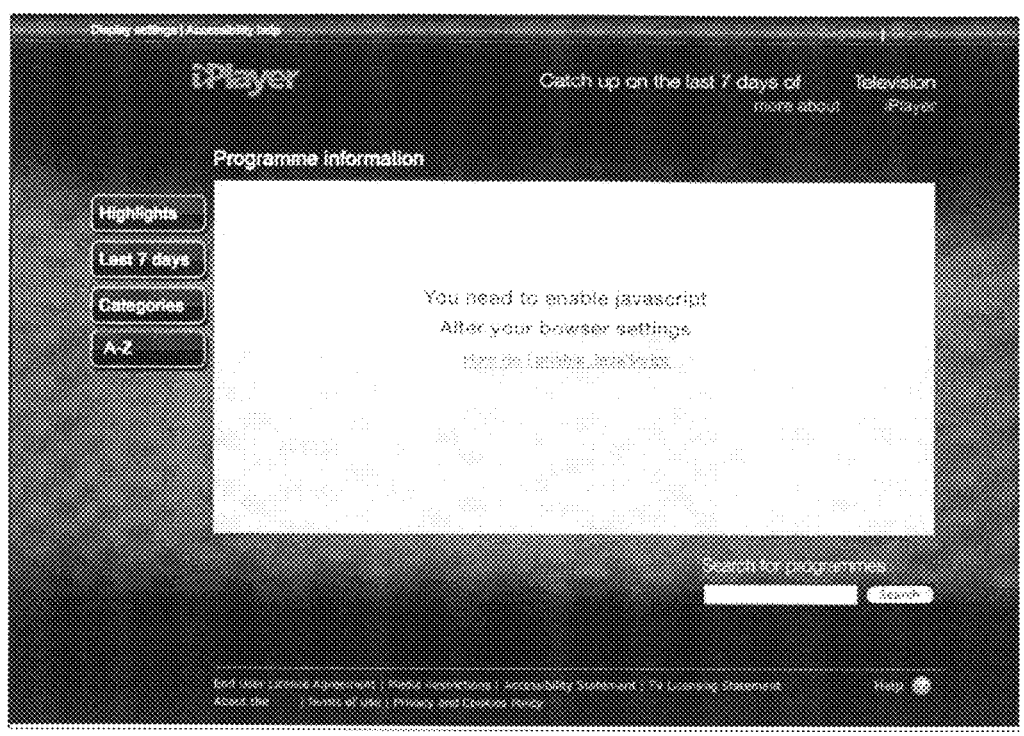
FIG. 39 shows a mini item page including a system checker message.

FIG. 39 shows the mini item page including a system checker message featuring a standard error page and a deep link to help.

Sign In

Figure 40:
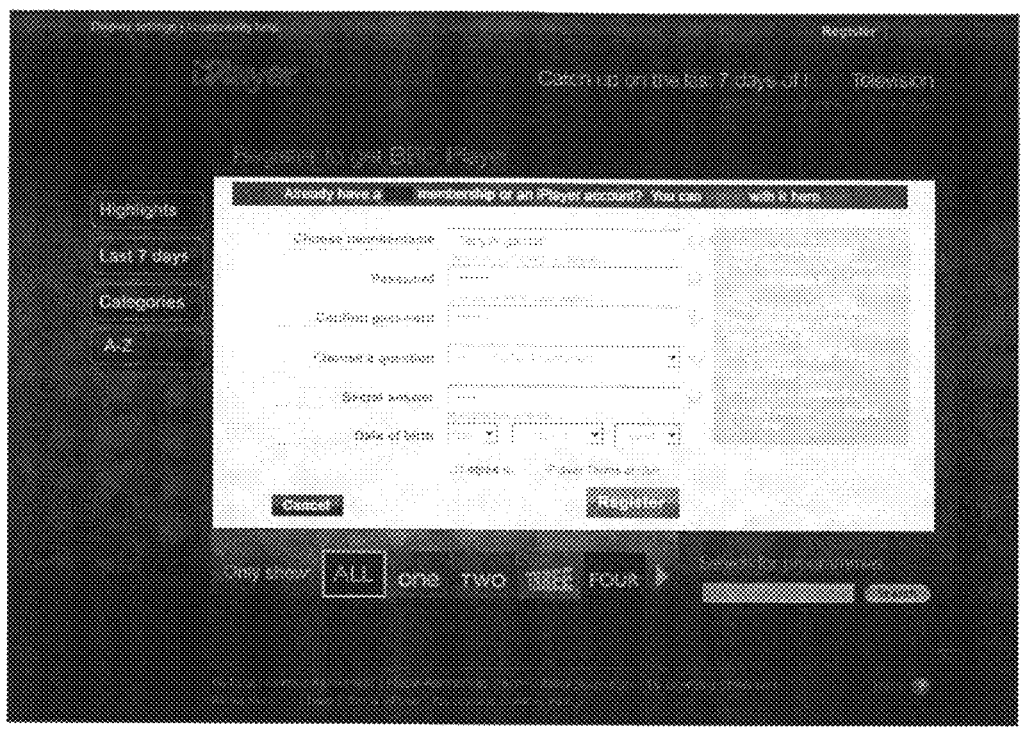
FIG. 40 shows a main registration screen.
Figure 41:
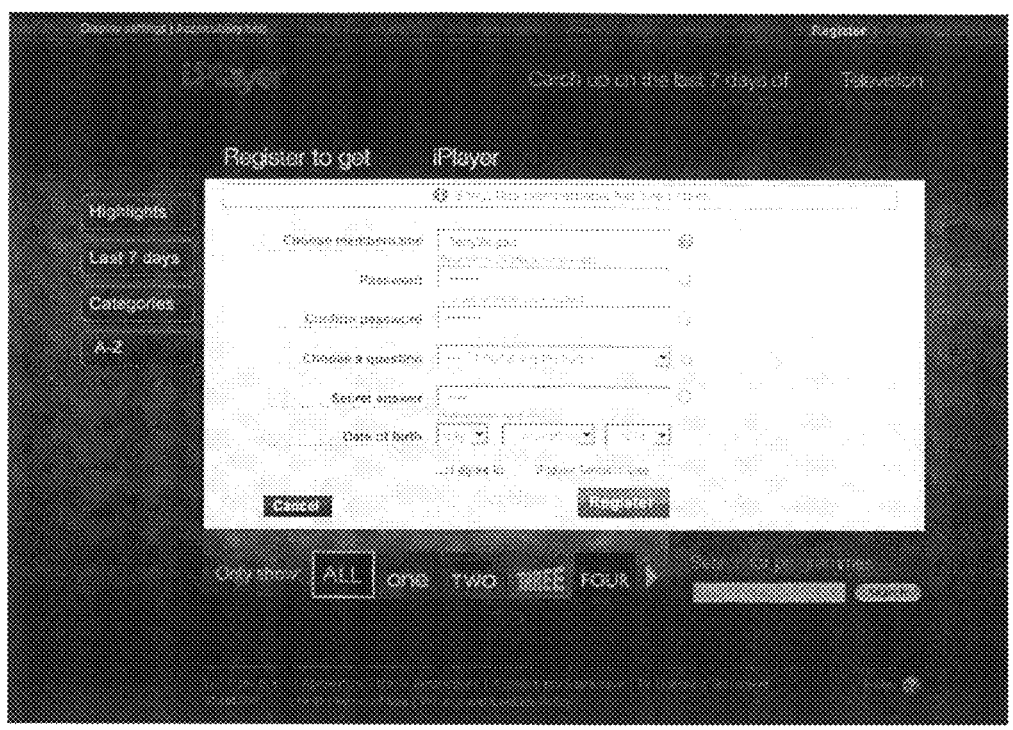
FIG. 41 shows a further registration screen.

FIG. 40 shows the main registration screen. This is accessed when either the user selects 'download' on a piece of content (the majority of users will get to it this way), or when they click the register link in the top bar. The main registration screen:

Appears as one page within the main content window.
Includes the minimum number of entry fields possible from the Single Sign On (SSO) 'adult' version.
May feature an all error flag e.g. 'This membername is already taken' appears in context to the right of the entry fields (see FIG. 41).

When the user selects 'register now' they are given a confirmation message and are asked to download the (Peer-to-Peer) software. If the user selects 'cancel' they are returned to the page they were on before they entered the registration process.

Confirmation and Sign In Screen

Figure 42:
FIG. 42 shows a registration confirmation screen.

FIG. 42 shows the registration confirmation screen which appears after the user clicks 'register now' on the previous screen. The user then has the option to install the Peer-to-Peer download library software or to come back and do that later. After installation is complete, or when 'do it later' is selected, the user is returned to the page that they were on before they entered the registration process. The status bar may also change.

Figure 43:
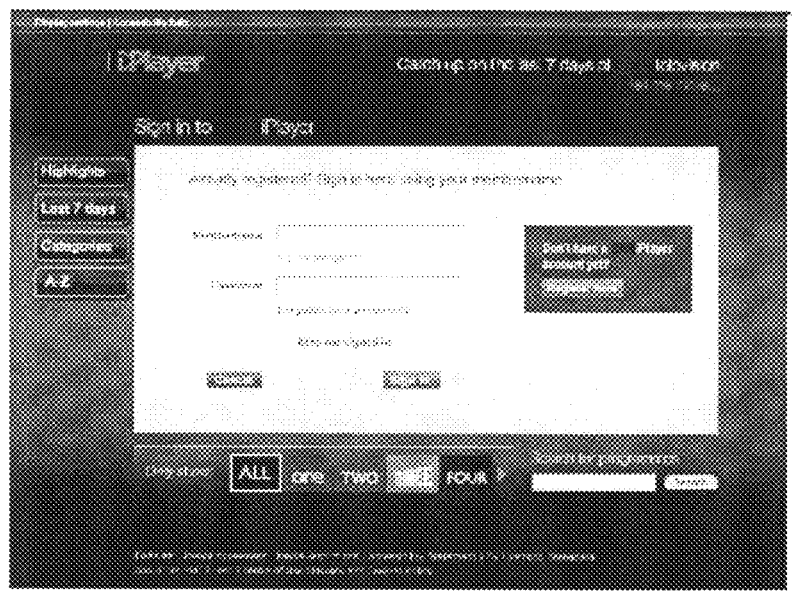
FIG. 43 shows a sign in screen.

FIG. 43 shows the sign in screen that is accessed when the user selects 'sign in' on the registration page or from the links in the top bar. It appears as one page within the main content window. If the user has forgotten his password he is prompted to confirm his membername and secret question/answer. After the user has signed in they are returned to the page they were on before they entered the sign in process. The status bar may also change.

Figure 88:
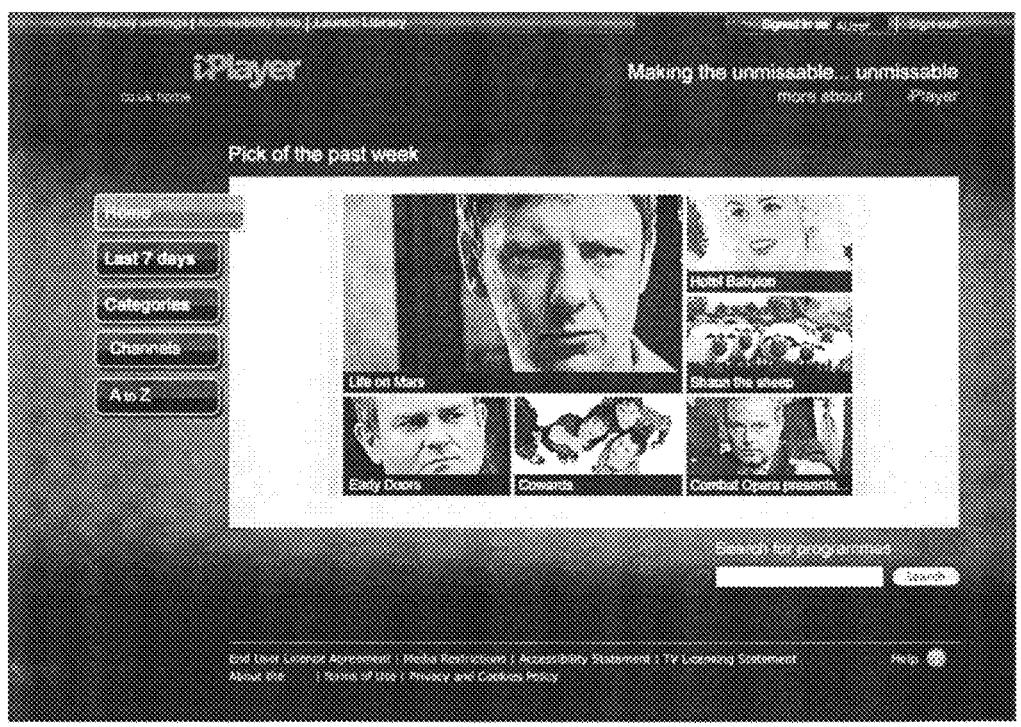
FIG. 88 shows a homepage interface following sign in by a user.

Following registration/sign in, the graphical indication at the top of the screen may change from 'Register|Sign in' (as shown, for example in FIG. 53) to 'Signed in as user|Sign out', and also enable a user to access the download manager/library via a 'launch library' graphical indication, as shown in FIG. 88.

Figure 91:
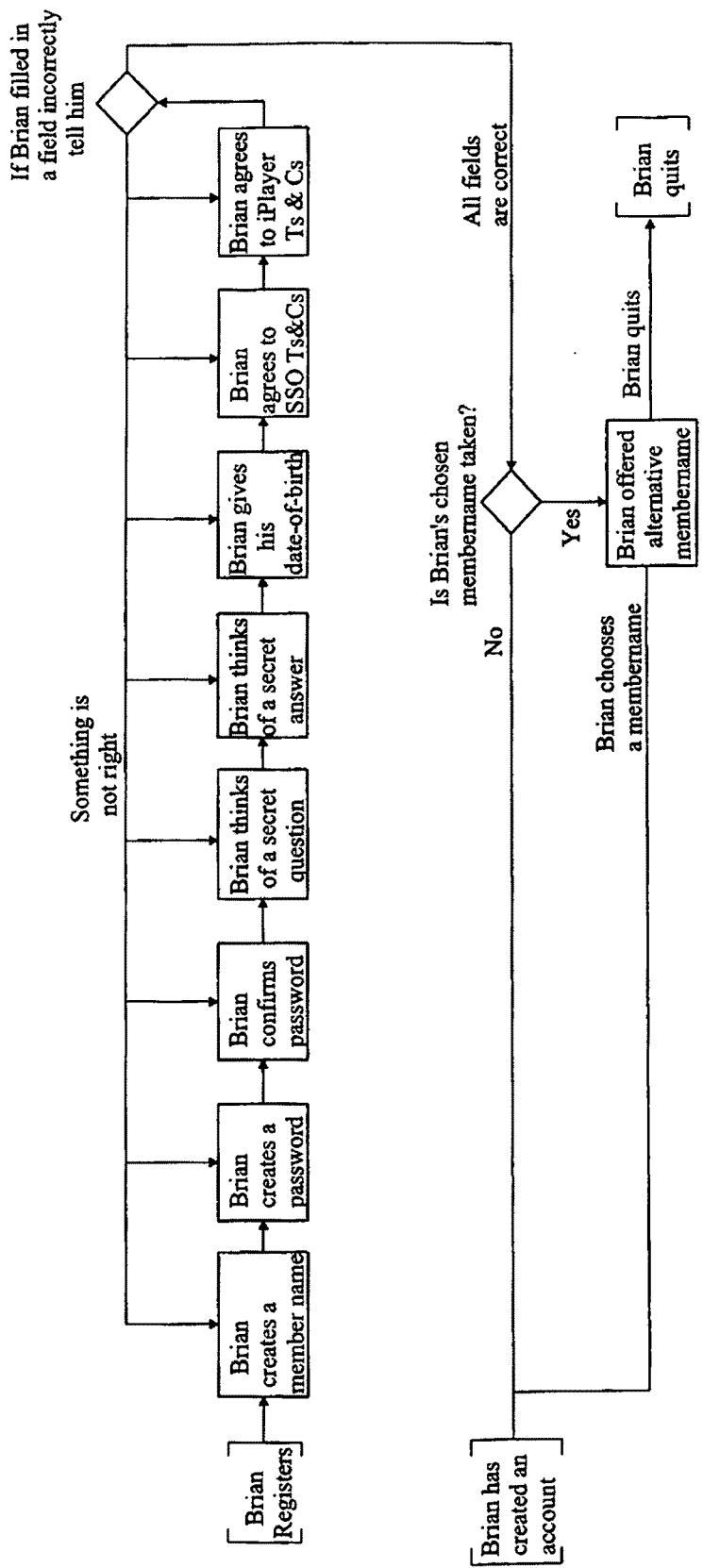

FIGS. 90 and 91 illustrate registration flow.

Extra Details Required

Figure 44:
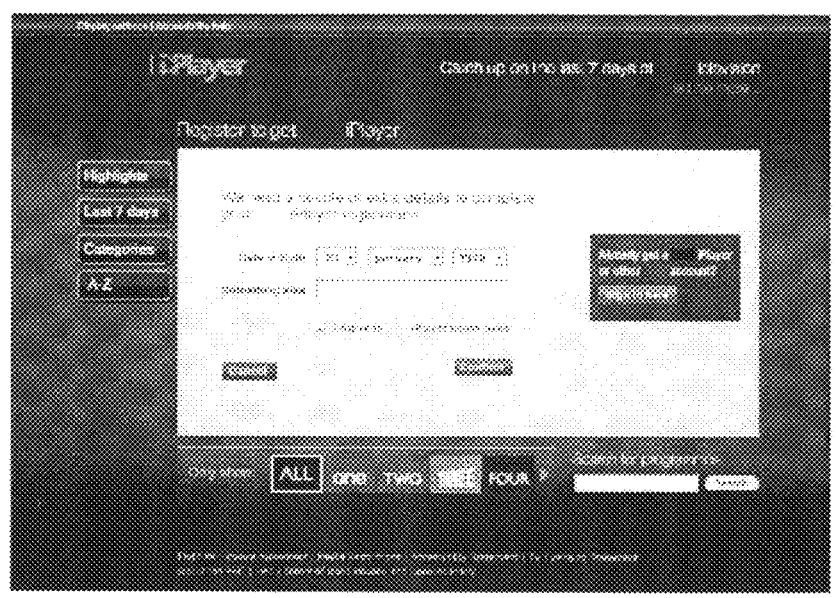
FIG. 44 shows a registration screen.

FIG. 44 shows the extra details required screen which appears when a user who has an existing non-interactive player system SSO account signs in to interactive player system. In addition to the 'I agree to house rules', the extra details required screen will contain fields for additional data that may be required by the extra details required screen. When the user selects 'confirm' they are given a registration confirmation message and are asked to download the (Peer-to-Peer) software. If the user selects 'cancel' then they are returned to the page that they were on before they entered the sign in process.

Console and Download Manager

Figure 45:
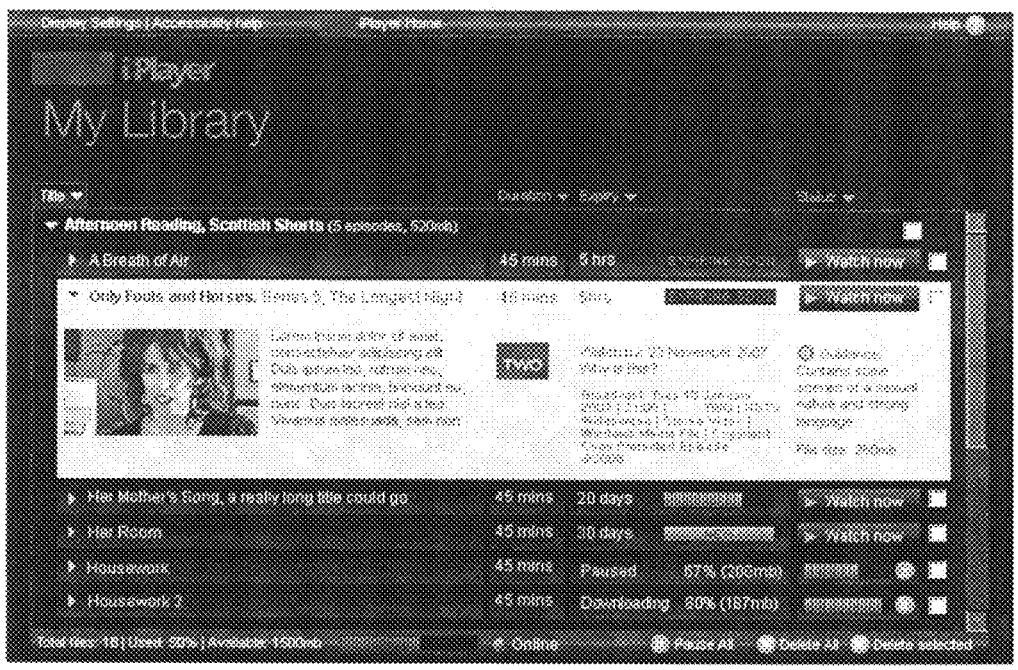
FIG. 45 shows a download manager interface.
Figure 46:
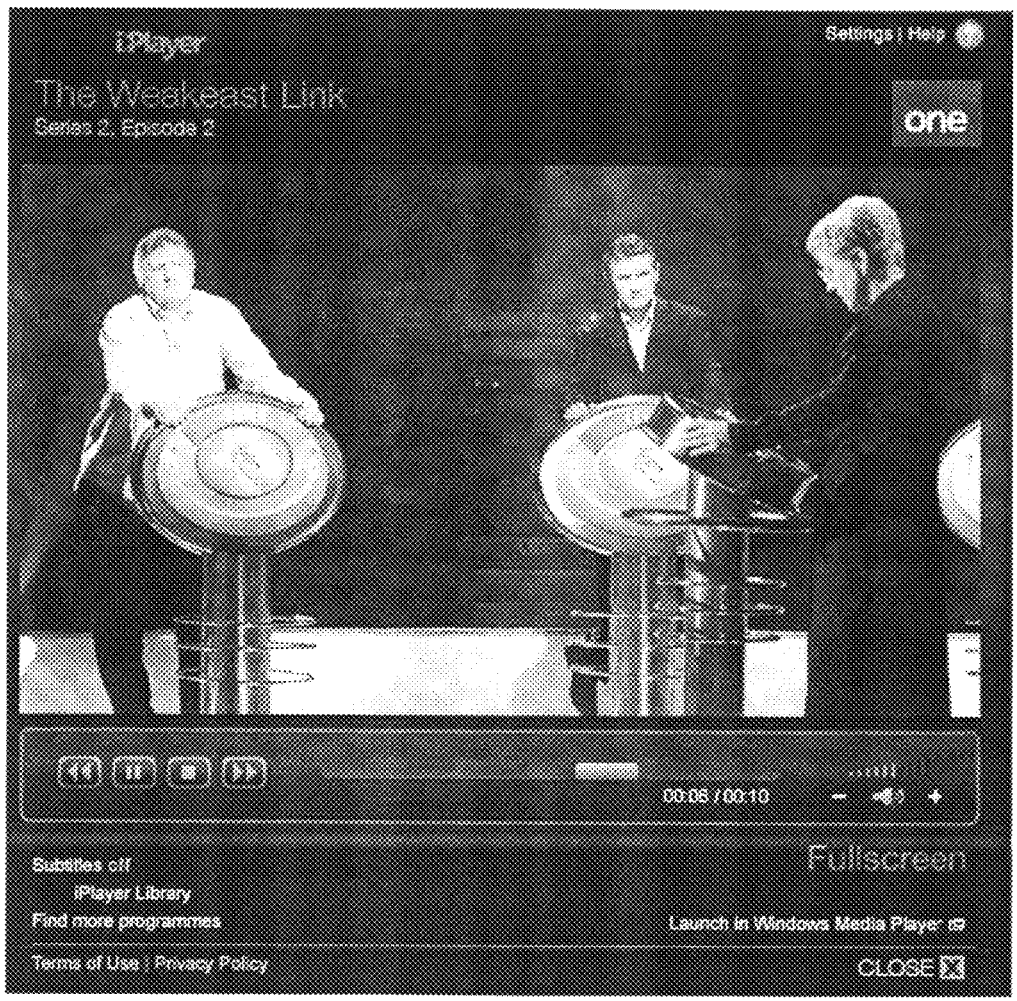
FIG. 46 shows a media player or console playing with 'subtitles off'.
Figure 47:
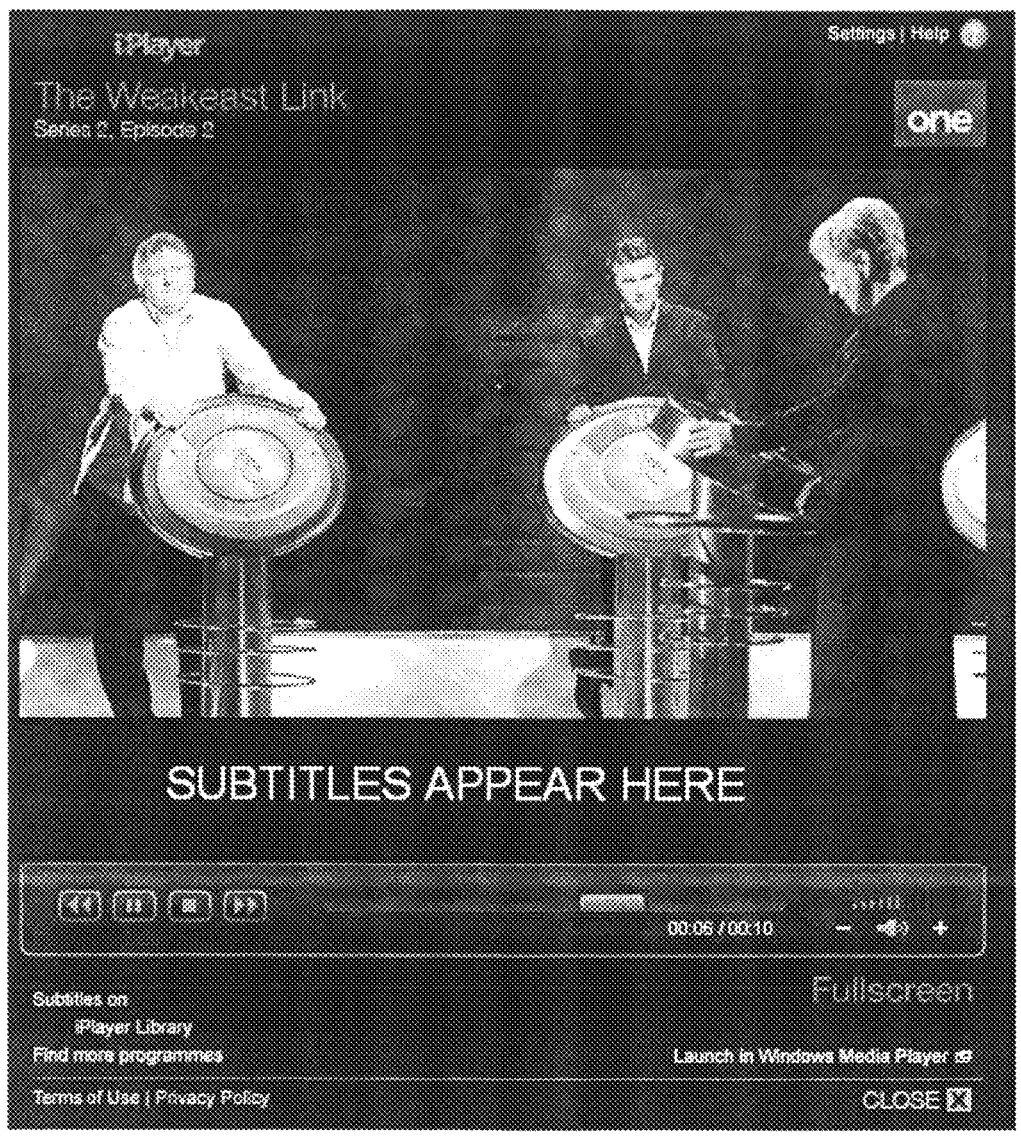
FIG. 47 shows a media player or console playing with 'subtitles on'.

FIG. 45 shows the download manager. FIG. 46 shows the interactive player system playing a 'subtitles off' version of a medium. FIG. 47 shows the interactive player system playing subtitled content.

Help and FAQ

Figure 48:
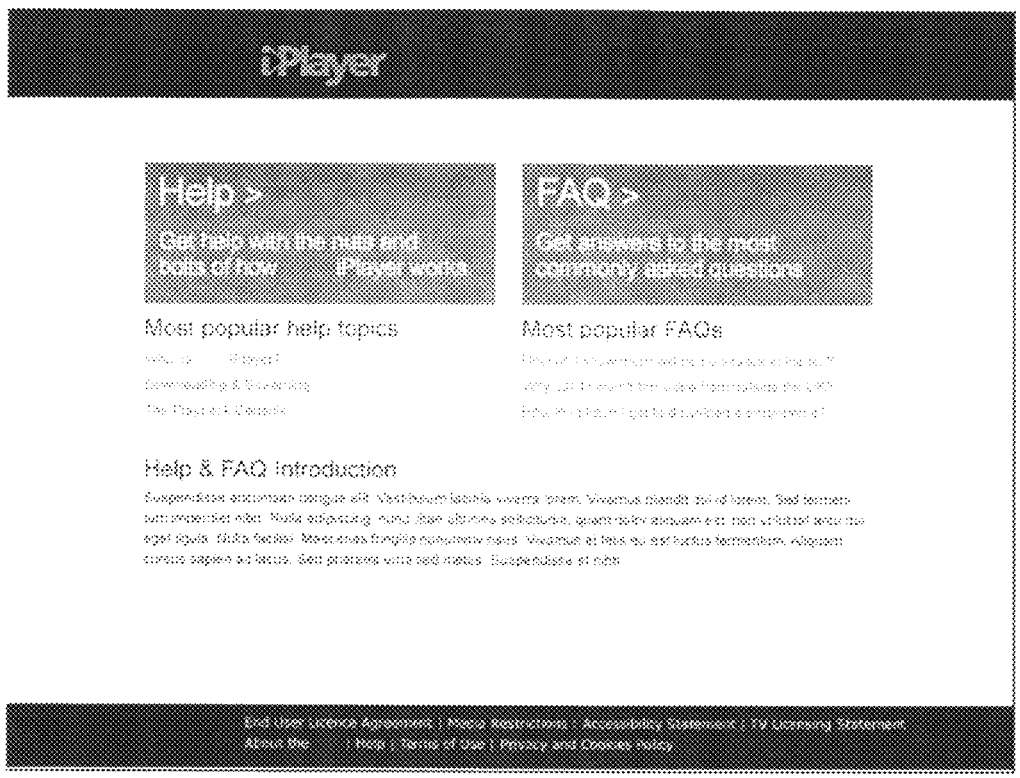
FIGS. 48 and 49 show various help screens.
Figure 49:
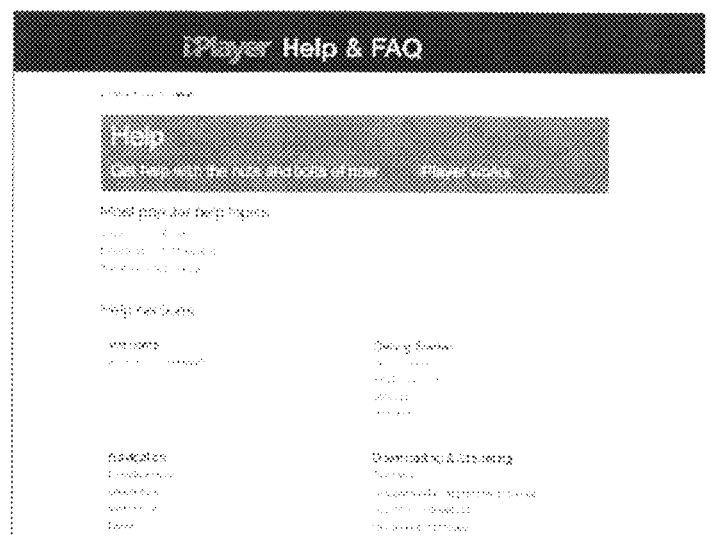
Figure 50:

FIGS. 48 and 49 show interactive player system help pages. There may be a contextual help link on all pages. Clicking upon the help the link takes the user to the relevant section within help. There is only one deep link within the interactive player system mirco site and that is on the mini item page Marketing & Help FIGS. 50 and 51 show an interactive player system marketing and help page. This page may be a static page where text and images relating to marketing can be uploaded. A link to help may also be provided.

Figure 61:
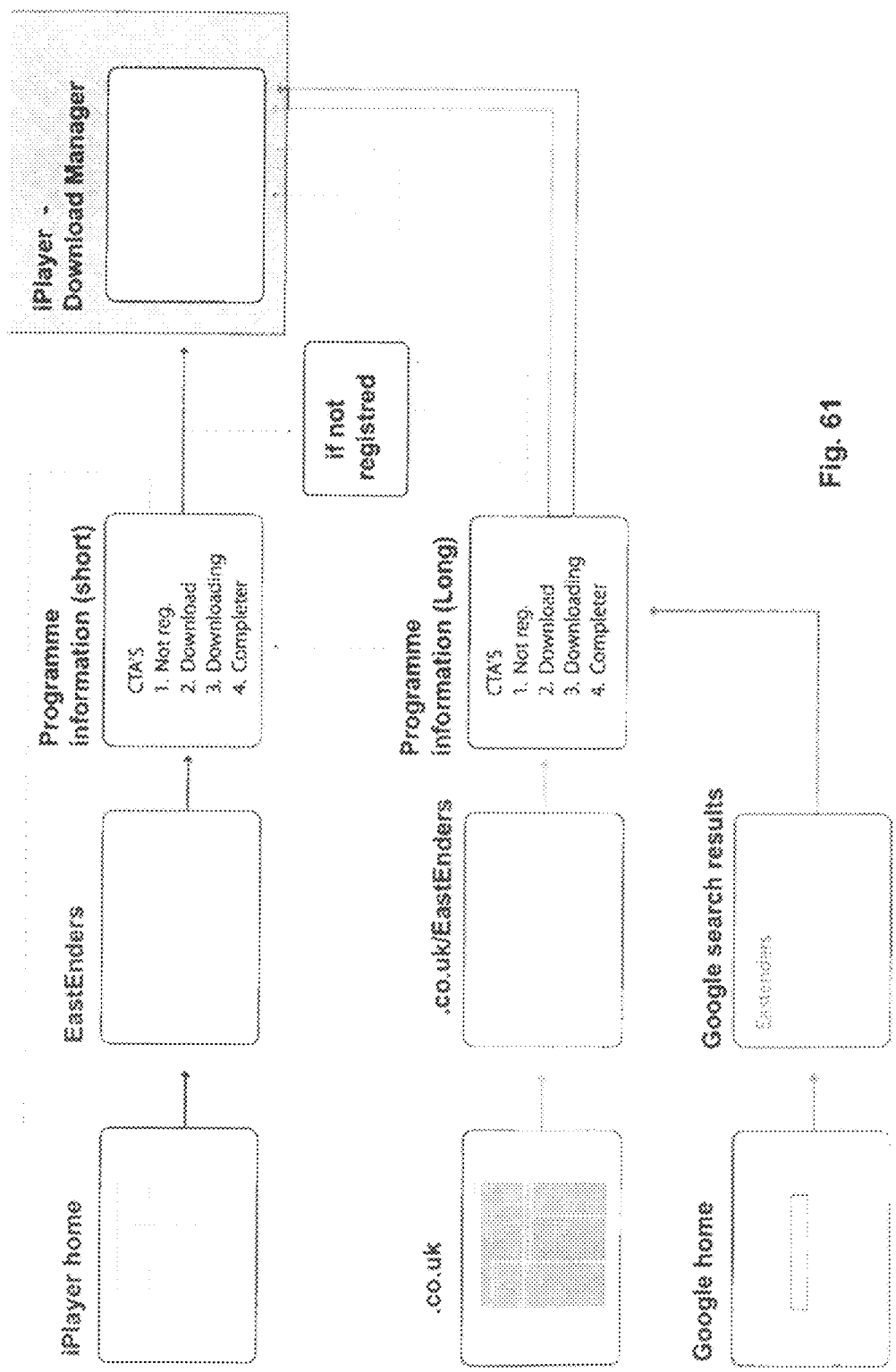
FIG. 61 shows access points to a download manager.

FIG. 61 details access points to interactive player system video download manager.

Further details of the underlying structure of the above-described features are given below.

A-Z Programme Under Selected Letter

Figure 62:
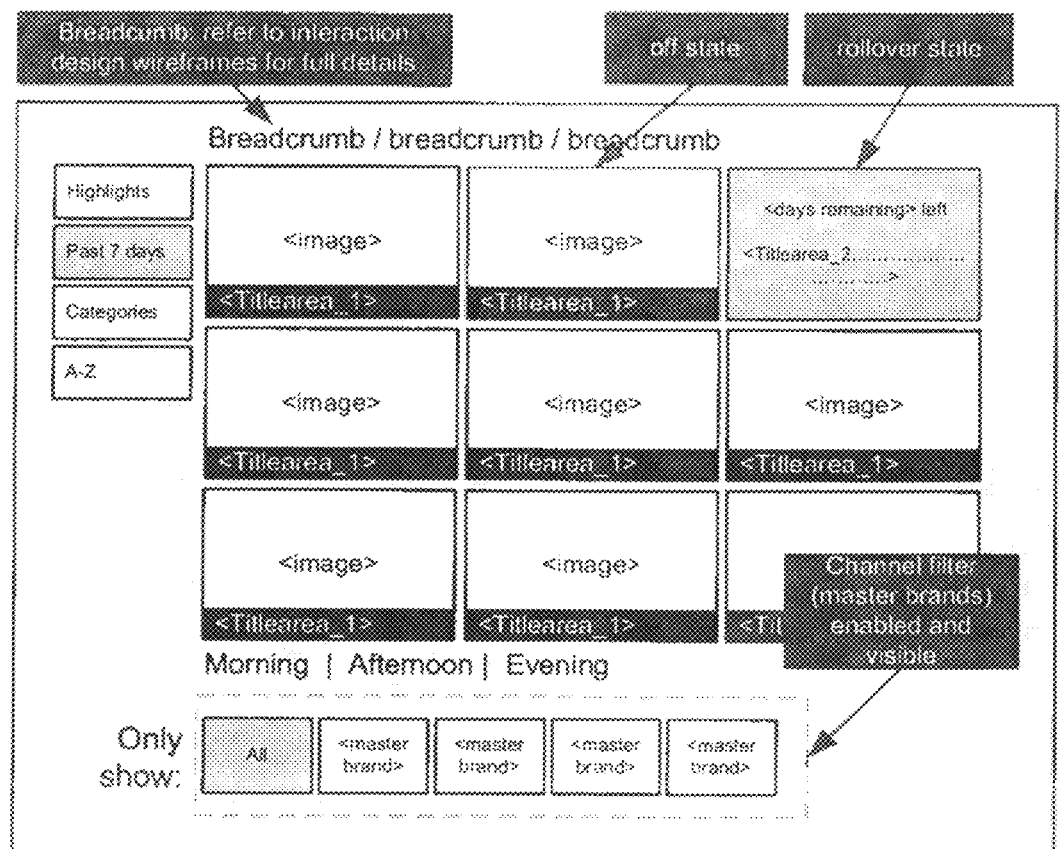
FIG. 62 shows the underlying structure of the A-Z screen metadata.

FIG. 62 shows the underlying structure of the A-Z (programme under selected letter) metadata.

Off State

Titlearea_1

Displays the title of top level of any programme's hierarchy. The top level title is dependent on the programme's structure, this could be either a group title or an episode title. If an episode belongs to a group in this case display the title for the top level group, which could be the title for either Programme brand, Series or Sub-series. So if the group title is a programme brand level display the programme brand title, if there is no programme brand title then display the series title, if there is no series title display the sub-series title. If this programme is a one-off episode this should display the Episode Title field, (it is unlikely the Episode Presentation title field is populated for one-off episodes).

Data model ref: list the top level only if it's a group
Group title [programme brand]
ASSET_GROUP
COG_Title
Group title [series]
ASSET_GROUP
COG_Title
Group title [subseries]
ASSET_GROUP
COG_Title
List Episode Title for One-Off Episodes
Episode Title
ASSET_CONCEPT
COC_Title Rollover State
Titlearea_2

Display the title of lowest level of the programme's hierarchy. The lowest level title will always be for the episode. This is either Episode Title or Presentation Title. If there is data in the Episode Title field then display this and don't display the Episode Presentation Title field. If there is no data in the Episode Title field display the Episode Presentation Title field. If the programme is a one-off episode then display the Episode Title should be displayed in titlearea_1. If this programme is a one-off episode this should display the Episode Title field again, but allow it to wrap on to the two lines when extensive, (it is unlikely the Episode Presentation title field is populated for one-off episodes).

Either One of These at Episode Level . . .
Data model ref:
Episode Title
ASSET_CONCEPT
COC_Title
Episode Presentation Title
ASSET_CONCEPT
COC_Presentation_Title
Days Remaining
Derived by calculation: minus the availability start date/time from the availability end date/time. Should state days until the last day and then should read hours remaining.
Data model ref:
Download availability end date
ON-DEMAND_PUBLICATION
ODU_Billed_Essence/Licence_Availability_End_Date
Download availability start time
ON-DEMAND PUBLICATION
ODU_Billed_Essence/Licence_Availability_Start_Time
Download availability start date
ON-DEMAND PUBLICATION
ODU_Billed_Essence/Licence_Availability_Start_Date
Download availability end time
ON-DEMAND_PUBLICATION
ODU_Billed_Essence/Licence_Availability_End_Time
Note on Presentation of Titles
Titlearea_1
The titlearea_1 runs on a single line. Should the title be longer than the space allows then the remaining words will be cut off.
Titlearea_2
The data displayed in 'titlearea_2' can wrap on to two lines. If this title exceeds the two lines the remaining words of the title will be cut off.
Image
Size: Medium 150×84. If image is not available display the default interactive player system image.
(default image should be medium sized).
Data model ref
Episode Image
GUI_IMAGE
GUI_ID
Master Brand Logo
Master brand for that episode (asset concept). Clicking the logo filters the content in the grid view so that only the programmes that have that master brand assigned to it are displayed. The master brand should include an alt text.
Data model ref
Master brand [code]
MASTER BRAND
MBA_Code
Data Ordering for 'A-Z'
First Level Sorting (Alphabetical):
Programmes should be sorted in alphabetical order (from A to Z) by what is listed in the 'titlearea_1', that contains the top most level of any programme structure (this could be either a programme brand title, series title, sub-series title or an episode title).
Ordering articles The . . . and A . . .
The article 'The' at the beginning of the programme name is skipped and programme title is ordered by the first letter of the next word. Example: 'The Hand that Rocked the Cradle' will be found under 'H' and NOT under 'T'. This is not the same when a programme title begins with the article 'A'. The article 'A' should be considered in filtering.

Figure 64:
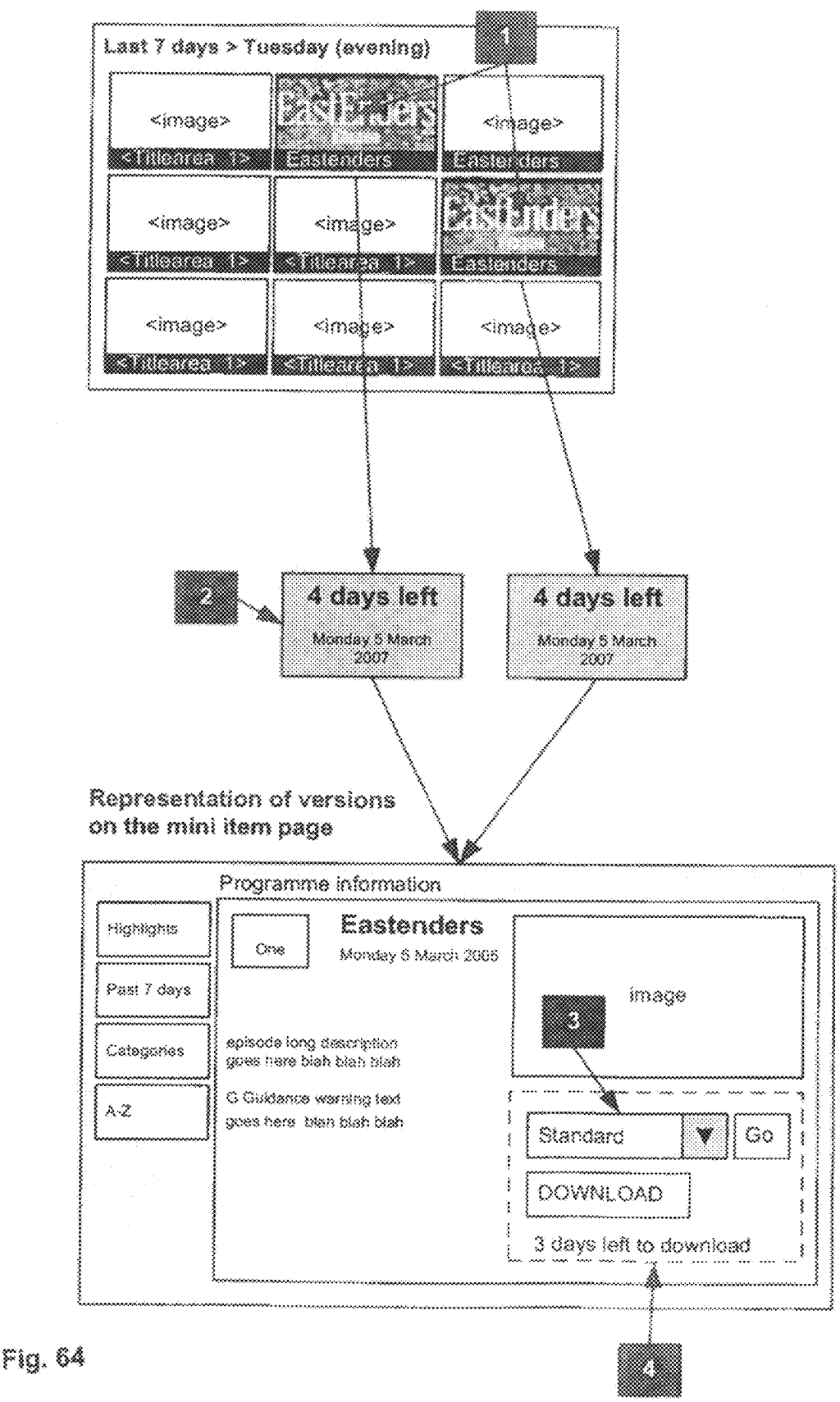
FIG. 64 shows the rules that apply to the grids for the categories and A-Z sections.

Example: 'A Midsummer Nights Dream' should sit in the 'A' section and NOT under the 'M' section.
Second Level Sorting (Most Recent First):
When there is more than one with the same title in 'titlearea_1' these should be then ordered by the most recent first. Sort according to PID [episode] with longest availability period (7 days, then 6, then 5 . . . ). This is calculated by subtracting download availability start date and time from download availability end date and time, (this will be the same as sorting according to most recently broadcast and will include repeats).
Third Level Sorting (Master Brand):
When there is more than one with the same title in 'titlearea_1' that has the same billed broadcast date and time then sort by the 'Master brand'. The order of Master brands should be in line with how they are displayed in the Master brand filter (from left to right, ie: Channel One, Channel Two, Channel Three, Channel Four, Children's Channel, News, News 24 . . . etc.
Display Rules for Versions & Repeats
FIG. 63 illustrates the display rules that apply to the grids for versions & repeats in the past 7 days. These rules apply to when there are multiple versions available at that time.
Past 7 Day Grid
Repeats of the same version—see reference numeral 1 in FIG. 63.
An episode version is displayed on the grid for that day it was first broadcast. If it is repeated again that same day or another day it should still only be listed once on the day on which it was first broadcast.
Displays the DRM for that version—see reference numeral 2 in FIG. 63.
The days remaining displayed on the rollover is for the DRM for that version only.
Rollover—another version of the same episode—see reference numeral 3 in FIG. 63.
If another version of the same episode is broadcast on another day this is displayed on the day that version was first broadcast.
Item Page
Once reaching the item page the display rules are as follows:
Default: standard version—see reference numeral 4 in FIG. 63.
When standard version is available along with other versions at that moment in time the standard is always the default version in this drop down list, regardless to the version that was selected from the 3×3 grid and how many days are left for the other versions.
Days/hours left to download—see reference numeral 5 in FIG. 63
The days/hours remaining is always against that version that as been selected in the drop down list. If the user selects another version the days/hours remaining will change to match that version selected.
Due to the data model structure, the title is for the asset concept so the same title will be displayed for all episode versions. If this is a date this will be the date of the first broadcast of the standard version, this may be misleading for the user if the BSL version is broadcast a few days later.
FIG. 64 illustrates the rules that apply to the grids for the categories and A-Z sections. The following rules apply to when there are multiple versions available at any one time.
Categories & A-Z
Single promo result per version—see reference numeral 1 in FIG. 64.
On the grid layout a promo is displayed for each version. These versions may have many broadcasts each but only the one promo is to represent the many repeats for this version.

Displays the DRM for that version—see reference numeral 2 in FIG. 64.

The days remaining displayed on the rollover is for the DRM for that version only.

Item Page

Once reaching the item page the display rules are as follows:

Default: Standard version—see reference numeral 3 in FIG. 64.

When standard version is available along with other versions at that moment in time the standard is always the default version in this drop down list, regardless to the version that was selected from the 3×3 grid and how many days are left for the other versions.

Days/hours left to download—see reference numeral 4 in FIG. 64.

The days/hours remaining is always against that version that as been selected in the drop down list. If the user selects another version the days/hours remaining will change to match the version selected.

Figure 65:
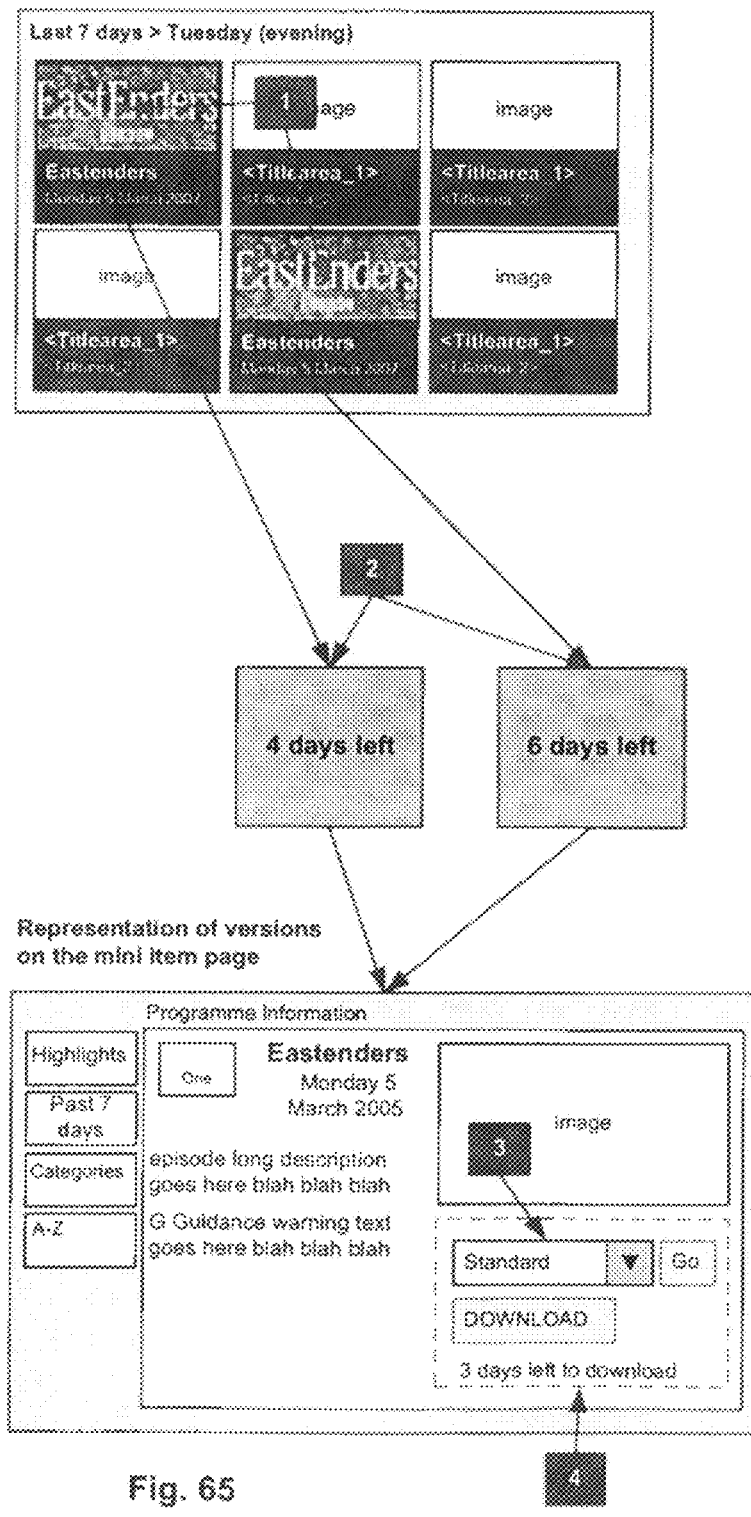
FIG. 65 shows the display rules for versions and repeats.

FIG. 65 illustrates the display rules for versions and repeats as they apply to the grids for the search results. The following rules apply to when there are multiple versions available at that time and that one of these is the standard version.

Search Results Single promo result per version—see reference numeral 1 in FIG. 65.

On the grid layout a promo is displayed for each version. These versions may have many broadcasts each but only the one promo is to represent the many repeats for this version.

Displays the DRM for that version—see reference numeral 2 in FIG. 65.

The days remaining displayed on the rollover is for the DRM for that version only.

Item Page

Once reaching the item page the display rules are as follows:

Default: Standard version—see reference numeral 3 in FIG. 65.

When the standard version is available along with other versions at that moment in time the standard is always the default version in this drop down list, regardless to the version that was selected from the 3×3 grid and how many days are left or the other versions.

Days/hours left to download—see reference numeral 4 in FIG. 65.

The days/hours remaining is always against that version that as been selected in the drop down list. If the user selects another version the days/hours remaining will change to match that version selected.

The display rules for repeats and DRM are as follows. The DRM will start to count down from that broadcast. Even if the system knows that the same version will be broadcast again within those 7 days the DRM will count down from that first broadcast. If and when the same version is broadcast again (within those 7 days) the DRM is then extended, for example:

| After first broadcast: | 7 days left |
| | 6 days left |
| | 5 days left |
| After second broadcast: | 7 days left |
| | 6 days left |

Figure 66:
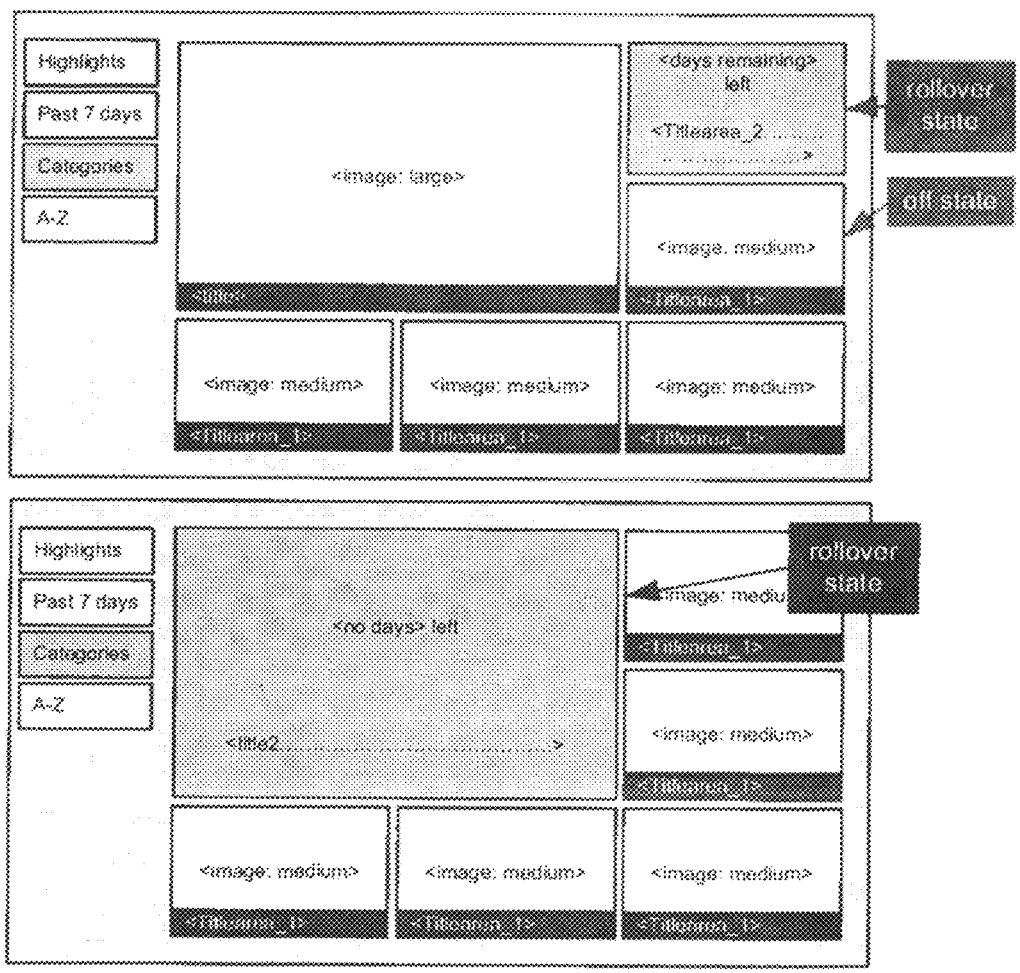
FIG. 66 shows metadata for a highlights screen.

The DRM count down should be applied as follows:
From the 7 days to 1 hour. Should not degrade to minutes.
7 days left
6 days left
5 days left
4 days left
3 days left
2 days left
1 day left
23 hours left
22 hours left
21 hours left
20 hours left
19 hours left
18 hours left
17 hours left
16 hours left
15 hours left
14 hours left
13 hours left
12 hours left
11 hours left
10 hours left
9 hours left
8 hours left
7 hours left
6 hours left
5 hours left
4 hours left
3 hours left
2 hours left
1 hour left Highlights Metadata FIG. 66 illustrates the metadata for the highlights interface or screen.

Off State

Titlearea_1 Displays the title of top level of any programmes hierarchy.

The top level title is dependant on the programmes structure, this could be either a group title or an episode title.

If an episode belongs to a group in this case display the title for the top level group, which could be the title for either Programme brand, Series or Sub-series.

So if the group title is at programme brand level display the programme brand title, if there is no programme brand title then display the series title, if there is no series title display the sub-series title.

If this programme is a one-off episode this should display the Episode Title field, (it is unlikely the Episode Presentation title field is populated for one-off episodes).

Data model ref:
list the top level only if it is a group
Group title [programme brand]
ASSET_GROUP
COG_Title
Group title [series]
ASSET_GROUP
COG_Title
Group title [subseries]
ASSET_GROUP
COG_Title
list episode title for one-off episodes
Episode Title
ASSET_CONCEPT
COC_Title
Rollover State
Titlearea_2 Display the title of lowest level of the programmes hierarchy.

The lowest level title will always be for the episode.

This is either Episode Title or Presentation Title. If there is data in the Episode Title field then display this and don't display the Episode Presentation Title field. If there is no data in the Episode Title field display the Episode Presentation Title field. If the programme is a one-off episode then display the Episode Title should be displayed in titlearea_1.

Figure 67:
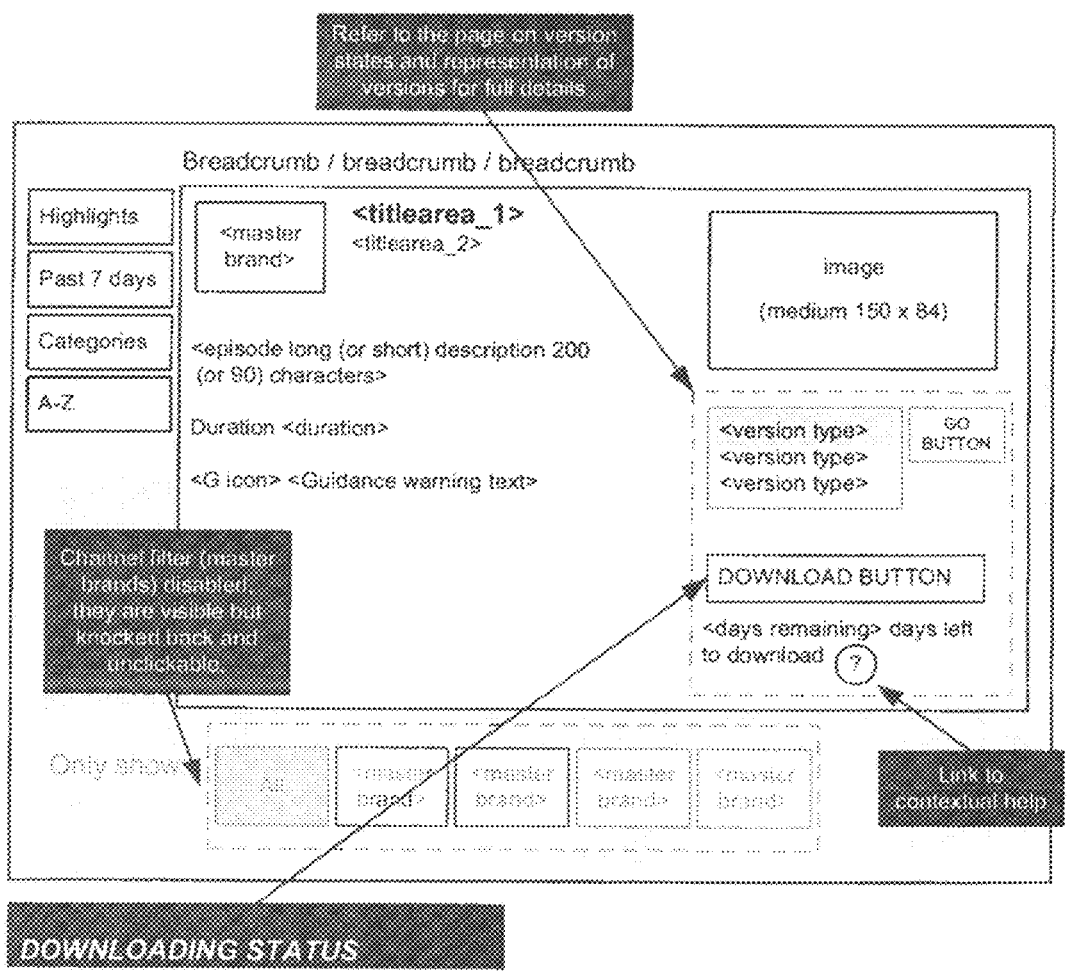
FIG. 67 shows the mini item page metadata.

If this programme is a one-off episode this should display the Episode Title field again, but allowed to wrap on to the two lines when extensive (it is unlikely the Episode Presentation title field is populated for one-off episodes).

either one of these at episode level . . .
Data model ref:
Episode Title
ASSET_CONCEPT
COC_Title
Episode Presentation Title
ASSET_CONCEPT
COC_Presentation_Title
Days Remaining
Derived by calculation: minus the availability start date/time from the availability end date/time. Should state days until the last day and then should read hours remaining.
Data model ref:
Download availability end date
ON-DEMAND PUBLICATION
ODU_Billed_Essence/Licence_Availability_End_Date
Download availability start time
ON-DEMAND PUBLICATION
ODU_Billed_Essence/Licence_Availability_Start_Time
Download availability start date
ON-DEMAND PUBLICATION
ODU_Billed_Essence/Licence_Availability_Start_Date
Download availability end time
ON-DEMAND PUBLICATION
ODU_Billed_Essence/Licence_Availability_End_Time
Note on the Presentation of Tiles
Applies to both the small and large promo areas:
Titlearea_1: the titlearea_1 runs on a single line. Should the title be longer than the space allows then the remaining words will be cut off.
Titlearea_2: the data displayed in 'titlearea_2' can wrap on to two lines. If this title exceeds the two lines the remaining words of the title will be cut off.
Image
size: Medium 150×84.
size: Large 303×170.
It is important that a suitable image is displayed in the highlights section for both the large and medium sized images.
Data model ref
Episode Image
GUI_IMAGE
GUI_ID
Mini Item Page Metadata
FIG. 67 illustrates an overview of the mini item page metadata.
Titlearea_1: if the episode belongs to a group then this should be the Containers List Title in full. If this is a one off episode this should display the Episode Title field.
Titlearea_2: this is either Episode Title or Presentation Title. If there is data in the Episode Title field then display this and don't display the Episode Presentation Title field. If there is no data in the Episode Title field display the Episode Presentation Title field. If the programme is a one off episode then there is no data to be displayed at this level as the Episode Title should be displayed in titlearea_1.

Data model ref:
Containers List Title (group)
ASSET_CONCEPT
COG_Presentation_Title
Episode Title
ASSET_CONCEPT
COC_Title
Episode Presentation Title
ASSET_CONCEPT
COC_Presentation_Title
Duration
Reloads data for selected version. Billed duration of the standard version when standard version is available. If any other version other than standard is broadcast first then the billed duration of this version is to displayed, but is to be replaced/amended if and when the standard version is broadcast and the billed duration is made available.
Data model ref
Billed Duration
ASSET_VERSION
COV_Billed_Duration
Episode long description: the 200 character max length description to be displayed here regardless to whether an extended description is available. If not available display the Episode short description instead.
Data model ref:
Episode Long Description
ASSET_CONCEPT
COC_Long_Description
Episode short description: the 90 character max length description to be displayed only if the long description field is not available.
Data model ref:
Episode Short Description
ASSET_CONCEPT
COC_Short_Description
G icon: reloads data for selected version. The warning code acts as a flag to show guidance icon.
Data model ref:
Guidance code (flag)
GUIDANCE
GVA_Code
Guidance warning text: reloads data for selected version. The full guidance warning text in full. This will be displayed in addition to the G icon if present.
Data model ref:
Guidance text (constructed)
GUIDANCE_APPLICABLE_COMBINATION
GVA_Code
Days remaining: reloads data for selected version. Derived from the download availability expiry date. Should state days until the last day and then should read hours remaining.
Data model ref:
Download availability end time
ON-DEMAND_PUBLICATION
ODU_Billed_Essence/Licence_Availability_End_Time
Image size: Medium 150×84. If image is not available display the default interactive player system image (default image should be medium sized).
Data model ref:
Episode Image
GUI_IMAGE
GUI_ID
Master brand logo: master brand for that episode (asset concept). The logo is not clickable but should include an alt text.

Data model ref:
Master brand [code]
MASTER BRAND
MBA_Code
Mini Item Page Metadata (Version States)

Figure 68:
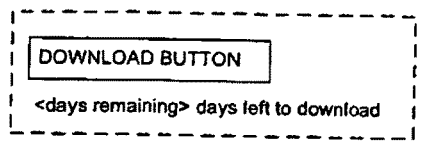
FIG. 68 is a schematic view of a CTA patch.

FIG. 68 shows scenario A where only a single version of a content item is available, and where there is also no knowledge of other versions on the way. If the single version is available and this version is a standard without subtitles. This version type is not displayed on the interface, so space closes up. The drop down is not required is not displayed when only a single version is available.

Figure 70:
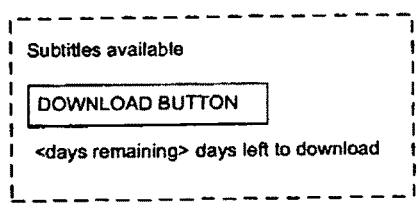
FIG. 70 is a schematic view of a CTA patch.

FIG. 70 shows scenario B where only a single version of a content item is available, and where there is also no knowledge of other versions on the way. If the single version is available, if this version is a standard that has subtitles as an option, this version should state that subtitles are available. The drop down is not required and is not displayed when only a single version is available.

Figure 69:
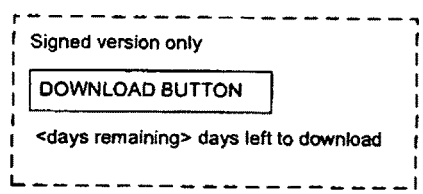
FIG. 69 is a schematic view of a CTA patch.

FIG. 69 shows scenario C where only a single version is available. When there is also no knowledge of other versions on the way. If the single version is available and this version is either a sign language version (e.g. BSL) or an audio description version (AD). This version type should be displayed on the interface. The drop down is not required is not displayed when only a single version is available.

Figure 71:
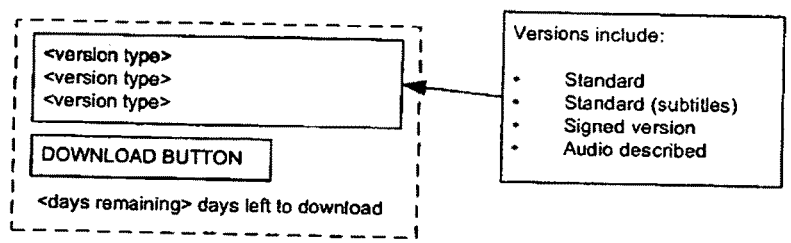
FIG. 71 is a schematic view of a CTA patch.

FIG. 71 shows scenario D where multiple versions of a content item are available, and where more than one version is available at that moment in time. The standard version is the default. Days remaining would change if another version is selected.

Mini Item Page Metadata—How Versions are Represented

Figure 72:
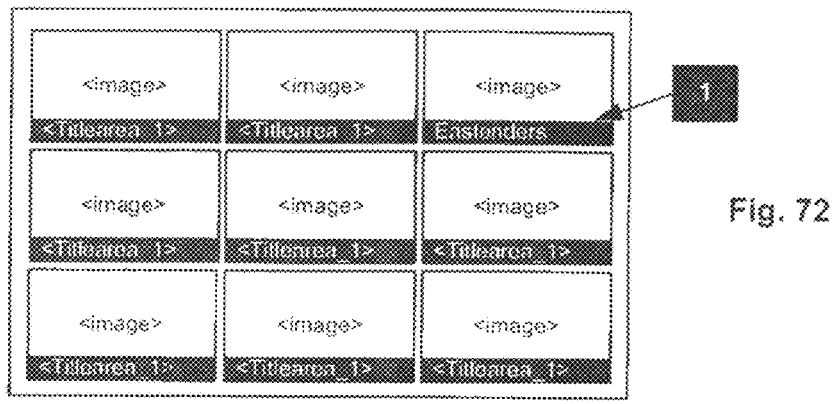
FIG. 72 is a schematic view of a screen showing different content item versions on the browse and search results grid in the off state.
Figure 73:
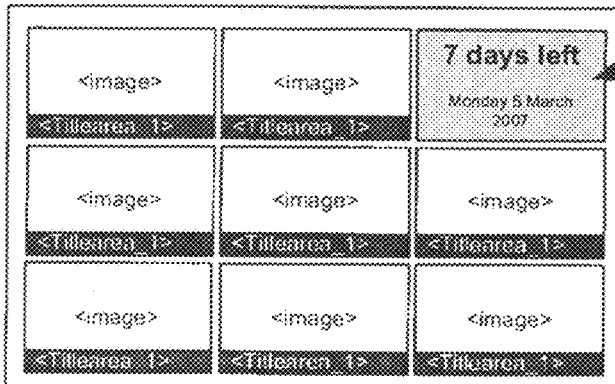
FIG. 73 is a schematic view of a screen showing different content item versions on the browse and search results grid in the rollover state.
Figure 74:
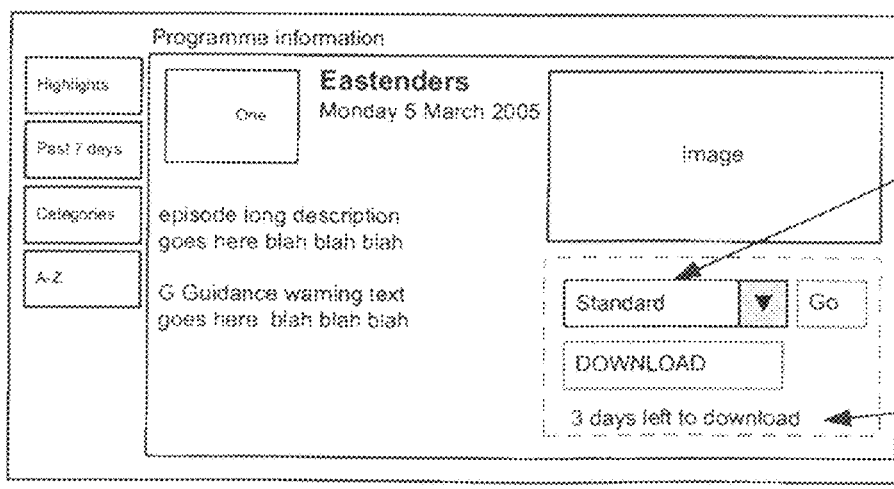
FIG. 74 is a schematic view of a screen showing different content item versions on the mini item page.

FIG. 72 shows a representation of episode versions on the browse and search results grid in the off state. FIG. 73 shows a representation of episode versions on the browse and search results grid in the rollover state. FIG. 74 shows a representation of versions on the mini item page.

The following rules apply to when there are multiple versions of a content item available at that time and that one of these is the standard version. For full listing of versions see above text on version states. This section is in reference to 'Scenario D (multiple versions available)'.

Browse & Search Results Grid

Single result—see reference numeral 1 in FIG. 72.

Listed at asset concept level, a single item is displayed at the grid level, regardless of the number of versions or repeats of those versions occur for that asset.

Displays the longest DRM—see reference numeral 2 in FIG. 73.

The days remaining displayed on the rollover are against the version that has the longest DRM available. This could be the 'Signed version' that came out a few days after the standard version. Even if the standard version has 2 days remaining it is represented under this rollover. It is only when the user goes to the mini item page that they can see the correct number of days remaining for the standard version.

Item Page

Default: Standard version—see reference numeral 3 in FIG. 74.

When standard version is available along with other versions at that moment in time the standard version is always set as the default.

Default: Standard versions number of days/hours left to download—see reference numeral 4 in FIG. 74.

As the standard version is always the default then the time remaining listed here is against the standard version. If the user selects another version the days remaining will change to match that version selected. The standard is always the default version in this drop down, regardless to how many days are left for the other versions and what was mentioned on the browse and search grids.

Past 7 Days Metadata

Figure 75:
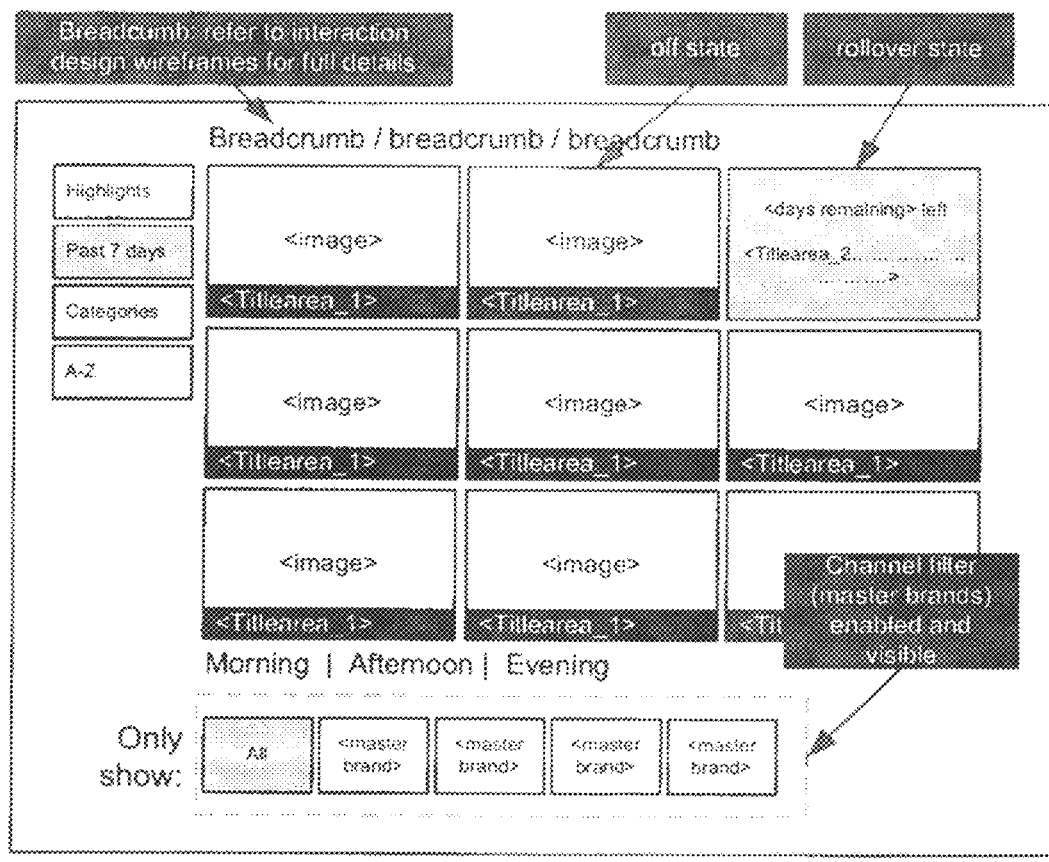
FIG. 75 shows metadata for a past 7 days screen.

FIG. 75 illustrates the past 7 days metadata.

Off State

Titlearea_1: displays the title of top level of any programmes hierarchy.

The top level title is dependant on the programmes structure, this could be either a group title or an episode title.

If an episode belongs to a group in this case display the title for the top level group, which could be the title for either Programme brand, Series or Sub-series.

So if the group title is at programme brand level display the programme brand title, if there is no programme brand title then display the series title, if there is no series title display the sub-series title.

If this programme is a one-off episode this should display the Episode Title field, (it is unlikely the Episode Presentation title field is populated for one-off episodes).

Data model ref:
list the top level only if it is a group
Group title [programme brand]
ASSET_GROUP
COG_Title
Group title [series]
ASSET_GROUP
COG_Title
Group title [subseries]
ASSET_GROUP
COG_Title
list episode title for one-off episodes
Episode Title
ASSET_CONCEPT
COC_Title
Rollover State Titlearea_2: display the title of lowest level of the programmes hierarchy.

The lowest level title will always be for the episode.

This is either Episode Title or Presentation Title. If there is data in the Episode Title field then display this and don't display the Episode Presentation Title field. If there is no data in the Episode Title field display the Episode Presentation Title field. If the programme is a one-off episode then display the Episode Title should be displayed in titlearea_1.

If this programme is a one-off episode this should display the Episode Title field again, but be allowed to wrap on to the two lines when extensive, (it is unlikely the Episode Presentation title field is populated for one-off episodes).

Either One of These at Episode Level . . .
Data model ref:
Episode Title
ASSET_CONCEPT
COC_Title
Episode Presentation Title
ASSET_CONCEPT
COC_Presentation_Title
Days Remaining Derived by calculation: minus the availability start date/time from the availability end date/time.

States days until the last day and then should read hours remaining.

Data model ref:
Download availability end date
ON-DEMAND_PUBLICATION
ODU_Billed_Essence/Licence_Availability_End_Date
Download availability start time
ON-DEMAND_PUBLICATION
ODU_Billed_Essence/Licence_Availability_Start_Time
Download availability start date
ON-DEMAND_PUBLICATION
ODU_Billed_Essence/Licence_Availability_Start_Date
Download availability end time
ON-DEMAND_PUBLICATION
ODU_Billed_Essence/Licence_Availability_End_Time
Note on Presentation of Tiles Titlearea_1: the titlearea_1 runs on a single line. Should the title be longer than the space allows then the remaining words will be cut off.

Titlearea_2: the data displayed in 'titlearea_2' can wrap on to two lines. If this title exceeds the two lines the remaining words of the title will be cut off.

Image size: Medium 150×84. If image is not available display the default interactive player system image. (default image should be medium sized)
Data model ref:
Episode Image
GUI_IMAGE
GUI_ID Master brand logo: master brand for that episode (asset concept). Clicking the logo filters the content in the grid view so that only the programmes that have that master brand assigned to it are displayed. The master brand should include an alt text.
Data model ref:
Master brand [code]
MASTER BRAND
MBA_Code A number of further sorting filters are available from within the Past 7 days screen. In particular, it is possible to filter based on a time slot. In one example, as shown in FIG. 75, it is possible to sort programs based on whether they were broadcast in the morning, afternoon or evening.

Data Ordering for 'Most Recent' Selection
The ordering applies to all filters: Morning, afternoon and evening 1) First Level Sorting (Most Recent First):
Sort according to PID [episode] with longest availability period (7 days, then 6, then 5 . . . ). This is calculated by subtracting download availability start date and time from download availability end date and time, (this will be the same as sorting according to most recently broadcast and will include repeats).

2) Second Level Sorting (Master Brand):
When there is more than one with the same billed broadcast date and time then sort by the 'Master brand' (that is while 'ALL' master brands are selected). If then a specific Master brand is selected then this will display those results under that filter only. The order of Master brands should be in line with how they are displayed in the Master brand filter (from left to right, ie: Channel One, Channel Two, Channel Three, Channel Four, News, News 24 . . . etc.).

Category (Programmes Under Selected Category) Metadata

Figure 76:
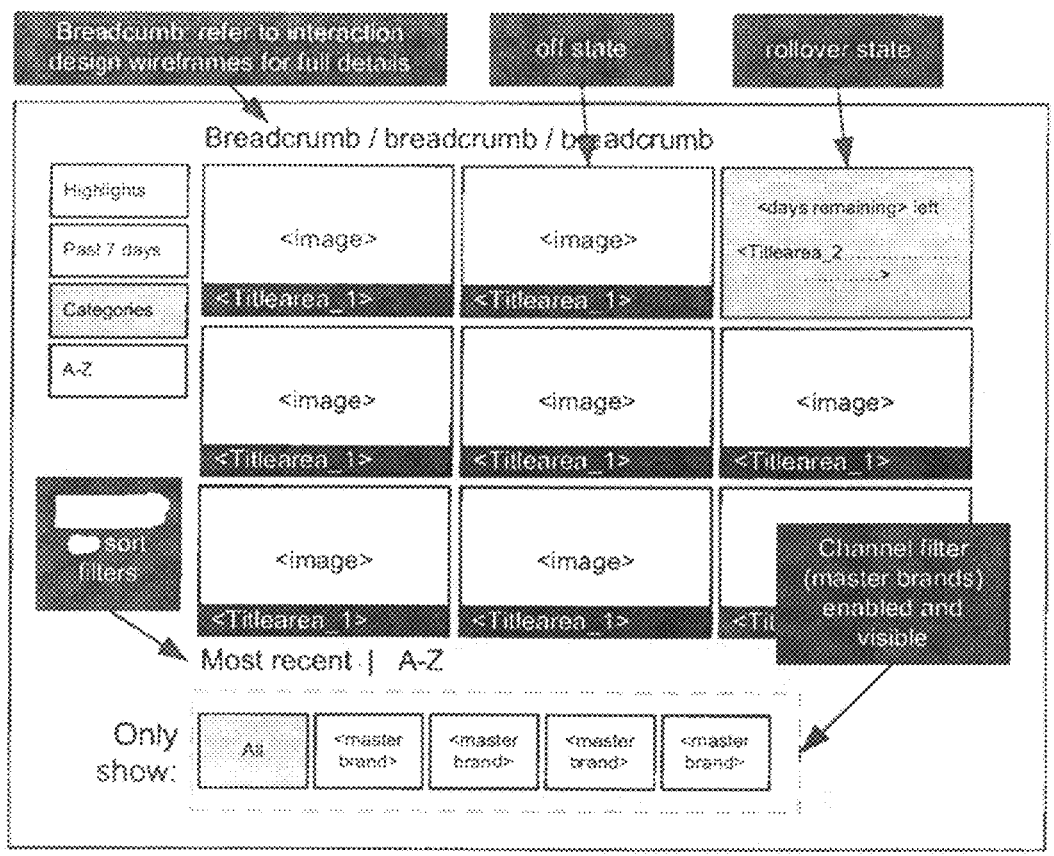
FIG. 76 shows metadata for a category screen.

FIG. 76 shows the category (programmes under selected category) interface metadata.

Off State
Titlearea_1: displays the title of top level of any programmes hierarchy.

The top level title is dependent on the programmes structure, this could be either a group title or an episode title.

If an episode belongs to a group in this case display the title for the top level group, which could be the title for either Programme brand, Series or Sub-series.

So if the group title is at programme brand level display the programme brand title, if there is no programme brand title then display the series title, if there is no series title display the sub-series title. If this programme is a one-off episode this should display the Episode Title field, (it is unlikely the Episode Presentation title field is populated for one-off episodes).
Data model ref:
list the top level only if it's a group
Group title [programme brand]
ASSET_GROUP
COG_Title
Group title [series]
ASSET_GROUP
COG_Title
Group title [subseries]
ASSET_GROUP
COG_Title
list episode title for one-off episodes
Episode Title
ASSET_CONCEPT
COC_Title
Rollover State Titlearea_2: display the title of lowest level of the programmes hierarchy.

The lowest level title will always be for the episode.
This is either Episode Title or Presentation Title. If there is data in the Episode Title field then display this and don't display the Episode Presentation Title field. If there is no data in the Episode Title field display the Episode Presentation Title field. If the programme is a one-off episode then display the Episode Title should be displayed in titlearea_1.

If this programme is a one-off episode this should display the Episode Title field again, but be allowed to wrap on to the two lines when extensive, (it is unlikely the Episode Presentation title field is populated for one-off episodes).
Either One of These at Episode Level . . .
Data model ref:
Episode Title
ASSET_CONCEPT
COC_Title
Episode Presentation Title
ASSET_CONCEPT
COC_Presentation_Title
Days Remaining Derived by calculation: minus the availability start date/time from the availability end date/time. Should state days until the last day and then should read hours remaining.
Data model ref:
Download availability end date
ON-DEMAND_PUBLICATION
ODU_Billed_Essence/Licence_Availability_End_Date
Download availability start time
ON-DEMAND_PUBLICATION
ODU_Billed_Essence/Licence_Availability_Start_Time
Download availability start date
ON-DEMAND_PUBLICATION
ODU_Billed_Essence/Licence_Availability_Start_Date
Download availability end time
ON-DEMAND_PUBLICATION
ODU_Billed_Essence/Licence_Availability_End_Time
Presentation Titlearea_1: titlearea_1 runs on a single line. Should the title be longer than the space allows then the remaining words will be cut off.

Titlearea_2: the data displayed in 'titlearea_2' can wrap on to two lines. If this title exceeds the two lines the remaining words of the title will be cut off.

Image size: Medium 150×84. If image is not available display the default interactive player system image. (default image should be medium sized)

Data model ref:
Episode Image
GUI_IMAGE
GUI_ID

Master brand logo: master brand for that episode (asset concept). Clicking the logo filters the content in the grid view so that only the programmes that have that master brand assigned to it are displayed. The master brand should include an alt text.

Data model ref:
Master brand [code]
MASTER BRAND
MBA_Code

Data Ordering for 'Most Recent' Selection

1) First Level Sorting (Most Recent First):

Sort according to PID [episode] with longest availability period (7 days, then 6, then 5 . . . ). This is calculated by subtracting download availability start date and time from download availability end date and time, (this will be the same as sorting according to most recently broadcast and will include repeats).

2) Second Level Sorting (Master Brand):

When there is more than one with the same billed broadcast date and time then sort by the 'Master brand' (that is while 'ALL' master brands are selected). If then a specific Master brand is selected then this will display those results under that filter only. The order of Master brands should be in line with how they are displayed in the Master brand filter (from left to right, ie: Channel One, Channel Two, Channel Three, Channel Four, News, News 24 . . . etc Data Ordering for 'A-Z' Selection 1) First Level Sorting (Alphabetical):

Programmes should be sorted in alphabetical order (from A to Z) by what is listed in the 'titlearea_1', that contains the top most level of any programme structure, (this could be either a programme brand title, series title, sub-series title or an episode title).

Ordering Articles The . . . and A . . .

The article 'The' at the beginning of the programme name is skipped and the programme title is ordered by the first letter of the next word. Example: The Hand that Rocked the Cradle' will be found under 'H' and NOT under 'T'. This is not the same when a programme title begins with the article 'A'. The article 'A' should be considered in the ordering. Example: 'A Midsummer Nights Dream' should be ordered by the article 'A' and then by the letter 'M'.

2) Second Level Sorting (Most Recent First):

When there is more than one with the same title in 'titlearea_1' these should be then ordered by the most recent first. Sort according to PID [episode] with longest availability period (7 days, then 6, then 5 . . . ). This is calculated by subtracting download availability start date and time from download availability end date and time (this will be the same as sorting according to most recently broadcast and will include repeats).

Figure 77:
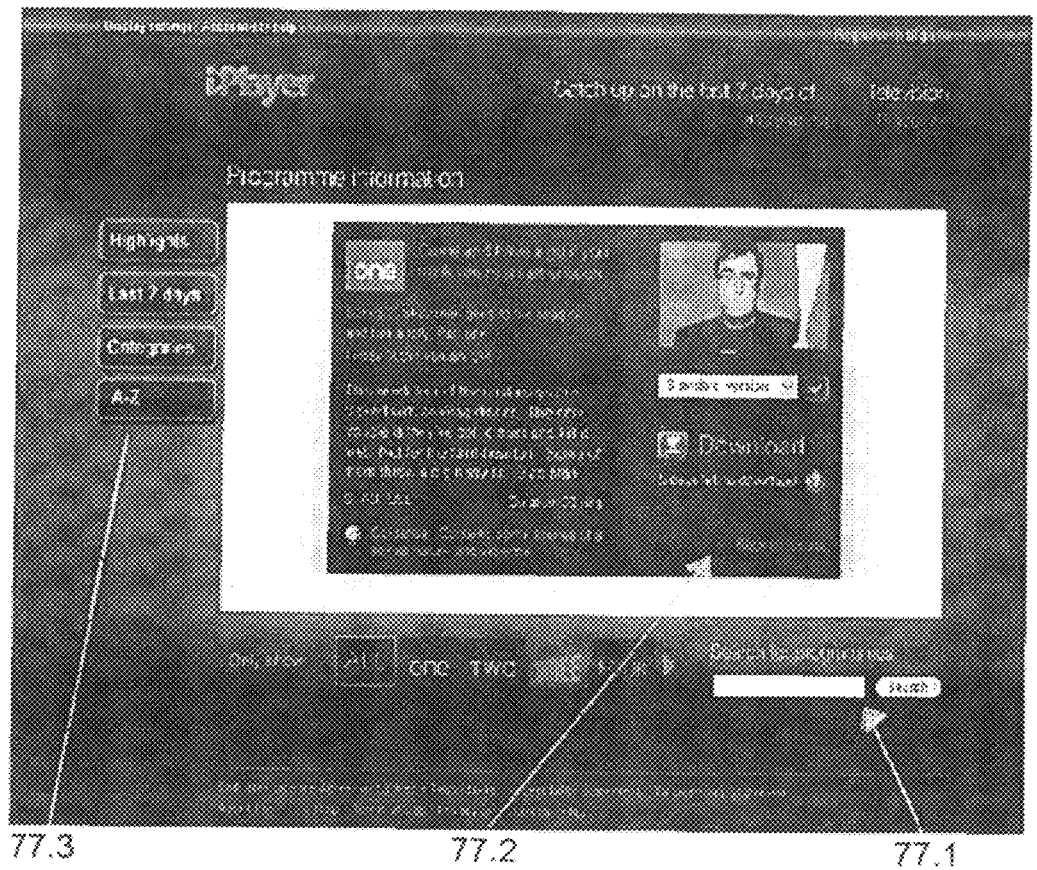
FIG. 77 shows a mini item page.

3) Third Level Sorting (Master Brand):

When there is more than one with the same title in 'titlearea 1' that has the same billed broadcast date and time then sort by the 'Master brand'(that is while 'ALL' master brands are selected). If then a specific Master brand is selected then this will display those results under that filter only. The order of Master brands should be in line with how they are displayed in the Master brand filter (from left to right, ie: Channel One, Channel Two, Channel Three, Channel Four, News, News 24 . . . etc Mini Item Page: Navigating Back from the Mini Item Page FIG. 77 shows the mini item page (navigating back from the mini item page: overview) this includes: the search bar 77.1 and the back to results link 77.2 and the menu options 77.3. Once the user is on the mini item page there are various means in leaving the mini item page, by either selecting the 'back to results' link, or selecting a menu option and/or running a search.

Navigating Away from the Mini Item Page Using the Menu Options

Figure 78:
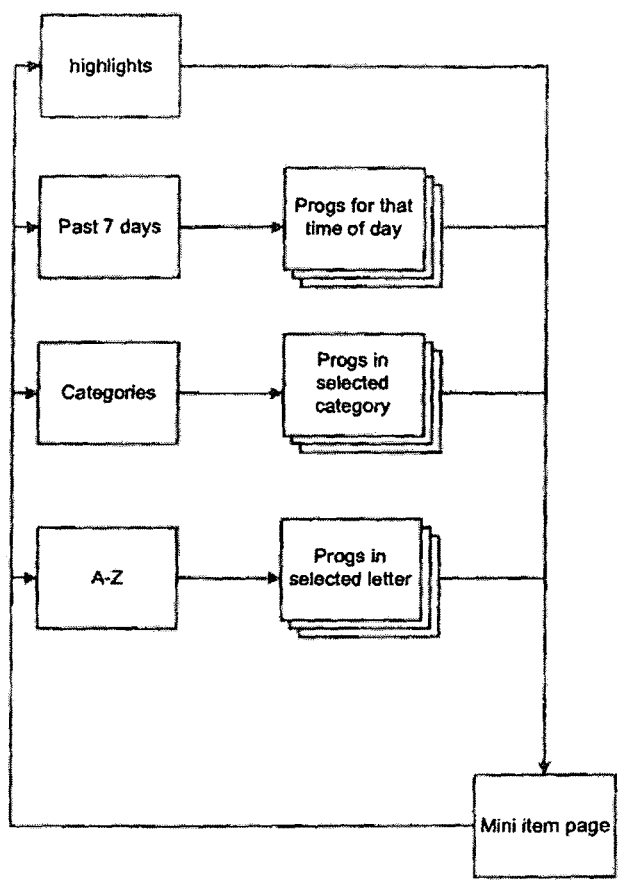
FIG. 78 is a flowchart which shows the navigation from and to the mini item page.

FIG. 78 shows the workflow for navigating to and from the mini item page by using the menu options. When the user is on an item page none of the menu options are highlighted, and the user can now select any of the menu options:

Selecting 'Past 7 Days' from the Item Page

Regardless to whether the user took this path to get to the mini item page, the user is taken to the top level of Past 7 Days.

No specific day, and time of day filter (morning, afternoon, evening) is selected or highlighted.

The item page that the user was on remains but is now shadowed by the past 7 days menu.

Selecting 'Categories' from the Item Page

Regardless of whether the user took this path to get to the mini item page, the user is taken to the top level of categories.

No category is selected or highlighted.

The item page that the user was on remains but is now shadowed by the categories menu.

Selecting 'A-Z' from the Item Page

Regardless to whether the user took this path to get to the mini item page, the user is taken to the top level of the A-Z menu.

No letter is selected or highlighted.

The item page that the user was on remains but is now shadowed by the A-Z menu.

Figure 79:
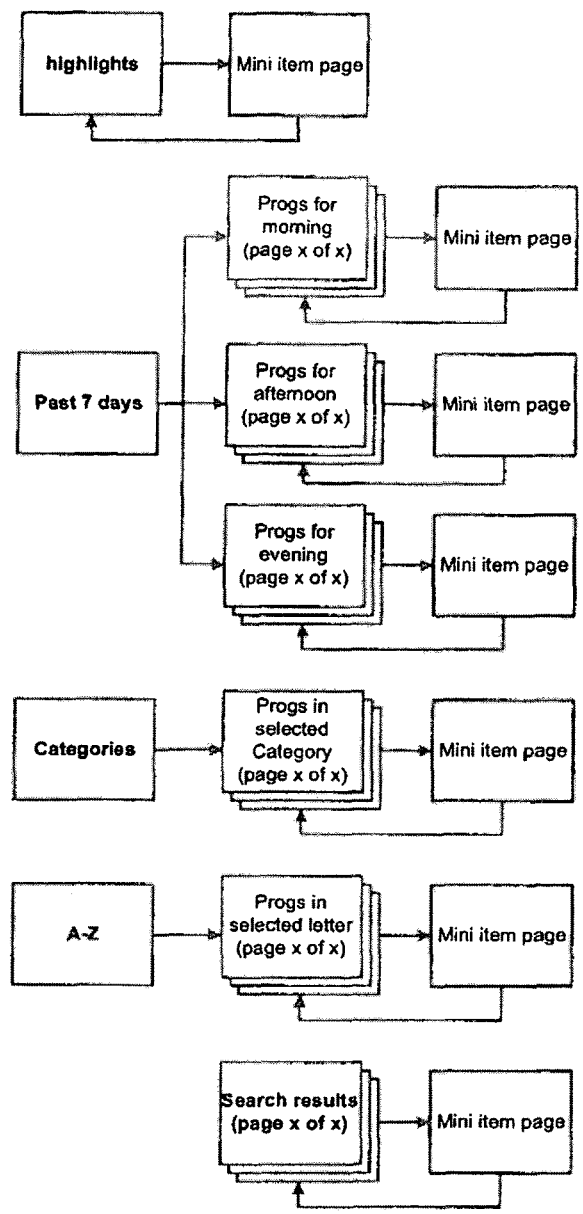
FIG. 79 is a flowchart which shows the workflow for navigating back from the mini item.

FIG. 79 shows the workflow for navigating back from the mini item page using the 'back to results' option.

Navigating back from the mini item page using the 'back to results' option

General Rules:

The user should always be taken back to where they selected that episode. To maintain the path in which they reached that mini item page.

The channel filter settings should be as they were when the user opened the mini item page.

While the user is on the item page for the episode they selected, it is possible that this episode is either no longer available; the DRM has expired and the episode promo is removed from the browse grid, or because of its availability its position now pushed it on to another.

Example Scenarios

From 'Highlights'

The user has arrived at the mini item page by selecting: the 'Highlights' in the menu (currently only one page available). Selecting 'back to results' the user is returned to the 'Highlights' page. The bookmark should read 'This weeks highlights.'

From the 'Last 7 Days'

The user has arrived at the mini item page by selecting: the 'Last 7 days' in the menu a 'Tuesday' in the day filter the 'Afternoon' slot in the time period filter the '2' in the page sequence (results run on to multiple pages). Selecting 'back to results' the user is returned to the 2$^{nd}$ page for the afternoon slot under Past 7 days section. The bookmark should read 'Last 7 days>Tuesday (afternoon)'.

From the 'Categories'

The user has arrived at the mini item page by selecting: the 'Categories' in the menu 'Factual' in the category list 'Channel One' in the channel filter the 2$^{nd}$ page in the page sequence (results run on to multiple pages). Selecting 'back to results' the user is returned to the second page under the Categories section, that lists only factual programmes flagged for Channel One. The bookmark should read the same: 'Categories > Factual'.

From the 'A-Z'

The user has arrived at the mini item page by selecting: the 'A-Z' in the menu 'OPQ' in the category list the 4th page' in the sequence to reach Q (results run on to multiple pages). Selecting 'back to results' the user is returned to the 4$^{th}$ page in the A-Z, OPQ section. The bookmark should read the same: 'A-Z of programmes>OPQ'

From the 'Search Results'

The user has arrived at the mini item page by running a search for GenericSoapShow: the selects the second page (there are 11 results so these run on to two pages) Selecting 'back to results' the user is returned to the second page in the search results. The bookmark should read the same: '11 search results for' GenericSoapShow.

Search Results Metadata

Search Results Metadata

Figure 80:
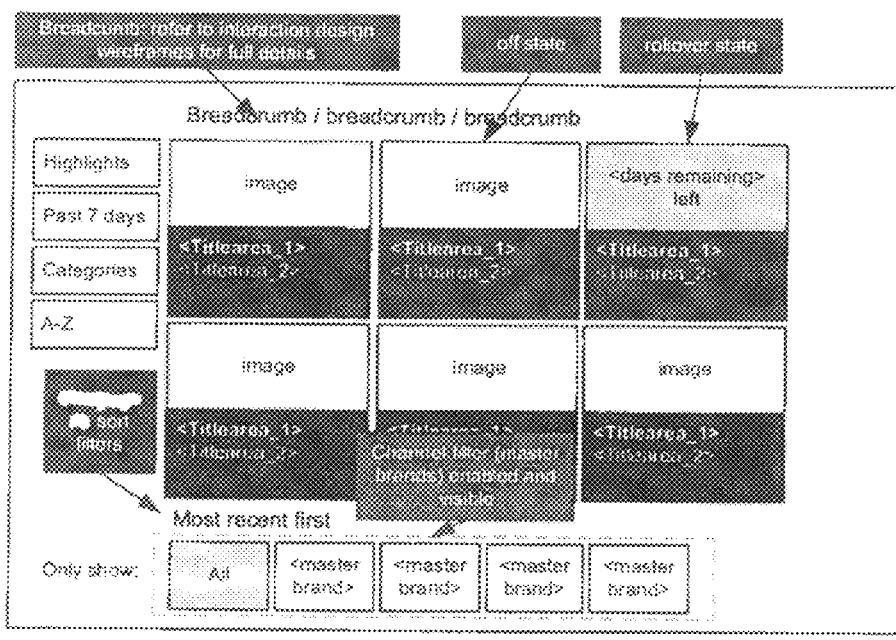
FIG. 80 shows the metadata for a search results screen.

FIG. 80 shows the search results interface metadata—reference.

Off State

Titlearea_1: displays the title of top level of any programmes hierarchy.

The top level title is dependent on the programmes structure, this could be either a group title or an episode title.

If an episode belongs to a group in this case display the title for the top level group, which could be the title for either Programme brand, Series or Sub-series.

So if the group title is at programme brand level display the programme brand title, if there is no programme brand title then display the series title, if there is no series title display the sub-series title.

If this programme is a one-off episode this should display the Episode Title field, (it is unlikely the Episode Presentation title field is populated for one off episodes).

Data model ref:
list the top level only if it is a group
Group title [programme brand]
ASSET_GROUP
COG_Title
Group title [series]
ASSET_GROUP
COG_Title
Group title [subseries]
ASSET_GROUP
COG_Title
list episode title for one-off episodes
Episode Title
ASSET_CONCEPT
COC_Title Titlearea_2: display the title of lowest level of the programmes hierarchy.

The lowest level title will always be for the episode.

This is either Episode Title or Presentation Title. If there is data in the Episode Title field then display this and do not display the Episode Presentation Title field. If there is no data in the Episode Title field display the Episode Presentation Title field. If the programme is a one-off episode then display the Episode Title should be displayed in titlearea_1.

If this programme is a one-off episode this should display the Episode Title field again, but allow it to wrap on to the two lines when extensive, (it is unlikely the Episode Presentation title field is populated for one-off episodes).

Either One of These at Episode Level . . .
Data model ref:
Episode Title
ASSET_CONCEPT
COC_Title
Episode Presentation Title
ASSET_CONCEPT
COC_Presentation_Title
Note on presentation of titles Total space allocated for all titles: 3 lines. Both Titlearea_1 and Titlearea_2 should start on their own line.

If 'Titlearea_1' needs to run on to the two lines then the space for 'Titlearea_2' should be restricted to the one line, so if 'Titlearea_2' exceeds the single line the remaining words should be cut off.

If 'Titlearea_1' fits on the one line then the 'Titlearea_2' can run on to two lines if it requires th space. But 'Titlearea_2' should not run on to 3 lines.

Rollover State

Days remaining: derived by calculation: minus the availability start date/time from the availability end date/time. Should state days until the last day and then should read hours remaining.

Data model ref:
Download availability end date
ON-DEMAND_PUBLICATION
ODU_Billed_Essence/Licence_Availability_End_Date
Download availability start time
ON-DEMAND_PUBLICATION
ODU_Billed_Essence/Licence_Availability_Start_Time
Download availability start date
ON-DEMAND_PUBLICATION
ODU_Billed_Essence/Licence_Availability_Start_Date
Download availability end time
ON-DEMAND_PUBLICATION
ODU_Billed_Essence/Licence_Availability_End_Time Image size: Medium 150×84. If image is not available display the default interactive player system image. (default image should be medium sized).

Data model ref:
Episode Image
GUI_IMAGE
GUI_ID

Master brand logo: master brand for that episode (asset concept). Clicking the logo filters the content in the grid view so that only the programmes that have that master brand assigned to it are displayed. The master brand should include an alt text.text.

Data model ref:
Master brand [code]
MASTER BRAND
MBA_Code
Interactive Player System Idents Design Many of the issues raised concerning downloaded idents discussed below are also related to the design of downloaded subtitles.

Terminology Note

This document uses the term 'Ident' to denote a piece of A/V played out before the 'main feature' A/V which the user has chosen. The main feature is referred to as 'content'.

Principles

Behaviour must be simple for users to understand.

Efficiency of the delivery network should be maximised by not having identical media in different packages.

Design Objectives

Idents are short clips played before A/V content. They have the following properties

- Idents are related to a Master Brand (see metadata documentation for more detail). All scheduled content is related to Master Brand: scheduled content must have its Master Brand's Ident played before the content starts.
- Either intentionally or due to metadata issues, some off-schedule content may not be associated with a Master Brand. In this case, a default generic Ident should be used.
- Idents do not have subtitles, signing or other accessibility features.
- Idents do not have the same rights restrictions as content: they do not need to have Digital Rights Management applied.
- Idents must be of similar quality to the content with which they are associated.
- Idents functionality must work offline.
- Idents are an average 5 s duration.
- There is a single Ident per brand.
- DOGs are to be applied where content does not already have a DOG.

Associating Idents with Media

The metadata model includes a relationship between Media and a Master Brand (in TVA terminology). The relationship may be directly from an episode to the Master Brand, if the episode does not have a Master Brand then the series' Master Brand should be used. If the series does not have a Master Brand then the programme brand's Master Brand should be used.

Each Master Brand will have an Ident associated with it: it is this Ident which is to be associated with the Media.

Provision of Download Idents (Channel Promotional Clips)

Idents may be uploaded by using an ad hoc process for example: email or FTP are two potential solutions. Included in the metadata associated with the ident is a name which will be used to associate the ident with the appropriate programmes. The naming convention used is for the Peer-to-Peer name/value pair:

Ident files may be loaded and associated name metadata onto a Peer-to-Peer system.

An Idents List may be updated and published. The Idents List will be a list of the MOIDs for all current Idents. The Idents List is published on a web server so that it can be read by the Download Manager.

Figure 81:
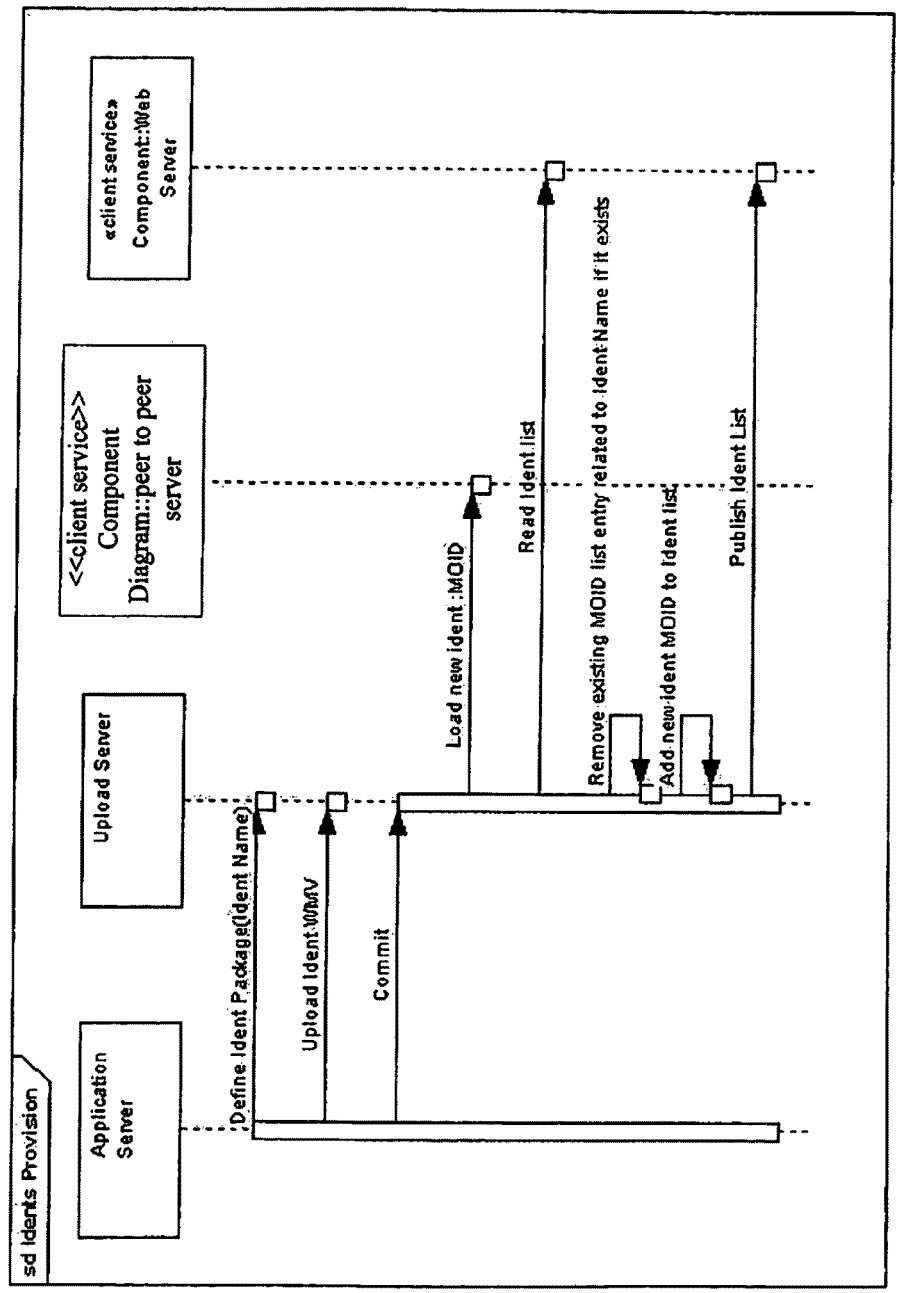
FIG. 81 is a schematic diagram of the transmission of channel identification content (idents)

FIG. 81 details the provision of download idents.

Streaming Playout Options

Combine AV & Idents

Idents could be combined with A/V content to create a single file.

Separate Idents

Idents are hosted on the broadcaster.co.uk streaming servers and associated with long-form content using .asx and .ram metafiles.

Download Playout Options

Combine Content & Idents into a Single WMV

Idents could be combined with A/V content to create a single WMV file.

The single file solution requires that the idents are re-delivered for each piece of content which is an efficient use of bandwidth.

The single file solution has DRM applied to Idents. While not necessary, this is not a problem.

Streamed Idents

The same Idents could be used as above. Streaming Idents would associated with downloaded content using .asx files. See further description herein for issues with manifest files and downloaded content.

The solution would not work offline, nor would the idents be of similar quality to the content.

Separate Download of Idents

Download Idents via HTTP

Figure 82:
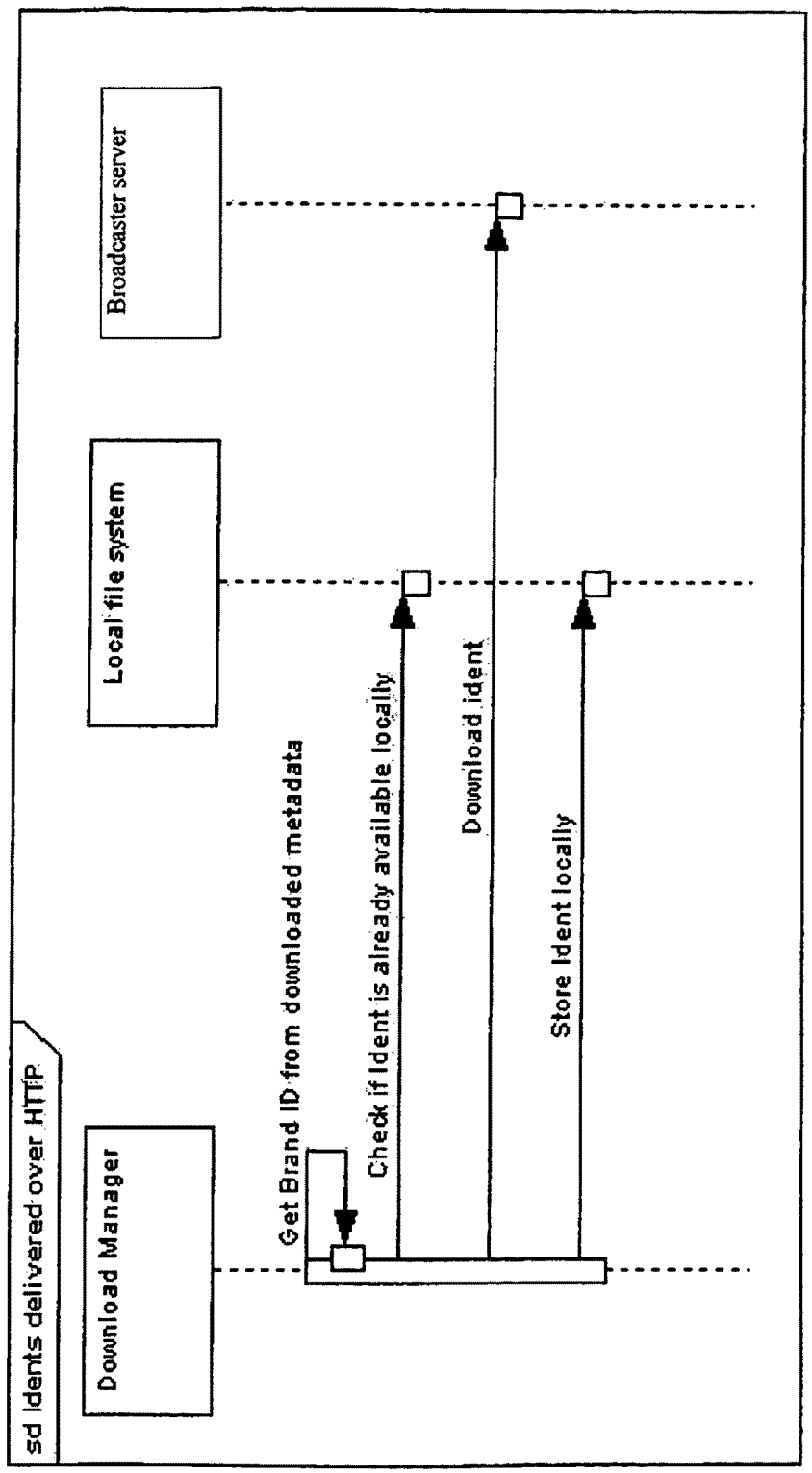
FIG. 82 is a schematic diagram showing the transmission of idents over HTTP.
Figure 83:
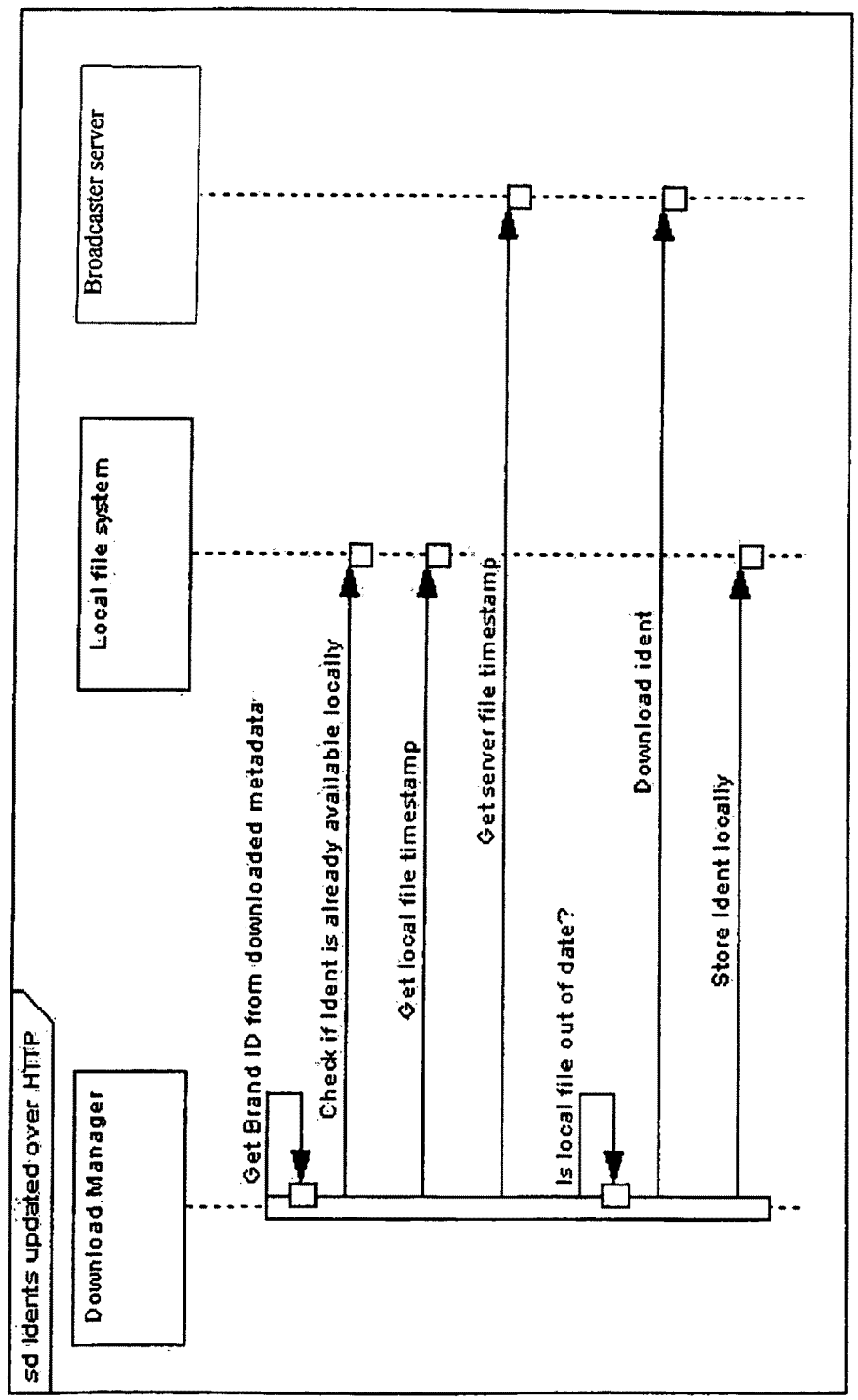
FIG. 83 is a schematic diagram showing the updating of idents over HTTP.

Idents are downloaded over HTTP from servers. The download would be scripted according to the following sequence diagram:

FIG. 82 details Idents delivered over HTTP. This solution could be refined to allow for updating of Idents. FIG. 83 details Idents updated over HTTP.

Download Idents Via Peer-to-Peer System 1

There is currently no mechanism to have multiple A/V files in a single Peer-to-Peer package. If the Peer-to-Peer system were extended to allow this, idents would be downloaded to the same local location as content.

Idents could be delivered via the current Peer-to-Peer system functionality if idents were defined as separate packages. The download of the packages could be scripted to happen automatically. There is an error condition whereby the first content files could be delivered before their idents.

Download Idents Via Peer-to-Peer System 2

A content file and its associated ident file could be packaged into a single .zip file for download. Each user's PC would have to keep the unzipped media for playout and the original .zip file for seeding the Peer-to-Peer network, thereby doubling the local storage requirement.

Download Idents via Peer-to-Peer System 3

Create a Peer-to-Peer series and have the content and ident files delivered as separate episodes of the series. The solution would require the ident's content MOD to be delivered to the client in order for the client to associate ident to content.

Download Idents Via Peer-to-Peer System 4

Use a single latest version reservation for each ident. This allows each ident to be updated easily. The set of series MOIDs will be read from the ident list (see further description herein) and the client configured to download them automatically on install and on startup thereafter.

Include Idents in Client Install

Include idents in the interactive player system installation.

Inclusion of the Idents in the installation file would have the following effect:

Include 9 Idents (8 national channels+1 generic) @ 5 s=4.5 MB

Include 32 Idents (31 national and regional channels+1 generic) @ 5 s=16 MB

These figures are in addition to the size of the installation file. Given the size of interactive player system content, neither install file size is a problem.

This solution does not allow for updating of idents. To do so would require the adoption of the updating solution as described further herein.

Playout of Separate Idents

However the content and ident files are delivered to the user's machine, they have to be united for playout. The connection of the files is done using an in memory ASX file. The ASX file holds a reference to the files to be associated.

Option Selection

Combining content and idents into a single WMV file pushes cost and complexity out to all production/encoding areas.

The small size of the ident files mean that it is not essential to have them delivered via a Peer-to-Peer system.

Solution Design

Streaming

Streaming idents should be separate files linked to their content using .asx and .ram files. The logic is shown in the below sequence diagram. The components involved will be different depending on which organisation is preparing the content, but the logic remains the same.

Figure 84:
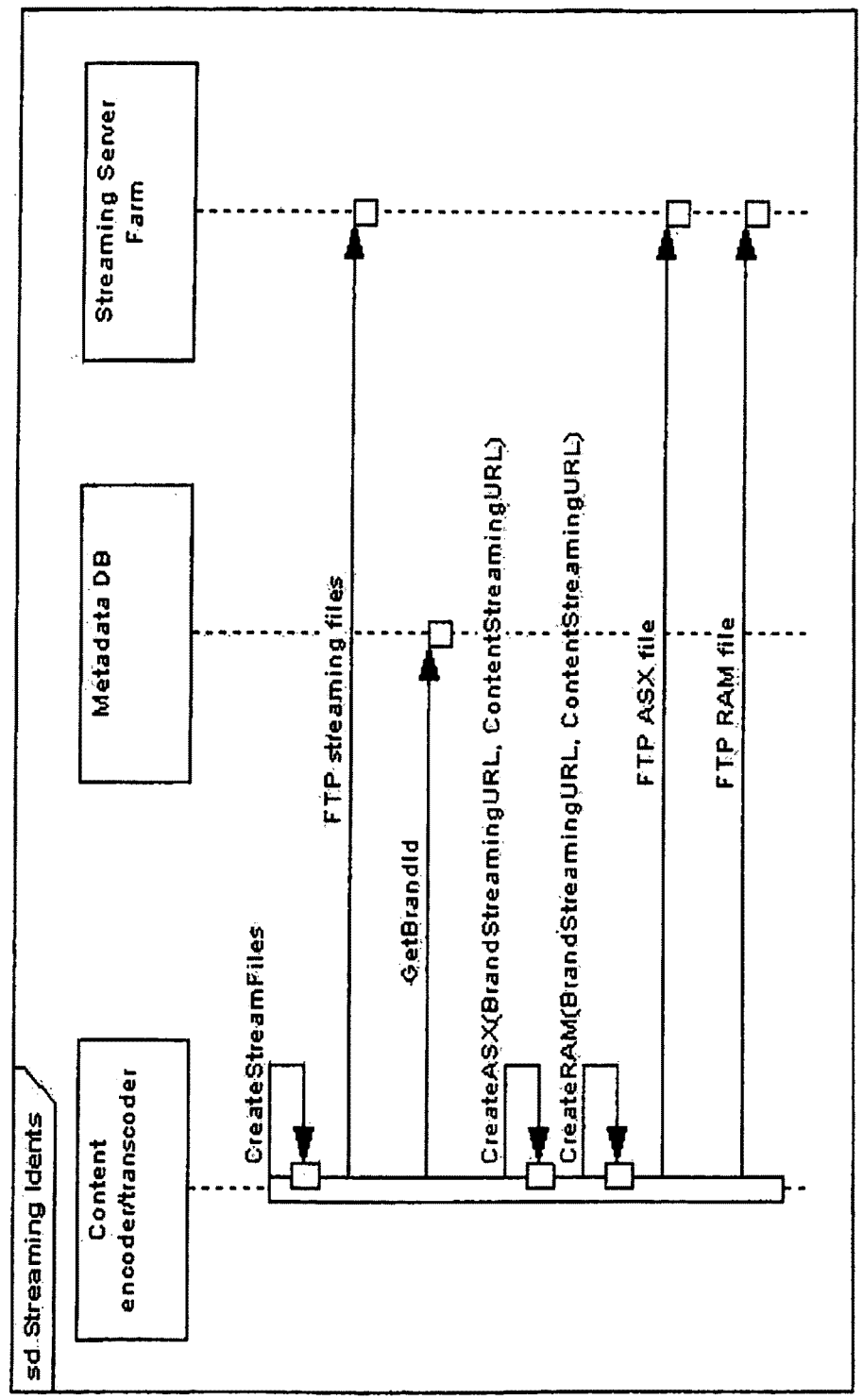
FIG. 84 is a schematic diagram showing the streaming of idents.

FIG. 84 details streaming Idents.

Downloads

Downloads may add two new metadata fields, ident name and required ident.

Each programme media item using an ident has the required ident metadata field set.

On installation and startup, the Download Manager will read the Idents List on a web server, check the MOIDs in the list against the content already download and trigger the download of any Idents not already downloaded.

The Download Manager must have some logic to not display the ident files as a separate bookings or downloads in the user interface. The logic is data driven: there is a flag in the Peer-to-Peer system metadata to indicate that the ident files should not be displayed. The flag is based on the following convention using a Peer-to-Peer name/value pair:

Name="bbcip_file_id"

Value=blank, "sub", "ident"

An extension to this model is to have a Retired Idents list which would prompt Download Manager to delete those files from the user's machine. An Ident would be retired if it was supersede by a later Ident with the same name.

Upon playback the download manager looks at the media files required ident metadata field and then iterates through the media store looking at the Ident Name metadata fields, when it finds a match it get the MOD and then the filename.

Figure 85:
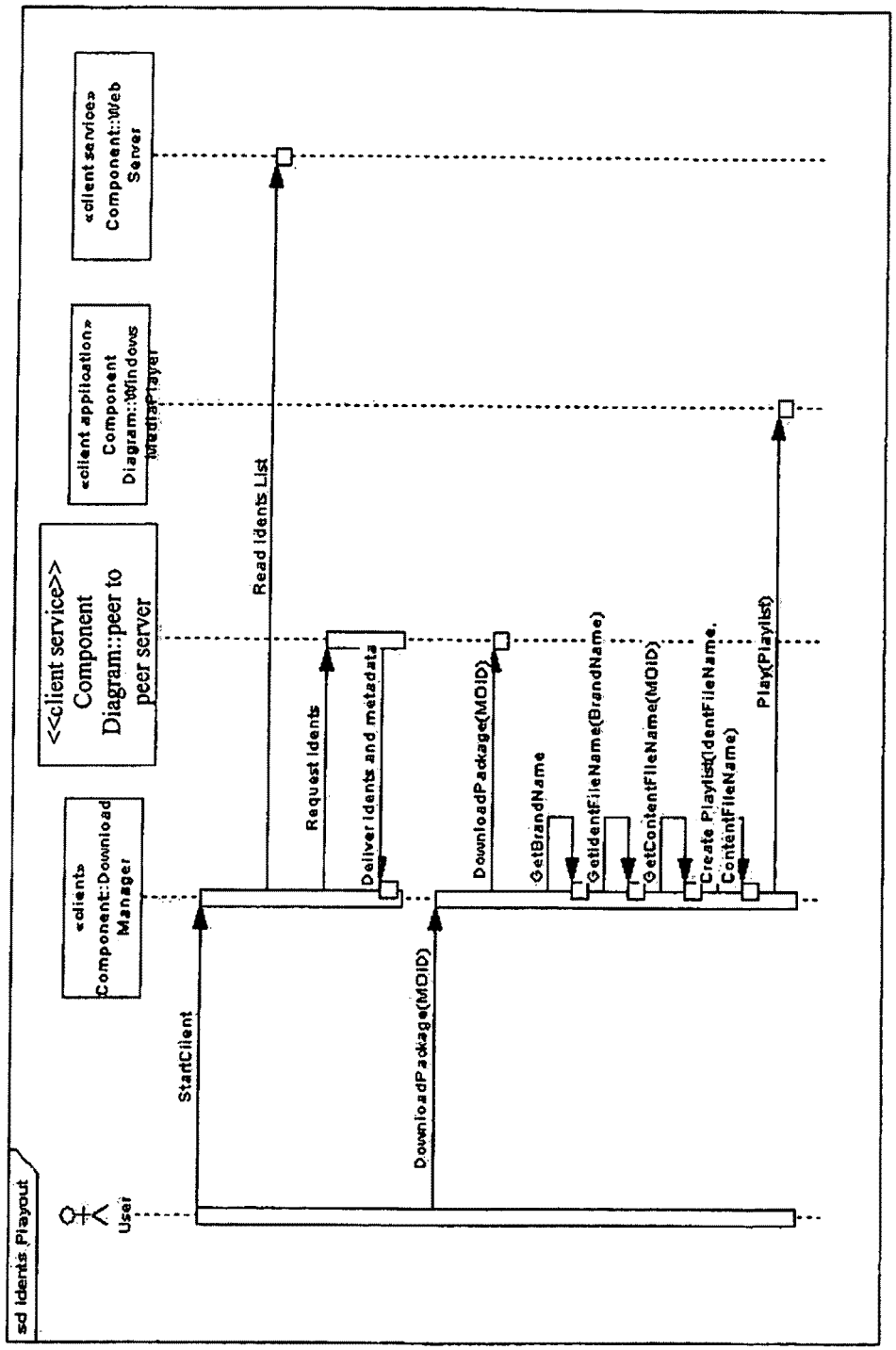
FIG. 85 is a schematic diagram showing the playout of idents.

FIG. 85 shows the sequence diagram for playout of idents.

Subtitles Design

The description herein of downloaded subtitles has equivalents in the description of downloaded idents.

Principles

Behaviour must be simple for users to understand

Download subtitles should be available offline.

Provision of Download Subtitles

Live programmes have subtitles entered directly into the broadcast stream and will therefore not be subtitled in interactive player system.

When defining a package indicate whether a subtitle file will be provided. If available, the SAMI subtitle file will be uploaded prior to the package being committed.

Once the package is committed, create a reservation MOID for the subtitle file and place that MOD in a metadata field of the WMV file. The naming of the metadata field is based on the following Peer-to-Peer name/value pair:

Name="bbcip_sub_MOID"

Value=<MOID>

Figure 86:
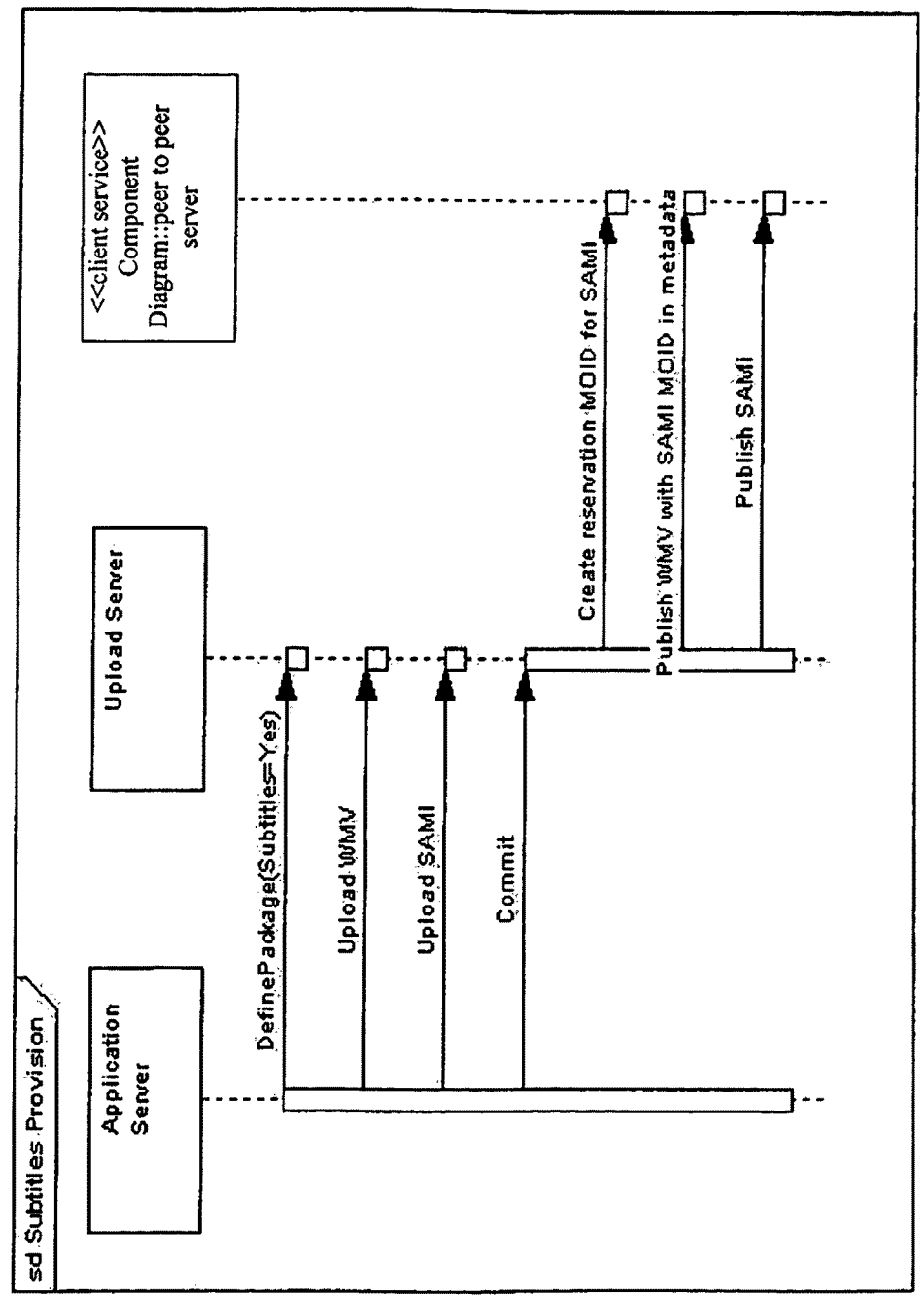
FIG. 86 is a schematic diagram showing the transmission of subtitles.

FIG. 86 illustrates the provision of subtitles.

Playout: Streaming Options

Separate Subtitles

Subtitles to be associated with media files using manifests: ASX or RAM depending on streaming technology.

Playout: Download Options

It is assumed that the subtitle file is in the SAMI format.

Embed Subtitles into WMV

The iMP trial involved taking the EBU-STL file, converting it into HTML and CSS and then embedding those files into the WMV file using the WMP SDK. The system worked with few issues during the trial.

Online Subtitles

Use a local ASX metafile to associate an online subtitle file with a local media file. The URL of the subtitle file would be passed to the client as a name/value metadata pair in the Peer-to-Peer system.

It is a constraint of the Peer-to-Peer system that the naming of files is not predictable on the client machine i.e. the local file name may not be the same as that on the server. In order to create the .asx file, it is necessary to discover the file name of the content on the local machine. There is an existing Peer-to-Peer API to support the discovery of the local file name.

When offline, the default behaviour should be to allow playout albeit without subtitles.

HTTP Download of Subtitles

Download the subtitle file using an ActiveX control. The URL of the subtitle file would be passed to the client as a name/value metadata pair in Peer-to-Peer.

Use a locally generated ASX metafile to associate the downloaded subtitle file with a local media file. Offline playout is supported as long as the subtitle file has been downloaded.

As for online subtitles, discovery of the local media file name via the Peer-to-Peer API is necessary in order to create the ASX file.

If the subtitle file has not been downloaded, the behaviour should be to allow playout albeit without subtitles.

Peer-to-Peer Download of Subtitles

Download the subtitle file using a separate MOID. Create an Windows Media Player API call using the Peer-to-Peer system API to discover the local WMV and subtitle file paths and names.

The Download Manager must have some logic to not display the subtitles file as a separate booking or download in the user interface. The logic is data driven: there is a flag in the Peer-to-Peer system metadata to indicate that the subtitle file should not be displayed. The naming convention for that flag is:

Name="bbcip_file_id"

Value=blank, "sub", "ident"

If the subtitle file is not available due to delayed delivery, the default behaviour should be to play the media without subtitles.

Option Selection

Streaming

Streaming subtitles should be separate files linked to their content using .asx and .ram files.

Downloads

Figure 87:
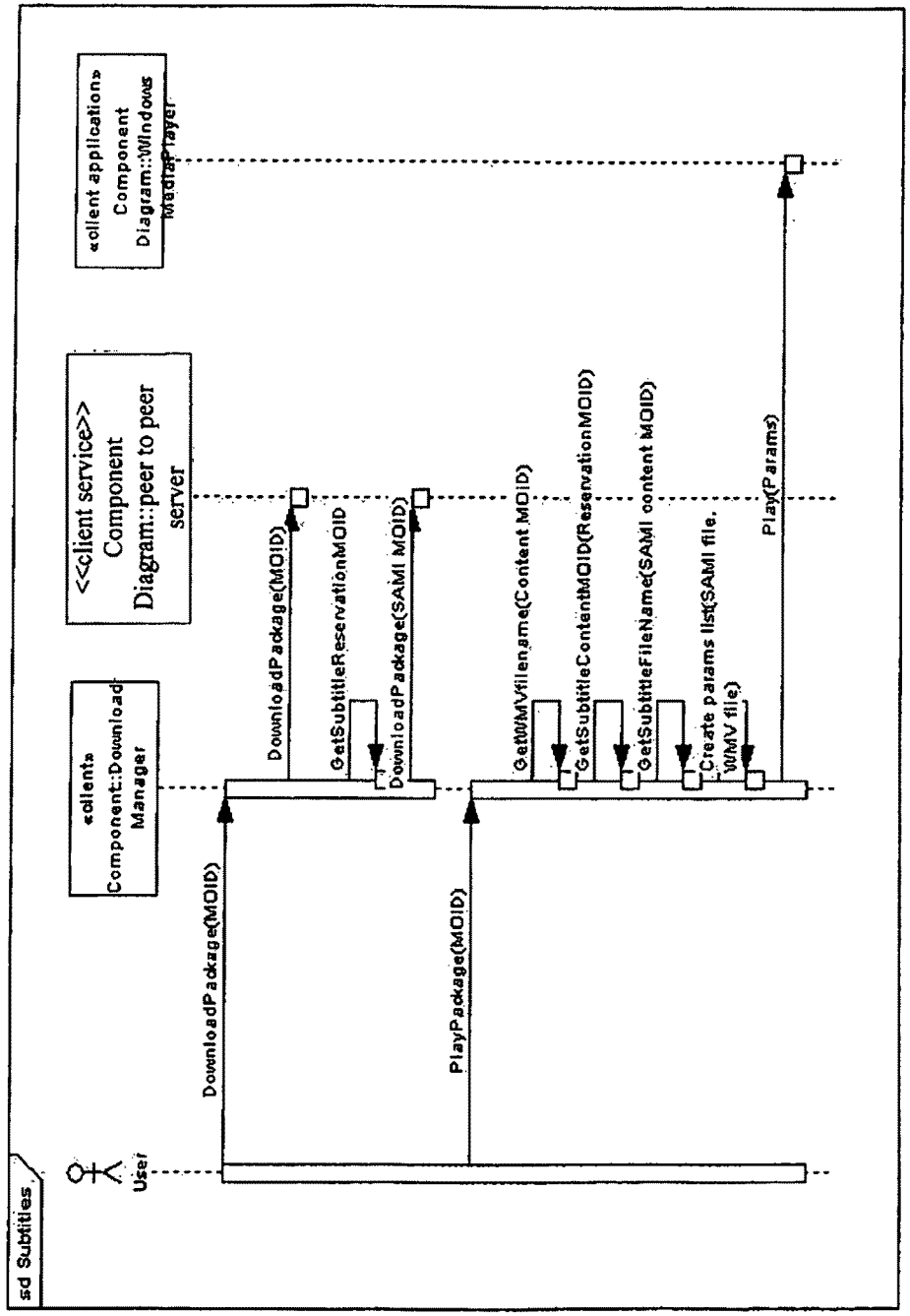
FIG. 87 shows further detail relating to the transmission of subtitles.

The preferred option is to use Peer-to-Peer to download subtitles and use a dynamically-created API call file to play them. This is illustrated in FIG. 87.

The following table details basic, additional and further elements of the system with respect to the handling of versions and repeats.

TABLE 30

| Basic elements | Further elements | Additional elements |
| --- | --- | --- |
| Same as further | There will be an Individual result for each separate episode concept e.g. Eastenders on Mondays, on Wednesdays and Fridays (there are no programme brand pages). | No change |
| Only the first broadcast instance of an item is displayed, although the DRM extends to cover the all transmissions of the item. When date is used in the display (e.g. search results OR on programme types where date is the identifier like Eastenders) first broadcast date is used. | Repeats are rolled up into a single result when they would cause duplication in a list view. The availability window of an item is based on last transmission in the rolled up set. First broadcast date within this 7 day window is used as the identifier. | 1. Repeats should be supported & duplication in list views is managed. |
| Versions are treated as separate items and will be displayed on the first broadcast date of that item in all views. (They are currently not marked as access versions and will result in duplication in lists with no way of knowing what the difference is). | All versions and repeats are rolled up into the mini item page but can also be found individually e.g. When a repeat is cross channel or cross time facet, the repeat can also be found when using all relevant filters (Channel and/or time). | 2. Items are marked with the versions they contain. 3. Versions are rolled up into mini item (otherwise they will need separate links on abc.co.uk and search engines as they have no relationship to the standard version) |
| Repeats are not displayed on the interface (only first broadcast) but rights windows are extended on the first broadcast to accommodate the repeat. | When a repeat is found, it is not marked as a repeat, the rights window presumes the last broadcast instance. However if the repeat is on a different day from the first broadcast, and the item is of a type where date is used as an identifier, it will be apparent as a repeat because the first broadcast date will be used as the identifier. | 1. Repeats should be supported & duplication in list views is managed. |
| N/A | Repeats and first broadcasts are in relation to a particular region. E.g. first broadcast on a London region, first broadcast on a welsh region. | 1. Repeats should be supported & duplication in list views is managed. 4. Regional programming is supported. |
| Access versions are treated as separate items. | If a mini item page set contains an available access version, this should be marked on the interface. | 2. Items are marked with the versions they contain 3. Versions are rolled up into mini item (otherwise they will need separate links on abc.co.uk and search engines as they have no relationship to the standard version) |

Interactive Player System Guidance Aspects

Guidance labels are applied to AV content that is on interactive player system and any associated broadcaster-.co.uk sites that link to interactive player system's content. These guidelines do not cover how Radio and off-schedule content are labelled, and also do not cover how content will be labelled on any VoD platform or any site or platform on which content is distributed or syndicated. The Guidance labels contained within these guidelines are subject to DFG/EDG approval.

Guidance Symbol and Labels

Guidance Symbol

Figure 92:
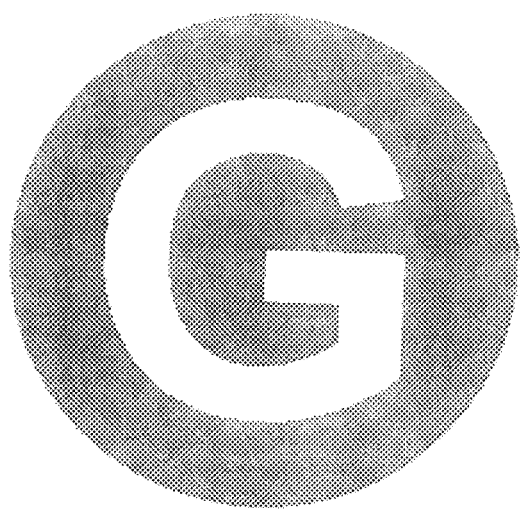
FIG. 92 shows a guidance symbol.

The symbol of FIG. 92 is the designated G for Guidance symbol, and should be displayed within interactive player system and associated sites as described below:

Guidance Label (Generic)

On occasion a generic label will be applied to Guidance where more detailed labelling is not required. This is as follows: 'Guidance'. It should be capitalised but never written in full upper case. On the screen it should be placed alongside the symbol of FIG. 92.

Guidance Labels (TV)

Content Labelling

Detailed below are the categories of challenging content which will be provided with guidance information for linear transmission and video-on-demand services.

The long-form description should be used where space allows. The short-form description is provided as a guide for the abridged form to be used on Electronic Programme Guides (EPGs) or elsewhere where space is limited.

Only Level 1 'Deutons' should receive an on-air announcement. These are codes Vn, Ln, Dn, Sn and RFI and are marked in bold.

Level 2 (text-only guidance) do not receive an on-air announcement. They are codes Wn.

| LEVEL 1 'DENTONS' (which would receive an on-air announcement) | |
| --- | --- |
| Code Long form | Short form for EPGs etc. |
| Violence | |
| V1 contains some violent scenes | Some violence |
| V2 contains prolonged violent scenes | Prolonged violence |
| V3 contains graphic violent scenes | Graphic violence |
| V4 contains scenes of sexual violence | Sexual violence |
| Language | |
| L1 contains some strong language | Some strong language |
| L2 contains strong language | Strong language |
| L3 contains very strong language | Very strong language |
| Distress | |
| D1 contains some scenes which some viewers may find upsetting | Some upsetting scenes |
| D2 contains scenes which some viewers may find upsetting | Upsetting scenes |
| D3 contains scenes which some viewers may find disturbing | Disturbing scenes |
| Sex | |
| S1 contains some scenes of a sexual nature | Some sexual content |
| S2 contains scenes of a sexual nature | Sexual content |
| S3 contains explicit sexual scenes | Explicit sexual content |
| RFI contains scenes of flashing images (e.g. strobe lighting) | Flashing images |

| LEVEL 2 TEXT-ONLY GUIDANCE (which would not receive an on-air announcement) | |
| --- | --- |
| Code Long form | Short form for EPGs etc. |
| WV contains scenes of moderate violence | Moderate violence |
| WL contains language which some may find offensive | Language may offend |
| WD contains some scenes which some viewers may find upsetting | Some upsetting scenes |
| W1 contains adult humour | Adult humour |
| W2 deals with adult themes | Adult themes |
| W3 contains some nudity | Some nudity |
| W4 contains scenes of drug use | Scenes of drug use |
| W5 contains graphic scenes of drug use | Graphic drug use |
| W6 contains behaviour which could be imitated | Behaviour could be imitated |
| W7 contains graphic medical scenes | Graphic medical scenes |

NB: D1 is a Denton and receives an on-air announcement. WD is a Level 2 text-only guidance and does not receive an on-air announcement (even though they both have the same description).

Guidance Label (Audio and Music)

Audio and Music programmes will have a one line warning which is "Language may offend" displayed along with the "G Symbol" for guidance. They will not follow the content labelling system detailed in Section 2.3 above.

A&M labelling will not be based on a watershed system, and will not assign multiple labels to programming.

Use of Labels (TV)

Only post-watershed content will be labelled for TV (with the exception of flashing images).

As now, programmes may receive more than one Level 1 Denton (e.g. "containing strong language and violence")

A programme which receives a Level 1 Denton will not normally receive an additional Level 2 text-only label as these reflect milder forms of challenging content (e.g. audiences expect programmes with strong language to also cover adult themes)

There may be exceptions to this rule (e.g. a Level 1 Denton for flashing images may also require a Level 2 text-only label concerning adult themes).

Presentation of Multiple Labels

Example: Contains violent scenes, strong language and adult humour. When a programme or asset has been assigned multiple guidance labels, they can be editorialised so that they become a single (coherent) sentence rather than a repetitive list.

Interactive Player System Navigation Pages

Home Page

There will be no G for Guidance labels present on the Home Page as standard (this is because viewers will see guidance information on subsequent pages after pressing either 'Watch now' or 'Download' calls to action). In exceptional circumstances a programme may need a G symbol and generic Guidance label applied on the home page (e.g. Jerry Springer: The Opera). These will be manually applied by the interactive player system home page team.

Schedule Pages

At a Glance

The 'At a glance' view of the schedule will not contain Guidance symbols or warnings (this is because viewers will see Guidance information when they click on a programme's channel information page).

Channel Information Pages

Channel information pages will contain G for Guidance symbol and labels in full, displayed under the programme synopsis (to the right of the screen). G symbols and labels will not be displayed as part of linked or recommended content.

Search Page

The G for Guidance will not be included on the basis that programme transmission times are displayed as part of Search Results information. Radio programmes will have guidance information as they do not follow a transmission-based watershed. No Guidance labels will be shown for a programme that can be pre-booked (for example, a series booking of an episode shown in three weeks time).

Browse Page

The Browse page is to be treated the same as the Search page. (This is because it is a functional variation to Search, but mirrors Search in the programme discovery and viewing journey).

Item Page (Programme Information Page)

G for Guidance symbol and labels will be shown in full form, displayed under the programme synopsis. G symbols and labels will not be displayed as part of linked or recommended content.

Streamed Media

Simulcast TV and Audio

The simulcast TV player (distributed via multicast or unicast) will not display the G symbol or labels. However, it will have a static link through to the Schedule page through which viewers can access Guidance information relating to each programme. The streams will carry any continuity announcements made on broadcast television.

The same applies for Audio and Music programming.

Streamed-on-Demand

Streamed-on-Demand TV programmes will contain a slide before each programme containing guidance labels which users will have to click through to begin the programme. Streamed-on-Demand Audio programmes will not contain a slide before each programme but will contain pre-programme continuity announcements detailing any guidance (delivered to best endeavours).

Download Manager

Download Options

G for Guidance symbol and short-form label will be shown at the programme version level. No Guidance symbols or labels will be shown at the series level.

My Library

Display of the G symbol and the word 'Guidance' is subject to the interactive player system redesign.

Downloading

Display of the G symbol and the word 'Guidance' is subject to the interactive player system redesign.

My Bookings

The 'My bookings' page will not display G for Guidance symbol or labels.

(This is because Guidance labels will be shown on the My Library page).

No Guidance labels will be shown for a programme which can be pre-booked.

abc.co.uk Channel Sites

G symbols will not be shown next to programme titles.

(This is because programmes are listed here without any further programme information).

G symbols and labels will not be shown next to programme information. (this is because this information is generally used for promotional purposes prior to transmission, so programmes will not yet be available to view through interactive player system).

broadcaster.co.uk Programme Sites

The same rules apply for programme sites as channel sites.

Implementation of Guidance Labels

Designation of Labels

It is presently believed that TV Operations' Compliance Unit will comply and label all of TV's scheduled content. They will not be labelling any of TV's off-schedule material at this time. Radio will continue to comply and label their programmes.

Guidance

Guidance advisory text will be displayed for video download content. Text and icon must be visible prior to download and within the Download manager.

Multiple Denton warnings can be shown per episode which will be displayed within one guidance advisory text message as a single sentence.

Guidance will be associated at the episode version level.

Guidance icon and Guidance advisory text message will be displayed on programme item page and the mini item page within the download manager.

If a user has set-up PIN protection, PIN input will be required prior to playout of "G" rated content.

Screen readers should be able to easily read the notification.

TV Operations will determine the labels that need to be applied to programmes, and they will inform BDS/RBM directly. BDS/RBM will then select and apply the appropriate label/codes for the programme.

Any on-air announcements will be played preceding programme play out.

PIN Protection

PIN protection will be available on downloaded G rated media.

PIN Protection will not be mandatory. The capability will be promoted after the installation of the download manager and will be made available via the download manager preferences settings. PIN will be defaulted to 'Off' within Preference settings area unless selected to 'On'.

Users will have the ability to set up and maintain a PIN number that must be inputted prior to playout of downloaded G rated content.

If an incorrect PIN is entered the user will be restricted from playing G rated programme until the correct PIN is provided.

Upon PIN setup, the user will input the 4 digit PIN and a memorable question and answer. If the user forgets their PIN, the PIN will be revealed upon entering the correct answer to the question. If the user cannot answer their question, they can opt to reset their PIN. In doing so they will lose any G rated content they have stored in their Download Manager. Users will be warned of this fact prior to and during PIN set-up.

PIN is managed and maintained locally on the client machine and is not connected to the login credentials.

Once setup, PIN can be disabled, but the current PIN needs to be inputted to do so.

PIN protection will only be possible for media played out through the interactive player system Download Manager. Media played out directly from the File Directory will not be PIN protected.

Under 16s and Interactive Player System

Under 16s Registering for Interactive Player System

Users under the age of 16 must be able to register and sign in to the interactive player system service. Users under the age of 16 will not be able to install the Download Manager.

If the user is under the age of 16, the user will be blocked from beginning the installation process via the D.O.B check in SSO.

Only users over the age of 16 can install the Download Manager.

It will be the adult's responsibility who has installed the Download Manager to set up PIN protection to prevent minors from viewing G rated programmes.

Use of Interactive Player System and Playout of G Rated Content

A user under 16 will be able to download G rated content, but they will be blocked from playing it through the PIN protection feature in Download Manager. It will be up to the adult who installed the Download Manager to set up PIN Protection.

It is desirable in the near future that children who have registered with the service will not be able to see G rated content in search and browse results.

Figure 89A:
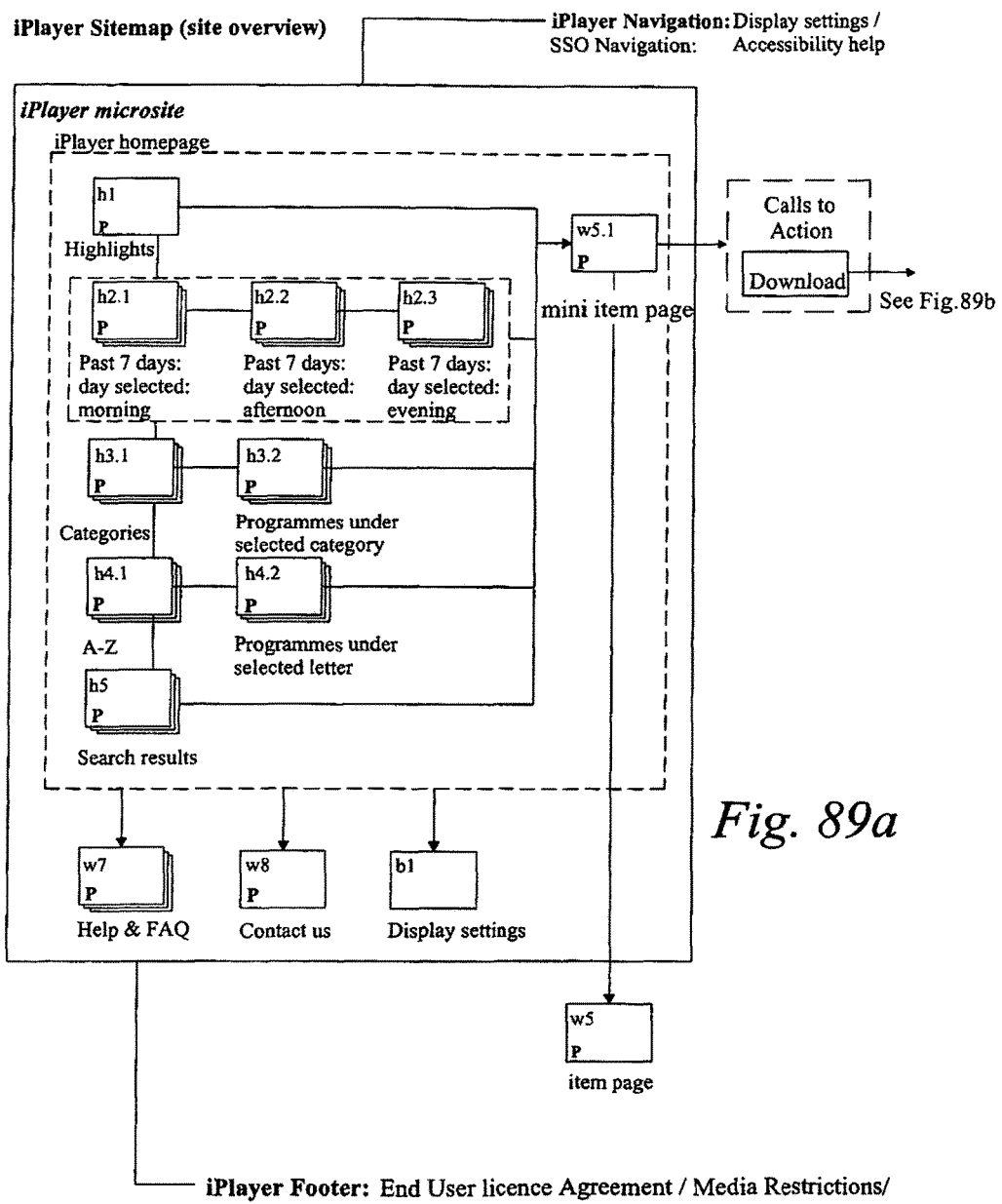
FIGS. 89a, 89b and 89c show the interactive player system sitemap or interface architecture.
Figure 89B:
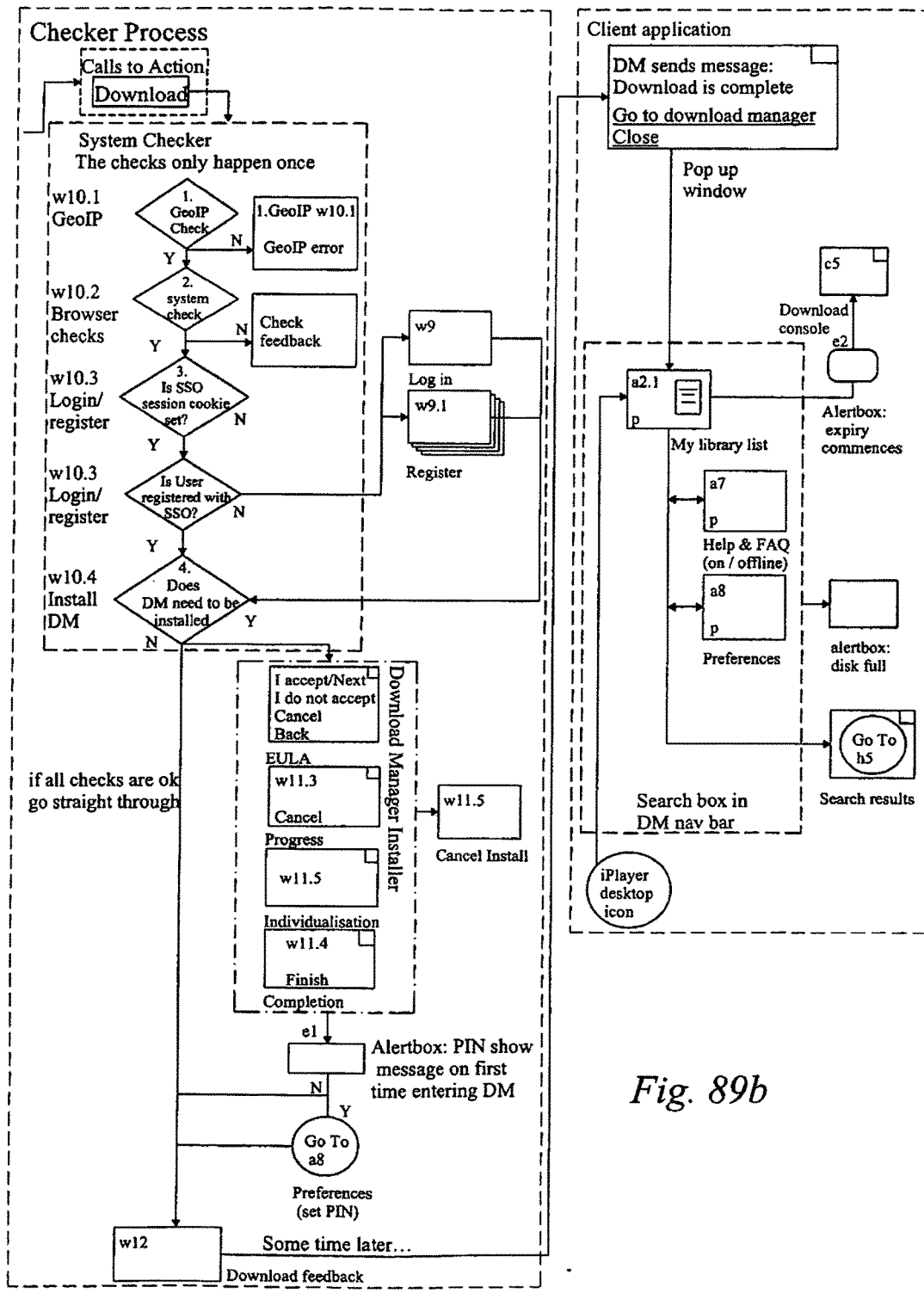
Figure 89C:
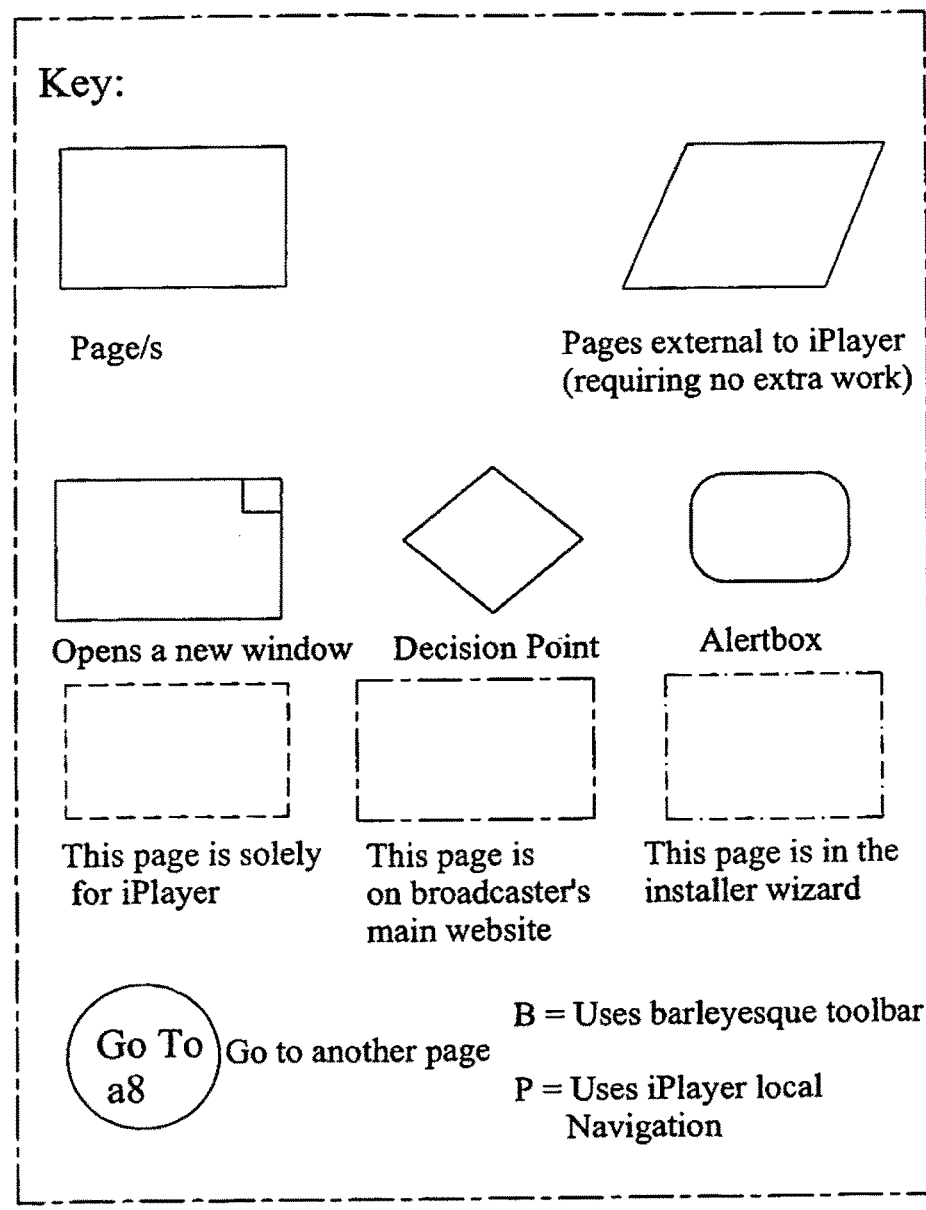

FIGS. 89*a*, 89*b* and 89*c* illustrate an overview of one example of the interactive player system sitemap or user interface architecture.

Calls to Action

Overview

The following description outlines certain examples of interactive player system calls to action. It refers to FIGS. 93 to 100, and provides further implementation details.

Definitions:

Interactive Player System Calls to Action

These are prompts for users to access a/v content. The CTAs are a kit of parts (design elements and guidelines) including:

- the icons and buttons which represent these prompts
- the language to use on and around these icons and buttons
- associated contextual information where appropriate/possible
- treatments/recommendations for how to integrate these prompts into sites (including into puff boxes and promos)

Interactive Player System 'Distribution & Syndication' (DAS)

A suite of tools to help promote and manage the interactive player system content within the broadcaster. It will provide a unified interface to achieve this whilst providing a means for internal systems—such as CMSs—to do the same.

It may also provide interfaces to:

find content available within the interactive player system compose dynamically updatable programme feeds e.g. always display latest episode of Spooks in the call to action specifying fall-back rules for those calls to action when a programme does not appear in the feed as expected, e.g. a transmission break or delay.

override calls to action when a programme needs to be embargoed due to rights issues or broadcast.

test and preview the behaviour of Calls to Action

These calls to action are a hugely important part of the interactive player system service. They have been created with the following objectives in mind:

A unified, recognisable and distinctive style with strong visual reference to the overall interactive player system brand Implementable across sites with minimum impact in terms of both page structure and look & feel Implementable through the Distribution & syndication Toolkit All options have been developed based on a site-wide audit and rigorous testing across numerous broadcaster.co.uk sites. The options are as flexible as possible to facilitate swift and painless implementation. There may still be exceptions where the proposed options in this document do not fit the bill. Children's content, especially Cbeebies is a known exception.

The Download Icon

Figure 93A:
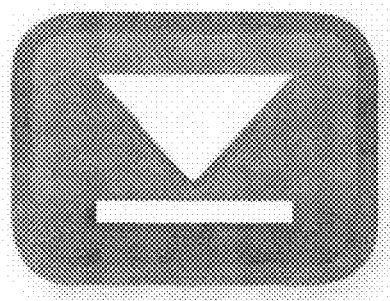
FIGS. 93a, 93b, 93c, 93d and 94 show various icons.

The download icon is shown in FIG. 93a.

Call to action language for interactive player system (Peer-to-Peer) downloads

Figure 93B:
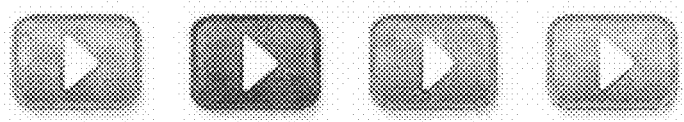
Figure 93C:
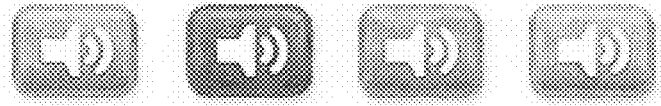
Figure 93D:

The download button may be used in conjunction with text, or as an expanded button (see FIG. 93d)

For example, "Download button"+ . . . (Editorial text)—e.g. Download Springwatch or Download the latest Spooks episode Any download link uses the term 'Download' in it or as an overall heading for a set of download links.

Other A/V Icons

One example covers TV downloads only so the interactive player system branded calls to action for TV streaming or radio will be implemented in another example. However, in order to avoid clashing graphic styles and to prepare sites for further examples, a/v icons are still standardised.

All new icons follow the same format and standardised sizes, but only the download icons should use the interactive player system magenta colour. All other icons must a different colour in this interim period to reflect that they are not part of the interactive player system brand. The set of colours will be supplied through DAS.

TV streaming icon—'Watch now'/'Watch live'

As shown in FIG. 93b, an arrow button, where the arrow denotes the 'play' function from real-world playback devices (VCRs etc).

Radio Streaming Icon—'Listen'/'Listen Live'

FIG. 93c shows a standard speaker icon used widely across broadcaster.co.uk and the web. The play arrow cannot be used for both audio and video streaming as users need to know up front which type of media they will be consuming.

Implementation Example

Figure 94:
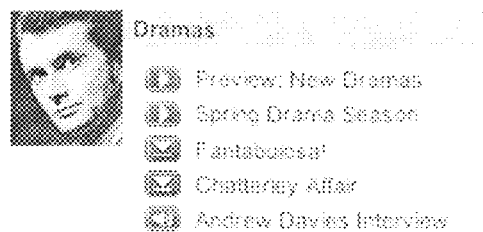

FIG. 94 shows an example of the implementation of the icons shown in FIGS. 93a, b, and c. The HTML links used next to the interactive player system icons use the link colour and type-style of the site (screen font etc).

Implementation

Icon Implementation Across the Site

All final icons come in a variety of sizes to suit different site structures (ranging from 10 pixels to 24 pixels height). Site owners and their teams use the largest possible within their site's constraints to optimise legibility for the user.

Final icon artwork can be supplied as:

transparent .png files

.gif files—aliased

.gif files anti-aliased to white (for use on white backgrounds only)

Offering these different versions allows for sites which have no design resource to simply swap out their existing icons for the new ones. For new sites, redesigns and sites which have resource to incorporate interactive player system changes, the ability to alias the new icons to their site colours (blending the edges to the background) will create a slicker crisper overall look and feel.

Icons, in one example, must:

be used for ALL a/v links across broadcaster.co.uk always use original artwork and should not be recreated.

always meet colour contrast standards be clickable always appear before a link not after it Iconography follows the Interaction Patterns Working Group guidelines and research on most recognised shapes for 'play audio' and 'play video' symbols.

Further development may be needed for children's versions.

Button Style

Sites also have the option to use call to action buttons instead of simple icons with html text.

Magenta/full colour buttons, such as that shown in FIG. 93d, are appropriate for use on central interactive player system pages (interactive player system home, interactive player system Manager etc) and on sites with strong colours where interactive player system Magenta will not overpower overall page look and feel. Rollover state changes the colour of text to #FFE6EE.

Light buttons have a neutral design and integrate neatly with most site styles whilst maintaining interactive player system brand identity. Rollover state changes the colour of text to #ED007F.

Full colour buttons—recoloured for non-broadcaster interactive player system content. Standardised, full colour version. There is no 'Live impact' version for full colour buttons.

Light buttons—recoloured for non-broadcaster interactive player system content. As with the simple icons, buttons must also be standardised for TV streaming and radio calls to action.

Button Usage

Buttons are created centrally in CSS rather than as graphics (the icons within the buttons will be graphics).

This makes them expandable and more accessible (text can be resized, and button's can be editorialised).

Call to action buttons always include the appropriate interactive player system icon.

Icons within buttons use original artwork and should not be recreated.

Default type style=Arial, 11 pt, bold. Colour #666666 (grey) or #FFFFFF (white).

Choice to use either the icon-with-html-text or button format to be decided on a site-by-site basis by site owners and their teams dependent on what best suit's their site style.

Large size buttons and Welsh language version to be created for later release

Use in Context—Interactive Player System 'Patches'

DEFINITION: interactive player system 'patches' are small, adaptable panels which can be slotted into sites to give users immediate access to—and site producers an immediate way of displaying—interactive player system calls to action. They can also be used to replace existing console launch buttons.

The patches are designed to facilitate inclusion of newly available download links with little or no change to page structures. There are a number of versions to suit different shape/size spaces and to fit with the many different visual styles across broadcaster.co.uk whilst maintaining a prominent, recognisable brand signpost for users.

Implementation

Patches update dynamically to always offer the most recently available episode/programme All patches have a minimum width but should be built 'stretchy' in order to fit different column and grid structures It's at individual sites' discretion which version is most appropriate to use 'Latest programme' is a link to the mini item page. This allows users to get more information about the currently available episode.

Wherever the interactive player system logo is used it must be clickable and link to the interactive player system homepage All patches may contain the contextual help '?' icon Use in Context—Interactive Player System Calls to Action Lifecycle DEFINITION: The lifecycle' of a call to action refers to the various states that need to be displayed to show the user what happens before content is available, while its available and after it expires. This applies mostly to the interactive player system patches which need to still serve a useful function on pages even when media assets are not currently available (for example if a series takes a break or an episode is moved in the schedule resulting in there being no available assets during the 7-day to download window).

Figure 95A:
FIGS. 95a to 95d show a number of calls to action (CTA) patches.

Three versions of the 'patches' are shown in FIGS. 95a, b and c.

Not yet available/pending—FIG. 95a

Promoting content soon to be available (i.e. within the next few days/week/when its available on the schedule) to maximise user awareness so they have ample chance to get the content.

DAS can automatically fill in 'available from' date

If not available, a generic 'coming soon' message will be used instead

Figure 95B:

Currently available—FIG. 95b

Showing latest content available to download.

As described previously

Figure 95C:

No longer available—FIG. 95c

Managing user expectations around expiry of content and offering a 'holding space' between available episodes.

When/if patches are no longer needed DAS can automatically remove them from pages Contextual Information DEFINITION: Contextual information around interactive player system calls to action includes: file expiry information, Guidance information, Help and explanation.

It is important to educate users about the new interactive player system service and manage their expectations of what we're offering. This means wherever possible give contextual information about a/v content at the point where users first encounter it—where they see the calls to action across the site. The wide variation in page structure across the site severely restricts available space for integrating this important information but the following rough examples show how we can start to do it.

Contextual Help

Wherever possible the '?' help icon should be included next to/near the download call to action. It will definitely be included in all interactive player system 'patches'. The content of this help i at a minimum includes a brief description of what 'download' means, system requirements for accessing the different formats and a brand statement.

Expiry information

Figure 96:
FIGS. 96 to 100 show various call to actions patches in various contexts.
Figure 97:
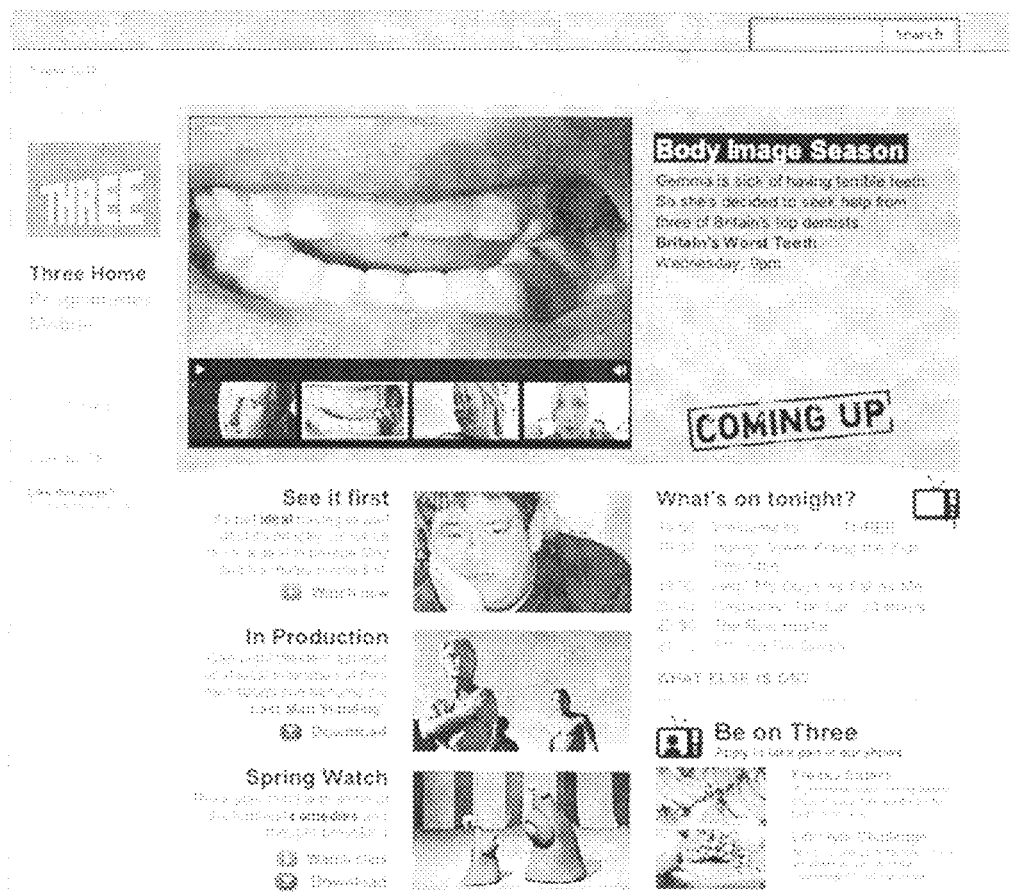
Figure 98:
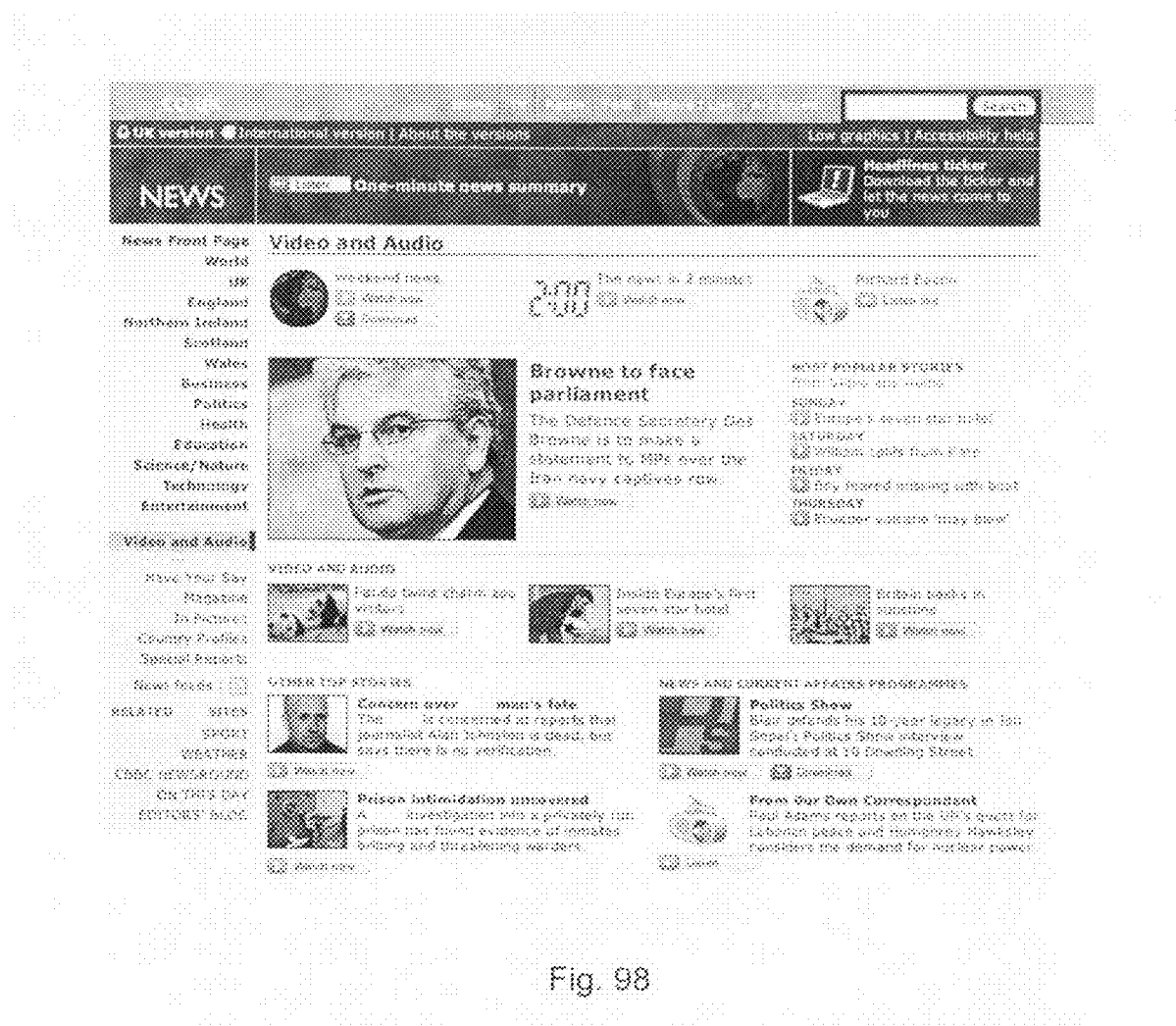
Figure 99:

This information is vital in managing user expectations about the service. Fitting it around the calls to action across the wider site is extremely difficult as the thousands of different site structures are not built to incorporate it. FIG. 96 shows how this will be managed across broadcaster.co.uk.

The buttons are more than just the link to 'Download'—they contain additional information which is hidden by default. This hidden information is about the date that the programme is available until. When the button is hovered-over, a JavaScript function adds 'id="active"' to the outermost div, revealing the hidden information (which is the div with class="ist_p", below) as an absolutely positioned pop-over.

<div class="ist_e">This is not currently available to watch or download</div>

4 days left to download.

FIGS. 97 to 100 show the Call to Action examples in the context of a user interface.

Further Details Relating to Call to Action (CTA) Patches are Now Provided

The use of CTA patches provides an interface between a content distributor, for example a broadcaster, and a content producer/distributor thereby enabling the content producer/distributor to provide more easily and flexibly their audio and/or video content over the internet on a streamed and/or downloadable basis. If restrictions are applied to the content, for example, if the content is deemed only to be available for a limited time window, or if the producer/distributor wishes to vary periodically the time window during which the content is available, these can be handled using the CTA patch.

The CTA patch provides a mechanism for enabling a distributor to provide a content item, along with the actual availability of the content item content, on various internet web pages on a particular content distributors' site, or on different websites on the internet.

The CTA patch is a browser and operating system independent component which acquires and presents current information and, if appropriate, stream and/or download links on a target page, without requiring any active input from the hosting page or website, other than to include the particular CTA patch code.

The CTA is effectively a link to either a stream or a downloadable file, and a "Patch" is a small region (e.g. rectangle) of a web page which displays certain information relating to the CTA. The CTA patch provides one or more CTAs to a user.

The CTA patch comprises a package of html and script source code that can be used to syndicate audio/video content from one originating site, page or server to another site, page or server. The patch itself contains and presents information relating to the availability of the content item, or group of content items, and enables the item to be streamed or downloaded, as appropriate, via appropriate links or icons.

As the syndicating (syndicated to) page is loaded by the user's browser The CTA patch communicates with a database operated by the content distributor in order to acquire accurate information about the status of the item, and acquire links to downloadable file and/or streamable item(s) if it is available at that time. Typically, this will involve a query to a database on which the information is contained, and to which the content item is linked.

The CTA patch is then updated regarding the availability of the content item, and whether or not the item is available for streaming and/or downloading. The patch then displays this current information relating to the content item, along with an appropriate a link or icon to enable a user to either stream or download the item.

In certain examples, the patch may optionally be customized by the hosting page to be invisible if the item is unavailable for streaming or downloading at a particular time.

The receiving (or syndicated to) site only needs to embed the CTA patch code and customise it with the ID of the content item (or series or other grouping of content items) once, and thereafter the page will always link to the correct current information relating to the content items' availability, and present appropriate icons to enable a user to stream or download the content items.

Figure 95D:

Thus, for example with reference to FIGS. 95a to 95d, if the distributor or broadcaster is able, in accordance with commercial rights, to make a particular content item available for 30 days from Dec. 6, 2007, then the patch will initially appear on a syndicated website as shown in FIG. 95a, that is, before the item is available the patch only indicates when the item will become available. Once the content item has become available, the patch indicates via a download link (shown in FIG. 95b) or via a watch now link (shown in FIG. 95c) that the content item is now available. The text displayed in the patch is also updated. Once the content item is no longer available, the patch will be updated as shown in FIG. 95d. Alternatively, the CTA patch might appear to be invisible after the 30 day window.

In an example, the content item is in the form of a TV programme which has previously been broadcast or simulcast on a scheduled basis, and is now being made available on a catch-up basis.

In an example, the 30 day availability window is related to the date on which the content is first broadcast, that is, the content is made available for streaming or downloading for 30 days following the broadcast.

In the case where the patch refers to a group of content items (e.g. the same program, but with and without subtitles or, say, three episodes of a programme series, which are all made available within the same time window), then the patch will provide a list of content items in the form of a drop down menu list.

The CTA patch is implemented in a number of different possible client-server configurations, incorporating client-side and/or server-side code. Two possible example configurations are shown in FIG. 101.

Figure 101:
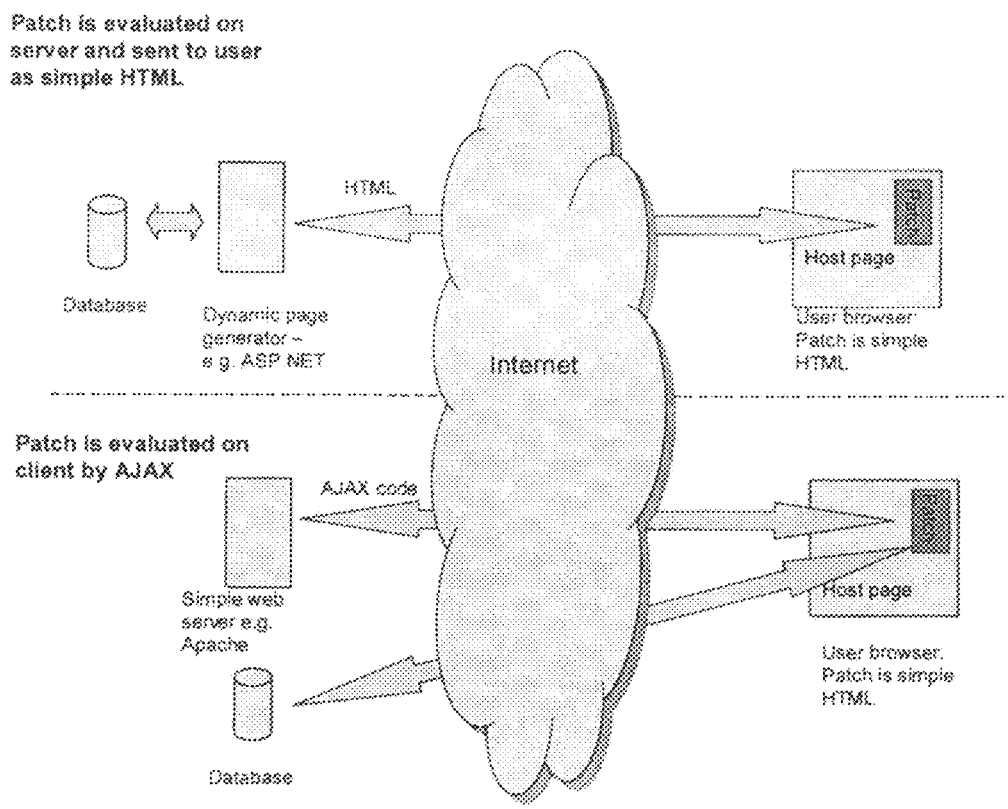
FIG. 101 is a schematic diagram showing the implementation of a CTA patch system.

In the first example, shown in the upper half of FIG. 101, the content item is stored on a server accessible via a database, along with information relating to the availability of the content item. A dynamic page generator, which may be executed on the same server or on a different server, evaluates the CTA patch embedded on the host server and transmits the appropriate information to populate the patch when the user access the page containing the patch. The patch will then contain the current information relating to the availability of the content item, together with an appropriate link to enable the user to either download or stream the content item.

In the second example, shown in the lower half of FIG. 101, AJAX (asynchronous JavaScript and XML) techniques are used to generate the CTA patch.

Further Details Relating to the Exchange of Metadata are Now Provided

The interactive player system incorporates an interface, which together with a concise metadata format for describing audio/visual content, is able to transfer audio/visual descriptions of content to be transferred efficiently between different systems. The interface incorporates a transport standard to enable the audio/visual descriptions to be exchanged in consistent fashion between different systems (business-to-business).

This provides a reliable method and system for transmitting complex programme metadata structures between different systems, for example to ephemeral schedule-type applications, or permanent content repositories.

The system is based on the TV-Anytime specifications, which are aimed at business-to-consumer applications.

1) Profile for Business-to-Business Exchange of Audience-Facing Programme Metadata A new profile based on the TV-Anytime (TV-A) XML application has been created specifically to support the business-to-business exchange of complex audience-facing metadata for audiovisual programmes. This contrasts with the business-to-consumer use cases central to the basic TV-Anytime specification. Many branches of the large TV-A tree have been omitted, and strict semantic restrictions have been attached to the remaining areas, thereby creating a rich, expressive format.

This format enables both permanent content attributes of single programmes and wider groups to be described. Furthermore, ephemeral details of particular broadcasts and on-demand publications can also be described using the same format. Additional secondary groupings can be modeled to support editorial creations that mix newly commissioned material with re-purposed media using this format. Thus, detailed representations of the editorial structure of a whole series of programmes, together with their planned publications, can then be safely transmitted between different systems (business partners).

This data services a wide variety of information platforms, from permanent stores to ephemeral listings. These can be presented in full detail, or projected onto simpler representations, as appropriate.

When further sub-profiling for specific project requirements in incorporated, the profile is able to carry five different data flows between a content producer, content providers and other syndication partners.

2) Generic Interchange Interface for TV-Anytime Transactions

A generic interchange interface, for transporting and packaging up TV-Anytime transactions, based on SOAP web services and MPEG-7 Systems, is defined in terms of WSDL and provides messages to publish descriptive metadata and Content Referencing Information. The interface also defines "recorded delivery" messaging semantics with a synchronous response message defined so that a recipient is able acknowledge receipt, and the publisher can maintain a transaction audit trail.

The interchange interface is designed to be generic, in that it allows any valid TV-Anytime fragments to be interchanged between any two parties. A number of particular profiles have been designed, but the actual profile used is negotiated between the content publisher and the content recipient at the start of each logical interchange session.

Fragments are conveyed as attachments using the SOAP Message Transmission Optimisation Mechanism. This allows security (e.g. a digital signature) to be applied to the entire SOAP Envelope if required.

The interface supports TV-Anytime's native version control system. Each fragment of interchange has a unique fragmentId plus an incrementing fragment Version, and each fragment can also be attributed to a particular party. This assists in dealing with any data collision issues.

Further details relating to aspects, including particular examples, are described in Appendix B.

EPG System Implementation

Figure 102:
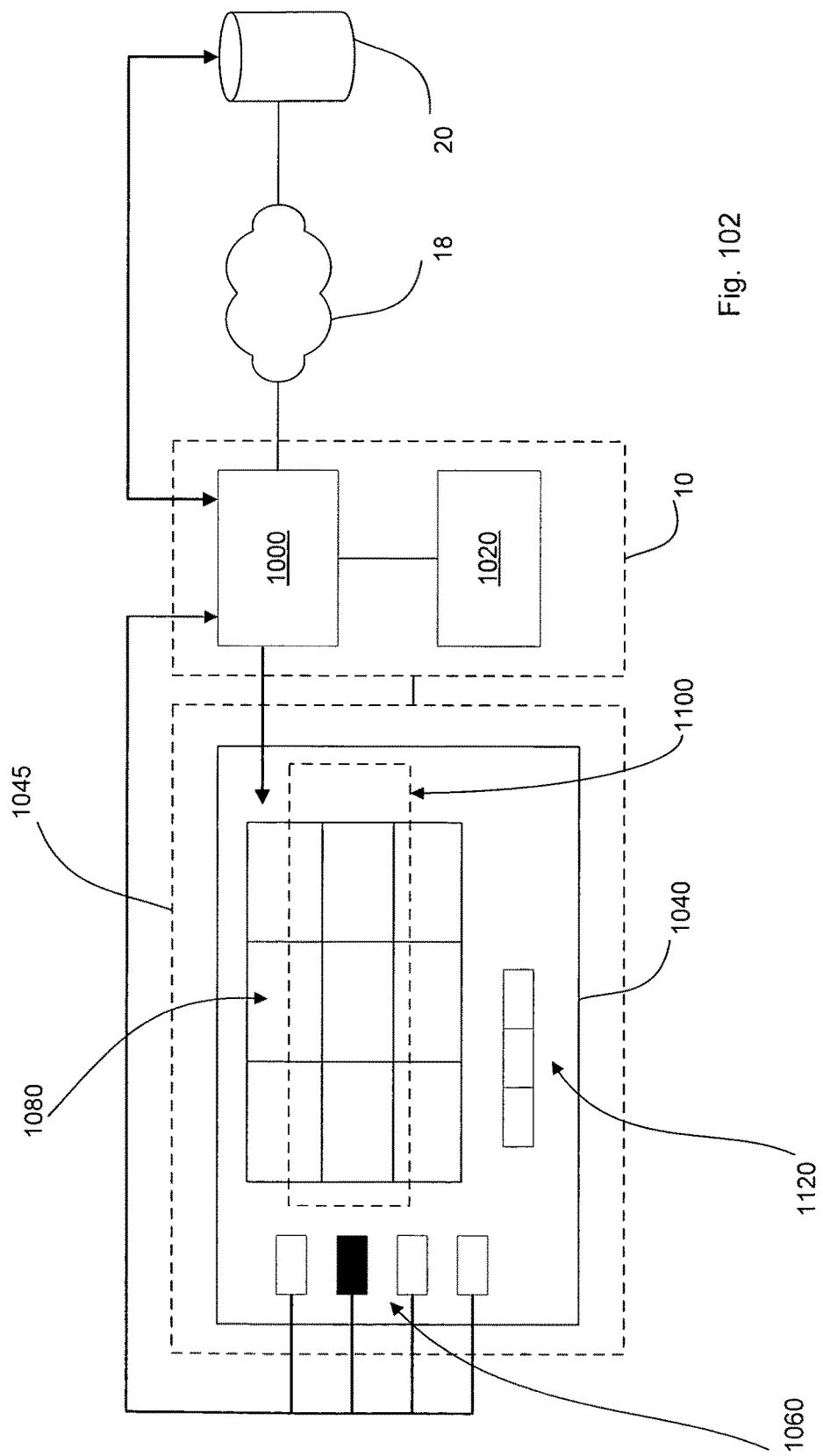
FIG. 102 is a schematic diagram of a system for implementing an EPG.

One example of the implementation of the interactive player system EPG is now described with reference to FIG. 102. As shown in FIG. 102, the EPG 1040 is displayed on a display device 1045 connected to a personal computer 10. The personal computer 10 comprises a processor 1000 connected to an associated memory 1020, which executes client software code adapted to generate and update the EPG 1040. The personal computer is also connected to a database 20, connected to a mass storage device and appropriate servers (not shown), via the internet 18.

When the EPG 1040 is first accessed or loaded, a default selection of content items are transmitted to the EPG 1040 and displayed in the display area 1080 of the EPG 1040 in a graphical form.

The EPG 1040 includes a set of graphical icons 1060 each relating to particular content item characteristics, for example, when a content item was broadcast, the channel on which is was broadcast, the category, and so on. When a particular icon is selected by a user the EPG 1040 displays a submenu 1100, superimposed over the display area 1080, which displays a number of parameters relating to the characteristic, enabling the user to select one of these parameters. In one example, the characteristic may relate to when the content was broadcast, in which case the submenu displays a calendar window, as shown for example in FIG. 29.

Once the user selects a particular parameter, for example a date on the (calendar) submenu 1100, the processor transmits this information to the database 20, which then responds by transmitting back content items which meet the selected criterion. These content items are then output to the display area 1080. In this way the content items displayed in the display area 1080 are filtered in accordance with the characteristic selected by the user.

The user is able to filter further the displayed content items by selecting a further graphical icon 1120 which represents a further characteristic, for example the channel on which the content was broadcast. This selection is also fed back to the database, and the displayed content items are updated accordingly.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A system for providing users access to audio/visual content, the system comprising a server having a server memory for storing previously broadcast content and a server processor; and a client device having a client device memory and a client device processor, wherein operation of the server processor causes the server to:
assign an access operation to available content, the access operation being related to the method by which a user is able to view and/or listen to the stored content
alter the access operation in dependence on whether or not the content has previously been broadcast;
broadcast content at scheduled broadcast times in accordance with a program schedule;
produce at the server downloadable files of said content after the scheduled broadcast time in dependence on the access operation, and to apply restricted access rights to the downloadable files; and
stream on demand, via a communications network, the previously broadcast content directly to the client device after the scheduled broadcast time in dependence on the access operation;
wherein operation of the client device processor causes the client device to:
download on demand, via the communications network, within a specified time period subsequent to the scheduled broadcast time, the downloadable files from the server memory directly to the client device memory;
enable a user to access the downloaded files directly from the client device memory only within the specified time period, the specified time period being subsequent to the scheduled broadcast time of the content;
restrict user access to the downloaded files directly from the client device memory outside of said specified time period in accordance with said restricted access rights; and
stream on demand, via said communications network, within the specified time period subsequent to the scheduled broadcast time, the stored previously broadcast content directly from the server memory.

2. The system according to claim 1, wherein the operation of the client device processor further causes the client device to order content which has not yet been broadcast on a scheduled basis.

3. The system according to claim 2, wherein the client device is adapted to download ordered content following the broadcast of the content without further user intervention.

4. The system according to claim 1, wherein the server is adapted to broadcast content in the form of a simultaneous broadcast (simulcast) transmission.

5. The system according to claim 4, wherein the simulcast transmission is selected from two or more of the following group of broadcast transmission media:
a terrestrial television broadcast;
a terrestrial radio broadcast;
a cable television broadcast;
a satellite television broadcast; and
publication on the internet.

6. The system according to claim 1, wherein the client device is adapted to enable a user to access the content only within a specified time period following the scheduled broadcast time associated with the content.

7. The system according to claim 1, wherein the client device further comprises a media player for opening and playing content.

8. The system according to claim 7, wherein the media player is adapted to perform one or more of the following:
open and play downloaded files;
play streamed content; and
play broadcast content.

9. The system according to claim 7, wherein the client device is in the form of a standalone player console.

10. The system according to claim 7, wherein the player is in the form of a standalone module adapted to be independently downloaded and installed onto the client device.

11. The system according to claim 1, wherein the client device is adapted to stream content via a peer-to-peer network.

12. The system according to claim 1, wherein the operation of the client processor further causes the client device to enable a user to search for content items stored on the server memory, and wherein the client device is adapted to search for content in dependence on an access mode by which the content may be accessed or played.

13. The system according to claim 1, further comprising a content management console for managing downloaded content, and, preferably, wherein the content management console is adapted to be independently downloaded and installed onto the client device.

14. The system according to claim 13, wherein the content management console is further configured to index related content items together.

15. The system according to claim 13, further comprising a user interface which provides a set of folders under which related content items are indexed.

16. The system according to claim 1, wherein the operation of the client processor further causes the client device to restrict access to content in dependence on whether the content is marked with a guidance flag.

17. The system according to claim 1, wherein the operation of the server processor causes the server to assign guidance flags to content automatically in dependence on metadata associated with the content.

18. The system according to claim 1, wherein the operation of the server processor causes the server to transmit further content relating to a particular content item separately from the particular content item once the particular content item has been downloaded.

19. The system according to claim 18, wherein the operation of the client processor causes the client to link the further content to the particular content item once the further content item has been received.

20. The system according to claim 18, wherein the further content is in the form of accessibility information.

21. The system according to claim 20, wherein the accessibility information is selected from the following group:
subtitles, sign language information; and
audio description information.

22. The system according to claim 18, wherein the server is adapted to initiate the transmission of the further content once the further content becomes available.

23. The system according to claim 1, further comprising a user interface for enabling a user to access content which may be downloaded, streamed in an on demand fashion, and broadcast.

24. The system according to claim 23, wherein the user interface is in the form of an Electronic Programme Guide (EPG) which is adapted to enable a user to access all available audio/visual content.

25. The system according to claim 1, wherein the client device is adapted to enable a user to stream the content on demand from the server memory only within the specified time period.

26. The system according to claim 25, wherein the client device is adapted to enable a user to stream the content on demand from the server memory only within the specified time period following the scheduled broadcast time of the content.

27. The system according to claim 1, wherein the characteristic relates to the date on which the content was broadcast.

28. The system according to claim 1, wherein the access operation enables a user to access the content item in one or more of the following ways:
by downloading the content, by streaming the content, and by ordering the content.

29. The system according to claim 1, wherein the access operation enables a user to access the content item by ordering the content.

* * * * *